US011838554B2

(12) United States Patent
Deng et al.

(10) Patent No.: US 11,838,554 B2
(45) Date of Patent: Dec. 5, 2023

(54) CONSTRAINS FOR DIFERENT CODING TOOLS

(71) Applicants: Beijing Bytedance Network Technology Co., Ltd., Beijing (CN); Bytedance Inc., Los Angeles, CA (US)

(72) Inventors: Zhipin Deng, Beijing (CN); Ye-kui Wang, San Diego, CA (US); Li Zhang, San Diego, CA (US); Kai Zhang, San Diego, CA (US); Kui Fan, San Diego, CA (US)

(73) Assignees: BEIJING BYTEDANCE NETWORK TECHNOLOGY CO., LTD., Beijing (CN); BYTEDANCE INC., Los Angeles, CA (US)

( * ) Notice: Subject to any disclaimer, the term of this patent is extended or adjusted under 35 U.S.C. 154(b) by 0 days.

(21) Appl. No.: 17/898,073

(22) Filed: Aug. 29, 2022

(65) Prior Publication Data

US 2023/0027478 A1 Jan. 26, 2023

Related U.S. Application Data

(63) Continuation of application No. PCT/CN2021/078190, filed on Feb. 26, 2021.

(30) Foreign Application Priority Data

Feb. 29, 2020 (WO) ................ PCT/CN2020/077325

(51) Int. Cl.
*H04N 19/70* (2014.01)
*H04N 19/105* (2014.01)
(Continued)

(52) U.S. Cl.
CPC ........... *H04N 19/70* (2014.11); *H04N 19/105* (2014.11); *H04N 19/107* (2014.11); *H04N 19/11* (2014.11);
(Continued)

(58) Field of Classification Search
CPC ...... H04N 19/70; H04N 19/105; H04N 19/11; H04N 19/122; H04N 19/132; H04N 19/139; H04N 19/186; H04N 19/61
See application file for complete search history.

(56) References Cited

U.S. PATENT DOCUMENTS 5,983,022 A    11/1999 Watkins et al.
2013/0114718 A1    5/2013 Lu et al.
(Continued)

FOREIGN PATENT DOCUMENTS

CN    103688547 A    3/2014
CN    105594209 A    5/2016
(Continued)

OTHER PUBLICATIONS

Document: JVET-Q2001-vE, Bross, B., et al., "Versatile Video Coding (Draft 8)," Joint Video Experts Team (JVET) of ITU-T SG 16 WP 3 and ISO/IEC JTC 1/SC 29/WG 11 17th Meeting: Brussels, BE, Jan. 7-17, 2020, 512 pages.
(Continued)

*Primary Examiner* — Richard T Torrente
(74) *Attorney, Agent, or Firm* — Conley Rose, P.C.

(57) ABSTRACT

Methods, systems, apparatuses for video processing are described. A method for processing video includes performing a conversion between a video and a bitstream of the video according to a format rule, and wherein the format rule specifies to include, in a general constraint syntax structure associated with the video, one or more general constraint flags indicating whether corresponding syntax elements are included in a sequence parameter set (SPS) and/or a picture parameter set (PPS) and/or a picture header (PH) and/or a slice header (SH) or to constrain values of the syntax elements in the SPS and/or the PPS and/or the PH and/or the SH.

6 Claims, 19 Drawing Sheets

(51) Int. Cl.

| | | |
|---|---|---|
| *H04N 19/11* | (2014.01) | |
| *H04N 19/122* | (2014.01) | |
| *H04N 19/132* | (2014.01) | |
| *H04N 19/139* | (2014.01) | |
| *H04N 19/186* | (2014.01) | |
| *H04N 19/61* | (2014.01) | |
| *H04N 19/107* | (2014.01) | |
| *H04N 19/172* | (2014.01) | |
| *H04N 19/174* | (2014.01) | |
| *H04N 19/169* | (2014.01) | |
| *H04N 19/30* | (2014.01) | |
| *H04N 19/117* | (2014.01) | |
| *H04N 19/196* | (2014.01) | |

(52) U.S. Cl.
CPC ......... *H04N 19/117* (2014.11); *H04N 19/122* (2014.11); *H04N 19/132* (2014.11); *H04N 19/139* (2014.11); *H04N 19/172* (2014.11); *H04N 19/174* (2014.11); *H04N 19/186* (2014.11); *H04N 19/188* (2014.11); *H04N 19/196* (2014.11); *H04N 19/30* (2014.11); *H04N 19/61* (2014.11)

(56) References Cited

U.S. PATENT DOCUMENTS

| | | |
|---|---|---|
| 2015/0103888 A1 | 4/2015 | Chen et al. |
| 2015/0195561 A1 | 7/2015 | Wang et al. |
| 2015/0264099 A1 | 9/2015 | Deshpande |
| 2015/0373348 A1 | 12/2015 | Wang |
| 2016/0366428 A1 | 12/2016 | Deshpande |
| 2017/0094277 A1 | 3/2017 | Chen et al. |
| 2017/0214938 A1 | 7/2017 | Zhang et al. |
| 2018/0041762 A1 | 2/2018 | Ikai et al. |
| 2019/0132612 A1 | 5/2019 | Deshpande |
| 2019/0141318 A1 | 5/2019 | Li |
| 2019/0208212 A1 | 7/2019 | Horowitz |
| 2020/0107027 A1 | 4/2020 | He et al. |
| 2020/0154144 A1 | 5/2020 | Deshpande |
| 2020/0260070 A1 | 8/2020 | Yoo et al. |
| 2021/0014535 A1 | 1/2021 | Rusanovskyy |
| 2021/0203996 A1 | 7/2021 | Hsiang et al. |
| 2021/0329303 A1 | 10/2021 | Deshpande |
| 2022/0103866 A1 | 3/2022 | Bossen |
| 2022/0132107 A1 | 4/2022 | Paluri |
| 2022/0141495 A1 | 5/2022 | Kim |
| 2022/0264136 A1* | 8/2022 | Chen .................... H04N 19/109 |
| 2022/0385903 A1* | 12/2022 | Yoo ...................... H04N 19/157 |
| 2022/0394301 A1* | 12/2022 | Deshpande .......... H04N 19/172 |

FOREIGN PATENT DOCUMENTS

| | | | |
|---|---|---|---|
| CN | 105981387 | A | 9/2016 |
| CN | 106170981 | A | 11/2016 |
| CN | 106664447 | A | 5/2017 |
| CN | 107105295 | A | 8/2017 |
| CN | 110506420 | A | 11/2019 |
| CN | 110896486 | A | 3/2020 |
| EP | 3051486 | A1 | 8/2016 |
| TW | 202007167 | A | 2/2020 |
| WO | 2013159335 | A1 | 10/2013 |
| WO | 2014008290 | A1 | 1/2014 |
| WO | 2015138979 | A2 | 9/2015 |
| WO | 2019188097 | A1 | 10/2019 |
| WO | 2020038465 | A1 | 2/2020 |
| WO | 2020076069 | A1 | 4/2020 |

OTHER PUBLICATIONS

"Information technology—High efficiency coding and media delivery in heterogeneous environments—Part 2: High Efficiency Video Coding", ISO/IEC JTC 1/SC 29/WG 11 N17661, Rec. ITU-T H. 265 | ISO/IEC 23008-2 (in force edition), Apr. 20, 2018, 8 pages.

Document: JVET-G1001-v1, Chen, J., et al., "Algorithm description of Joint Exploration Test Model 7 (JEM7)," Joint Video Exploration Team (JVET) of ITU-T SG 16 WP 3 and ISO/IEC JTC 1/SC 29/WG 11 7th Meeting: Torino, IT, Jul. 13-21, 2017, 50 pages.

Document: JVET-Q2002-v3, Chen J., et al., "Algorithm description for Versatile Video Coding and Test Model 8 (VTM 8)," Joint Video Experts Team (JVET) of ITU-T SG 16 WP 3 and ISO/IEC JTC 1/SC 29/WG 11 17th Meeting: Brussels, BE, Jan. 7-17, 2020, 97 pages.

Li, X., Retrieved from the Internet: https://vcgit.hhi.fraunhofer.de/jvet/VVCSoftware_VTM.git, VTM software, Nov. 2, 2022, 3 pages.

JVET-R2001-vB, Bross, B., et al., "Versatile Video Coding (Draft 9)," Joint Video Experts Team (JVET) of ITU-T SG 16 WP 3 and ISO/IEC JTC 1/SC 29/WG 11 18th Meeting: by teleconference, Apr. 15-24, 2020, 530 pages.

JVET-N0276, Boyce, J., "AHG15: On interoperability point signalling," Joint Video Experts Team (JVET) of ITU-T SG 16 WP 3 and ISO/IEC JTC 1/SC 29/WG 11 14th Meeting: Geneva, CH, Mar. 19-27, 2019, 16 pages.

JVET-P0117-v3, Wang, Y.K., "AHG8: Scalability—PTL and decoder capability," Joint Video Experts Team (JVET) of ITU-T SG 16 WP 3 and ISO/IEC JTC 1/SC 29/WG 11 16th Meeting: Geneva, CH, Oct. 1-11, 2019, 6 pages.

JVET-Q0781-v1, Xu, X., et al., "AHG 9: On conditioning the presence of inter-/intra- related syntax elements in PH," Joint Video Experts Team (JVET) of ITU-T SG 16 WP 3 and ISO/IEC JTC 1/SC 29/WG 11 17th Meeting: Brussels, BE, Jan. 7-17, 2020, 3 pages.

JVET-Q0428-v3, Xu, X., et al., "AHG 9: Picture header syntax cleanups," Joint Video Experts Team (JVET) of ITU-T SG 16 WP 3 and ISO/IEC JTC 1/SC 29/WG 11 17th Meeting: Brussels, BE, Jan. 7-17, 2020, 10 pages.

JVET-O1076-v4, Wang, Y.K., et al., "Report of BoG on high-level syntax," Joint Video Experts Team (JVET) of ITU-T SG 16 WP 3 and ISO/IEC JTC 1/SC 29/WG 11 15th Meeting: Gothenburg, SE, Jul. 3-12, 2019, 50 pages.

JVET-R0113, Samuelsson, J., et al., "AHG9: On Picture Parameter Set," Joint Video Experts Team (JVET) of ITU-T SG 16 WP 3 and ISO/IEC JTC 1/SC 29/WG 11 18th Meeting: by teleconference, Apr. 15-24, 2020, 3 pages.

JVET-R0202, Laroche, G., et al., "AHG9: Syntax cleanups when Picture Header is in the Slice Header," Joint Video Experts Team (JVET) of ITU-T SG 16 WP 3 and ISO/IEC JTC 1/SC 29/WG 11 18th Meeting: by teleconference, Apr. 15-24, 2020, 6 pages.

JVET-R0073-v1, Deng, Z., et al., "AHG9: Some cleanups on QP delta signalling," Joint Video Experts Team (JVET) of ITU-T SG 16 WP 3 and ISO/IEC JTC 1/SC 29/WG 11 18th Meeting: by teleconference, Apr. 15-24, 2020, 7 pages.

JVET-Q0505, Zhang, H., et al., "AHG15: Improvement for Quantization Matrix Signaling," Joint Video Experts Team (JVET) of ITU-T SG 16 WP 3 and ISO/IEC JTC 1/SC 29/WG 11 17th Meeting: Brussels, BE, Jan. 7-17, 2020, 9 pages.

JVET-R0301-v1, Li, L., et al., "AHG12: on scaling_list_chroma_present_flag in APS," Joint Video Experts Team (JVET) of ITU-T SG 16 WP 3 and ISO/IEC JTC 1/SC 29/WG 11 18th Meeting: by teleconference, Apr. 15-24, 2020, 5 pages.

JVET-R0177, Naser, K., et al., "AhG 9: APS Cleanup," Joint Video Experts Team (JVET) of ITU-T SG 16 WP 3 and ISO/IEC JTC 1/SC 29/WG 11 18th Meeting: by teleconference, Apr. 15-24, 2020, 8 pages.

JVET-R0433, Naser, K., et al., "AHG 9: Combination of JVET-R0177/R0301 and JVET-R0074/R0232 on APS Signaling and Semantics Cleanup," Joint Video Experts Team (JVET) of ITU-T SG 16 WP 3 and ISO/IEC JTC 1/SC 29/WG 11 18th Meeting: by teleconference, Apr. 15-24, 2020, 5 pages.

JVET-P0368-v2, Pettersson, M., et al., "AHG17: On selectively signal slice header parameters in PPS," Joint Video Experts Team (JVET) of ITU-T SG 16 WP 3 and ISO/IEC JTC 1/SC 29/WG 11 16th Meeting: Geneva, CH, Oct. 1-11, 2019, 9 pages.

JVET-Q0281, Choi, B., et al., "AHG12: Independently coded regions output window SEI message," Joint Video Experts Team

(56) References Cited

OTHER PUBLICATIONS (JVET) of ITU-T SG 16 WP 3 and ISO/IEC JTC 1/SC 29/WG 11 17th Meeting: Brussels, BE, Jan. 7-17, 2020, 4 pages.
JVET-R0129-v2, Chen, L., et al., "AHG9/AHG12: On CTU row based slice chunks of a slice within a tile," Joint Video Experts Team (JVET) of ITU-T SG 16 WP 3 and ISO/IEC JTC 1/SC 29/WG 11 18th Meeting: by teleconference, Apr. 15-24, 2020, 9 pages.
JVET-R0162-v2, Chen, J., et al., "AHG9: PPS and SH syntax cleanup," Joint Video Experts Team (JVET) of ITU-T SG 16 WP 3 and ISO/IEC JTC 1/SC 29/WG 11 18th Meeting: by teleconference, Apr. 15-24, 2020, 7 pages.
JVET-S0050-v3, Deng, Z., et al., "AHG9: On general constraints information," Joint Video Experts Team (JVET) of ITU-T SG 16 WP 3 and ISO/IEC JTC 1/SC 29/WG 11 19th Meeting: by teleconference, Jun. 22-Jul. 1, 2020, 9 pages.
JVET-N0073-v1, Chen, L., et al., "AHG17: [SYS-VVC] Signalling subpicture coded video sequence," Joint Video Experts Team (JVET) of ITU-T SG 16 WP 3 and ISO/IEC JTC 1/SC 29/WG 11 14th Meeting: Geneva, Switzerland, Mar. 19-27, 2019, 7 pages.
JVET-P0115-v2, Wang, Y.K. et al., "AHG8: Scalability—general and output layer sets," Joint Video Experts Team (JVET) of ITU-T SG 16 WP 3 and ISO/IEC JTC 1/SC 29/WG 11 16th Meeting: Geneva, CH, Oct. 1-11, 2019, 6 pages.
JVET-Q0117-v1, Wang, Y.K., et al., "AHG9: Cleanups on parameter sets," Joint Video Experts Team (JVET) of ITU-T SG 16 WP 3 and ISO/IEC JTC 1/SC 29/WG 11 17th Meeting: Brussels, BE, Jan. 7-17, 2020, 9 pages.
JVET-R0068-v1, Wang, Y.K., et al., "AHG8/AHG9/AHG12: Miscellaneous HLS topics," Joint Video Experts Team (JVET) of ITU-T SG 16 WP 3 and ISO/IEC JTC 1/SC 29/WG 11 18th Meeting: by teleconference, Apr. 15-24, 2020, 10 pages.
JVET-Q0400-v2, Suehring, K., et al., "AHG9: On extra picture header bits in VVC," Joint Video Experts Team (JVET) of ITU-T SG 16 WP 3 and ISO/IEC JTC 1/SC 29/WG 11 17th Meeting: Brussels, BE, Jan. 7-17, 2020, 4 pages.
JVET-R0286, Chang, Y-J., et al., "AhG9: On general constraint information syntax," Joint Video Experts Team (JVET) of ITU-T SG 16 WP 3 and ISO/IEC JTC 1/SC 29/WG 11 18th Meeting: by teleconference, Apr. 15-24, 2020, 5 pages.
JVET-R0070-v1, Wang, Y.K., et al., "AHG9: On repetition and update of non-VCL data units," Joint Video Experts Team (JVET) of ITU-T SG 16 WP 3 and ISO/IEC JTC 1/SC 29/WG 11 18th Meeting: by teleconference, Apr. 15-24, 2020, 4 pages.
JVET-P2001-vE, Bross, B., et al., "Versatile Video Coding (Draft 7)," Joint Video Experts Team (JVET) of ITU-T SG 16 WP 3 and ISO/IEC JTC 1/SC 29/WG 11 16th Meeting: Geneva, CH, Oct. 1-11, 2019, 491 pages.
JVET-O2001-vE, Bross, B., et al., "Versatile Video Coding (Draft 6)," Joint Video Experts Team (JVET) of ITU-T SG 16 WP 3 and ISO/IEC JTC 1/SC 29/WG 11 15th Meeting: Gothenburg, SE, Jul. 3-12, 2019, 455 pages.
JVET-N1001-v10, Bross, B., et al., "Versatile Video Coding (Draft 5)," Joint Video Experts Team (JVET) of ITU-T SG 16 WP 3 and ISO/IEC JTC 1/SC 29/WG 11 14th Meeting: Geneva, CH, Mar. 19-27, 2019, 407 pages.
Foreign Communication From A Related Counterpart Application, International Application No. PCT/CN2021/078188, English Translation of International Search Report dated May 26, 2021, 9 pages.
Foreign Communication From A Related Counterpart Application, International Application No. PCT/CN2021/078182, English Translation of International Search Report dated May 17, 2021, 12 pages.
Foreign Communication From A Related Counterpart Application, International Application No. PCT/CN2021/078190, English Translation of International Search Report dated Apr. 25, 2021, 9 pages.
Foreign Communication From A Related Counterpart Application, International Application No. PCT/CN2021/086868, English Translation of International Search Report dated Jul. 9, 2021, 9 pages.
Foreign Communication From A Related Counterpart Application, International Application No. PCT/CN2021/086869, English Translation of International Search Report dated Jul. 9, 2021, 12 pages.
Foreign Communication From A Related Counterpart Application, International Application No. PCT/CN2021/086873, English Translation of International Search Report dated Jun. 30, 2021, 12 pages.
Foreign Communication From A Related Counterpart Application, International Application No. PCT/CN2021/095386, English Translation of International Search Report dated Aug. 23, 2021, 11 pages.
Foreign Communication From A Related Counterpart Application, International Application No. PCT/CN2021/095387, English Translation of International Search Report dated Aug. 24, 2021, 9 pages.
Foreign Communication From A Related Counterpart Application, International Application No. PCT/CN2021/095388, English Translation of International Search Report dated Aug. 24, 2021, 9 pages.
Foreign Communication From A Related Counterpart Application, International Application No. PCT/CN2021/095389, English Translation of International Search Report dated Aug. 31, 2021, 10 pages.
Foreign Communication From A Related Counterpart Application, International Application No. PCT/CN2021/096592, English Translation of International Search Report dated Sep. 2, 2021, 11 pages.
Non-Final Office Action from U.S. Appl. No. 17/898,051 dated Jan. 24, 2023.
Office Action from Indian Patent Application No. 202227067001 dated Jan. 24, 2023.
JVET-R2001-vA, Bross, B., et al. "Versatile Video Coding (Draft 9)", Joint Video Experts Team (JVET) of ITU-T SG 16 WP 3 and ISO/IEC JTC 1/SC 29/WG 11 18th Meeting: by teleconference, Apr. 15-24, 2020, 524 pages.
JVET-Q2001-vD, Bross, B., et al. "Versatile Video Coding (Draft 8)," Joint Video Experts (JVET) of ITU-T SG 16 WP 3 and ISO/IEC JTC 1/SC 29 WG 11 17th Meeting: Brussels, BE, Jan. 7-17, 2020, 511 pages.
Document: JVET-P0239-v1, Wan, W., et al., "AHG17: Picture Header," Joint Video Experts (JVET) of ITU-T SG 16 WP 3 and ISO/IEC JTC 1/SC 29 WG 11 16th Meeting: Geneva, CH, Oct. 1-11, 2019, 8 pages.
Document: JVET-S0070-v1, Chen, L., et al., "AHG9: On flag ph_gdr_pr_irap_pic_flag," Joint Video Experts (JVET) of ITU-T SG 16 WP 3 and ISO/IEC JTC 1/SC 29 WG 11 19th Meeting: by teleconference, Jun. 22-Jul. 2020, 4 pages.
Non-Final Office Action dated May 22, 2023, 29 pages, U.S. Appl. No. 17/965,590, filed Oct. 13, 2022.
Non-Final Office Action dated Apr. 27, 2023, 24 pages, U.S. Appl. No. 17/992,270, filed Nov. 22, 2022.
Non-Final Office Action dated Apr. 11, 2023, 25 pages, U.S. Appl. No. 17/994,864, filed Nov. 28, 2022.
Non-Final Office Action dated May 18, 2023, 19 pages, U.S. Appl. No. 17/897,943, filed Aug. 29, 2022.
Foreign Communication From A Related Counterpart Application, European Application No. 21760362.0, Extended European Search Report dated Jun. 28, 2023, 8 pages.

* cited by examiner

840

842

Performing a conversion between a video and a bitstream of the video according to a format rule, and wherein the format rule specifies that a bitstream constraint is added such that a value of a syntax element in a picture header (PH) or a slice header (SH) is equal to a certain value based on a value of a general constraint flag

872 — Performing a conversion between a video and a bitstream of the video according to a format rule, and wherein the format rule specifies that a value or an occurrence of a SPS (sequence parameter set) syntax element at a SPS level and/or a PPS (picture parameter set) syntax element at a PPS level controls an inclusion of one or more related syntax element in the SPS level, the PPS level, a PH (picture header) level, or a SH (slice header) level.

912 — Performing a conversion between a video and a bitstream of the video according to a format rule, and wherein the format rule specifies to include, in a general constraint syntax structure associated with the video, one or more general constraint flags indicating whether corresponding syntax elements are included in a sequence parameter set (SPS) and/or a picture parameter set (PPS) and/or a picture header (PH) and/or a slice header (SH) or to constrain values of the syntax elements in the SPS and/or the PPS and/or the PH and/or the SH.

FIG. 9A

CONSTRAINS FOR DIFERENT CODING TOOLS

CROSS REFERENCE TO RELATED APPLICATIONS

This application is a continuation of International Patent Application No. PCT/CN2021/078190, filed on Feb. 26, 2021 which claims the priority to and benefits of International Patent Application No. PCT/CN2020/077325, filed on Feb. 29, 2020. All the aforementioned patent applications are hereby incorporated by reference in their entireties.

TECHNICAL FIELD

This patent document relates to image and video coding and decoding.

BACKGROUND

Digital video accounts for the largest bandwidth use on the internet and other digital communication networks. As the number of connected user devices capable of receiving and displaying video increases, it is expected that the bandwidth demand for digital video usage will continue to grow.

SUMMARY

The present document discloses techniques that can be used by video encoders and decoders for processing coded representation of video using control information useful for decoding of the coded representation.

In one example aspect, a video processing method is disclosed. The method includes performing a conversion between a video having one or more pictures and a coded representation of the video, wherein each of the one or more pictures comprise exactly one slice; wherein the coded representation conforms to a format rule; wherein the format rule specifies that a first field in the coded representation indicative of a profile, a tier and a level that the coded representation conforms to, includes a second field indicative of whether a syntax structure that signals various constraints observed during the conversion is present in the first field.

In another example aspect, another video processing method is disclosed. The method includes performing a conversion between a video comprising one or more pictures and one or more slices and a coded representation of the video, wherein the coded representation conforms to a format rule, wherein the format rule specifies that values of one or more constraint flags at a first level in the coded representation control occurrence of one or more syntax elements at a sequence parameter set (SPS) level or a picture header (PH) level of a slice header (SH) level.

In another example aspect, another video processing method is disclosed. The method includes performing a conversion between a video comprising one or more pictures and one or more slices and a coded representation of the video, wherein the coded representation conforms to a format rule, wherein the format rule specifies that values of one or more constraint flags at a first level in the coded representation constrain values of one or more syntax elements at picture parameter set (PPS) level.

In another example aspect, another video processing method is disclosed. The method includes performing a conversion between a video comprising one or more pictures and one or more slices and a coded representation of the video, wherein the coded representation conforms to a format rule that specifies that the coded representation includes an adaptation parameter set that includes syntax elements for identifiers of a video parameter set and/or a sequence parameter set and/or a picture parameter set.

In another example aspect, another video processing method is disclosed. The method includes performing a conversion between a video comprising one or more pictures and one or more slices and a coded representation of the video, wherein the coded representation conforms to a format rule that specifies to include one or more general constraint flags applicable to the conversion; wherein the one or more general constraint flags are indicative of applicability of general constrain info included in the coded representation to the conversion.

In another example aspect, another video processing method is disclosed. The method includes performing a conversion between a video and a coded representation of the video, wherein the coded representation conforms to a format rule, wherein the format rule specifies that the coded representation conditionally includes a general constraint structure carrying general constraint information based on a characteristic of the video or the conversion.

In another example aspect, another video processing method is disclosed. The method includes: performing a conversion between a video and a bitstream of the video according to a format rule, wherein the format rule specifies that values of one or more general constraint flags at a first level in the bitstream control occurrence of one or more syntax elements at a sequence parameter set (SPS) level or a picture header (PH) level or a slice header (SH) level.

In another example aspect, another video processing method is disclosed. The method includes: performing a conversion between a video and a bitstream of the video according to a format rule, and wherein the format rule specifies that a first field in the bitstream indicative of a profile, a tier and a level (PTL) information for the bitstream includes a second field indicative of whether a syntax structure that indicates one or more constraints applicable to the conversion is present in the first field.

In another example aspect, another video processing method is disclosed. The method includes: performing a conversion between a video and a bitstream of the video according to a format rule, and wherein the format rule specifies whether a syntax element in a sequence parameter set (SPS) based on a value of a general constraint flag.

In another example aspect, another video processing method is disclosed. The method includes: performing a conversion between a video and a bitstream of the video according to a format rule, and wherein the format rule specifies that a value of a syntax element in a sequence parameter set (SPS) is equal to a certain value based on a value of a general constraint flag.

In another example aspect, another video processing method is disclosed. The method includes: performing a conversion between a video and a bitstream of the video according to a format rule, and wherein the format rule specifies that a syntax element is conditionally included in a picture header (PH) or a slice header (SH) in the bitstream based on a value of a general constraint flag.

In another example aspect, another video processing method is disclosed. The method includes: performing a conversion between a video and a bitstream of the video according to a format rule, and wherein the format rule specifies that a bitstream constraint is added such that a value of a syntax element in a picture header (PH) or a slice header (SH) is equal to a certain value based on a value of a general constraint flag.

In another example aspect, another video processing method is disclosed. The method includes: performing a conversion between a video and a bitstream of the video according to a format rule, wherein the format rule specifies that a value or an inclusion of a first general constraint flag in a syntax structure that indicates a constraint imposed during the conversion is based on a value of a second general constraint flag in the syntax structure.

In another example aspect, another video processing method is disclosed. The method includes: performing a conversion between a video including one or more slices and a bitstream of the video according to a format rule, and wherein the format rule specifies that values of one or more general constraint flags at a first level constrain values of one or more syntax elements in a picture parameter set (PPS).

In another example aspect, another video processing method is disclosed. The method includes: performing a conversion between a video and a bitstream of the video according to a format rule, and wherein the format rule specifies that a value or an occurrence of a SPS (sequence parameter set) syntax element at a SPS level and/or a PPS (picture parameter set) syntax element at a PPS level controls an inclusion of one or more related syntax element in the SPS level, the PPS level, a PH (picture header) level, or a SH (slice header) level.

In another example aspect, another video processing method is disclosed. The method includes: performing a conversion between a video and a bitstream of the video according to a format rule, and wherein the format rule specifies to include, in a general constraint syntax structure associated with the video, one or more general constraint flags indicating whether corresponding syntax elements are included in a sequence parameter set (SPS) and/or a picture parameter set (PPS) and/or a picture header (PH) and/or a slice header (SH) or to constrain values of the syntax elements in the SPS and/or the PPS and/or the PH and/or the SH.

In another example aspect, another video processing method is disclosed. The method includes: performing a conversion between a video and a bitstream of the video according to a format rule, and wherein the format rule specifies use of an adaptation parameter set (APS) associated with the video that includes one or more syntax elements for identifiers of a video parameter set (VPS) and/or a sequence parameter set (SPS) and/or a picture parameter set (PPS).

In another example aspect, another video processing method is disclosed. The method includes: performing a conversion between a video and a bitstream of the video according to a format rule, and wherein the format rule specifies use of a redundant indication of information in a general constraint information syntax structure associated with the video.

In another example aspect, another video processing method is disclosed. The method includes: performing a conversion between a video and a bitstream of the video according to a format rule, and wherein the format rule specifies whether and/or how to indicate a general constraint structure carrying general constraint information based on a characteristic of the bitstream.

In yet another example aspect, a video encoder apparatus is disclosed. The video encoder comprises a processor configured to implement above-described methods.

In yet another example aspect, a video decoder apparatus is disclosed. The video decoder comprises a processor configured to implement above-described methods.

In yet another example aspect, a computer readable medium having code stored thereon is disclose. The code embodies one of the methods described herein in the form of processor-executable code.

These, and other, features are described throughout the present document.

BRIEF DESCRIPTION OF DRAWINGS

FIGS. 8A to 8G are flowcharts for example methods of video processing.

FIGS. 9A to 9D are flowcharts for example methods of video processing.

DETAILED DESCRIPTION

Figure 1:
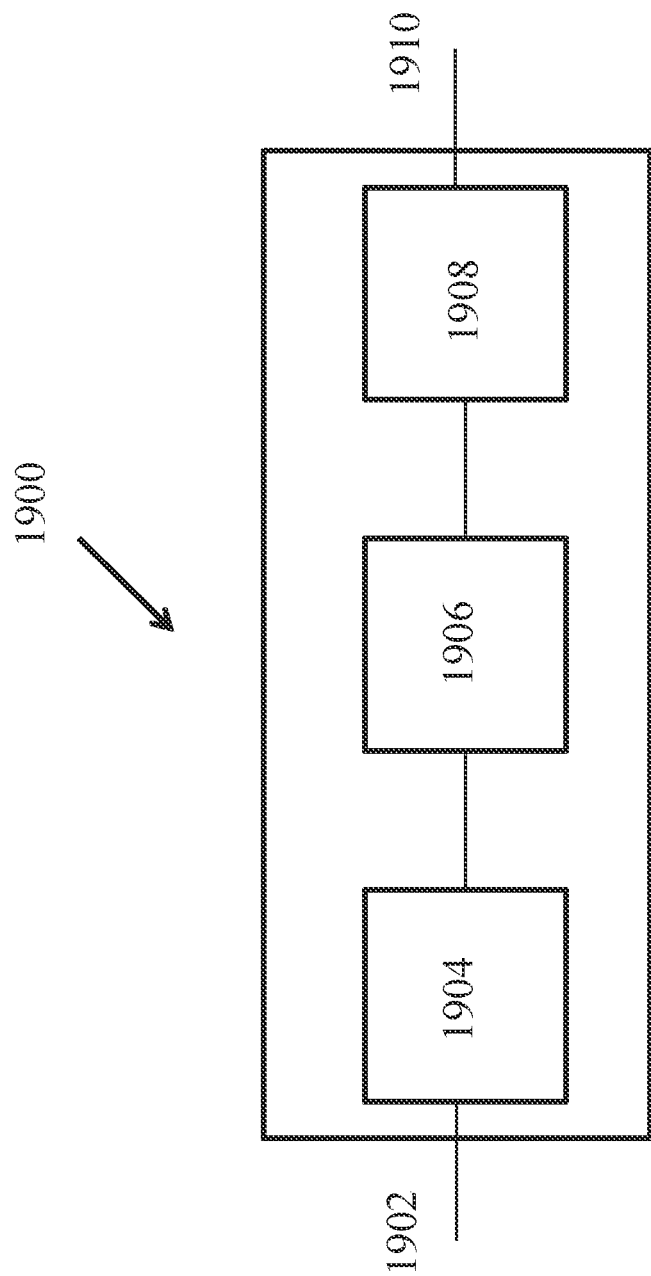
FIG. 1 is a block diagram of an example video processing system.

Section headings are used in the present document for ease of understanding and do not limit the applicability of techniques and embodiments disclosed in each section only to that section. Furthermore, H.266 terminology is used in some description only for ease of understanding and not for limiting scope of the disclosed techniques. As such, the techniques described herein are applicable to other video codec protocols and designs also.

1. Initial Discussion

This document is related to video coding technologies. Specifically, it is about the design of constraint flags related syntax in video coding. The ideas may be applied individually or in various combination, to any video coding standard or non-standard video codec that supports multi-layer video coding, e.g., the being-developed Versatile Video Coding (VVC).

2. Abbreviations

ACT Adaptive Color Transform
ALF Adaptive Loop Filter
APS Adaptation Parameter Set
AU Access Unit
AUD Access Unit Delimiter
AVC Advanced Video Coding
CCALF Cross Component Adaptive Loop Filter
CLVS Coded Layer Video Sequence
CPB Coded Picture Buffer
CRA Clean Random Access
CTB Coding Tree Block CTU Coding Tree Unit
CVS Coded Video Sequence
CU Coding Unit
DCI Decoding Capability Information
DPB Decoded Picture Buffer
DPS Decoding Parameter Set
EOB End Of Bitstream
EOS End Of Sequence
GDR Gradual Decoding Refresh
HEVC High Efficiency Video Coding
HRD Hypothetical Reference Decoder
ID Identifier
IDR Instantaneous Decoding Refresh
ISP Intra Sub-Partitions
JEM Joint Exploration Model
LFNST Low Frequency Non-Separable Transform
LMCS Luma Mapping With Chroma Scaling
MCTS Motion-Constrained Tile Sets
MER Merge Estimation Region
MIP Matrix-Based Intra-Prediction
MMVD Merge Mode with Motion Vector Difference
MRL Multiple Reference Line
MVD Motion Vector Difference
NAL Network Abstraction Layer
OLS Output Layer Set
PH Picture Header
PPS Picture Parameter Set
PTL Profile, Tier and Level
PU Picture Unit
RADL Random Access Decodable Leading
RASL Random Access Skipped Leading
RBSP Raw Byte Sequence Payload
SEI Supplemental Enhancement Information
SH Slice Header
SMVD Symmetric MVD
SPS Sequence Parameter Set
SVC Scalable Video Coding
VCL Video Coding Layer
VPS Video Parameter Set
VTM VVC Test Model
VUI Video Usability Information
VVC Versatile Video Coding
WPP Wave Parallel Processing

3. Video Coding Introduction

Video coding standards have evolved primarily through the development of the well-known International Telecommunication Union Telecommunication Standardization Sector (ITU-T) and International Organization for Standardization (ISO)/International Electrotechnical Commission (IEC) standards. The ITU-T produced H.261 and H.263, ISO/IEC produced Moving Picture Experts Group (MPEG)-1 and MPEG-4 Visual, and the two organizations jointly produced the H.262/MPEG-2 Video and H.264/MPEG-4 Advanced Video Coding (AVC) and H.265/High Efficiency Video Coding (HEVC) standards. Since H.262, the video coding standards are based on the hybrid video coding structure wherein temporal prediction plus transform coding are utilized. To explore the future video coding technologies beyond HEVC, the Joint Video Exploration Team (WET) was founded by Video Coding Experts Group (VCEG) and MPEG jointly in 2015. Since then, many new methods have been adopted by JVET and put into the reference software named Joint Exploration Model (JEM). The JVET meeting is concurrently held once every quarter, and the new coding standard is targeting at 50% bitrate reduction as compared to HEVC. The new video coding standard was officially named as Versatile Video Coding (VVC) in the April 2018 JVET meeting, and the first version of VVC test model (VTM) was released at that time. As there are continuous effort contributing to VVC standardization, new coding techniques are being adopted to the VVC standard in every JVET meeting. The VVC working draft and test model VTM are then updated after every meeting. The VVC project is now aiming for technical completion (FDIS) at the July 2020 meeting.

3.1. General Profile, Tier, Level Syntax and Semantics

In the latest VVC draft text, the general profile, tier, level syntax and semantics are as follows:

| | Descriptor |
|---|---|
| profile_tier_level( profileTierPresentFlag, maxNumSubLayersMinus1 ) { | |
|   if( profileTierPresentFlag ) { | |
|     general_profile_idc | u(7) |
|     general_tier_flag | u(1) |
|     general_constraint_info( ) | |
|   } | |
|   general_level_idc | u(8) |
|   if( profileTierPresentFlag ) { | |
|     num_sub_profiles | u(8) |
|     for( i = 0; i < num_sub_profiles; i++ ) | |
|       general_sub_profile_idc[ i ] | u(32) |
|   } | |
|   for( i = 0; i < maxNumSubLayersMinus1; i++ ) | |
|     sublayer_level_present_flag[ i ] | u(1) |
|   while( !byte_aligned( ) ) | |
|     ptl_alignment_zero_bit | f(1) |
|   for( i = 0; i < maxNumSubLayersMinus1; i++ ) | |
|     if( sublayer_level_present_flag[ i ] ) | |
|       sublayer_level_idc[ i ] | u(8) |
| } | |

A profile_tier_level( ) syntax structure provides level information and, optionally, profile, tier, sub-profile, and general constraints information.

When the profile_tier_level( ) syntax structure is included in a VPS, the OlsInScope is one or more OLSs specified by the VPS. When the profile_tier_level( ) syntax structure is included in an SPS, the OlsInScope is the OLS that includes only the layer that is the lowest layer among the layers that refer to the SPS, and this lowest layer is an independent layer.

general_profile_idc indicates a profile to which OlsInScope conforms as specified in Annex A. Bitstreams shall not contain values of general_profile_idc other than those specified in Annex A. Other values of general_profile_idc are reserved for future use by ITU-T|ISO/IEC.

general_tier_flag specifies the tier context for the interpretation of general_level_idc as specified in Annex A.

general_level_idc indicates a level to which OlsInScope conforms as specified in Annex A. Bitstreams shall not contain values of general_level_idc other than those specified in Annex A. Other values of general_level_idc are reserved for future use by ITU-T|ISO/IEC.

NOTE 1—A greater value of general_level_idc indicates a higher level. The maximum level signalled in the DCI NAL unit for OlsInScope may be higher than but cannot be lower than the level signalled in the SPS for a CLVS contained within OlsInScope.

NOTE 2—When OlsInScope conforms to multiple profiles, general_profile_idc should indicate the profile that provides the preferred decoded result or the preferred bitstream identification, as determined by the encoder (in a manner not specified in this Specification).

NOTE 3—When the CVSs of OlsInScope conform to different profiles, multiple profile_tier_level( ) syntax structures may be included in the DCI NAL unit such that for each CVS of the OlsInScope there is at least one set of indicated profile, tier, and level for a decoder that is capable of decoding the CVS.

num_sub_profiles specifies the number of the general_sub_profile_idc[i] syntax elements.

general_sub_profile_idc[i] indicates the i-th interoperability metadata registered as specified by Rec. ITU-T T.35, the contents of which are not specified in this Specification.

sublayer_level_present_flag[i] equal to 1 specifies that level information is present in the profile_tier_level( ) syntax structure for the sublayer representation with TemporalId equal to i.

sublayer_level_present_flag[i] equal to 0 specifies that level information is not present in the profile_tier_level( ) syntax structure for the sublayer representation with TemporalId equal to i.

ptl_alignment_zero_bits shall be equal to 0.

The semantics of the syntax element sublayer_level_idc[i] is, apart from the specification of the inference of not present values, the same as the syntax element general_level_idc, but apply to the sublayer representation with TemporalId equal to i.

When not present, the value of sublayer_level_idc[i] is inferred as follows:
- sublayer_level_idc[maxNumSubLayersMinus1] is inferred to be equal to general_level_idc of the same profile_tier_level( ) structure,
- For i from maxNumSubLayersMinus1−1 to 0 (in decreasing order of values of i), inclusive, sublayer_level_idc[i] is inferred to be equal to sublayer_level_idc[i+1].

3.2. General Constraint Information Syntax and Semantics

In the latest VVC draft text, the general constraint information syntax and semantics are as follows:

| | Descriptor |
|---|---|
| general_constraint_info( ) { | |
| general_progressive_source_flag | u(1) |
| general_interlaced_source_flag | u(1) |
| general_non_packed_constraint_flag | u(1) |
| general_frame_only_constraint_flag | u(1) |
| general_non_projected_constraint_flag | u(1) |
| intra_only_constraint_flag | u(1) |
| max_bitdepth_constraint_idc | u(4) |
| max_chroma_format_constraint_idc | u(2) |
| no_res_change_in_clvs_constraint_flag | u(1) |
| one_tile_per_pic_constraint_flag | u(1) |
| one_slice_per_pic_constraint_flag | u(1) |
| one_subpic_per_pic_constraint_flag | u(1) |
| no_qtbtt_dual_tree_intra_constraint_flag | u(1) |
| no_partition_constraints_override_constraint_flag | u(1) |
| no_sao_constraint_flag | u(1) |
| no_alf_constraint_flag | u(1) |
| no_ccalf_constraint_flag | u(1) |
| no_joint_cbcr_constraint_flag | u(1) |
| no_ref_wraparound_constraint_flag | u(1) |
| no_temporal_mvp_constraint_flag | u(1) |
| no_sbtmvp_constraint_flag | u(1) |
| no_amvr_constraint_flag | u(1) |
| no_bdof_constraint_flag | u(1) |
| no_dmvr_constraint_flag | u(1) |
| no_cclm_constraint_flag | u(1) |
| no_mts_constraint_flag | u(1) |
| no_sbt_constraint_flag | u(1) |
| no_affine_motion_constraint_flag | u(1) |
| no_bcw_constraint_flag | u(1) |
| no_ibc_constraint_flag | u(1) |
| no_ciip_constraint_flag | u(1) |
| no_fpel_mmvd_constraint_flag | u(1) |
| no_gpm_constraint_flag | u(1) |
| no_ladf_constraint_flag | u(1) |
| no_transform_skip_constraint_flag | u(1) |
| no_bdpcm_constraint_flag | u(1) |
| no_qp_delta_constraint_flag | u(1) |
| no_dep_quant_constraint_flag | u(1) |
| no_sign_data_hiding_constraint_flag | u(1) |
| no_mixed_nalu_types_in_pic_constraint_flag | u(1) |
| no_trail_constraint_flag | u(1) |
| no_stsa_constraint_flag | u(1) |
| no_rasl_constraint_flag | u(1) |
| no_radl_constraint_flag | u(1) |
| no_idr_constraint_flag | u(1) |
| no_cra_constraint_flag | u(1) |
| no_gdr_constraint_flag | u(1) |
| no_aps_constraint_flag | u(1) |
| while( !byte_aligned( ) ) | |
| gci_alignment_zero_bit | f(1) |
| num_reserved_constraint_bytes | u(8) |
| for( i = 0; i < num_reserved_constraint_bytes; i++ ) | |
| gci_reserved_constraint_byte[ i ] | u(8) |
| } | | general_progressive_source_flag and general_interlaced_source_flag are interpreted as follows:
- If general_progressive_source_flag is equal to 1 and general_interlaced_source_flag is equal to 0, the source_scan_type of the pictures in OlsInScope should be interpreted as progressive only.
- Otherwise, if general_progressive_source_flag is equal to 0 and general_interlaced_source_flag is equal to 1, the source_scan_type of the pictures in OlsInScope should be interpreted as interlaced only.
- Otherwise, if general_progressive_source_flag is equal to 0 and general_interlaced_source_flag is equal to 0, the source_scan_type of the pictures in OlsInScope should be interpreted as unknown or unspecified.
- Otherwise (general_progressive_source_flag is equal to 1 and general_interlaced_source_flag is equal to 1), the source_scan_type of each picture in OlsInScope is indicated at the picture level using the syntax element source_scan_type in a frame-field information SEI message. It is a requirement of bitstream conformance that when general_progressive_source_flag is equal to 1 and general_interlaced_source_flag is equal to 1, a frame-field information SEI message shall be present in each AU.

NOTE 1—Decoders may ignore the values of general_progressive_source_flag and general_interlaced_source_flag. Moreover, the actual source_scan_type of the pictures is outside the scope of this Specification and the method by which the encoder selects the values of general_progressive_source_flag and general_interlaced_source_flag is unspecified.

general_non_packed_constraint_flag equal to 1 specifies that there shall not be any frame packing arrangement SEI messages present in the bitstream of the OlsInScope. general_non_packed_constraint_flag equal to 0 does not impose such a constraint.

NOTE 2—Decoders may ignore the value of general_non_packed_constraint_flag, as there are no decoding process requirements associated with the presence or interpretation of frame packing arrangement SEI messages.

general_frame_only_constraint_flag equal to 1 specifies that OlsInScope conveys pictures that represent frames. general_frame_only_constraint_flag equal to 0 specifies that OlsInScope conveys pictures that may or may not represent frames.

NOTE 3—Decoders may ignore the value of general_frame_only_constraint_flag, as there are no decoding process requirements associated with it.

general_non_projected_constraint_flag equal to 1 specifies that there shall not be any equirectangular projection SEI messages or generalized cubemap projection SEI messages present in the bitstream of the OlsInScope. general_non_projected_constraint_flag equal to 0 does not impose such a constraint.

NOTE 4—Decoders may ignore the value of general_non_projected_constraint_flag, as there are no decoding process requirements associated with the presence or interpretation of equirectangular projection SEI messages and generalized cubemap projection SEI messages.

intra_only_constraint_flag equal to 1 specifies that slice type shall be equal to I. intra_only_constraint_flag equal to 0 does not impose such a constraint.

maxbitdepth_constraint_idc specifies that bit_depth_minus8 shall be in the range of 0 to max_bitdepth_constraint_idc, inclusive.

max_chroma_format_constraint_idc specifies that chroma_format_idc shall be in the range of 0 to max_chroma_format_constraint_idc, inclusive.

no_res_change_in_clvs_constraint_flag equal to 1 specifies that res_change_in_clvs_allowed_flag shall be equal to 0. no_res_change_in_clvs_constraint_flag equal to 0 does not impose such a constraint.

one_tile_per_pic_constraint_flag equal to 1 specifies that each picture shall contain only one tile. one_tile_per_pic_constraint_flag equal to 0 does not impose such a constraint.

one_slice_per_pic_constraint_flag equal to 1 specifies that each picture shall contain only one slice. one_slice_per_pic_constraint_flag equal to 0 does not impose such a constraint.

one_subpic_per_pic_constraint_flag equal to 1 specifies that each picture shall contain only one subpicture. one_subpic_per_pic_constraint_flag equal to 0 does not impose such a constraint. When one_slice_per_pic_constraint_flag is equal to 1, the value of one_subpic_per_pic_constraint_flag shall be equal to 1.

no_qtbtt_dual_tree_intra_constraint_flag equal to 1 specifies that qtbtt_dual_tree_intra_flag shall be equal to 0. no_qtbtt_dual_tree_intra_constraint_flag equal to 0 does not impose such a constraint.

no_partition_constraints_override_constraint_flag equal to 1 specifies that partition constraints override enabled flag shall be equal to 0. no_partition_constraints_override_constraint_flag equal to 0 does not impose such a constraint.

no_sao_constraint_flag equal to 1 specifies that sps_sao_enabled_flag shall be equal to 0. no_sao_constraint_flag equal to 0 does not impose such a constraint.

no_alf_constraint_flag equal to 1 specifies that sps_alf_enabled_flag shall be equal to 0. no_alf_constraint_flag equal to 0 does not impose such a constraint.

no_ccalf_constraint_flag equal to 1 specifies that sps_ccalf_enabled_flag shall be equal to 0. no_ccalf_constraint_flag equal to 0 does not impose such a constraint.

no_joint_cbcr_constraint_flag equal to 1 specifies that sps_joint_cbcr_enabled_flag shall be equal to 0. no_joint_cbcr_constraint_flag equal to 0 does not impose such a constraint.

no_ref_wraparound_constraint_flag equal to 1 specifies that sps_ref_wraparound_enabled_flag shall be equal to 0. no_ref_wraparound_constraint_flag equal to 0 does not impose such a constraint.

no_temporal_mvp_constraint_flag equal to 1 specifies that sps_temporal_mvp_enabled_flag shall be equal to 0. no_temporal_mvp_constraint_flag equal to 0 does not impose such a constraint.

no_sbtmvp_constraint_flag equal to 1 specifies that sps_sbtmvp_enabled_flag shall be equal to 0. no_sbtmvp_constraint_flag equal to 0 does not impose such a constraint.

no_amvr_constraint_flag equal to 1 specifies that sps_amvr_enabled_flag shall be equal to 0. no_amvr_constraint_flag equal to 0 does not impose such a constraint.

no_bdof_constraint_flag equal to 1 specifies that sps_bdof_enabled_flag shall be equal to 0. no_bdof_constraint_flag equal to 0 does not impose such a constraint.

no_dmvr_constraint_flag equal to 1 specifies that sps_dmvr_enabled_flag shall be equal to 0. no_dmvr_constraint_flag equal to 0 does not impose such a constraint.

no_cclm_constraint_flag equal to 1 specifies that sps_cclm_enabled_flag shall be equal to 0. no_cclm_constraint_flag equal to 0 does not impose such a constraint.

no_mts_constraint_flag equal to 1 specifies that sps_mts_enabled_flag shall be equal to 0. no mts_constraint_flag equal to 0 does not impose such a constraint.

no_sbt_constraint_flag equal to 1 specifies that sps_sbt_enabled_flag shall be equal to 0. no_sbt_constraint_flag equal to 0 does not impose such a constraint.

no_affine_motion_constraint_flag equal to 1 specifies that sps_affine_enabled_flag shall be equal to 0. no_affine_motion_constraint_flag equal to 0 does not impose such a constraint.

no_bcw_constraint_flag equal to 1 specifies that sps_bcw_enabled_flag shall be equal to 0. no_bcw_constraint_flag equal to 0 does not impose such a constraint.

no_ibc_constraint_flag equal to 1 specifies that sps_ibc_enabled_flag shall be equal to 0. no_ibc_constraint_flag equal to 0 does not impose such a constraint.

no_ciip_constraint_flag equal to 1 specifies that sps_ciip_enabled_flag shall be equal to 0. no_cipp_constraint_flag equal to 0 does not impose such a constraint.

no_fpel_mmvd_constraint_flag equal to 1 specifies that sps_fpel_mmvd_enabled_flag shall be equal to 0. no_fpel_mmvd_constraint_flag equal to 0 does not impose such a constraint.

no_gpm_constraint_flag equal to 1 specifies that sps_gpm_enabled_flag shall be equal to 0. no_gpm_constraint_flag equal to 0 does not impose such a constraint.

no_ladf_constraint_flag equal to 1 specifies that sps_ladf_enabled_flag shall be equal to 0. no_ladf_constraint_flag equal to 0 does not impose such a constraint.

no_transform_skip_constraint_flag equal to 1 specifies that sps_transfrom_skip_enabled_flag shall be equal to 0. no_transform_skip_constraint_flag equal to 0 does not impose such a constraint.

no_bdpcm_constraint_flag equal to 1 specifies that sps_bdpcm_enabled_flag shall be equal to 0. no_bdpcm_constraint_flag equal to 0 does not impose such a constraint.

no_qp_delta_constraint_flag equal to 1 specifies that it is a requirement of bitstream conformance that cu_qp_delta_enabled_flag shall be equal to 0. no_qp_delta_constraint_flag equal to 0 does not impose such a constraint.

no_dep_quant_constraint_flag equal to 1 specifies that it is a requirement of bitstream conformance that sps_dep_quant_enabled_flag shall be equal to 0. no_dep_quant_constraint_flag equal to 0 does not impose such a constraint.

no_sign_data_hiding_constraint_flag equal to 1 specifies that it is a requirement of bitstream conformance that sps_sign_data_hiding_enabled_flag shall be equal to 0. no_sign_data_hiding_constraint_flag equal to 0 does not impose such a constraint.

no_mixed_nalu_types_in_pic_constraint_flag equal to 1 specifies that it is a requirement of bitstream conformance that mixed_nalu_types_in_pic_flag shall be equal to 0. no_mixed_nalu_types_in_pic_constraint_flag equal to 0 does not impose such a constraint.

no_trail_constraint_flag equal to 1 specifies that there shall be no NAL unit with nuh_unit_type equal to TRAIL_NUT present in OlsInScope. no_trail_constraint_flag equal to 0 does not impose such a constraint.

no_stsa_constraint_flag equal to 1 specifies that there shall be no NAL unit with nuh_unit_type equal to STSA_NUT present in OlsInScope. no_stsa_constraint_flag equal to 0 does not impose such a constraint.

no_rasl_constraint_flag equal to 1 specifies that there shall be no NAL unit with nuh_unit_type equal to RASL_NUT present in OlsInScope. no_rasl_constraint_flag equal to 0 does not impose such a constraint.

no_radl_constraint_flag equal to 1 specifies that there shall be no NAL unit with nuh_unit_type equal to RADL_NUT present in OlsInScope. no_radl_constraint_flag equal to 0 does not impose such a constraint.

no_idr_constraint_flag equal to 1 specifies that there shall be no NAL unit with nuh_unit_type equal to IDR_W_RADL or IDR_N_LP present in OlsInScope. no_idr_constraint_flag equal to 0 does not impose such a constraint.

no_cra_constraint_flag equal to 1 specifies that there shall be no NAL unit with nuh_unit_type equal to CRA_NUT present in OlsInScope. no_cra_constraint_flag equal to 0 does not impose such a constraint.

no_gdr_constraint_flag equal to 1 specifies that there shall be no NAL unit with nuh_unit_type equal to GDR_NUT present in OlsInScope. no_gdr_constraint_flag equal to 0 does not impose such a constraint.

no_aps_constraint_flag equal to 1 specifies that there shall be no NAL unit with nuh_unit_type equal to PREFIX_APS_NUT or SUFFIX_APS_NUT present in OlsInScope. no_aps_constraint_flag equal to 0 does not impose such a constraint.

gci_alignment_zero_bits shall be equal to 0.

num_reserved_constraint_bytes specifies the number of the reserved constraint bytes. The value of num_reserved_constraint_bytes shall be 0. Other values of num_reserved_constraint_bytes are reserved for future use by ITU-T|ISO/IEC and shall not be present in bitstreams conforming to this version of this Specification.

gci_reserved_constraint_byte[i] may have any value. Its presence and value do not affect decoder conformance to profiles specified in this version of this Specification. Decoders conforming to this version of this Specification shall ignore the values of all the gci_reserved_constraint_byte[i] syntax elements.

3.3. DCI Syntax and Semantics

In the latest VVC draft text, the DCI syntax and semantics are as follows:

|  | Descriptor |
| --- | --- |
| decoding_capability_information_rbsp( ) { |  |
|   dci_max_sublayers_minus1 | u(3) |
|   dci_reserved_zero_bit | u(1) |
|   dci_num_ptls_minus1 | u(4) |
|   for( i = 0; i <= dci_num_ptls_minus1; i++ ) |  |
|     profile_tier_level( 1, 0 ) |  |
|   dci_extension_flag | u(1) |
|   if( dci_extension_flag ) |  |
|     while( more_rbsp_data( ) ) |  |
|       dci_extension_data_flag | u(1) |
|   rbsp_trailing_bits( ) |  |
| } |  |

A DCI RBSP may be made available to the decoder, through either being present in the bitstream, included in at least the first AU of the bitstream, or provided through external means.

NOTE 1—The information contained in the DCI RBSP is not necessary for operation of the decoding process specified in clauses 2 through 9 of this Specification.

When present, all DCI NAL units in a bitstream shall have the same content.

dci_max_sublayers_minus1 plus 1 specifies the maximum number of temporal sublayers that may be present in a layer in each CVS of the bitstream. The value of dci_max_sublayers_minus1 shall be in the range of 0 to 6, inclusive.

dci_reserved_zero_bit shall be equal to 0 in bitstreams conforming to this version of this Specification. The value 1 for dci_reserved_zero_bit is reserved for future use by ITU-T|ISO/IEC.

dci_num_ptls_minus1 plus 1 specifies the number of profile_tier_level( ) syntax structures in the DCI NAL unit.

It is a requirement of bitstream conformance that each OLS in a CVS in the bitstream shall conforms to at least one of the profile_tier_level( ) syntax structures in the DCI NAL unit.

NOTE 2—The DCI NAL unit may include PTL information, possibly carried in multiple profile_tier_level( ) syntax structures, that applies collectively to multiple OLSs, and does not need to include PTL information for each of the OLSs individually.

dci_extension_flag equal to 0 specifies that no dci_extension_data_flag syntax elements are present in the DCI RBSP syntax structure. dci_extension_flag equal to 1 specifies that there are dci_extension_data_flag syntax elements present in the DCI RBSP syntax structure.

dci_extension_data_flag may have any value. Its presence and value do not affect decoder conformance to profiles specified in Annex A. Decoders conforming to this version of this Specification shall ignore all dci_extension_data_flag syntax elements.

3.4. VPS Syntax and Semantics

In the latest VVC draft text, the VPS syntax and semantics are as follows:

| | Descriptor |
|---|---|
| video_parameter_set_rbsp( ) { | |
|   vps_video_parameter_set_id | u(4) |
|   vps_max_layers_minus1 | u(6) |
|   vps_max_sublayers_minus1 | u(3) |
|   if( vps_max_layers_minus1 > 0 && vps_max_sublayers_minus1 > 0 ) | |
|     vps_all_layers_same_num_sublayers_flag | u(1) |
|   if( vps_max_layers_minus1 > 0 ) | |
|     vps_all_independent_layers_flag | u(1) |
|   for( i = 0; i <= vps_max_layers_minus1; i++ ) { | |
|     vps_layer_id[ i ] | u(6) |
|     if( i > 0 && !vps_all_independent_layers_flag ) { | |
|       vps_independent_layer_flag[ i ] | u(1) |
|       if( !vps_independent_layer_flag[ i ] ) { | |
|         for( j = 0; j < i; j++ ) | |
|           vps_direct_ref_layer_flag[ i ][ j ] | u(1) |
|         max_tid_ref_present_flag[ i ] | u(1) |
|         if( max_tid_ref_present_flag[ i ] ) | |
|           max_tid_il_ref_pics_plus1[ i ] | u(3) |
|       } | |
|     } | |
|   } | |
|   if( vps_max_layers_minus1 > 0 ) { | |
|     if( vps_all_independent_layers_flag ) | |
|       each_layer_is_an_ols_flag | u(1) |
|     if( !each_layer_is_an_ols_flag ) { | |
|       if( !vps_all_independent_layers_flag ) | |
|         ols_mode_idc | u(2) |
|       if( ols_mode_idc = = 2 ) { | |
|         num_output_layer_sets_minus1 | u(8) |
|         for( i = 1; i <= num_output_layer_sets_minus1; i ++) | |
|           for( j = 0; j <= vps_max_layers_minus1; j++ ) | |
|             ols_output_layer_flag[ i ][ j ] | u(1) |
|       } | |
|     } | |
|   } | |
|   vps_num_ptls_minus1 | u(8) |
|   for( i = 0; i <= vps_num_ptls_minus1; i++ ) { | |
|     if( i > 0 ) | |
|       pt_present_flag[ i ] | u(1) |
|     if( vps_max_sublayers_minus1 > 0 && !vps_all_layers_same_num_sublayers_flag ) | |
|       ptl_max_temporal_id[ i ] | u(3) |
|   } | |
|   while( !byte_aligned( ) ) | |
|     vps_ptl_alignment_zero_bit /* equal to 0 */ | f(1) |
|   for( i = 0; i <= vps_num_ptls_minus1; i++ ) | |
|     profile_tier_level( pt_present_flag[ i ], ptl_max_temporal_id[ i ] ) | |
|   for( i = 0; i < TotalNumOlss; i++ ) | |
|     if( vps_num_ptls_minus1 > 0 ) | |
|       ols_ptl_idx[ i ] | u(8) |
|   if( !vps_all_independent_layers_flag ) | |
|     vps_num_dpb_params | ue(v) |
|   if( vps_num_dpb_params > 0 && vps_max_sublayers_minus1 > 0 ) | |
|     vps_sublayer_dpb_params_present_flag | u(1) |
|   for( i = 0; i < vps_num_dpb_params; i++ ) { | |
|     if( vps_max_sublayers_minus1 > 0 && !vps_all_layers_same_num_sublayers_flag ) | |
|       dpb_max_temporal_id[ i ] | u(3) |
|     dpb_parameters( dpb_max_temporal_id[ i ], vps_sublayer_dpb_params_present_flag ) | |
|   } | |
|   for( i = 0; i < TotalNumOlss; i++ ) { | |
|     if( NumLayersInOls[ i ] > 1 ) { | |
|       ols_dpb_pic_width[ i ] | ue(v) |
|       ols_dpb_pic_height[ i ] | ue(v) |
|       if( vps_num_dpb_params > 1 ) | |
|         ols_dpb_params_idx[ i ] | ue(v) |
|     } | |
|   } | |
|   if( !each_layer_is_an_ols_flag ) | |
|     vps_general_hrd_params_present_flag | u(1) |
|   if( vps_general_hrd_params_present_flag ) { | |
|     general_hrd_parameters( ) | |

|  | Descriptor |
|---|---|
| ```
    if( vps_max_sublayers_minus1 > 0 )
      vps_sublayer_cpb_params_present_flag
    num_ols_hrd_params_minus1
    for( i = 0; i <= num_ols_hrd_params_minus1; i++ ) {
      if( vps_max_sublayers_minus1 > 0 &&
!vps_all_layers_same_num_sublayers_flag )
        hrd_max_tid[ i ]
      firstSubLayer = vps_sublayer_cpb_params_present_flag ? 0 :
hrd_max_tid[ i ]
      ols_hrd_parameters( firstSubLayer, hrd_max_tid[ i ] )
    }
    if( num_ols_hrd_params_minus1 + 1 != TotalNumOlss &&
        num_ols_hrd_params_minus1 > 0 )
      for( i = 1; i < TotalNumOlss; i++ )
        if( NumLayersInOls[ i ] > 1 )
          ols_hrd_idx[ i ]
  }
  vps_extension_flag
  if( vps_extension_flag )
    while( more_rbsp_data( ) )
      vps_extension_data_flag
  rbsp_trailing_bits( )
}
``` | u(1)<br>ue(v)<br><br><br><br>u(3)<br><br><br><br><br><br><br><br><br>ue(v)<br><br>u(1)<br><br><br>u(1) |

A VPS RBSP shall be available to the decoding process prior to it being referenced, included in at least one AU with TemporalId equal to 0 or provided through external means. All VPS NAL units with a particular value of vps_video_parameter_set_id in a CVS shall have the same content.

vps_video_parameter_set_id provides an identifier for the VPS for reference by other syntax elements. The value of vps_video_parameter_set_id shall be greater than 0.

vps_max_layers_minus1 plus 1 specifies the maximum allowed number of layers in each CVS referring to the VPS.

vps_max_sublayers_minus1 plus 1 specifies the maximum number of temporal sublayers that may be present in a layer in each CVS referring to the VPS. The value of vps_max_sublayers_minus1 shall be in the range of 0 to 6, inclusive.

vps_all_layers_same_num_sublayers_flag equal to 1 specifies that the number of temporal sublayers is the same for all the layers in each CVS referring to the VPS.

vps_all_layers_same_num_sublayers_flag equal to 0 specifies that the layers in each CVS referring to the VPS may or may not have the same number of temporal sublayers. When not present, the value of vps_all_layers_same_num_sublayers_flag is inferred to be equal to 1.

vps_all_independent_layers_flag equal to 1 specifies that all layers in the CVS are independently coded without using inter-layer prediction. vps_all_independent_layers_flag equal to 0 specifies that one or more of the layers in the CVS may use inter-layer prediction. When not present, the value of vps_all_independent_layers_flag is inferred to be equal to 1.

vps_layer_id[i] specifies the nuh_layer_id value of the i-th layer. For any two non-negative integer values of m and n, when m is less than n, the value of vps_layer_id[m] shall be less than vps_layer_id[n].

vps_independent_layer_flag[i] equal to 1 specifies that the layer with index i does not use inter-layer prediction. vps_independent_layer_flag[i] equal to 0 specifies that the layer with index i may use inter-layer prediction and the syntax elements vps_direct_ref_layer_flag[i][j] for j in the range of 0 to i−1, inclusive, are present in VPS. When not present, the value of vps_independent_layer_flag[i] is inferred to be equal to 1.

vps_direct_ref_layer_flag[i][j] equal to 0 specifies that the layer with index j is not a direct reference layer for the layer with index i. vps_direct_ref_layer_flag [i][j] equal to 1 specifies that the layer with index j is a direct reference layer for the layer with index i. When vps_direct_ref_layer_flag [i][j] is not present for i and j in the range of 0 to vps_max_layers_minus1, inclusive, it is inferred to be equal to 0. When vps_independent_layer_flag[i] is equal to 0, there shall be at least one value of j in the range of 0 to i−1, inclusive, such that the value of vps_direct_ref_layer_flag [i][j] is equal to 1. The variables NumDirectRefLayers[i], DirectRefLayerIdx[i][d], NumRefLayers[i], RefLayerIdx[i][r], and LayerUsedAsRefLayerFlag[j] are derived as follows:

```
for( i = 0; i <= vps_max_layers_minus1; i++ ) {
  for( j = 0; j <= vps_max_layers_minus1; j++ ) {
    dependencyFlag[ i ][ j ] = vps_direct_ref_layer_flag[ i ][ j ]
    for( k = 0; k < i; k++ )
      if( vps_direct_ref_layer_flag[ i ][ k ] &&
      dependencyFlag[ k ][ j ] )
        dependencyFlag[ i ][ j ] = 1
  }
  LayerUsedAsRefLayerFlag[ i ] = 0
}
for( i = 0; i <= vps_max_layers_minus1; i++ ) {                    (37)
  for( j = 0, d = 0, r = 0; j <= vps_max_layers_minus1; j++ ) {
    if( vps_direct_ref_layer_flag[ i ][ j ] ) {
      DirectRefLayerIdx[ i ][ d++ ] = j
      LayerUsedAsRefLayerFlag[ j ] = 1
    }
    if( dependencyFlag[ i ][ j ] )
      RefLayerIdx[ i ][ r++ ] = j
  }
  NumDirectRefLayers[ i ] = d
  NumRefLayers[ i ] = r
}
```

The variable GeneralLayerIdx[i], specifying the layer index of the layer with nuh_layer_id equal to vps_layer_id[i], is derived as follows:

$$\text{for}(i=0;\ i<=\text{vps\_max\_layers\_minus1};\ i\text{++})\text{GeneralLayerIdx}[\text{vps\_layer\_id}[i]]=i \quad (38)$$

For any two different values of i and j, both in the range of 0 to vps_max_layers_minus1, inclusive, when dependency- Flag[i][j] equal to 1, it is a requirement of bitstream conformance that the values of chroma_format_idc and bit_depth_minus8 that apply to the i-th layer shall be equal to the values of chroma_format_idc and bit_depth_minus8, respectively, that apply to the j-th layer.

max_tid_ref_present_flag[i] equal to 1 specifies that the syntax element max_tid_il_ref_pic_splus1[i] is present. max_tid_ref_present_flag[i] equal to 0 specifies that the syntax element max_tid_ref_pics_plus1[i] is not present.

max_tid_il_ref_pics_plus1[i] equal to 0 specifies that inter-layer prediction is not used by non-IRAP pictures of the i-th layer. max_tid_ref_pics_plus1[i] greater than 0 specifies that, for decoding pictures of the i-th layer, no picture with TemporalId greater than max_tid_ref_pics_plus1[i]−1 is used as ILRP. When not present, the value of max_tid_ref_pics_plus1[i] is inferred to be equal to 7.

each_layer_is_an_ols_flag equal to 1 specifies that each OLS contains only one layer and each layer itself in a CVS referring to the VPS is an OLS with the single included layer being the only output layer. each_layer_is_an_ols_flag equal to 0 that an OLS may contain more than one layer. If vps_max_layers_minus1 is equal to 0, the value of each_layer_is_an_ols_flag is inferred to be equal to 1. Otherwise, when vps_all_independent_layers_flag is equal to 0, the value of each_layer_is_an_ols_flag is inferred to be equal to 0.

ols_mode_idc equal to 0 specifies that the total number of OLSs specified by the VPS is equal to vps_max_layers_minus1+1, the i-th OLS includes the layers with layer indices from 0 to i, inclusive, and for each OLS only the highest layer in the OLS is output.

ols_mode_idc equal to 1 specifies that the total number of OLSs specified by the VPS is equal to vps_max_layers_minus1+1, the i-th OLS includes the layers with layer indices from 0 to i, inclusive, and for each OLS all layers in the OLS are output.

ols_mode_idc equal to 2 specifies that the total number of OLSs specified by the VPS is explicitly signalled and for each OLS the output layers are explicitly signalled and other layers are the layers that are direct or indirect reference layers of the output layers of the OLS.

The value of ols_mode_idc shall be in the range of 0 to 2, inclusive. The value 3 of ols_mode_idc is reserved for future use by ITU-T|ISO/IEC.

When vps_all_independent_layers_flag is equal to 1 and each_layer_is_an_ols_flag is equal to 0, the value of ols_mode_idc is inferred to be equal to 2.

num_output_layer_sets_minus1 plus 1 specifies the total number of OLSs specified by the VPS when ols_mode_idc is equal to 2.

The variable TotalNumOlss, specifying the total number of OLSs specified by the VPS, is derived as follows:

```
if( vps_max_layers_minus1 = = 0 )
    TotalNumOlss = 1
else if( each_layer_is_an_ols_flag | | ols_mode_idc = = 0 | |
ols_mode_idc = = 1 )
    TotalNumOlss = vps_max_layers_minus1 + 1              (39)
else if( ols_mode_idc = = 2 )
    TotalNumOlss = num_output_layer_sets_minus1 + 1
``` ols_output_layer_flag[i][j] equal to 1 specifies that the layer with nuh_layer_id equal to vps_layer_id[j] is an output layer of the i-th OLS when ols_mode_idc is equal to 2. ols_output_layer_flag[i][j] equal to 0 specifies that the layer with nuh_layer_id equal to vps_layer_id[j] is not an output layer of the i-th OLS when ols_mode_idc is equal to 2. The variable NumOutputLayersInOls[i], specifying the number of output layers in the i-th OLS, the variable NumSubLayersInLayerinOLS[i][j], specifying the number of sublayers in the j-th layer in the i-th OLS, the variable OutputLayerIdInOls[i][j], specifying the nuh_layer_id value of the j-th output layer in the i-th OLS, and the variable LayerUsedAsOutputLayerFlag[k], specifying whether the k-th layer is used as an output layer in at least one OLS, are derived as follows:

```
NumOutputLayersInOls[ 0 ] = 1
OutputLayerIdInOls[ 0 ][ 0 ] = vps_layer_id[ 0 ]
NumSubLayersInLayerInOLS[ 0 ][ 0 ] = vps_max_sub_layers_minus1 + 1
LayerUsedAsOutputLayerFlag[ 0 ] = 1
for( i = 1, i <= vps_max_layers_minus1; i++ ) {
    if( each_layer_is_an_ols_flag | | ols_mode_idc < 2 )
        LayerUsedAsOutputLayerFlag[ i ] = 1
    else /*( !each_layer_is_an_ols_flag && ols_mode_idc = = 2 ) */
        LayerUsedAsOutputLayerFlag[ i ] = 0
}
for( i = 1; i < TotalNumOlss; i++ )
    if( each_layer_is_an_ols_flag | | ols_mode_idc = = 0 ) {
        NumOutputLayersInOls[ i ] = 1
        OutputLayerIdInOls[ i ][ 0 ] = vps_layer_id[ i ]
        for( j = 0; j < i && ( ols_mode_idc = = 0 ); j++ )
            NumSubLayersInLayerInOLS[ i ][ j ] = max_tid_il_ref_pics_plus1[ i ]
        NumSubLayersInLayerInOLS[ i ][ i ] = vps_max_sub_layers_minus1 + 1
    } else if( ols_mode_idc = = 1 ) {
        NumOutputLayersInOls[ i ] = i + 1
        for( j = 0; j < NumOutputLayersInOls[ i ]; j++ ) {
            OutputLayerIdInOls[ i ][j ] = vps_layer_id[ j ]
            NumSubLayersInLayerInOLS[ i ][ j ] = vps_max_sub_layers_minus1 + 1
        }
    } else if( ols_mode_idc = = 2 ) {
        for( j = 0; j <= vps_max_layers_minus1; j++ ) {
            layerIncludedInOlsFlag[ i ][ j ] = 0
            NumSubLayersInLayerInOLS[ i ][ j ] = 0
        }
        for( k = 0, j = 0; k <= vps_max_layers_minus1; k++ )          (40)
            if( ols_output_layer_flag[ i ][ k ] ) {
                layerIncludedInOlsFlag[ i ][ k ] = 1
                LayerUsedAsOutputLayerFlag[ k ] = 1
```

```
            OutputLayerIdx[ i ][ j ] = k
            OutputLayerIdInOls[ i ][ j++ ] = vps_layer_id[ k ]
            NumSubLayersInLayerInOLS[ i ][ j ] =
vps_max_sub_layers_minus1 + 1
        }
      NumOutputLayersInOls[ i ] = j
      for( j = 0; j < NumOutputLayersInOls[ i ]; j++ ) {
        idx = OutputLayerIdx[ i ][ j ]
        for( k = 0; k < NumRefLayers[ idx ]; k++ ) {
          layerIncludedInOlsFlag[ i ][ RefLayerIdx[ idx ][ k ] ] = 1
          if( NumSubLayersInLayerInOLS[ i ][ RefLayerIdx[ idx ][ k ] ] <
max_tid_il_ref_pics_plus1[ OutputLayerIdInOls[ i ][ j ] ] )
              NumSubLayersInLayerInOLS[ i ][ RefLayerIdx[ idx ][ k ] ] =
              max_tid_il_ref_pics_plus1[ OutputLayerIdInOls[ i ][ j ] ]
        }
      }
    }
  }
```

For each value of i in the range of 0 to vps_max_layers_minus1, inclusive, the values of LayerUsedAsRefLayerFlag[i] and LayerUsedAsOutputLayerFlag[i] shall not be both equal to 0. In other words, there shall be no layer that is neither an output layer of at least one OLS nor a direct reference layer of any other layer.

For each OLS, there shall be at least one layer that is an output layer. In other words, for any value of i in the range of 0 to TotalNumOlss−1, inclusive, the value of NumOutputLayersInOls[i] shall be greater than or equal to 1.

The variable NumLayersInOls[i], specifying the number of layers in the i-th OLS, and the variable LayerIdInOls[i][j], specifying the nuh_layer_id value of the j-th layer in the i-th OLS, are derived as follows:

```
NumLayersInOls[ 0 ] = 1
LayerIdInOls[ 0 ][ 0 ] = vps_layer_id[ 0 ]
for( i = 1; i < TotalNumOlss; i++ ) {
  if( each_layer_is_an_ols_flag ) {
    NumLayersInOls[ i ] = 1
    LayerIdInOls[ i ][ 0 ] = vps_layer_id[ i ]            (41)
  } else if( ols_mode_idc == 0 || ols_mode_idc == 1 ) {
    NumLayersInOls[ i ] = i + 1
    for( j = 0; j < NumLayersInOls[ i ]; j++ )
      LayerIdInOls[ i ][ j ] = vps_layer_id[ j ]
  } else if( ols_mode_idc == 2 ) {
    for( k = 0, j = 0; k <= vps_max_layers_minus1; k++ )
      if( layerIncludedInOlsFlag[ i ][ k ] )
        LayerIdInOls[ i ][ j++ ] = vps_layer_id[ k ]
    NumLayersInOls[ i ] = j
  }
}
```

NOTE 1
The 0-th OLS contains only the lowest layer (i.e., the layer with nuh_layer_id equal to vps_layer_id[ 0 ]) and for the 0-th OLS the only included layer is output.

The variable OlsLayerIdx[i][j], specifying the OLS layer index of the layer with nuh_layer_id equal to LayerIdInOls[i][j], is derived as follows:

for(i=0; i<TotalNumOlss; i++) for j=0;
  j<NumLayersInOls[i]; j++)OlsLayerIdx[i][LayerIdInOls[i][j]]=j                                    (42)

The lowest layer in each OLS shall be an independent layer. In other words, for each i in the range of 0 to TotalNumOlss−1, inclusive, the value of vps_independent_layer_flag[GeneralLayerIdx[LayerIdInOls[i][0]]] shall be equal to 1.

Each layer shall be included in at least one OLS specified by the VPS. In other words, for each layer with a particular value of nuh_layer_id nuhLayerId equal to one of vps_layer_id[k] for k in the range of 0 to vps_max_layers_minus1, inclusive, there shall be at least one pair of values of i and j, where i is in the range of 0 to TotalNumOlss−1, inclusive, and j is in the range of NumLayersInOls[i]−1, inclusive, such that the value of LayerIdInOls[i][j] is equal to nuhLayerId.

vps_num_ptls_minus1 plus 1 specifies the number of profile_tier_level( ) syntax structures in the VPS. The value of vps_num_ptls_minus1 shall be less than TotalNumOlss.

pt_present_flag[i] equal to 1 specifies that profile, tier, and general constraints information are present in the i-th profile_tier_level( ) syntax structure in the VPS. pt_present_flag[i] equal to 0 specifies that profile, tier, and general constraints information are not present in the i-th profile_tier_level( ) syntax structure in the VPS. The value of pt_present_flag[0] is inferred to be equal to 1. When pt_present_flag[i] is equal to 0, the profile, tier, and general constraints information for the i-th profile_tier_level( ) syntax structure in the VPS are inferred to be the same as that for the (i−1)-th profile_tier_level( ) syntax structure in the VPS.

ptl_max_temporal_id[i] specifies the TemporalId of the highest sublayer representation for which the level information is present in the i-th profile_tier_level( ) syntax structure in the VPS. The value of ptl_max_temporal_id[i] shall be in the range of 0 to vps_max_sublayers_minus1, inclusive. When vps_max_sublayers_minus1 is equal to 0, the value of ptl_max_temporal_id[i] is inferred to be equal to 0. When vps_max_sublayers_minus1 is greater than 0 and vps_all_layers_same_num_sublayers_flag is equal to 1, the value of ptl_max_temporal_id[i] is inferred to be equal to vps_max_sublayers_minus1.

vps_ptl_alignment_zero_bit shall be equal to 0.

ols_ptl_idx[i] specifies the index, to the list of profile_tier_level( ) syntax structures in the VPS, of the profile_tier_level( ) syntax structure that applies to the i-th OLS. When present, the value of ols_ptl_idx[i] shall be in the range of 0 to vps_num_ptls_minus1, inclusive. When vps_num_ptls_minus1 is equal to 0, the value of ols_ptl_idx[i] is inferred to be equal to 0. When NumLayersInOls[i] is equal to 1, the profile_tier_level( ) syntax structure that applies to the i-th OLS is also present in the SPS referred to by the layer in the i-th OLS. It is a requirement of bitstream conformance that, when NumLayersInOls[i] is equal to 1, the profile_tier_level( ) syntax structures signalled in the VPS and in the SPS for the i-th OLS shall be identical.

vps_num_dpb_params specifies the number of dpb_parameters( ) syntax structures in the VPS. The value of vps_num_dpb_params shall be in the range of 0 to 16, inclusive. When not present, the value of vps_num_dpb_params is inferred to be equal to 0.

vps_sublayer_dpb_params_present_flag is used to control the presence of max_dec_pic_buffering_minus1 [ ], max_num_reorder_pics[ ], and max_latency_increase_plus1[ ] syntax elements in the dpb_parameters( ) syntax structures in the VPS. When not present, vps_sub_dpb_params_info_present_flag is inferred to be equal to 0.

dpb_max_temporal_id[i] specifies the TemporalId of the highest sublayer representation for which the DPB parameters may be present in the i-th dpb_parameters( ) syntax structure in the VPS. The value of dpb_max_temporal_id[i] shall be in the range of 0 to vps_max_sublayers_minus1, inclusive. When vps_max_sublayers_minus1 is equal to 0, the value of dpb_max_temporal_id[i] is inferred to be equal to 0. When vps_max_sublayers_minus1 is greater than 0 and vps_all_layers_same_num_sublayers_flag is equal to 1, the value of dpb_max_temporal_id[i] is inferred to be equal to vps_max_sublayers_minus1.

ols_dpb_pic_width[i] specifies the width, in units of luma samples, of each picture storage buffer for the i-th OLS.

ols_dpb_pic_height[i] specifies the height, in units of luma samples, of each picture storage buffer for the i-th OLS.

ols_dpb_params_idx[i] specifies the index, to the list of dpb_parameters( ) syntax structures in the VPS, of the dpb_parameters( ) syntax structure that applies to the i-th OLS when NumLayersInOls[i] is greater than 1. When present, the value of ols_dpb_params_idx[i] shall be in the range of 0 to vps_num_dpb_params−1, inclusive. When ols_dpb_params_idx[i] is not present, the value of ols_dpb_params_idx[i] is inferred to be equal to 0.

When NumLayersInOls[i] is equal to 1, the dpb_parameters( ) syntax structure that applies to the i-th OLS is present in the SPS referred to by the layer in the i-th OLS.

vps_general_hrd_params_present_flag equal to 1 specifies that the syntax structure general_hrd_parameters( ) and other HRD parameters are present in the VPS RBSP syntax structure. vps_general_hrd_params_present_flag equal to 0 specifies that the syntax structure general_hrd_parameters( ) and other HRD parameters are not present in the VPS RBSP syntax structure. When not present, the value of vps_general_hrd_params_present_flag is inferred to be equal to 0.

When NumLayersInOls[i] is equal to 1, the general_hrd_parameters( ) syntax structure that applies to the i-th OLS is present in the SPS referred to by the layer in the i-th OLS. vps_sublayer_cpb_params_present_flag equal to 1 specifies that the i-th ols_hrd_parameters( ) syntax structure in the VPS contains HRD parameters for the sublayer representations with TemporalId in the range of 0 to hrd_max_tid[i], inclusive.

vps_sublayer_cpb_params_present_flag equal to 0 specifies that the i-th ols_hrd_parameters( ) syntax structure in the VPS contains HRD parameters for the sublayer representation with TemporalId equal to hrd_max_tid[i] only. When vps_max_sublayers_minus1 is equal to 0, the value of vps_sublayer_cpb_params_present_flag is inferred to be equal to 0.

When vps_sublayer_cpb_params_present_flag is equal to 0, the HRD parameters for the sublayer representations with TemporalId in the range of 0 to hrd_max_tid[i]−1, inclusive, are inferred to be the same as that for the sublayer representation with TemporalId equal to hrd_max_tid[i]. These include the HRD parameters starting from the fixed_pic_rate_general_flag[i] syntax element till the sublayer_hrd_parameters(i) syntax structure immediately under the condition "if(general_vcl_hrd_params_present_flag)" in the ols_hrd_parameters syntax structure.

num_ols_hrd_params_minus1 plus 1 specifies the number of ols_hrd_parameters( ) syntax structures present in the general_hrd_parameters( ) syntax structure when vps_general_hrd_params_present_flag is equal to 1. The value of num_ols_hrd_params_minus1 shall be in the range of 0 to TotalNumOlss−1, inclusive.

hrd_max_tid[i] specifies the TemporalId of the highest sublayer representation for which the HRD parameters are contained in the i-th ols_hrd_parameters( ) syntax structure. The value of hrd_max_tid[i] shall be in the range of 0 to vps_max_sublayers_minus1, inclusive. When vps_max_sublayers_minus1 is equal to 0, the value of hrd_max_tid[i] is inferred to be equal to 0. When vps_max_sublayers_minus1 is greater than 0 and vps_all_layers_same_num_sublayers_flag is equal to 1, the value of hrd_max_tid[i] is inferred to be equal to vps_max_sublayers_minus1.

ols_hrd_idx[i] specifies the index, to the list of ols_hrd_parameters( ) syntax structures in the VPS, of the ols_hrd_parameters( ) syntax structure that applies to the i-th OLS when NumLayersInOls[i] is greater than 1. The value of ols_hrd_idx[[i] shall be in the range of 0 to num_ols_hrd_params_minus1, inclusive.

When NumLayersInOls[i] is equal to 1, the ols_hrd_parameters( ) syntax structure that applies to the i-th OLS is present in the SPS referred to by the layer in the i-th OLS. If the value of num_ols_hrd_param_minus1+1 is equal to TotalNumOlss, the value of ols_hrd_idx[i] is inferred to be equal to i. Otherwise, when NumLayersInOls[i] is greater than 1 and num_ols_hrd_params_minus1 is equal to 0, the value of ols_hrd_idx[[i] is inferred to be equal to 0.

vps_extension_flag equal to 0 specifies that no vps_extension_data_flag syntax elements are present in the VPS RBSP syntax structure. vps_extension_flag equal to 1 specifies that there are vps_extension_data_flag syntax elements present in the VPS RBSP syntax structure.

vps_extension_data_flag may have any value. Its presence and value do not affect decoder conformance to profiles specified in this version of this Specification. Decoders conforming to this version of this Specification shall ignore all vps_extension_data_flag syntax elements.

3.5. SPS Syntax and Semantics

In the latest VVC draft text, the SPS syntax and semantics are as follows:

|  | Descriptor |
|---|---|
| seq_parameter_set_rbsp( ) { |  |
|   sps_seq_parameter_set_id | u(4) |
|   sps_video_parameter_set_id | u(4) |
|   sps_max_sublayers_minus1 | u(3) |
|   sps_reserved_zero_4bits | u(4) |
|   sps_ptl_dpb_hrd_params_present_flag | u(1) |
|   if( sps_ptl_dpb_hrd_params_present_flag ) |  |
|     profile_tier_level( 1, sps_max_sublayers_minus1 ) |  |
|   gdr_enabled_flag | u(1) |

-continued

| | Descriptor |
|---|---|
| chroma_format_idc | u(2) |
| if( chroma_format_idc = = 3 ) | |
|   separate_colour_plane_flag | u(1) |
| res_change_in_clvs_allowed_flag | u(1) |
| pic_width_max_in_luma_samples | ue(v) |
| pic_height_max_in_luma_samples | ue(v) |
| sps_conformance_window_flag | u(1) |
| if( sps_conformance_window_flag ) { | |
|   sps_conf_win_left_offset | ue(v) |
|   sps_conf_win_right_offset | ue(v) |
|   sps_conf_win_top_offset | ue(v) |
|   sps_conf_win_bottom_offset | ue(v) |
| } | |
| sps_log2_ctu_size_minus5 | u(2) |
| subpic_info_present_flag | u(1) |
| if( subpic_info_present_flag ) { | |
|   sps_num_subpics_minus1 | ue(v) |
|   sps_independent_subpics_flag | u(1) |
|   for( i = 0; sps_num_subpics_minus1 > 0 && i <= sps_num_subpics_minus1; i++ ) { | |
|     if( i > 0 && pic_width_max_in_luma_samples > CtbSizeY ) | |
|       subpic_ctu_top_left_x[ i ] | u(v) |
|     if( i > 0 && pic_height_max_in_luma_samples > CtbSizeY ) { | |
|       subpic_ctu_top_left_y[ i ] | u(v) |
|     if( i < sps_num_subpics_minus1 && | |
|       pic_width_max_in_luma_samples > CtbSizeY ) | |
|       subpic_width_minus1[ i ] | u(v) |
|     if( i < sps_num_subpics_minus1 && | |
|       pic_height_max_in_luma_samples > CtbSizeY ) | |
|       subpic_height_minus1[ i ] | u(v) |
|     if( ! sps_independent_subpics_flag) { | |
|       subpic_treated_as_pic_flag[ i ] | u(1) |
|       loop_filter_across_subpic_enabled_flag[ i ] | u(1) |
|     } | |
|   } | |
|   sps_subpic_id_len_minus1 | ue(v) |
|   subpic_id_mapping_explicitly_signalled_flag | u(1) |
|   if( subpic_id_mapping_explicitly_signalled_flag ) { | |
|     subpic_id_mapping_in_sps_flag | u(1) |
|     if( subpic_id_mapping_in_sps_flag ) | |
|       for( i = 0; i <= sps_num_subpics_minus1; i++ ) | |
|         sps_subpic_id[ i ] | u(v) |
|   } | |
| } | |
| bit_depth_minus8 | ue(v) |
| sps_entropy_coding_sync_enabled_flag | u(1) |
| if( sps_entropy_coding_sync_enabled_flag ) | |
|   sps_wpp_entry_point_offsets_present_flag | u(1) |
| sps_weighted_pred_flag | u(1) |
| sps_weighted_bipred_flag | u(1) |
| log2_max_pic_order_cnt_lsb_minus4 | u(4) |
| sps_poc_msb_flag | u(1) |
| if( sps_poc_msb_flag ) | |
|   poc_msb_len_minus1 | ue(v) |
| num_extra_ph_bits_bytes | u(2) |
|   extra_ph_bits_struct( num_extra_ph_bits_bytes ) | |
| num_extra_sh_bits_bytes | u(2) |
|   extra_sh_bits_struct( num_extra_sh_bits_bytes ) | |
| if( sps_max_sublayers_minus1 > 0 ) | |
|   sps_sublayer_dpb_params_flag | u(1) |
| if( sps_ptl_dpb_hrd_params_present_flag ) | |
|   dpb_parameters( sps_max_sublayers_minus1, sps_sublayer_dpb_params_flag ) | |
| long_term_ref_pics_flag | u(1) |
| inter_layer_ref_pics_present_flag | u(1) |
| sps_idr_rpl_present_flag | u(1) |
| rpl1_same_as_rpl0_flag | u(1) |
| for( i = 0; i < !rpl1_same_as_rpl0_flag ? 2 : 1; i++ ) { | |
|   num_ref_pic_lists_in_sps[ i ] | ue(v) |
|   for( j = 0; j < num_ref_pic_lists_in_sps[ i ]; j++) | |
|     ref_pic_list_struct( i, j ) | |
| } | |
| if( ChromaArrayType != 0 ) | |
|   qtbtt_dual_tree_intra_flag | u(1) |
| log2_min_luma_coding_block_size_minus2 | ue(v) |
| partition_constraints_override_enabled_flag | u(1) |
| sps_log2_diff_min_qt_min_cb_intra_slice_luma | ue(v) |

-continued

| | Descriptor |
|---|---|
| sps_max_mtt_hierarchy_depth_intra_slice_luma | ue(v) |
| if( sps_max_mtt_hierarchy_depth_intra_slice_luma != 0 ) { | |
|   sps_log2_diff_max_bt_min_qt_intra_slice_luma | ue(v) |
|   sps_log2_diff_max_tt_min_qt_intra_slice_luma | ue(v) |
| } | |
| sps_log2_diff_min_qt_min_cb_inter_slice | ue(v) |
| sps_max_mtt_hierarchy_depth_inter_slice | ue(v) |
| if( sps_max_mtt_hierarchy_depth_inter_slice != 0 ) { | |
|   sps_log2_diff_max_bt_min_qt_inter_slice | ue(v) |
|   sps_log2_diff_max_tt_min_qt_inter_slice | ue(v) |
| } | |
| if( qtbtt_dual_tree_intra_flag ) { | |
|   sps_log2_diff_min_qt_min_cb_intra_slice_chroma | ue(v) |
|   sps_max_mtt_hierarchy_depth_intra_slice_chroma | ue(v) |
|   if( sps_max_mtt_hierarchy_depth_intra_slice_chroma != 0 ) { | |
|     sps_log2_diff_max_bt_min_qt_intra_slice_chroma | ue(v) |
|     sps_log2_diff_max_tt_min_qt_intra_slice_chroma | ue(v) |
|   } | |
| } | |
| sps_max_luma_transform_size_64_flag | u(1) |
| if( ChromaArrayType != 0 ) { | |
|   sps_joint_cbcr_enabled_flag | u(1) |
|   same_qp_table_for_chroma | u(1) |
|   numQpTables = same_qp_table_for_chroma ? 1 : ( sps_joint_cbcr_enabled_flag ? 3 : 2 ) | |
|   for( i = 0; i < numQpTables; i++ ) { | |
|     qp_table_start_minus26[ i ] | se(v) |
|     num_points_in_qp_table_minus1[ i ] | ue(v) |
|     for( j = 0; j <= num_points_in_qp_table_minus1[ i ]; j++ ) { | |
|       delta_qp_in_val_minus1[ i ][ j ] | ue(v) |
|       delta_qp_diff_val[ i ][ j ] | ue(v) |
|     } | |
|   } | |
| } | |
| sps_sao_enabled_flag | u(1) |
| sps_alf_enabled_flag | u(1) |
| if( sps_alf_enabled_flag && ChromaArrayType != 0 ) | |
|   sps_ccalf_enabled_flag | u(1) |
| sps_transform_skip_enabled_flag | u(1) |
| if( sps_transform_skip_enabled_flag ) { | |
|   log2_transform_skip_max_size_minus2 | ue(v) |
|   sps_bdpcm_enabled_flag | u(1) |
| } | |
| sps_ref_wraparound_enabled_flag | u(1) |
| sps_temporal_mvp_enabled_flag | u(1) |
| if( sps_temporal_mvp_enabled_flag ) | |
|   sps_sbtmvp_enabled_flag | u(1) |
| sps_amvr_enabled_flag | u(1) |
| sps_bdof_enabled_flag | u(1) |
| if( sps_bdof_enabled_flag ) | |
|   sps_bdof_pic_present_flag | u(1) |
| sps_smvd_enabled_flag | u(1) |
| sps_dmvr_enabled_flag | u(1) |
| if( sps_dmvr_enabled_flag) | |
|   sps_dmvr_pic_present_flag | u(1) |
| sps_mmvd_enabled_flag | u(1) |
| sps_isp_enabled_flag | u(1) |
| sps_mrl_enabled_flag | u(1) |
| sps_mip_enabled_flag | u(1) |
| if( ChromaArrayType != 0 ) | |
|   sps_cclm_enabled_flag | u(1) |
| if( chroma_format_idc == 1 ) { | |
|   sps_chroma_horizontal_collocated_flag | u(1) |
|   sps_chroma_vertical_collocated_flag | u(1) |
| } | |
| sps_mts_enabled_flag | u(1) |
| if( sps_mts_enabled_flag ) { | |
|   sps_explicit_mts_intra_enabled_flag | u(1) |
|   sps_explicit_mts_inter_enabled_flag | u(1) |
| } | |
| six_minus_max_num_merge_cand | ue(v) |
| sps_sbt_enabled_flag | u(1) |
| sps_affine_enabled_flag | u(1) |
| if( sps_affine_enabled_flag ) { | |
|   five_minus_max_num_subblock_merge_cand | ue(v) |
|   sps_affine_type_flag | u(1) |
|   if( sps_amvr_enabled_flag ) | |

-continued

| | Descriptor |
|---|---|
|     sps_affine_amvr_enabled_flag | u(1) |
|     sps_affine_prof_enabled_flag | u(1) |
|     if( sps_affine_prof_enabled_flag ) | |
|       sps_prof_pic_present_flag | u(1) |
| } | |
| sps_palette_enabled_flag | u(1) |
| if( ChromaArrayType = = 3 && !sps_max_luma_transform_size_64_flag ) | |
|   sps_act_enabled_flag | u(1) |
| if( sps_transform_skip_enabled_flag \|\| sps_palette_enabled_flag ) | |
|   min_qp_prime_ts_minus4 | ue(v) |
| sps_bcw_enabled_flag | u(1) |
| sps_ibc_enabled_flag | u(1) |
| if( sps_ibc_enabled_flag ) | |
|   six_minus_max_num_ibc_merge_cand | ue(v) |
| sps_ciip_enabled_flag | u(1) |
| if( sps_mmvd_enabled_flag ) | |
|   sps_fpel_mmvd_enabled_flag | u(1) |
| if( MaxNumMergeCand >= 2 ) { | |
|   sps_gpm_enabled_flag | u(1) |
|   if( sps_gpm_enabled_flag && MaxNumMergeCand >= 3 ) | |
|     max_num_merge_cand_minus_max_num_gpm_cand | ue(v) |
| } | |
| sps_lmcs_enabled_flag | u(1) |
| sps_lfnst_enabled_flag | u(1) |
| sps_ladf_enabled_flag | u(1) |
| if( sps_ladf_enabled_flag ) { | |
|   sps_num_ladf_intervals_minus2 | u(2) |
|   sps_ladf_lowest_interval_qp_offset | se(v) |
|   for( i = 0; i < sps_num_ladf_intervals_minus2 + 1; i++ ) { | |
|     sps_ladf_qp_offset[ i ] | se(v) |
|     sps_ladf_delta_threshold_minus1[ i ] | ue(v) |
|   } | |
| } | |
| log2_parallel_merge_level_minus2 | ue(v) |
| sps_scaling_list_enabled_flag | u(1) |
| sps_dep_quant_enabled_flag | u(1) |
| if( !sps_dep_quant_enabled_flag ) | |
|   sps_sign_data_hiding_enabled_flag | u(1) |
| sps_virtual_boundaries_enabled_flag | u(1) |
| if( sps_virtual_boundaries_enabled_flag ) { | |
|   sps_virtual_boundaries_present_flag | u(1) |
|   if( sps_virtual_boundaries_present_flag ) { | |
|     sps_num_ver_virtual_boundaries | u(2) |
|     for( i = 0; i < sps_num_ver_virtual_boundaries; i++ ) | |
|       sps_virtual_boundaries_pos_x[ i ] | u(13) |
|     sps_num_hor_virtual_boundaries | u(2) |
|     for( i = 0; i < sps_num_hor_virtual_boundaries; i++ ) | |
|       sps_virtual_boundaries_pos_y[ i ] | u(13) |
|   } | |
| } | |
| if( sps_ptl_dpb_hrd_params_present_flag ) { | |
|   sps_general_hrd_params_present_flag | u(1) |
|   if( sps_general_hrd_params_present_flag ) { | |
|     general_hrd_parameters( ) | |
|     if( sps_max_sublayers_minus1 > 0 ) | |
|       sps_sublayer_cpb_params_present_flag | u(1) |
|     firstSubLayer = sps_sublayer_cpb_params_present_flag ? 0 : | |
|       sps_max_sublayers_minus1 | |
|     ols_hrd_parameters( firstSubLayer, sps_max_sublayers_minus1 ) | |
|   } | |
| } | |
| field_seq_flag | u(1) |
| vui_parameters_present_flag | u(1) |
| if( vui_parameters_present_flag ) | |
|   vui_parameters( ) /* Specified in ITU-T H.SEI \| ISO/IEC 23002-7 */ | |
| sps_extension_flag | u(1) |
| if( sps_extension_flag ) | |
|   while( more_rbsp_data( ) ) | |
|     sps_extension_data_flag | u(1) |
| rbsp_trailing_bits( ) | |
| } | |

An SPS RBSP shall be available to the decoding process prior to it being referenced, included in at least one AU with TemporalId equal to 0 or provided through external means. All SPS NAL units with a particular value of sps_seq_parameter_set_id in a CVS shall have the same content.
sps_seq_parameter_set_id provides an identifier for the SPS for reference by other syntax elements.
SPS NAL units, regardless of the nuh_layer_id values, share the same value space of sps_seq_parameter_set_id.

Let spsLayerId be the value of the nuh_layer_id of a particular SPS NAL unit, and vclLayerId be the value of the nuh_layer_id of a particular VCL NAL unit. The particular VCL NAL unit shall not refer to the particular SPS NAL unit unless spsLayerId is less than or equal to vclLayerId and the layer with nuh_layer_id equal to spsLayerId is included in at least one OLS that includes the layer with nuh_layer_id equal to vclLayerId.

sps_video_parameter_set_id, when greater than 0, specifies the value of vps video parameter set id for the VPS referred to by the SPS.

When sps_video_parameter_set_id is equal to 0, the following applies:
  The SPS does not refer to a VPS.
  No VPS is referred to when decoding each CLVS referring to the SPS.
  The value of vps_max_layers_minus1 is inferred to be equal to 0.
  The CVS shall contain only one layer (i.e., all VCL NAL unit in the CVS shall have the same value of nuh_layer_id).
  The value of GeneralLayerIdx[nuh_layer_id] is inferred to be equal to 0.
  The value of vps independent layer flag[GeneralLayerIdx [nuh_layer_id]] is inferred to be equal to 1.

When vps independent layer flag[GeneralLayerIdx[nuh_layer_id]] is equal to 1, the SPS referred to by a CLVS with a particular nuh_layer_id value nuhLayerId shall have nuh_layer_id equal to nuhLayerId.

The value of sps_video_parameter_set_id shall be the same in all SPSs that are referred to by CLVSs in a CVS.

sps_max_sublayers_minus1 plus 1 specifies the maximum number of temporal sublayers that may be present in each CLVS referring to the SPS. The value of sps_max_sublayers_minus1 shall be in the range of 0 to vps_max_sublayers_minus1, inclusive.

sps_reserved_zero_4 bits shall be equal to 0 in bitstreams conforming to this version of this Specification. Other values for sps_reserved_zero_4bits are reserved for future use by ITU-T ISO/IEC.

sps_ptl_dpb_hrd_params_present_flag equal to 1 specifies that a profile_tier_level( ) syntax structure and a dpb_parameters( ) syntax structure are present in the SPS, and a general_hrd_parameters( ) syntax structure and an ols_hrd_parameters( ) syntax structure may also be present in the SPS. sps_ptl_dpb_hrd_params_present_flag equal to 0 specifies that none of these four syntax structures is present in the SPS. The value of sps_ptl_dpb_hrd_params_present_flag shall be equal to vps independent layer flag[GeneralLayerIdx[nuh_layer_id]].

gdr_enabled_flag equal to 1 specifies that GDR pictures may be present in CLVSs referring to the SPS. gdr_enabled_flag equal to 0 specifies that GDR pictures are not present in CLVSs referring to the SPS.

chroma_format_idc specifies the chroma sampling relative to the luma sampling as specified in clause 6.2.

separate_colour_plane_flag equal to 1 specifies that the three colour components of the 4:4:4 chroma format are coded separately. separate_colour_plane_flag equal to 0 specifies that the colour components are not coded separately. When separate_colour_plane_flag is not present, it is inferred to be equal to 0. When separate_colour_plane_flag is equal to 1, the coded picture consists of three separate components, each of which consists of coded samples of one colour plane (Y, Cb, or Cr) and uses the monochrome coding syntax. In this case, each colour plane is associated with a specific colour_plane_id value.

NOTE 1—There is no dependency in decoding processes between the colour planes having different colour_plane_id values. For example, the decoding process of a monochrome picture with one value of colour_plane_id does not use any data from monochrome pictures having different values of colour_plane_id for inter prediction.

Depending on the value of separate_colour_plane_flag, the value of the variable ChromaArrayType is assigned as follows:
  If separate_colour_plane_flag is equal to 0, ChromaArrayType is set equal to chroma_format_idc.
  Otherwise (separate_colour_plane_flag is equal to 1), ChromaArrayType is set equal to 0.

res_change_in_clvs_allowed_flag equal to 1 specifies that the picture spatial resolution may change within a CLVS referring to the SPS. res_change_in_clvs_allowed_flag equal to 0 specifies that the picture spatial resolution does not change within any CLVS referring to the SPS.

pic_width_max_in_luma_samples specifies the maximum width, in units of luma samples, of each decoded picture referring to the SPS. pic_width_max_in_luma_samples shall not be equal to 0 and shall be an integer multiple of Max(8, MinCbSizeY).

It is a requirement of bitstream conformance that, for any OLS with OLS index i that contains one or more layers that refers to the SPS, the value of pic_width_max_in_luma_samples shall be less than or equal to the value of ols_dpb_pic_width[i].

pic_height_max_in_luma_samples specifies the maximum height, in units of luma samples, of each decoded picture referring to the SPS. pic_height_max_in_luma_samples shall not be equal to 0 and shall be an integer multiple of Max(8, MinCbSizeY).

It is a requirement of bitstream conformance that, for any OLS with OLS index i that contains one or more layers that refers to the SPS, the value of pic_height_max_in_luma_samples shall be less than or equal to the value of ols_dpb_pic_height[i].

sps_conformance_window_flag equal to 1 indicates that the conformance cropping window offset parameters follow next in the SPS. sps_conformance_window_flag equal to 0 indicates that the conformance cropping window offset parameters are not present in the SPS.

sps_conf_win_left_offset, sps_conf_win_right_offset, sps_conf_win_top_offset, and sps_conf_win_bottom_offset specify the cropping window that is applied to pictures with pic width in luma samples equal to pic_width_max_in_luma_samples and pic height in luma samples equal to pic_height_max_in_luma_samples. When sps_conformance_window_flag is equal to 0, the values of sps_conf_win_left_offset, sps_conf_win_right_offset, sps_conf_win_top_offset, and sps_conf_win_bottom_offset are inferred to be equal to 0.

The conformance cropping window contains the luma samples with horizontal picture coordinates from SubWidthC*sps_conf_win_left_offset to pic_width_max_in_luma_samples−

(SubWidthC*sps_conf_win_right_offset+1) and vertical picture coordinates from SubHeightC*sps_conf_win_top_offset to pic_height_max_in_luma_samples−(SubHeightC*sps_conf_win_bottom_offset+1), inclusive.

The value of SubWidthC*(sps_conf_win_left_offset+sps_conf_win_right_offset) shall be less than pic_width_max_in_luma_samples, and the value of SubHeightC*(sps_conf_win_top_offset+sps_conf_win_bottom_offset) shall be less than pic_height_max_in_luma_samples.

When ChromaArrayType is not equal to 0, the corresponding specified samples of the two chroma arrays are the samples having picture coordinates (x/SubWidthC, y/SubHeightC), where (x, y) are the picture coordinates of the specified luma samples.

> NOTE 2—The conformance cropping window offset parameters are only applied at the output. All internal decoding processes are applied to the uncropped picture size.

sps_log 2_ctu_size_minus5 plus 5 specifies the luma coding tree block size of each CTU. The value of sps_log 2_ctu_size_minus5 shall be in the range of 0 to 2, inclusive. The value 3 for sps_log 2_ctu_size_minus5 is reserved for future use by ITU-T The variables Ctb Log 2SizeY and CtbSizeY are derived as follows:

$$Ctb\ Log\ 2SizeY = sps\_log\ 2\_ctu\_size\_minus5 + 5 \qquad (43)$$

$$CtbSizeY = 1 << Ctb\ Log\ 2SizeY \qquad (44)$$

subpic_info_present_flag equal to 1 specifies that subpicture information is present for the CLVS and there may be one or more than one subpicture in each picture of the CLVS. subpic_info_present_flag equal to 0 specifies that subpicture information is not present for the CLVS and there is only one subpicture in each picture of the CLVS.

When res_change_in_clvs_allowed_flag is equal to 1, the value of subpic_info_present_flag shall be equal to 0.

> NOTE 3—When a bitstream is the result of a sub-bitstream extraction process and contains only a subset of the subpictures of the input bitstream to the sub-bitstream extraction process, it might be required to set the value of subpic_info_present_flag equal to 1 in the RBSP of the SPSs.

sps_num_subpics_minus1 plus 1 specifies the number of subpictures in each picture in the CLVS. The value of sps_num_subpics_minus1 shall be in the range of 0 to Ceil(pic_width_max_in_luma_samples÷CtbSizeY)*Ceil (pic_height_max_in_luma_samples÷CtbSizeY)−1, inclusive. When not present, the value of sps_num_subpics_minus1 is inferred to be equal to 0.

sps_independent_subpics_flag equal to 1 specifies that no intra prediction, no inter prediction and no in-loop filtering operations may be performed across any subpicture boundary in the CLVS. sps_independent_subpics_flag equal to 0 specifies that inter prediction or in-loop filtering operations across the subpicture boundaries in the CLVS may be allowed. When not present, the value of sps_independent_subpics_flag is inferred to be equal to 0.

subpic_ctu_top_left_x[i] specifies horizontal position of top left CTU of i-th subpicture in unit of CtbSizeY. The length of the syntax element is Ceil(Log 2((pic_width_max_in_luma_samples+CtbSizeY−1)>>Ctb Log 2SizeY)) bits.

When not present, the value of subpic_ctu_top_left_x[i] is inferred to be equal to 0.

subpic_ctu_top_left_y[i] specifies vertical position of top left CTU of i-th subpicture in unit of CtbSizeY. The length of the syntax element is Ceil(Log 2((pic_height_max_in_luma_samples+CtbSizeY−1)>>Ctb Log 2SizeY)) bits.

When not present, the value of subpic_ctu_top_left_y[i] is inferred to be equal to 0.

subpic_width_minus1[i] plus 1 specifies the width of the i-th subpicture in units of CtbSizeY. The length of the syntax element is Ceil(Log 2((pic_width_max_in_luma_samples+CtbSizeY−1)>>Ctb Log 2SizeY)) bits.

When not present, the value of subpic_width_minus1[i] is inferred to be equal to ((pic_width_max_in_luma_samples+CtbSizeY−1)>>Ctb Log 2SizeY)−subpic_ctu_top_left_x[i]−1.

subpic_height_minus1[i] plus 1 specifies the height of the i-th subpicture in units of CtbSizeY. The length of the syntax element is Ceil(Log 2((pic_height_max_in_luma_samples+CtbSizeY−1)>>Ctb Log 2SizeY)) bits. When not present, the value of subpic_height_minus1[i] is inferred to be equal to ((pic_height_max_in_luma_samples+CtbSizeY−1)>>Ctb Log 2SizeY)−subpic_ctu_top_left_y[i]−1.

subpic_treated_as_pic_flag[i] equal to 1 specifies that the i-th subpicture of each coded picture in the CLVS is treated as a picture in the decoding process excluding in-loop filtering operations. subpic_treated_as_pic_flag[i] equal to 0 specifies that the i-th subpicture of each coded picture in the CLVS is not treated as a picture in the decoding process excluding in-loop filtering operations. When not present, the value of subpic_treated_as_pic_flag[i] is inferred to be equal to sps_independent_subpics_flag.

When subpic_treated_as_pic_flag[i] is equal to 1, it is a requirement of bitstream conformance that all of the following conditions are true for each output layer and its reference layers in an OLS that includes the layer containing the i-th subpicture as an output layer:

> All pictures in the output layer and its reference layers shall have the same value of pic width in luma samples and the same value of pic height in luma samples.
>
> All the SPSs referred to by the output layer and its reference layers shall have the same value of sps_num_subpics_minus1 and shall have the same values of subpic_ctu_top_left_x[j], subpic_ctu_top_left_y[j], subpic_width_minus1[j], subpic_height_minus1[j], and loop_filter_across_subpic_enabled_flag[j], respectively, for each value of j in the range of 0 to sps_num_subpics_minus1, inclusive.
>
> All pictures in each access unit in the output layer and its reference layers shall have the same value of SubpicIdVal[j] for each value of j in the range of 0 to sps_num_subpics_minus1, inclusive.

loop_filter_across_subpic_enabled_flag[i] equal to 1 specifies that in-loop filtering operations may be performed across the boundaries of the i-th subpicture in each coded picture in the CLVS. loop_filter_across_subpic_enabled_flag[i] equal to 0 specifies that in-loop filtering operations are not performed across the boundaries of the i-th subpicture in each coded picture in the CLVS. When not present, the value of loop_filter_across_subpic_enabled_pic_flag[i] is inferred to be equal to 1−sps_independent_subpics_flag.

> It is a requirement of bitstream conformance that the shapes of the subpictures shall be such that each subpicture, when decoded, shall have its entire left boundary and entire top boundary consisting of picture boundaries or consisting of boundaries of previously decoded subpictures.

sps_subpic_id_len_minus1 plus 1 specifies the number of bits used to represent the syntax element sps_subpic_id[i], the syntax elements pps_subpic_id[i], when present, and the syntax element slice_subpic_id, when present. The value of sps_subpic_id_len_minus1 shall be in the range of 0 to 15, inclusive. The value of 1<<(sps_subpic_id_len_minus1+1) shall be greater than or equal to sps_num_subpics_minus1+1.

subpic_id_mapping_explicitly_signalled_flag equal to 1 specifies that the subpicture ID mapping is explicitly signalled, either in the SPS or in the PPSs referred to by coded pictures of the CLVS. subpic_id_mapping_explicitly_signalled_flag equal to 0 specifies that the subpicture ID mapping is not explicitly signalled for the CLVS. When not present, the value of subpic_id_mapping_explicitly_signalled_flag is inferred to be equal to 0.

subpic_id_mapping_in_sps_flag equal to 1 specifies that the subpicture ID mapping is signalled in the SPS when subpic_id_mapping_explicitly_signalled_flag is equal to 1. subpic_id_mapping_in_sps_flag equal to 0 specifies that subpicture ID mapping is signalled in the PPSs referred to by coded pictures of the CLVS when subpic_id_mapping_explicitly_signalled_flag is equal to 1.

sps_subpic_id[i] specifies the subpicture ID of the i-th subpicture. The length of the sps_subpic_id[i] syntax element is sps_subpic_id_len_minus1+1 bits.

bit_depth_minus8 specifies the bit depth of the samples of the luma and chroma arrays, BitDepth, and the value of the luma and chroma quantization parameter range offset, QpBdOffset, as follows:

$$BitDepth = 8 + bit\_depth\_minus8 \quad (45)$$

$$QpBdOffset = 6 * bit\_depth\_minus8 \quad (46)$$

bit_depth_minus8 shall be in the range of 0 to 8, inclusive.

sps_entropy_coding_sync_enabled_flag equal to 1 specifies that a specific synchronization process for context variables is invoked before decoding the CTU that includes the first CTB of a row of CTBs in each tile in each picture referring to the SPS, and a specific storage process for context variables is invoked after decoding the CTU that includes the first CTB of a row of CTBs in each tile in each picture referring to the SPS. sps_entropy_coding_sync_enabled_flag equal to 0 specifies that no specific synchronization process for context variables is required to be invoked before decoding the CTU that includes the first CTB of a row of CTBs in each tile in each picture referring to the SPS, and no specific storage process for context variables is required to be invoked after decoding the CTU that includes the first CTB of a row of CTBs in each tile in each picture referring to the SPS.

sps_wpp_entry_point_offsets_present_flag equal to 1 specifies that signalling for entry point offsets for CTU rows may be present in the slice headers of pictures referring to the SPS when sps_entropy_coding_sync_enabled_flag is equal to 1. sps_wpp_entry_point_offsets_present_flag equal to 0 specifies that signalling for entry point offsets for CTU rows are not present in the slice headers of pictures referring to the SPS. When not present, the value of sps_wpp_entry_point_offsets_present_flag is inferred to be equal to 0.

sps_weighted_pred_flag equal to 1 specifies that weighted prediction may be applied to P slices referring to the SPS. sps_weighted_pred_flag equal to 0 specifies that weighted prediction is not applied to P slices referring to the SPS.

sps_weighted_bipred_flag equal to 1 specifies that explicit weighted prediction may be applied to B slices referring to the SPS. sps_weighted_bipred_flag equal to 0 specifies that explicit weighted prediction is not applied to B slices referring to the SPS.

log 2_max_pic_order_cnt_lsb_minus4 specifies the value of the variable MaxPicOrderCntLsb that is used in the decoding process for picture order count as follows:

$$MaxPicOrderCntLsb = 2^{(log\ 2\_max\_pic\_order\_cnt\_lsb\_minus4+4)} \quad (47)$$

The value of log 2_max_pic_order_cnt_lsb_minus4 shall be in the range of 0 to 12, inclusive.

sps_poc_msb_flag equal to 1 specifies that the ph_poc_msb_present_flag syntax element is present in PHs referring to the SPS. sps_poc_msb_flag equal to 0 specifies that the ph_poc_msb_present_flag syntax element is not present in PHs referring to the SPS.

poc_msb_len_minus1 plus 1 specifies the length, in bits, of the poc_msb_val syntax elements, when present in the PHs referring to the SPS. The value of poc_msb_len_minus1 shall be in the range of 0 to 32−log 2_max_pic_order_cnt_lsb_minus4−5, inclusive.

num_extra_ph_bits_bytes specifies the number of bytes of extra bits in the PH syntax structure for coded pictures referring to the SPS. The value of num_extra_ph_bits_bytes shall be equal to 0 in bitstreams conforming to this version of this Specification. Although the value of num_extra_ph_bits_bytes is required to be equal to 0 in this version of this Specification, decoder conforming to this version of this Specification shall allow the value of num_extra_ph_bits_bytes equal to 1 or 2 to appear in the syntax.

num_extra_sh_bits_bytes specifies the number of bytes of extra bits in the slice headers for coded pictures referring to the SPS. The value of num_extra_sh_bits_bytes shall be equal to 0 in bitstreams conforming to this version of this Specification. Although the value of num_extra_sh_bits_bytes is required to be equal to 0 in this version of this Specification, decoder conforming to this version of this Specification shall allow the value of num_extra_sh_bits_bytes equal to 1 or 2 to appear in the syntax.

sps_sublayer_dpb_params_flag is used to control the presence of max_dec_pic_buffering_minus1[i], max_num_reorder_pics[i], and max_latency_increase_plus1[i] syntax elements in the dpb_parameters( ) syntax structure in the SPS. When not present, the value of sps_sub_dpb_params_info_present_flag is inferred to be equal to 0.

long_term_ref_pics_flag equal to 0 specifies that no LTRP is used for inter prediction of any coded picture in the CLVS. long_term_ref_pics_flag equal to 1 specifies that LTRPs may be used for inter prediction of one or more coded pictures in the CLVS.

inter_layer_ref_pics_present_flag equal to 0 specifies that no ILRP is used for inter prediction of any coded picture in the CLVS. inter_layer_ref_pic_flag equal to 1 specifies that ILRPs may be used for inter prediction of one or more coded pictures in the CLVS. When sps_video_parameter_set_id is equal to 0, the value of inter_layer_ref_pics_present_flag is inferred to be equal to 0. When vps_independent_layer_flag[GeneralLayerIdx[nuh_layer_id]] is equal to 1, the value of inter_layer_ref_pics_present_flag shall be equal to 0.

sps_idr_rpl_present_flag equal to 1 specifies that reference picture list syntax elements are present in slice headers of IDR pictures. sps_idr_rpl_present_flag equal to 0 specifies that reference picture list syntax elements are not present in slice headers of IDR pictures.

rpl1_same_as_rpl0_flag equal to 1 specifies that the syntax element num_ref_pic_lists_in_sps[1] and the syntax structure ref_pic_list_struct(1, rplsIdx) are not present and the following applies:

The value of num_ref_pic_lists_in_sps[1] is inferred to be equal to the value of num_ref_pic_lists_in_sps[0].

The value of each of syntax elements in ref_pic_list_struct(1, rplsIdx) is inferred to be equal to the value of corresponding syntax element in ref_pic_list_struct(0, rplsIdx) for rplsIdx ranging from 0 to num_ref_pic_lists_in_sps[0]−1.

num_ref_pic_lists_in_sps[i] specifies the number of the ref_pic_list_struct(listIdx, rplsIdx) syntax structures with listIdx equal to i included in the SPS. The value of num_ref_pic_lists_in_sps[i] shall be in the range of 0 to 64, inclusive.

NOTE 4—For each value of listIdx (equal to 0 or 1), a decoder should allocate memory for a total number of num_ref_pic_lists_in_sps[i]+1 ref_pic_list_struct(listIdx, rplsIdx) syntax structures since there may be one ref_pic_list_struct(listIdx, rplsIdx) syntax structure directly signalled in the slice headers of a current picture.

qtbtt_dual_tree_intra_flag equal to 1 specifies that, for I slices, each CTU is split into coding units with 64×64 luma samples using an implicit quadtree split, and these coding units are the root of two separate coding_tree syntax structure for luma and chroma.

qtbtt_dual_tree_intra_flag equal to 0 specifies separate coding_tree syntax structure is not used for I slices. When qtbtt_dual_tree_intra_flag is not present, it is inferred to be equal to 0.

log 2_min_luma_coding_block_size_minus2 plus 2 specifies the minimum luma coding block size. The value range of log 2_min_luma_coding_block_size_minus2 shall be in the range of 0 to Min(4, sps_log 2_ctu_size_minus5+3), inclusive.

The variables MinCb Log 2SizeY, MinCbSizeY, IbcBufWidthY, IbcBufWidthC and Vsize are derived as follows:

$$\text{MinCb Log 2SizeY} = \text{log 2\_min\_luma\_coding\_block\_size\_minus2} + 2 \qquad (48)$$

$$\text{MinCbSizeY} = 1 << \text{MinCb Log 2SizeY} \qquad (49)$$

$$\text{IbcBufWidthY} = 256*128/\text{CtbSizeY} \qquad (50)$$

$$\text{IbcBufWidthC} = \text{IbcBufWidthY}/\text{SubWidthC} \qquad (51)$$

$$\text{VSize} = \text{Min}(64,\text{CtbSizeY}) \qquad (52)$$

The value of MinCbSizeY shall less than or equal to VSize. The variables CtbWidthC and CtbHeightC, which specify the width and height, respectively, of the array for each chroma CTB, are derived as follows:
  If chroma_format_idc is equal to 0 (monochrome) or separate_colour_plane_flag is equal to 1, CtbWidthC and CtbHeightC are both equal to 0.
  Otherwise, CtbWidthC and CtbHeightC are derived as follows:

$$\text{CtbWidthC} = \text{CtbSizeY}/\text{SubWidthC} \qquad (53)$$

$$\text{CtbHeightC} = \text{CtbSizeY}/\text{SubHeightC} \qquad (54)$$

For log 2BlockWidth ranging from 0 to 4 and for log 2BlockHeight ranging from 0 to 4, inclusive, the up-right diagonal scan order array initialization process as specified in clause 6.5.2 is invoked with 1<<log 2BlockWidth and 1<<log 2BlockHeight as inputs, and the output is assigned to DiagScanOrder[log 2BlockWidth][log 2BlockHeight].

For log 2BlockWidth ranging from 0 to 6 and for log 2BlockHeight ranging from 0 to 6, inclusive, the horizontal and vertical traverse scan order array initialization process as specified in clause 6.5.3 is invoked with 1<<log 2BlockWidth and 1<<log 2BlockHeight as inputs, and the output is assigned to HorTravScanOrder[log 2BlockWidth][log 2BlockHeight] and VerTravScanOrder[log 2BlockWidth][log 2BlockHeight].

partition_constraints_override_enabled_flag equal to 1 specifies the presence of partition_constraints_override_flag in PHs referring to the SPS. partition_constraints_override_enabled_flag equal to 0 specifies the absence of partition_constraints_override_flag in PHs referring to the SPS.

sps_log 2_diff_min_qt_min_cb_intra_slice_luma specifies the default difference between the base 2 logarithm of the minimum size in luma samples of a luma leaf block resulting from quadtree splitting of a CTU and the base 2 logarithm of the minimum coding block size in luma samples for luma CUs in slices with slice type equal to 2 (I) referring to the SPS. When partition_constraints_override_enabled_flag is equal to 1, the default difference can be overridden by ph_log 2_diff_min_qt_min_cb_luma present in PHs referring to the SPS. The value of sps_log 2_diff_min_qt_min_cb_intra_slice_luma shall be in the range of 0 to Ctb Log 2SizeY−MinCb Log 2SizeY, inclusive. The base 2 logarithm of the minimum size in luma samples of a luma leaf block resulting from quadtree splitting of a CTU is derived as follows:

$$\text{MinQt Log 2SizeIntraY} = \text{sps\_log 2\_diff\_min\_qt\_min\_cb\_intra\_slice\_luma} + \text{MinCb Log 2SizeY} \qquad (55)$$

sps_max_mtt_hierarchy_depth_intra_slice_luma specifies the default maximum hierarchy depth for coding units resulting from multi-type tree splitting of a quadtree leaf in slices with slice type equal to 2 (I) referring to the SPS. When partition_constraints_override_enabled_flag is equal to 1, the default maximum hierarchy depth can be overridden by ph_max_mtt_hierarchy_depth_intra_slice_luma present in PHs referring to the SPS. The value of sps_max_mtt_hierarchy_depth_intra_slice_luma shall be in the range of 0 to 2*(Ctb Log 2SizeY−MinCb Log 2SizeY), inclusive.

sps_log 2_diff_max_bt_min_qt_intra_slice_luma specifies the default difference between the base 2 logarithm of the maximum size (width or height) in luma samples of a luma coding block that can be split using a binary split and the minimum size (width or height) in luma samples of a luma leaf block resulting from quadtree splitting of a CTU in slices with slice type equal to 2 (I) referring to the SPS. When partition_constraints_override_enabled_flag is equal to 1, the default difference can be overridden by ph_log 2_diff_max_bt_min_qt_luma present in PHs referring to the SPS. The value of sps_log 2_diff_max_bt_min_qt_intra_slice_luma shall be in the range of 0 to Ctb Log 2SizeY−MinQt Log 2SizeIntraY, inclusive. When sps_log 2_diff_max_bt_min_qt_intra_slice_luma is not present, the value of sps_log 2_diff_max_bt_min_qt_intra_slice_luma is inferred to be equal to 0.

sps_log 2_diff_max_tt_min_qt_intra_slice_luma specifies the default difference between the base 2 logarithm of the maximum size (width or height) in luma samples of a luma coding block that can be split using a ternary split and the minimum size (width or height) in luma samples of a luma leaf block resulting from quadtree splitting of a CTU in slices with slice type equal to 2 (I) referring to the SPS. When partition_constraints_override_enabled_flag is equal to 1, the default difference can be overridden by ph_log 2_diff_max_tt_min_qt_luma present in PHs referring to the SPS. The value of sps_log 2_diff_max_tt_min_qt_intra_slice_luma shall be in the range of 0 to Ctb Log 2SizeY−MinQt Log 2SizeIntraY, inclusive. When sps_log 2_diff_max_tt_min_qt_intra_slice_luma is not present, the value of sps_log 2_diff_max_tt_min_qt_intra_slice_luma is inferred to be equal to 0.

sps_log 2_diff_min_qt_min_cb_inter_slice specifies the default difference between the base 2 logarithm of the minimum size in luma samples of a luma leaf block resulting from quadtree splitting of a CTU and the base 2 logarithm of the minimum luma coding block size in luma samples for luma CUs in slices with slice type equal to 0 (B) or 1 (P) referring to the SPS. When partition_constraints_override_enabled_flag is equal to 1, the default difference can be overridden by ph_log 2_diff_min_qt_min_cb_luma present in PHs referring to the SPS. The value of sps_log 2_diff_min_qt_min_cb_inter_slice shall be in the range of 0 to Ctb Log 2SizeY−MinCb Log 2SizeY, inclusive. The base 2 logarithm of the minimum size in luma samples of a luma leaf block resulting from quadtree splitting of a CTU is derived as follows:

$$\text{MinQt Log 2SizeInter}Y = \text{sps\_log 2\_diff\_min\_qt\_min\_cb\_inter\_slice} + \text{MinCb Log 2Size}Y \quad (56)$$

sps_max_mtt_hierarchy_depth_inter_slice specifies the default maximum hierarchy depth for coding units resulting from multi-type tree splitting of a quadtree leaf in slices with slice type equal to 0 (B) or 1 (P) referring to the SPS. When partition_constraints_override_enabled_flag is equal to 1, the default maximum hierarchy depth can be overridden by ph_max_mtt_hierarchy_depth_inter_slice present in PHs referring to the SPS. The value of sps_max_mtt_hierarchy_depth_inter_slice shall be in the range of 0 to 2*(Ctb Log 2SizeY−MinCb Log 2SizeY), inclusive.

sps_log 2_diff_max_bt_min_qt_inter_slice specifies the default difference between the base 2 logarithm of the maximum size (width or height) in luma samples of a luma coding block that can be split using a binary split and the minimum size (width or height) in luma samples of a luma leaf block resulting from quadtree splitting of a CTU in slices with slice type equal to 0 (B) or 1 (P) referring to the SPS. When partition_constraints_override_enabled_flag is equal to 1, the default difference can be overridden by ph_log 2_diff_max_bt_min_qt_luma present in PHs referring to the SPS. The value of sps_log 2_diff_max_bt_min_qt_inter_slice shall be in the range of 0 to Ctb Log 2SizeY−MinQt Log 2SizeInterY, inclusive. When sps_log 2_diff_max_bt_min_qt_inter_slice is not present, the value of sps_log 2_diff_max_bt_min_qt_inter_slice is inferred to be equal to 0.

sps_log 2_diff_max_tt_min_qt_inter_slice specifies the default difference between the base 2 logarithm of the maximum size (width or height) in luma samples of a luma coding block that can be split using a ternary split and the minimum size (width or height) in luma samples of a luma leaf block resulting from quadtree splitting of a CTU in slices with slice type equal to 0 (B) or 1 (P) referring to the SPS. When partition_constraints_override_enabled_flag is equal to 1, the default difference can be overridden by ph_log 2_diff_max_tt_min_qt_luma present in PHs referring to the SPS. The value of sps_log 2_diff_max_tt_min_qt_inter_slice shall be in the range of 0 to Ctb Log 2SizeY−MinQt Log 2SizeInterY, inclusive. When sps_log 2_diff_max_tt_min_qt_inter_slice is not present, the value of sps_log 2_diff_max_tt_min_qt_inter_slice is inferred to be equal to 0. sps_log 2_diff_min_qt_min_cb_intra_slice_chroma specifies the default difference between the base 2 logarithm of the minimum size in luma samples of a chroma leaf block resulting from quadtree splitting of a chroma CTU with treeType equal to DUAL TREE CHROMA and the base 2 logarithm of the minimum coding block size in luma samples for chroma CUs with treeType equal to DUAL TREE CHROMA in slices with slice type equal to 2 (I) referring to the SPS. When partition_constraints_override_enabled_flag is equal to 1, the default difference can be overridden by ph_log 2_diff_min_qt_min_cb_chroma present in PHs referring to the SPS. The value of sps_log 2_diff_min_qt_min_cb_intra_slice_chroma shall be in the range of 0 to Ctb Log 2SizeY−MinCb Log 2SizeY, inclusive. When not present, the value of sps_log 2_diff_min_qt_min_cb_intra_slice_chroma is inferred to be equal to 0. The base 2 logarithm of the minimum size in luma samples of a chroma leaf block resulting from quadtree splitting of a CTU with treeType equal to DUAL TREE CHROMA is derived as follows:

$$\text{MinQt Log 2SizeIntra}C = \text{sps\_log 2\_diff\_min\_qt\_min\_cb\_intra\_slice\_chroma} + \text{MinCb Log 2Size}Y \quad (57)$$

sps_max_mtt_hierarchy_depth_intra_slice_chroma specifies the default maximum hierarchy depth for chroma coding units resulting from multi-type tree splitting of a chroma quadtree leaf with treeType equal to DUAL TREE CHROMA in slices with slice type equal to 2 (I) referring to the SPS. When partition_constraints_override_enabled_flag is equal to 1, the default maximum hierarchy depth can be overridden by ph_max_mtt_hierarchy_depth_chroma present in PHs referring to the SPS. The value of sps_max_mtt_hierarchy_depth_intra_slice_chroma shall be in the range of 0 to 2*(Ctb Log 2SizeY−MinCb Log 2SizeY), inclusive. When not present, the value of sps_max_mtt_hierarchy_depth_intra_slice_chroma is inferred to be equal to 0.

sps_log 2_diff_max_bt_min_qt_intra_slice_chroma specifies the default difference between the base 2 logarithm of the maximum size (width or height) in luma samples of a chroma coding block that can be split using a binary split and the minimum size (width or height) in luma samples of a chroma leaf block resulting from quadtree splitting of a chroma CTU with treeType equal to DUAL TREE CHROMA in slices with slice type equal to 2 (I) referring to the SPS. When partition_constraints_override_enabled_flag is equal to 1, the default difference can be overridden by ph_log 2_diff_max_bt_min_qt_chroma present in PHs referring to the SPS. The value of sps_log 2_diff_max_bt_min_qt_intra_slice_chroma shall be in the range of 0 to Ctb Log 2SizeY−MinQt Log 2SizeIntraC, inclusive. When sps_log 2_diff_max_bt_min_qt_intra_slice_chroma is not present, the value of sps_log 2_diff_max_bt_min_qt_intra_slice_chroma is inferred to be equal to 0. sps_log 2_diff_max_tt_min_qt_intra_slice_chroma specifies the default difference between the base 2 logarithm of the maximum size (width or height) in luma samples of a chroma coding block that can be split using a ternary split and the minimum size (width or height) in luma samples of a chroma leaf block resulting from quadtree splitting of a chroma CTU with treeType equal to DUAL TREE CHROMA in slices with slice type equal to 2 (I) referring to the SPS. When partition_constraints_override_enabled_flag is equal to 1, the default difference can be overridden by ph_log 2_diff_max_tt_min_qt_chroma present in PHs referring to the SPS. The value of sps_log 2_diff_max_tt_min_qt_intra_slice_chroma shall be in the range of 0 to Ctb Log 2SizeY−MinQt Log 2SizeIntraC, inclusive. When sps_log 2_diff_max_tt_min_qt_intra_slice_chroma is not present, the value of sps_log 2_diff_max_tt_min_qt_intra_slice_chroma is inferred to be equal to 0.
sps_max_luma_transform_size_64_flag equal to 1 specifies that the maximum transform size in luma samples is equal to 64. sps_max_luma_transform_size_64_flag equal to 0 specifies that the maximum transform size in luma samples is equal to 32.
When CtbSizeY is less than 64, the value of sps_max_luma_transform_size_64_flag shall be equal to 0. The variables MinTb Log 2SizeY, MaxTb Log 2SizeY, MinTbSizeY, and MaxTbSizeY are derived as follows:

$$\text{MinTb Log 2SizeY} = 2 \tag{58}$$

$$\text{MaxTb Log 2SizeY} = \text{sps\_max\_luma\_transform\_size\_64\_flag} ? 6 : 5 \tag{59}$$

$$\text{MinTbSizeY} = 1 << \text{MinTb Log 2SizeY} \tag{60}$$

$$\text{MaxTbSizeY} = 1 << \text{MaxTb Log 2SizeY} \tag{61}$$

sps_joint_cbcr_enabled_flag equal to 0 specifies that the joint coding of chroma residuals is disabled. sps_joint_cbcr_enabled_flag equal to 1 specifies that the joint coding of chroma residuals is enabled. When not present, the value of sps_joint_cbcr_enabled_flag is inferred to be equal to 0.
same_qp_table_for_chroma equal to 1 specifies that only one chroma QP mapping table is signalled and this table applies to Cb and Cr residuals and additionally to joint Cb—Cr residuals when sps_joint_cbcr_enabled_flag is equal to 1. same_qp_table_for_chroma equal to 0 specifies that chroma QP mapping tables, two for Cb and Cr, and one additional for joint Cb—Cr when sps_joint_cbcr_enabled_flag is equal to 1, are signalled in the SPS. When same_qp_table_for_chroma is not present in the bitstream, the value of same_qp_table_for_chroma is inferred to be equal to 1.
qp_table_start_minus26[i] plus 26 specifies the starting luma and chroma QP used to describe the i-th chroma QP mapping table. The value of qp_table_start_minus26[i] shall be in the range of −26−QpBdOffset to 36 inclusive. When qp_table_start_minus26[i] is not present in the bitstream, the value of qp_table_start_minus26[i] is inferred to be equal to 0.
num_points_in_qp_table_minus1[i] plus 1 specifies the number of points used to describe the i-th chroma QP mapping table. The value of num_points_in_qp_table_minus1[i] shall be in the range of 0 to 63+QpBdOffset, inclusive. When num_points_in_qp_table_minus1[0] is not present in the bitstream, the value of num_points_in_qp_table_minus1[0] is inferred to be equal to 0.
delta_qp_in_val_minus1[i][j] specifies a delta value used to derive the input coordinate of the j-th pivot point of the i-th chroma QP mapping table. When delta_qp_in_val_minus1[0][j] is not present in the bitstream, the value of delta_qp_in_val_minus1[0][j] is inferred to be equal to 0.
delta_qp_diff_val[i][j] specifies a delta value used to derive the output coordinate of the j-th pivot point of the i-th chroma QP mapping table.
The i-th chroma QP mapping table ChromaQpTable[i] for i=0 . . . numQpTables−1 is derived as follows:

```
qpInVal[ i ][ 0 ] = qp_table_start_minus26[ i ] + 26
qpOutVal[ i ][ 0 ] = qpInVal[ i ][ 0 ]
for( j = 0; j <= num_points_in_qp_table_minus1[ i ]; j++ ) {
  qpInVal[ i ][ j + 1 ] = qpInVal[ i ][ j ] +
    delta_qp_in_val_minus1[ i ][ j ] + 1
```

-continued

```
  qpOutVal[ i ][ j + 1 ] = qpOutVal[ i ][ j ] +
  ( delta_qp_in_val_minus1[ i ][ j ] ^ delta_qp_diff_val[ i ][ j ] )
}
ChromaQpTable[ i ][ qpInVal[ i ][ 0 ] ] = qpOutVal[ i ][ 0 ]
for( k = qpInVal[ i ][ 0 ] − 1; k >= −QpBdOffset; k − − )
  ChromaQpTable[ i ][ k ] = Clip3( −QpBdOffset, 63,
  ChromaQpTable[ i ][ k + 1 ] − 1 )                              (62)
for( j = 0; j <= num_points_in_qp_table_minus1[ i ]; j++ ) {
  sh = ( delta_qp_in_val_minus1[ i ][j] + 1 ) >> 1
  for( k = qpInVal[ i ][ j ] + 1, m = 1; k <= qpInval[ i ][ j + 1 ]; k++,
m++ )
    ChromaQpTable[ i ][ k ] = ChromaQpTable[ i ][ qpInVal[ i ][ j ] ] +
    ( ( qpOutVal[ i ] [j + 1] − qpOutVal[ i ] [j ] ) * m + sh ) /
  ( delta_qp_in_val_minus1[ i ][j] + 1 )
}
for( k = qpInVal[ i ][ num_points_in_qp_table_minus1[ i ] + 1 ] + 1;
k <= 63; k++ )
  ChromaQpTable[ i ][ k ] = Clip3( −QpBdOffset, 63,
  ChromaQpTable[ i ][ k − 1 ] + 1 )
```

When same_qp_table_for_chroma is equal to 1, ChromaQpTable[1][k] and ChromaQpTable[2][k] are set equal to ChromaQpTable[0][k] for k in the range of −QpBdOffset to 63, inclusive.
It is a requirement of bitstream conformance that the values of qpInVal[i][j] and qpOutVal[i][j] shall be in the range of −QpBdOffset to 63, inclusive for i in the range of 0 to numQpTables−1, inclusive, and j in the range of 0 to num_points_in_qp_table_minus1[i]+1, inclusive.
sps_sao_enabled_flag equal to 1 specifies that the sample adaptive offset process is applied to the reconstructed picture after the deblocking filter process. sps_sao_enabled_flag equal to 0 specifies that the sample adaptive offset process is not applied to the reconstructed picture after the deblocking filter process.
sps_alf_enabled_flag equal to 0 specifies that the adaptive loop filter is disabled. sps_alf_enabled_flag equal to 1 specifies that the adaptive loop filter is enabled.
sps_ccalf_enabled_flag equal to 0 specifies that the cross-component adaptive loop filter is disabled. sps_ccalf_enabled_flag equal to 1 specifies that the cross-component adaptive loop filter may be enabled.
sps_transform_skip_enabled_flag equal to 1 specifies that transform_skip_flag may be present in the transform unit syntax. sps_transform_skip_enabled_flag equal to 0 specifies that transform_skip_flag is not present in the transform unit syntax.
log 2_transform_skip_max_size_minus2 specifies the maximum block size used for transform skip, and shall be in the range of 0 to 3, inclusive.
The variable MaxTsSize is set equal to 1<<(log 2_transform_skip_max_size_minus2+2).
sps_bdpcm_enabled_flag equal to 1 specifies that intra_bdpcm_luma_flag and intra_bdpcm_chroma_flag may be present in the coding unit syntax for intra coding units. sps_bdpcm_enabled_flag equal to 0 specifies that intra_bdpcm_luma_flag and intra_bdpcm_chroma_flag are not present in the coding unit syntax for intra coding units. When not present, the value of sps_bdpcm_enabled_flag is inferred to be equal to 0.
sps_ref_wraparound_enabled_flag equal to 1 specifies that horizontal wrap-around motion compensation is applied in inter prediction. sps_ref_wraparound_enabled_flag equal to 0 specifies that horizontal wrap-around motion compensation is not applied. When the value of (CtbSizeY/MinCbSizeY+1) is greater than (pic width in luma samples/MinCbSizeY−1), where pic width in luma samples is the value of pic width in luma samples in any PPS that refers to the SPS, the value of sps_ref_wraparound_enabled_flag shall be equal to 0.

sps_temporal_mvp_enabled_flag equal to 1 specifies that temporal motion vector predictors may be used in the CLVS. sps_temporal_mvp_enabled_flag equal to 0 specifies that temporal motion vector predictors are not used in the CLVS.

sps_sbtmvp_enabled_flag equal to 1 specifies that subblock-based temporal motion vector predictors may be used in decoding of pictures with all slices having slice_type not equal to I in the CLVS. sps_sbtmvp_enabled_flag equal to 0 specifies that subblock-based temporal motion vector predictors are not used in the CLVS. When sps_sbtmvp_enabled_flag is not present, it is inferred to be equal to 0.

sps_amvr_enabled_flag equal to 1 specifies that adaptive motion vector difference resolution is used in motion vector coding. amvr_enabled_flag equal to 0 specifies that adaptive motion vector difference resolution is not used in motion vector coding.

sps_bdof_enabled_flag equal to 0 specifies that the bi-directional optical flow inter prediction is disabled. sps_bdof_enabled_flag equal to 1 specifies that the bi-directional optical flow inter prediction is enabled.

sps_bdof_pic_present_flag equal to 1 specifies that ph_disable_bdof_flag is present in PHs referring to the SPS. sps_bdof_pic_present_flag equal to 0 specifies that ph_disable_bdof_flag is not present in PHs referring to the SPS. When sps_bdof_pic_present_flag is not present, the value of sps_bdof_pic_present_flag is inferred to be equal to 0.

sps_smvd_enabled_flag equal to 1 specifies that symmetric motion vector difference may be used in motion vector decoding. sps_smvd_enabled_flag equal to 0 specifies that symmetric motion vector difference is not used in motion vector coding.

sps_dmvr_enabled_flag equal to 1 specifies that decoder motion vector refinement based inter bi-prediction is enabled. sps_dmvr_enabled_flag equal to 0 specifies that decoder motion vector refinement based inter bi-prediction is disabled.

sps_dmvr_pic_present_flag equal to 1 specifies that ph_disable_dmvr_flag is present in PHs referring to the SPS. sps_dmvr_pic_present_flag equal to 0 specifies that ph_disable_dmvr_flag is not present in PHs referring to the SPS. When sps_dmvr_pic_present_flag is not present, the value of sps_dmvr_pic_present_flag is inferred to be equal to 0.

sps_mmvd_enabled_flag equal to 1 specifies that merge mode with motion vector difference is enabled. sps_mmvd_enabled_flag equal to 0 specifies that merge mode with motion vector difference is disabled.

sps_isp_enabled_flag equal to 1 specifies that intra prediction with subpartitions is enabled. sps_isp_enabled_flag equal to 0 specifies that intra prediction with subpartitions is disabled.

sps_mrl_enabled_flag equal to 1 specifies that intra prediction with multiple reference lines is enabled. sps_mrl_enabled_flag equal to 0 specifies that intra prediction with multiple reference lines is disabled.

sps_mip_enabled_flag equal to 1 specifies that matrix-based intra prediction is enabled. sps_mip_enabled_flag equal to 0 specifies that matrix-based intra prediction is disabled.

sps_cclm_enabled_flag equal to 0 specifies that the cross-component linear model intra prediction from luma component to chroma component is disabled. sps_cclm_enabled_flag equal to 1 specifies that the cross-component linear model intra prediction from luma component to chroma component is enabled. When sps_cclm_enabled_flag is not present, it is inferred to be equal to 0.

sps_chroma_horizontal_collocated_flag equal to 1 specifies that prediction processes operate in a manner designed for chroma sample positions that are not horizontally shifted relative to corresponding luma sample positions. sps_chroma_horizontal_collocated_flag equal to 0 specifies that prediction processes operate in a manner designed for chroma sample positions that are shifted to the right by 0.5 in units of luma samples relative to corresponding luma sample positions. When sps_chroma_horizontal_collocated_flag is not present, it is inferred to be equal to 1.

sps_chroma_vertical_collocated_flag equal to 1 specifies that prediction processes operate in a manner designed for chroma sample positions that are not vertically shifted relative to corresponding luma sample positions. sps chroma vertical collocated flag equal to 0 specifies that prediction processes operate in a manner designed for chroma sample positions that are shifted downward by 0.5 in units of luma samples relative to corresponding luma sample positions. When sps_chroma_vertical_collocated_flag is not present, it is inferred to be equal to 1.

sps_mts_enabled_flag equal to 1 specifies that sps_explicit_mts_intra_enabled_flag is present in the sequence parameter set RBSP syntax and sps_explicit_mts_inter_enabled_flag is present in the sequence parameter set RBSP syntax. sps_mts_enabled_flag equal to 0 specifies that sps_explicit_mts_intra_enabled_flag is not present in the sequence parameter set RBSP syntax and sps_explicit_mts_inter_enabled_flag is not present in the sequence parameter set RBSP syntax.

sps_explicit_mts_intra_enabled_flag equal to 1 specifies that mts_idx may be present in intra coding unit syntax. sps_explicit_mts_intra_enabled_flag equal to 0 specifies that mts_idx is not present in intra coding unit syntax. When not present, the value of sps_explicit_mts_intra_enabled_flag is inferred to be equal to 0.

sps_explicit_mts_inter_enabled_flag equal to 1 specifies that mts_idx may be present in inter coding unit syntax. sps_explicit_mts_inter_enabled_flag equal to 0 specifies that mts_idx is not present in inter coding unit syntax. When not present, the value of sps_explicit_mts_inter_enabled_flag is inferred to be equal to 0.

six_minus_max_num_merge_cand specifies the maximum number of merging motion vector prediction (MVP) candidates supported in the SPS subtracted from 6. The value of six_minus_max_num_merge_cand shall be in the range of 0 to 5, inclusive.

The maximum number of merging MVP candidates, MaxNumMergeCand, is derived as follows:

$$\text{MaxNumMergeCand} = 6 - \text{six\_minus\_max\_num\_merge\_cand} \qquad (63)$$

sps_sbt_enabled_flag equal to 0 specifies that subblock transform for inter-predicted CUs is disabled. sps_sbt_enabled_flag equal to 1 specifies that subblock transform for inter-predicted CU is enabled.

sps_affine_enabled_flag specifies whether affine model based motion compensation can be used for inter prediction. If sps_affine_enabled_flag is equal to 0, the syntax shall be constrained such that no affine model based motion compensation is used in the CLVS, and inter affine flag and cu affine type flag are not present in coding unit syntax of the CLVS. Otherwise (sps_affine_enabled_flag is equal to 1), affine model based motion compensation can be used in the CLVS.

five_minus_max_num_subblock_merge_cand specifies the maximum number of subblock-based merging motion vector prediction candidates supported in the SPS subtracted from 5.

sps_affine_type_flag specifies whether 6-parameter affine model based motion compensation can be used for inter prediction. If sps_affine_type_flag is equal to 0, the syntax shall be constrained such that no 6-parameter affine model based motion compensation is used in the CLVS, and cu_affine_type_flag is not present in coding unit syntax in the CLVS. Otherwise (sps_affine_type_flag is equal to 1), 6-parameter affine model based motion compensation can be used in the CLVS. When not present, the value of sps_affine_type_flag is inferred to be equal to 0.

sps_affine_amvr_enabled_flag equal to 1 specifies that adaptive motion vector difference resolution is used in motion vector coding of affine inter mode. sps_affine_amvr_enabled_flag equal to 0 specifies that adaptive motion vector difference resolution is not used in motion vector coding of affine inter mode. When not present, the value of sps_affine_amvr_enabled_flag is inferred to be equal to 0.

sps_affine_prof_enabled_flag specifies whether the prediction refinement with optical flow can be used for affine motion compensation. If sps_affine_prof_enabled_flag is equal to 0, the affine motion compensation shall not be refined with optical flow. Otherwise (sps_affine_prof_enabled_flag is equal to 1), the affine motion compensation can be refined with optical flow. When not present, the value of sps_affine_prof_enabled_flag is inferred to be equal to 0.

sps_prof_pic_present_flag equal to 1 specifies that ph_disable_prof_flag is present in PHs referring to the SPS. sps_prof_pic_present_flag equal to 0 specifies that ph_disable_prof_flag is not present in PHs referring to the SPS. When sps_prof_pic_present_flag is not present, the value of sps_prof_pic_present_flag is inferred to be equal to 0.

sps_palette_enabled_flag equal to 1 specifies that pred_mode_plt_flag may be present in the coding unit syntax. sps_palette_enabled_flag equal to 0 specifies that pred_mode_plt_flag is not present in the coding unit syntax. When sps_palette_enabled_flag is not present, it is inferred to be equal to 0.

sps_act_enabled_flag equal to 1 specifies that adaptive colour transform may be used and the cu_act_enabled_flag may be present in the coding unit syntax. sps_act_enabled_flag equal to 0 specifies that adaptive colour transform is not used and cu_act_enabled_flag is not present in the coding unit syntax. When sps_act_enabled_flag is not present, it is inferred to be equal to 0.

min_qp_prime_ts_minus4 specifies the minimum allowed quantization parameter for transform skip mode as follows:

$$QpPrimeTsMin = 4 + min\_qp\_prime\_ts\_minus4 \qquad (64)$$

The value of min_qp_prime_ts_minus4 shall be in the range of 0 to 48, inclusive.

sps_bcw_enabled_flag specifies whether bi-prediction with CU weights can be used for inter prediction. If sps_bcw_enabled_flag is equal to 0, the syntax shall be constrained such that no bi-prediction with CU weights is used in the CLVS, and bcw_idx is not present in coding unit syntax of the CLVS. Otherwise (sps_bcw_enabled_flag is equal to 1), bi-prediction with CU weights can be used in the CLVS.

sps_ibc_enabled_flag equal to 1 specifies that the IBC prediction mode may be used in decoding of pictures in the CLVS. sps_ibc_enabled_flag equal to 0 specifies that the IBC prediction mode is not used in the CLVS. When sps_ibc_enabled_flag is not present, it is inferred to be equal to 0.

six_minus_max_num_ibc_merge_cand specifies the maximum number of IBC merging block vector prediction (BVP) candidates supported in the SPS subtracted from 6. The value of six_minus_max_num_ibc_merge_cand shall be in the range of 0 to 5, inclusive.

The maximum number of IBC merging BVP candidates, MaxNumIbcMergeCand, is derived as follows:

```
if( sps_ibc_enabled_flag )
    MaxNumIbcMergeCand = 6 −
    six_minus_max_num_ibc_merge_cand                    (65)
else
    MaxNumIbcMergeCand = 0
``` sps_ciip_enabled_flag specifies that ciip_flag may be present in the coding unit syntax for inter coding units. sps_ciip_enabled_flag equal to 0 specifies that ciip_flag is not present in the coding unit syntax for inter coding units.

sps_fpel_mmvd_enabled_flag equal to 1 specifies that merge mode with motion vector difference is using integer sample precision. sps_fpel_mmvd_enabled_flag equal to 0 specifies that merge mode with motion vector difference can use fractional sample precision.

sps_gpm_enabled_flag specifies whether geometric partition based motion compensation can be used for inter prediction. sps_gpm_enabled_flag equal to 0 specifies that the syntax shall be constrained such that no geometric partition based motion compensation is used in the CLVS, and merge_gpm_partition_idx, merge_gpm_idx0, and merge_gpm_idx1 are not present in coding unit syntax of the CLVS. sps_gpm_enabled_flag equal to 1 specifies that geometric partition based motion compensation can be used in the CLVS. When not present, the value of sps_gpm_enabled_flag is inferred to be equal to 0.

max_num_merge_cand_minus_max_num_gpm_cand specifies the maximum number of geometric partitioning merge mode candidates supported in the SPS subtracted from MaxNumMergeCand.

The maximum number of geometric partitioning merge mode candidates, MaxNumGpmMergeCand, is derived as follows:

```
if( sps_gpm_enabled_flag && MaxNumMergeCand >= 3 )
    MaxNumGpmMergeCand = MaxNumMergeCand −
    max_num_merge_cand_minus_max_num_gpm_cand           (66)
else if( sps_gpm_enabled_flag && MaxNumMergeCand == 2 )
    MaxNumMergeCand = 2
else
    MaxNumGpmMergeCand = 0
```

The value of MaxNumGpmMergeCand shall be in the range of 2 to MaxNumMergeCand, inclusive.

sps_lmcs_enabled_flag equal to 1 specifies that luma mapping with chroma scaling is used in the CLVS. sps_lmcs_enabled_flag equal to 0 specifies that luma mapping with chroma scaling is not used in the CLVS.

sps_lfnst_enabled_flag equal to 1 specifies that lfnst_idx may be present in intra coding unit syntax. sps_lfnst_enabled_flag equal to 0 specifies that lfnst_idx is not present in intra coding unit syntax.

sps_ladf_enabled_flag equal to 1, specifies that sps_num_ladf_intervals_minus2, sps_ladf_lowest_interval_qp_offset, sps_ladf_qp_offset[i], and sps_ladf_delta_threshold_minus1 [i] are present in the SPS.

sps_num_ladf_intervals_minus2 plus 1 specifies the number of sps_ladf_delta_threshold_minus1 [i] and sps_ladf_qp_offset[i] syntax elements that are present in the SPS. The value of sps_num_ladf_intervals_minus2 shall be in the range of 0 to 3, inclusive.

sps_ladf_lowest_interval_qp_offset specifies the offset used to derive the variable qP as specified in clause 8.8.3.6.1. The value of sps_ladf_lowest_interval_qp_offset shall be in the range of −63 to 63, inclusive.

sps_ladf_qp_offset[i] specifies the offset array used to derive the variable qP as specified in clause 8.8.3.6.1. The value of sps_ladf_qp_offset[i] shall be in the range of −63 to 63, inclusive.

sps_ladf_delta_threshold_minus1[i] is used to compute the values of SpsLadfIntervalLowerBound[i], which specifies the lower bound of the i-th luma intensity level interval. The value of sps_ladf_delta_threshold_minus1[i] shall be in the range of 0 to $2^{BitDepth}-3$, inclusive.

The value of SpsLadfIntervalLowerBound[0] is set equal to 0.

For each value of i in the range of 0 to sps_num_ladf_intervals_minus2, inclusive, the variable SpsLadfIntervalLowerBound[i+1] is derived as follows:

SpsLadfIntervalLowerBound[$i$+1]=SpsLadfIntervalLowerBound[$i$]+sps_ladf_delta_threshold_minus1[$i$]+1    (67)

log 2_parallel_merge_level_minus2 plus 2 specifies the value of the variable Log 2ParMrgLevel, which is used in the derivation process for spatial merging candidates as specified in clause 8.5.2.3, the derivation process for motion vectors and reference indices in subblock merge mode as specified in clause 8.5.5.2, and to control the invocation of the updating process for the history-based motion vector predictor list in clause 8.5.2.1. The value of log 2_parallel_merge_level_minus2 shall be in the range of 0 to Ctb Log 2SizeY−2, inclusive. The variable Log 2ParMrgLevel is derived as follows:

Log 2ParMrgLevel=log 2_parallel_merge_level_minus2+2    (68)

sps_scaling_list_enabled_flag equal to 1 specifies that a scaling list is used for the scaling process for transform coefficients. sps_scaling_list_enabled_flag equal to 0 specifies that scaling list is not used for the scaling process for transform coefficients.

sps_dep_quant_enabled_flag equal to 0 specifies that dependent quantization is disabled for pictures referring to the SPS. sps_dep_quant_enabled_flag equal to 1 specifies that dependent quantization may be enabled for pictures referring to the SPS.

sps_sign_data_hiding_enabled_flag equal to 0 specifies that sign bit hiding is disabled for pictures referring to the SPS. sps_sign_data_hiding_enabled_flag equal to 1 specifies that sign bit hiding may be enabled for pictures referring to the SPS. When sps_sign_data_hiding_enabled_flag is not present, it is inferred to be equal to 0.

sps_virtual_boundaries_enabled_flag equal to 1 specifies that disabling in-loop filtering across virtual boundaries may be applied in the coded pictures in the CLVS. sps_virtual_boundaries_enabled_flag equal to 0 specifies that disabling in-loop filtering across virtual boundaries is not applied in the coded pictures in the CLVS. In-loop filtering operations include the deblocking filter, sample adaptive offset filter, and adaptive loop filter operations.

sps_virtual_boundaries_present_flag equal to 1 specifies that information of virtual boundaries is signalled in the SPS. sps_virtual_boundaries_present_flag equal to 0 specifies that information of virtual boundaries is not signalled in the SPS. When there is one or more than one virtual boundaries signalled in the SPS, the in-loop filtering operations are disabled across the virtual boundaries in pictures referring to the SPS. In-loop filtering operations include the deblocking filter, sample adaptive offset filter, and adaptive loop filter operations.

It is a requirement of bitstream conformance that when the value of res_change_in_clvs_allowed_flag is equal to 1, the value of sps_virtual_boundaries_present_flag shall be equal to 0.

sps_num_ver_virtual_boundaries specifies the number of sps_virtual_boundaries_pos_x[i] syntax elements that are present in the SPS. When sps_num_ver_virtual_boundaries is not present, it is inferred to be equal to 0.

sps_virtual_boundaries_pos_x[i] specifies the location of the i-th vertical virtual boundary in units of luma samples divided by 8. The value of sps_virtual_boundaries_pos_x[i] shall be in the range of 1 to Ceil(pic width in luma samples÷8)−1, inclusive.

sps_num_hor_virtual_boundaries specifies the number of sps_virtual_boundaries_pos_y[i] syntax elements that are present in the SPS. When sps_num_hor_virtual_boundaries is not present, it is inferred to be equal to 0.

When sps_virtual_boundaries_enabled_flag is equal to 1 and sps_virtual_boundaries_present_flag is equal to 1, the sum of sps_num_ver_virtual_boundaries and sps_num_hor_virtual_boundaries shall be greater than 0.

sps_virtual_boundaries_pos_y[i] specifies the location of the i-th horizontal virtual boundary in units of luma samples divided by 8. The value of sps_virtual_boundaries_pos_y[i] shall be in the range of 1 to Ceil(pic_height_in_luma_samples÷8)−1, inclusive.

sps_general_hrd_params_present_flag equal to 1 specifies that the syntax structure general_hrd_parameters( ) is present in the SPS RBSP syntax structure. sps_general_hrd_params_present_flag equal to 0 specifies that the syntax structure general_hrd_parameters( ) is not present in the SPS RBSP syntax structure.

sps_sublayer_cpb_params_present_flag equal to 1 specifies that the syntax structure old_hrd_parameters( ) in the SPS RBSP includes HRD parameters for sublayer representations with TemporalId in the range of 0 to sps_max_sublayers_minus1, inclusive.

sps_sublayer_cpb_params_present_flag equal to 0 specifies that the syntax structure ols_hrd_parameters( ) in the SPS RBSP includes HRD parameters for the sublayer representation with TemporalId equal to sps_max_sublayers_minus1 only. When sps_max_sublayers_minus1 is equal to 0, the value of sps_sublayer_cpb_params_present_flag is inferred to be equal to 0. When sps_sublayer_cpb_params_present_flag is equal to 0, the HRD parameters for the sublayer representations with TemporalId in the range of 0 to sps_max_sublayers_minus1−1, inclusive, are inferred to be the same as that for the sublayer representation with TemporalId equal to sps_max_sublayers_minus1. These include the HRD parameters starting from the fixed_pic_rate_general_flag[i] syntax element till the sublayer_hrd_parameters(i) syntax structure immediately under the condition "if(general_vcl_hrd_params_present_flag)" in the ols_hrd_parameters syntax structure.

field_seq_flag equal to 1 indicates that the CLVS conveys pictures that represent fields.

field_seq_flag equal to 0 indicates that the CLVS conveys pictures that represent frames. When general_frame_only_constraint_flag is equal to 1, the value of field_seq_flag shall be equal to 0. When field_seq_flag is equal to 1, a frame-field information SEI message shall be present for every coded picture in the CLVS.

NOTE 5—The specified decoding process does not treat pictures that represent fields or frames differently. A sequence of pictures that represent fields would therefore be coded with the picture dimensions of an individual field. For example, pictures that represent 1080i fields would commonly have cropped output dimensions of 1920×540, while the sequence picture rate would commonly express the rate of the source fields (typically between 50 and 60 Hz), instead of the source frame rate (typically between 25 and 30 Hz).

vui_parameters_present_flag equal to 1 specifies that the syntax structure vui_parameters( ) is present in the SPS RBSP syntax structure. vui_parameters_present_flag equal to 0 specifies that the syntax structure vui_parameters( ) is not present in the SPS RBSP syntax structure.

sps_extension_flag equal to 0 specifies that no sps_extension_data_flag syntax elements are present in the SPS RBSP syntax structure. sps_extension_flag equal to 1 specifies that there are sps_extension_data_flag syntax elements present in the SPS RBSP syntax structure.

sps_extension_data_flag may have any value. Its presence and value do not affect decoder conformance to profiles specified in this version of this Specification. Decoders conforming to this version of this Specification shall ignore all sps_extension_data_flag syntax elements.

3.6. PPS Syntax and Semantics

In the latest VVC draft text, the PPS syntax and semantics are as follows:

| | Descriptor |
|---|---|
| pic_parameter_set_rbsp( ) { | |
|   pps_pic_parameter_set_id | ue(v) |
|   pps_seq_parameter_set_id | u(4) |
|   mixed_nalu_types_in_pic_flag | u(1) |
|   pic_width_in_luma_samples | ue(v) |
|   pic_height_in_luma_samples | ue(v) |
|   pps_conformance_window_flag | u(1) |
|   if( pps_conformance_window_flag ) { | |
|     pps_conf_win_left_offset | ue(v) |
|     pps_conf_win_right_offset | ue(v) |
|     pps_conf_win_top_offset | ue(v) |
|     pps_conf_win_bottom_offset | ue(v) |
|   } | |
|   scaling_window_explicit_signalling_flag | u(1) |
|   if( scaling_window_explicit_signalling_flag ) { | |
|     scaling_win_left_offset | ue(v) |
|     scaling_win_right_offset | ue(v) |
|     scaling_win_top_offset | ue(v) |
|     scaling_win_bottom_offset | ue(v) |
|   } | |
|   output_flag_present_flag | u(1) |
|   subpic_id_mapping_in_pps_flag | u(1) |
|   if( subpic_id_mapping_in_pps_flag ) { | |
|     pps_num_subpics_minus1 | ue(v) |
|     pps_subpic_id_len_minus1 | ue(v) |
|     for( i = 0; i <= pps_num_subpic_minus1; i++ ) | |
|       pps_subpic_id[ i ] | u(v) |
|   } | |
|   no_pic_partition_flag | u(1) |
|   if( !no_pic_partition_flag ) { | |
|     pps_log2_ctu_size_minus5 | u(2) |
|     num_exp_tile_columns_minus1 | ue(v) |
|     num_exp_tile_rows_minus1 | ue(v) |
|     for( i = 0; i <= num_exp_tile_columns_minus1; i++ ) | |
|       tile_column_width_minus1[ i ] | ue(v) |
|     for( i = 0; i <= num_exp_tile_rows_minus1; i++ ) | |
|       tile_row_height_minus1[ i ] | ue(v) |
|     if( NumTilesInPic > 1 ) | |
|       rect_slice_flag | u(1) |
|     if( rect_slice_flag ) | |
|       single_slice_per_subpic_flag | u(1) |
|     if( rect_slice_flag && !single_slice_per_subpic_flag ) { | |
|       num_slices_in_pic_minus1 | ue(v) |
|       if( num_slices_in_pic_minus1 > 0 ) | |
|         tile_idx_delta_present_flag | u(1) |
|       for( i = 0; i < num_slices_in_pic_minus1; i++ ) { | |
|         if( NumTileColumns > 1 ) | |
|           slice_width_in_tiles_minus1[ i ] | ue(v) |
|         if( NumTileRows > 1 && ( tile_idx_delta_present_flag \|\| tileIdx % NumTileColumns = = 0 ) ) | |
|           slice_height_in_tiles_minus1[ i ] | ue(v) |
|         if( slice_width_in_tiles_minus1[ i ] = = 0 && slice_height_in_tiles_minus1[ i ] = = 0 && RowHeight[ SliceTopLeftTileIdx[ i ] / NumTileColumns ] > 1 ) { | |
|           num_exp_slices_in_tile[ i ] | ue(v) |
|           for( j = 0; j < num_exp_slices_in_tile[ i ]; j++ ) | |
|             exp_slice_height_in_ctus_minus1[ j ] | ue(v) |
|           i += NumSlicesInTile[ i ] − 1 | |
|         } | |
|         if( tile_idx_delta_present_flag && i < num_slices_in_pic_minus1 ) | |
|           tile_idx_delta[ i ] | se(v) |
|       } | |
|     } | |
|     loop_filter_across_tiles_enabled_flag | u(1) |
|     loop_filter_across_slices_enabled_flag | u(1) |
|   } | |
|   cabac_init_present_flag | u(1) |
|   for( i = 0; i < 2; i++ ) | |
|     num_ref_idx_default_active_minus1[ i ] | ue(v) |
|   rpl1_idx_present_flag | u(1) |
|   init_qp_minus26 | se(v) |
|   cu_qp_delta_enabled_flag | u(1) |
|   pps_chroma_tool_offsets_present_flag | u(1) |
|   if( pps_chroma_tool_offsets_present_flag ) { | |
|     pps_cb_qp_offset | se(v) |
|     pps_cr_qp_offset | se(v) |
|     pps_joint_cbcr_qp_offset_present_flag | u(1) |
|     if( pps_joint_cbcr_qp_offset_present_flag ) | |
|       pps_joint_cbcr_qp_offset_value | se(v) |
|     pps_slice_chroma_qp_offsets_present_flag | u(1) |
|     pps_cu_chroma_qp_offset_list_enabled_flag | u(1) |
|   } | |
|   if( pps_cu_chroma_qp_offset_list_enabled_flag ) { | |
|     chroma_qp_offset_list_len_minus1 | ue(v) |
|     for( i = 0; i <= chroma_qp_offset_list_len_minus1; i++ ) { | |
|       cb_qp_offset_list[ i ] | se(v) |
|       cr_qp_offset_list[ i ] | se(v) |
|       if( pps_joint_cbcr_qp_offset_present_flag ) | |
|         joint_cbcr_qp_offset_list[ i ] | se(v) |
|     } | |
|   } | |
|   pps_weighted_pred_flag | u(1) |
|   pps_weighted_bipred_flag | u(1) |
|   deblocking_filter_control_present_flag | u(1) |
|   if( deblocking_filter_control_present_flag ) { | |
|     deblocking_filter_override_enabled_flag | u(1) |
|     pps_deblocking_filter_disabled_flag | u(1) |
|     if( !pps_deblocking_filter_disabled_flag ) { | |
|       pps_beta_offset_div2 | se(v) |
|       pps_tc_offset_div2 | se(v) |
|       pps_cb_beta_offset_div2 | se(v) |
|       pps_cb_tc_offset_div2 | se(v) |
|       pps_cr_beta_offset_div2 | se(v) |
|       pps_cr_tc_offset_div2 | se(v) |
|     } | |
|   } | |
|   rpl_info_in_ph_flag | u(1) |
|   if( deblocking_filter_override_enabled_flag ) | |
|     dbf_info_in_ph_flag | u(1) |
|   sao_info_in_ph_flag | u(1) |
|   alf_info_in_ph_flag | u(1) |

| | Descriptor |
|---|---|
| if( ( pps_weighted_pred_flag \|\|  pps_weighted_bipred_flag ) && rpl_info_in_ph_flag ) | |
|    wp_info_in_ph_flag | u(1) |
|    qp_delta_info_in_ph_flag | u(1) |
| pps_ref_wraparound_enabled_flag | u(1) |
| if( pps_ref_wraparound_enabled_flag ) | |
|    pps_ref_wraparound_offset | ue(v) |
| picture_header_extension_present_flag | u(1) |
| slice_header_extension_present_flag | u(1) |
| pps_extension_flag | u(1) |
| if( pps_extension_flag ) | |
|    while( more_rbsp_data( ) ) | |
|      pps_extension_data_flag | u(1) |
| rbsp_trailing_bits( ) | |
| } | |

A PPS RBSP shall be available to the decoding process prior to it being referenced, included in at least one AU with TemporalId less than or equal to the TemporalId of the PPS NAL unit or provided through external means.

All PPS NAL units with a particular value of pps_pic_parameter_set_id within a PU shall have the same content.

pps_pic_parameter_set_id identifies the PPS for reference by other syntax elements. The value of pps_pic_parameter_set_id shall be in the range of 0 to 63, inclusive. PPS NAL units, regardless of the nuh_layer_id values, share the same value space of pps_pic_parameter_set_id.

Let ppsLayerId be the value of the nuh_layer_id of a particular PPS NAL unit, and vclLayerId be the value of the nuh_layer_id of a particular VCL NAL unit. The particular VCL NAL unit shall not refer to the particular PPS NAL unit unless ppsLayerId is less than or equal to vclLayerId and the layer with nuh_layer_id equal to ppsLayerId is included in at least one OLS that includes the layer with nuh_layer_id equal to vclLayerId.

pps_seq_parameter_set_id specifies the value of sps_seq_parameter_set_id for the SPS. The value of pps_seq_parameter_set_id shall be in the range of 0 to 15, inclusive. The value of pps_seq_parameter_set_id shall be the same in all PPSs that are referred to by coded pictures in a CLVS.

mixed_nalu_types_in_pic_flag equal to 1 specifies that each picture referring to the PPS has more than one VCL NAL unit, the VCL NAL units do not have the same value of nal_unit_type, and the picture is not an IRAP picture. mixed_nalu_types_in_pic_flag equal to 0 specifies that each picture referring to the PPS has one or more VCL NAL units and the VCL NAL units of each picture referring to the PPS have the same value of nal_unit_type.

When no_mixed_nalu_types_in_pic_constraint_flag is equal to 1, the value of mixed_nalu_types_in_pic_flag shall be equal to 0.

For each slice with a nal_unit_type value nalUnitTypeA in the range of IDR_W_RADL to CRA_NUT, inclusive, in a picture picA that also contains one or more slices with another value of nal_unit_type (i.e., the value of mixed_nalu_types_in_pic_flag for the picture picA is equal to 1), the following applies:

The slice shall belong to a subpicture subpicA for which the value of the corresponding subpic_treated_as_pic_flag[i] is equal to 1.

The slice shall not belong to a subpicture of picA containing VCL NAL units with nal_unit_type not equal to nalUnitTypeA.

If nalUnitTypeA is equal to CRA, for all the following PUs following the current picture in the CLVS in decoding order and in output order, neither RefPicList[0] nor RefPicList[1] of a slice in subpicA in those PUs shall include any picture preceding picA in decoding order in an active entry.

Otherwise (i.e., nalUnitTypeA is equal to IDR_W_RADL or IDR_N_LP), for all the PUs in the CLVS following the current picture in decoding order, neither RefPicList[0] nor RefPicList[1] of a slice in subpicA in those PUs shall include any picture preceding picA in decoding order in an active entry.

NOTE 1—mixed_nalu_types_in_pic_flag equal to 1 indicates that pictures referring to the PPS contain slices with different NAL unit types, e.g., coded pictures originating from a subpicture bitstream merging operation for which encoders have to ensure matching bitstream structure and further alignment of parameters of the original bitstreams. One example of such alignments is as follows: When the value of sps_idr_rpl_flag is equal to 0 and mixed_nalu_types_in_pic_flag is equal to 1, a picture referring to the PPS cannot have slices with nal_unit_type equal to IDR_W_RADL or IDR_N_LP.

pic_width_in_luma_samples specifies the width of each decoded picture referring to the PPS in units of luma samples. pic_width_in_luma_samples shall not be equal to 0, shall be an integer multiple of Max(8, MinCbSizeY), and shall be less than or equal to pic_width_max_in_luma_samples. When res_change_in_clvs_allowed_flag equal to 0, the value of pic_width_in_luma_samples shall be equal to pic_width_max_in_luma_samples.

pic_height_in_luma_samples specifies the height of each decoded picture referring to the PPS in units of luma samples. pic_height_in_luma_samples shall not be equal to 0 and shall be an integer multiple of Max(8, MinCbSizeY), and shall be less than or equal to pic_height_max_in_luma_samples.

When res_change_in_clvs_allowed_flag equal to 0, the value of pic_height_in_luma_samples shall be equal to pic_height_max_in_luma_samples.

The variables PicWidthInCtbsY, PicHeightInCtbsY, PicSizeInCtbsY, PicWidthInMinCbsY, PicHeightInMinCbsY, PicSizeInMinCbsY, PicSizeInSamplesY, PicWidthInSamplesC and PicHeightInSamplesC are derived as follows:

$$PicWidthInCtbsY = \text{Ceil}(pic\_width\_in\_luma\_samples \div CtbSizeY) \qquad (69)$$

$$PicHeightInCtbsY = \text{Ceil}(pic\_height\_in\_luma\_samples \div CtbSizeY) \qquad (70)$$

$$PicSizeInCtbsY = PicWidthInCtbsY * PicHeightInCtbsY \qquad (71)$$

$$PicWidthInMinCbsY = pic\_width\_in\_luma\_samples / MinCbSizeY \qquad (72)$$

$$PicHeightInMinCbsY = pic\_height\_in\_luma\_samples / MinCbSizeY \qquad (73)$$

$$PicSizeInMinCbsY = PicWidthInMinCbsY * PicHeightInMinCbsY \qquad (74)$$

$$PicSizeInSamplesY = pic\_width\_in\_luma\_samples * pic\_height\_in\_luma\_samples \qquad (75)$$

$$PicWidthInSamplesC = pic\_width\_in\_luma\_samples / SubWidthC \qquad (76)$$

$$PicHeightInSamplesC = pic\_height\_in\_luma\_samples / SubHeightC \qquad (77)$$

pps_conformance_window_flag equal to 1 indicates that the conformance cropping window offset parameters follow next in the PPS. pps_conformance_window_flag equal to 0 indicates that the conformance cropping window offset parameters are not present in the PPS.

pps_conf_win_left_offset, pps_conf_win_right_offset, pps_conf_win_top_offset, and pps_conf_win_bottom_offset specify the samples of the pictures in the CLVS that are output from the decoding process, in terms of a rectangular region specified in picture coordinates for output. When pps_conformance_window_flag is equal to 0, the values of pps_conf_win_left_offset, pps_conf_win_right_offset, pps_conf_win_top_offset, and pps_conf_win_bottom_offset are inferred to be equal to 0.

The conformance cropping window contains the luma samples with horizontal picture coordinates from SubWidthC*pps_conf_win_left_offset to pic_width_in_luma_samples−(SubWidthC*pps_conf_win_right_offset+1) and vertical picture coordinates from SubHeightC*pps_conf_win_top_offset to pic_height_in_luma_samples−(SubHeightC*pps_conf_win_bottom_offset+1), inclusive.

The value of SubWidthC*(pps_conf_win_left_offset+pps_conf_win_right_offset) shall be less than pic_width_in_luma_samples, and the value of SubHeightC*(pps_conf_win_top_offset+pps_conf_win_bottom_offset) shall be less than pic_height_in_luma_samples.

When ChromaArrayType is not equal to 0, the corresponding specified samples of the two chroma arrays are the samples having picture coordinates (x/SubWidthC, y/SubHeightC), where (x, y) are the picture coordinates of the specified luma samples.

NOTE 2—The conformance cropping window offset parameters are only applied at the output. All internal decoding processes are applied to the uncropped picture size.

Let ppsA and ppsB be any two PPSs referring to the same SPS. It is a requirement of bitstream conformance that, when ppsA and ppsB have the same the values of pic_width_in_luma_samples and pic_height_in_luma_samples, respectively, ppsA and ppsB shall have the same values of pps_conf_win_left_offset, pps_conf_win_right_offset, pps_conf_win_top_offset, and pps_conf_win_bottom_offset, respectively.

When pic_width_in_luma_samples is equal to pic_width_max_in_luma_samples and pic_height_in_luma_samples is equal to pic_height_max_in_luma_samples, it is a requirement of bitstream conformance that pps_conf_win_left_offset, pps_conf_win_right_offset, pps_conf_win_top_offset, and pps_conf_win_bottom_offset, are equal to sps_conf_win_left_offset, sps_conf_win_right_offset, sps_conf_win_top_offset, and sps_conf_win_bottom_offset, respectively.

scaling_window_explicit_signalling_flag equal to 1 specifies that the scaling window offset parameters are present in the PPS. scaling_window_explicit_signalling_flag equal to 0 specifies that the scaling window offset parameters are not present in the PPS. When res_change_in_clvs_allowed_flag is equal to 0, the value of scaling_window_explicit_signalling_flag shall be equal to 0.

scaling_win_left_offset, scaling_win_right_offset, scaling_win_top_offset, and scaling_win_bottom_offset specify the offsets that are applied to the picture size for scaling ratio calculation. When not present, the values of scaling_win_left_offset, scaling_win_right_offset, scaling_win_top_offset, and scaling_win_bottom_offset are inferred to be equal to pps_conf_win_left_offset, pps_conf_win_right_offset, pps_conf_win_top_offset, and pps_conf_win_bottom_offset, respectively.

The value of SubWidthC*(scaling_win_left_offset+scaling_win_right_offset) shall be less than pic_width_in_luma_samples, and the value of SubHeightC*(scaling_win_top_offset+scaling_win_bottom_offset) shall be less than pic_height_in_luma_samples.

The variables PicOutputWidthL and PicOutputHeightL are derived as follows:

$$PicOutputWidthL=pic\_width\_in\_luma\_samples-SubWidthC*(scaling\_win\_right\_offset+scaling\_win\_left\_offset) \quad (78)$$

$$PicOutputHeightL=pic\_height\_in\_luma\_samples-SubWidthC*(scaling\_win\_bottom\_offset+scaling\_win\_top\_offset) \quad (79)$$

Let refPicOutputWidthL and refPicOutputHeightL be the PicOutputWidthL and PicOutputHeightL, respectively, of a reference picture of a current picture referring to this PPS. Is a requirement of bitstream conformance that all of the following conditions are satisfied:

PicOutputWidthL*2 shall be greater than or equal to refPicWidthInLumaSamples.

PicOutputHeightL*2 shall be greater than or equal to refPicHeightInLumaSamples.

PicOutputWidthL shall be less than or equal to refPicWidthInLumaSamples*8.

PicOutputHeightL shall be less than or equal to refPicHeightInLumaSamples*8.

PicOutputWidthL*pic_width_max_in_luma_samples shall be greater than or equal to refPicOutputWidthL*(pic_width_in_luma_samples−Max(8, MinCbSizeY)).

PicOutputHeightL*pic_height_max_in_luma_samples shall be greater than or equal to refPicOutputHeightL*(pic_height_in_luma_samples−Max(8, MinCbSizeY)).

output_flag_present_flag equal to 1 indicates that the pic output flag syntax element is present in slice headers referring to the PPS. output_flag_present_flag equal to 0 indicates that the pic_output_flag syntax element is not present in slice headers referring to the PPS.

subpic_id_mapping_in_pps_flag equal to 1 specifies that the subpicture ID mapping is signalled in the PPS. subpic_id_mapping_in_pps_flag equal to 0 specifies that the subpicture ID mapping is not signalled in the PPS. If subpic_id_mapping_explicitly_signalled_flag is 0 or subpic_id_mapping_in_sps_flag is equal to 1, the value of subpic_id_mapping_in_pps_flag shall be equal to 0. Otherwise (subpic_id_mapping_explicitly_signalled_flag is equal to 1 and subpic_id_mapping_in_sps_flag is equal to 0), the value of subpic_id_mapping_in_pps_flag shall be equal to 1.

pps_num_subpics_minus1 shall be equal to sps_num_subpics_minus1.

pps_subpic_id_len_minus1 shall be equal to sps_subpic_id_len_minus1.

pps_subpic_id[i] specifies the subpicture ID of the i-th subpicture. The length of the pps_subpic_id[i] syntax element is pps_subpic_id_len_minus1+1 bits.

The variable SubpicIdVal[i], for each value of i in the range of 0 to sps_num_subpics_minus1, inclusive, is derived as follows:

```
for( i = 0; i <= sps_num_subpics_minus1; i++ )
    if( subpic_id_mapping_explicitly_signalled_flag )
        SubpicIdVal[ i ] = subpic_id_mapping_in_pps_flag ?
            pps_subpic_id[ i ] :
```

```
        sps_subpic_id[ i ]                                    (80)
    else
        SubpicIdVal[ i ] = i
```

It is a requirement of bitstream conformance that both of the following constraints apply:
- For any two different y values of i and j in the range of 0 to sps_num_subpics_minus1, inclusive, SubpicIdVal[i] shall not be equal to SubpicIdVal[j].
- When the current picture is not the first picture of the CLVS, for each value of i in the range of 0 to sps_num_subpics_minus1, inclusive, if the value of SubpicIdVal[i] is not equal to the value of SubpicIdVal[i] of the previous picture in decoding order in the same layer, the nal_unit_type for all coded slice NAL units of the subpicture in the current picture with subpicture index i shall be equal to a particular value in the range of IDR_W_RADL to CRA_NUT, inclusive.

no_pic_partition_flag equal to 1 specifies that no picture partitioning is applied to each picture referring to the PPS. no_pic_partition_flag equal to 0 specifies each picture referring to the PPS may be partitioned into more than one tile or slice.

It is a requirement of bitstream conformance that the value of no_pic_partition_flag shall be the same for all PPSs that are referred to by coded pictures within a CLVS.

It is a requirement of bitstream conformance that the value of no_pic_partition_flag shall not be equal to 1 when the value of sps_num_subpics_minus1+1 is greater than 1.

pps_log 2_ctu_size_minus5 plus 5 specifies the luma coding tree block size of each CTU. pps_log 2_ctu_size_minus5 shall be equal to sps_log 2_ctu_size_minus5.

num_exp_tile_columns_minus1 plus 1 specifies the number of explicitly provided tile column widths. The value of num_exp_tile_columns_minus1 shall be in the range of 0 to PicWidthInCtbsY−1, inclusive. When no_pic_partition_flag is equal to 1, the value of num_exp_tile_columns_minus1 is inferred to be equal to 0.

num_exp_tile_rows_minus1 plus 1 specifies the number of explicitly provided tile row heights. The value of num_exp_tile_rows_minus1 shall be in the range of 0 to PicHeightInCtbsY−1, inclusive. When no_pic_partition_flag is equal to 1, the value of num_tile_rows_minus1 is inferred to be equal to 0.

tile_column_width_minus1 [i] plus 1 specifies the width of the i-th tile column in units of CTBs for i in the range of 0 to num_exp_tile_columns_minus1−1, inclusive. tile column width minus1[num_exp_tile_columns_minus1] is used to derive the width of the tile columns with index greater than or equal to num_exp_tile_columns_minus1 as specified in clause 6.5.1. The value of tile_column_width_minus1[i] shall be in the range of 0 to PicWidthInCtbsY−1, inclusive. When not present, the value of tile_column_width_minus1[0] is inferred to be equal to PicWidthInCtbsY−1.

tile_row_height_minus1[i] plus 1 specifies the height of the i-th tile row in units of CTBs for i in the range of 0 to num_exp_tile_rows_minus1−1, inclusive. tile_row_height_minus1[num_exp_tile_rows_minus1] is used to derive the height of the tile rows with index greater than or equal to num_exp_tile_rows_minus1 as specified in clause 6.5.1. The value of tile_row_height_minus1[i] shall be in the range of 0 to PicHeightInCtbsY−1, inclusive. When not present, the value of tile_row_height_minus1[0] is inferred to be equal to PicHeightInCtbsY−1.

rect_slice_flag equal to 0 specifies that tiles within each slice are in raster scan order and the slice information is not signalled in PPS. rect_slice_flag equal to 1 specifies that tiles within each slice cover a rectangular region of the picture and the slice information is signalled in the PPS. When not present, rect_slice_flag is inferred to be equal to 1. When subpic_info_present_flag is equal to 1, the value of rect_slice_flag shall be equal to 1.

single_slice_per_subpic_flag equal to 1 specifies that each subpicture consists of one and only one rectangular slice. single_slice_per_subpic_flag equal to 0 specifies that each subpicture may consist of one or more rectangular slices. When single_slice_per_subpic_flag is equal to 1, num_slices_in_pic_minus1 is inferred to be equal to sps_num_subpics_minus1. When not present, the value of single_slice_per_subpic_flag is inferred to be equal to 0.

num_slices_in_pic_minus1 plus 1 specifies the number of rectangular slices in each picture referring to the PPS. The value of num_slices_in_pic_minus1 shall be in the range of 0 to MaxSlicesPerPicture−1, inclusive, where MaxSlicesPerPicture is specified in Annex A. When no_pic_partition_flag is equal to 1, the value of num_slices_in_pic_minus1 is inferred to be equal to 0.

tile_idx_delta_present_flag equal to 0 specifies that tile_idx_delta values are not present in the PPS and all rectangular slices in pictures referring to the PPS are specified in raster order according to the process defined in clause 6.5.1. tile_idx_delta_present_flag equal to 1 specifies that tile_idx_delta values may be present in the PPS and all rectangular slices in pictures referring to the PPS are specified in the order indicated by the values of tile_idx_delta. When not present, the value of tile_idx_delta_present_flag is inferred to be equal to 0.

slice_width_in_tiles_minus1[i] plus 1 specifies the width of the i-th rectangular slice in units of tile columns. The value of slice_width_in_tiles_minus1[i] shall be in the range of 0 to NumTileColumns−1, inclusive.

When slice_width_in_tiles_minus1[i] is not present, the following applies:
- If NumTileColumns is equal to 1, the value of slice_width_in_tiles_minus1[i] is inferred to be equal to 0.
- Otherwise, the value of slice_width_in_tiles_minus1[i] is inferred as specified in clause 6.5.1.

slice_height_in_tiles_minus1[i] plus 1 specifies the height of the i-th rectangular slice in units of tile rows. The value of slice_height_in_tiles_minus1[i] shall be in the range of 0 to NumTileRows−1, inclusive.

When slice_height_in_tiles_minus1[i] is not present, the following applies:
- If NumTileRows is equal to 1, or tile_idx_delta_present_flag is equal to 0 and tileIdx % NumTileColumns is greater than 0), the value of slice_height_in_tiles_minus1[i] is inferred to be equal to 0.
- Otherwise (NumTileRows is not equal to 1, and tile_idx_delta_present_flag is equal to 1 or tileIdx % NumTileColumns is equal to 0), when tile_idx_delta_present_flag is equal to 1 or tileIdx % NumTileColumns is equal to 0, the value of slice_height_in_tiles_minus1[i] is inferred to be equal to slice_height_in_tiles_minus1[i−1].

num_exp_slices_in_tile[i] specifies the number of explicitly provided slice heights in the current tile that contains more than one rectangular slices. The value of num_exp_slices_in_tile[i] shall be in the range of 0 to RowHeight[tileY]−1, inclusive, where tileY is the tile row index containing the i-th slice. When not present, the value of num_exp_slices_in_tile[i] is inferred to be equal to 0. When num_exp_slices_in_tile[i] is equal to 0, the value of the variable NumSlicesInTile[i] is derived to be equal to 1.

exp_slice_height_in_ctus_minus1[j] plus 1 specifies the height of the j-th rectangular slice in the current tile in units of CTU rows. The value of exp_slice_height_in_ctus_minus1 [j] shall be in the range of 0 to RowHeight[tileY]−1, inclusive, where tileY is the tile row index of the current tile. When num_exp_slices_in_tile[i] is greater than 0, the variable NumSlicesInTile[i] and SliceHeightInCtusMinus1[i+k] for kin the range of 0 to NumSlicesInTile[i]−1 are derived as follows:

```
remainingHeightInCtbsY = RowHeight[ SliceTopLeftTileIdx[ i ] / NumTileColumns ]
numExpSliceInTile = num_exp_slices_in_tile[ i ]
for( j = 0; j < numExpSliceInTile − 1; j++ ) {
    SliceHeightInCtusMinus1[ i++ ] =
    exp_slice_height_in_ctu_minus1[ j ]
    remainingHeightInCtbsY −= SliceHeightInCtusMinus1[ j ]
}
uniformSliceHeightMinus1 = SliceHeightInCtusMinus1[ i − 1 ]           (81)
while( remainingHeightInCtbsY >= (uniformSliceHeightMinus1 +
1) ) {
    SliceHeightInCtusMinus1[ i++ ] = uniformSliceHeightMinus1
    remainingHeightInCtbsY −= (uniformSliceHeightMinus1 + 1)
    j++
}
if( remainingHeightInCtbsY > 0 ) {
    SliceHeightInCtusMinus1[ i++ ] = remainingHeightInCtbsY
    j++
}
NumSlicesInTile[ i ] = j
``` tile_idx_delta[i] specifies the difference between the tile index of the first tile in the i-th rectangular slice and the tile index of the first tile in the (i+1)-th rectangular slice. The value of tile_idx_delta[i] shall be in the range of −NumTilesInPic+1 to NumTilesInPic−1, inclusive. When not present, the value of tile_idx_delta[i] is inferred to be equal to 0. When present, the value of tile_idx_delta[i] shall not be equal to 0.

loop_filter_across_tiles_enabled_flag equal to 1 specifies that in-loop filtering operations may be performed across tile boundaries in pictures referring to the PPS. loop_filter_across_tiles_enabled_flag equal to 0 specifies that in-loop filtering operations are not performed across tile boundaries in pictures referring to the PPS. The in-loop filtering operations include the deblocking filter, sample adaptive offset filter, and adaptive loop filter operations. When not present, the value of loop_filter_across_tiles_enabled_flag is inferred to be equal to 1.

loop_filter_across_slices_enabled_flag equal to 1 specifies that in-loop filtering operations may be performed across slice boundaries in pictures referring to the PPS. loop_filter_across_slice_enabled_flag equal to 0 specifies that in-loop filtering operations are not performed across slice boundaries in pictures referring to the PPS. The in-loop filtering operations include the deblocking filter, sample adaptive offset filter, and adaptive loop filter operations. When not present, the value of loop_filter_across_slices_enabled_flag is inferred to be equal to 0.

cabac_init_present_flag equal to 1 specifies that cabac_init_flag is present in slice headers referring to the PPS. cabac_init_present_flag equal to 0 specifies that cabac_init_flag is not present in slice headers referring to the PPS.

num_ref_idx_default_active_minus1[i] plus 1, when i is equal to 0, specifies the inferred value of the variable NumRefIdxActive[0] for P or B slices with num_ref_idx_active_override_flag equal to 0, and, when i is equal to 1, specifies the inferred value of NumRefIdxActive[1] for B slices with num_ref_idx_active_override_flag equal to 0. The value of num_ref_idx_default_active_minus1[i] shall be in the range of 0 to 14, inclusive.

rpl1_idx_present_flag equal to 0 specifies that ref_pic_list_sps_flag[1] and ref_pic_list_idx[1] are not present in the PH syntax structures or the slice headers for pictures referring to the PPS. rpl1_idx_present_flag equal to 1 specifies that ref_pic_list_sps_flag[1] and ref_pic_list_idx[1] may be present in the PH syntax structures or the slice headers for pictures referring to the PPS.

init_qp_minus26 plus 26 specifies the initial value of $SliceQp_Y$ for each slice referring to the PPS. The initial value of $SliceQp_Y$ is modified at the picture level when a non-zero value of ph_qp_delta is decoded or at the slice level when a non-zero value of slice_qp_delta is decoded. The value of init_qp_minus26 shall be in the range of −(26+QpBdOffset) to +37, inclusive.

cu_qp_delta_enabled_flag equal to 1 specifies that the ph_cu_qp_delta_subdiv_intra_slice and ph_cu_qp_delta_subdiv_inter_slice syntax elements are present in PHs referring to the PPS and cu_qp_delta_abs may be present in the transform unit syntax. cu_qp_delta_enabled_flag equal to 0 specifies that the ph_cu_qp_delta_subdiv_intra_slice and ph_cu_qp_delta_subdiv_inter_slice syntax elements are not present in PHs referring to the PPS and cu_qp_delta_abs is not present in the transform unit syntax.

pps_chroma_tool_offsets_present_flag equal to 1 specifies that chroma tool offsets related syntax elements are present in the PPS RBSP syntax structure. pps_chroma_tool_offsets_present_flag equal to 0 specifies that chroma tool offsets related syntax elements are not present in in the PPS RBSP syntax structure. When ChromaArrayType is equal to 0, the value of pps_chroma_tool_offsets_present_flag shall be equal to 0.

pps_cb_qp_offset and pps_cr_qp_offset specify the offsets to the luma quantization parameter $Qp'_Y$ used for deriving $Qp'_{Cb}$ and $Qp'_{Cr}$, respectively. The values of pps_cb_qp_offset and pps_cr_qp_offset shall be in the range of −12 to +12, inclusive. When ChromaArrayType is equal to 0, pps_cb_qp_offset and pps_cr_qp_offset are not used in the decoding process and decoders shall ignore their value. When not present, the values of pps_cb_qp_offset and pps_cr_qp_offset are inferred to be equal to 0.

pps_joint_cbcr_qp_offset_present_flag equal to 1 specifies that pps_joint_cbcr_qp_offset_value and joint_cbcr_qp_offset_list[i] are present in the PPS RBSP syntax structure. pps_joint_cbcr_qp_offset_present_flag equal to 0 specifies that pps_joint_cbcr_qp_offset_value and joint_cbcr_qp_offset_list[i] are not present in the PPS RBSP syntax structure. When ChromaArrayType is equal to 0 or sps_joint_cbcr_enabled_flag is equal to 0, the value of pps_joint_cbcr_qp_offset_present_flag shall be equal to 0. When not present, the value of pps_joint_cbcr_qp_offset_present_flag is inferred to be equal to 0.

pps_joint_cbcr_qp_offset_value specifies the offset to the luma quantization parameter $Qp'_Y$ used for deriving $Qp'_{CbCr}$. The value of pps_joint_cbcr_qp_offset_value shall be in the range of −12 to +12, inclusive. When ChromaArrayType is equal to 0 or sps_joint_cbcr_enabled_flag is equal to 0, pps_joint_cbcr_qp_offset_value is not used in the decoding process and decoders shall ignore its value. When pps_joint_cbcr_qp_offset_present_flag is equal to 0, pps_joint_cbcr_qp_offset_value is not present and is inferred to be equal to 0.

pps_slice_chroma_qp_offsets_present_flag equal to 1 specifies that the slice_cb_qp_offset and slice_cr_qp_offset syntax elements are present in the associated slice headers. pps_slice_chroma_qp_offsets_present_flag equal to 0 specifies that the slice_cb_qp_offset and slice_cr_qp_offset syntax elements are not present in the associated slice headers. When not present, the value of pps_slice_chroma_qp_offsets_present_flag is inferred to be equal to 0.

pps_cu_chroma_qp_offset_list_enabled_flag equal to 1 specifies that the ph_cu_chroma_qp_offset_subdiv_intra_slice and ph_cu_chroma_qp_offset_subdiv_inter_slice syntax elements are present in PHs referring to the PPS and cu_chroma_qp_offset_flag may be present in the transform unit syntax and the palette coding syntax. pps_cu_chroma_qp_offset_list_enabled_flag equal to 0 specifies that the ph_cu_chroma_qp_offset_subdiv_intra_slice and ph_cu_chroma_qp_offset_subdiv_inter_slice syntax elements are not present in PHs referring to the PPS and the cu_chroma_qp_offset_flag is not present in the transform unit syntax and the palette coding syntax. When not present, the value of pps_cu_chroma_qp_offset_list_enabled_flag is inferred to be equal to 0.

chroma_qp_offset_list_len_minus1 plus 1 specifies the number of cb_qp_offset_list[i], cr_qp_offset_list[i], and joint_cbcr_qp_offset_list[i], syntax elements that are present in the PPS RBSP syntax structure. The value of chroma_qp_offset_list_len_minus1 shall be in the range of 0 to 5, inclusive.

cb_qp_offset_list[i], cr_qp_offset_list[i], and joint_cbcr_qp_offset_list[i], specify offsets used in the derivation of $Qp'_{Cb}$, $Qp'_{Cr}$, and $Qp'_{CbCr}$, respectively. The values of cb_qp_offset_list[i], cr_qp_offset_list[i], and joint_cbcr_qp_offset_list[i] shall be in the range of −12 to +12, inclusive. When pps_joint_cbcr_qp_offset_present_flag is equal to 0, joint_cbcr_qp_offset_list[i] is not present and it is inferred to be equal to 0.

pps_weighted_pred_flag equal to 0 specifies that weighted prediction is not applied to P slices referring to the PPS. pps_weighted_pred_flag equal to 1 specifies that weighted prediction is applied to P slices referring to the PPS. When sps_weighted_pred_flag is equal to 0, the value of pps_weighted_pred_flag shall be equal to 0.

pps_weighted_bipred_flag equal to 0 specifies that explicit weighted prediction is not applied to B slices referring to the PPS. pps_weighted_bipred_flag equal to 1 specifies that explicit weighted prediction is applied to B slices referring to the PPS. When sps_weighted_bipred_flag is equal to 0, the value of pps_weighted_bipred_flag shall be equal to 0.

deblocking_filter_control_present_flag equal to 1 specifies the presence of deblocking filter control syntax elements in the PPS. deblocking_filter_control_present_flag equal to 0 specifies the absence of deblocking filter control syntax elements in the PPS.

deblocking_filter_override_enabled_flag equal to 1 specifies the presence of ph_deblocking_filter_override_flag in the PHs referring to the PPS or slice_deblocking_filter_override_flag in the slice headers referring to the PPS. deblocking_filter_override_enabled_flag equal to 0 specifies the absence of ph_deblocking_filter_override_flag in PHs referring to the PPS or slice_deblocking_filter_override_flag in slice headers referring to the PPS. When not present, the value of deblocking_filter_override_enabled_flag is inferred to be equal to 0.

pps_deblocking_filter_disabled_flag equal to 1 specifies that the operation of deblocking filter is not applied for slices referring to the PPS in which slice_deblocking_filter_disabled_flag is not present. pps_deblocking_filter_disabled_flag equal to 0 specifies that the operation of the deblocking filter is applied for slices referring to the PPS in which slice_deblocking_filter_disabled_flag is not present. When not present, the value of pps_deblocking_filter_disabled_flag is inferred to be equal to 0.

pps_beta_offset_div2 and pps_tc_offset_div2 specify the default deblocking parameter offsets for β and tC (divided by 2) that are applied to the luma component for slices referring to the PPS, unless the default deblocking parameter offsets are overridden by the deblocking parameter offsets present in the picture headers or the slice headers of the slices referring to the PPS. The values of pps_beta_offset_div2 and pps_tc_offset_div2 shall both be in the range of −12 to 12, inclusive. When not present, the values of pps_beta_offset_div2 and pps_tc_offset_div2 are both inferred to be equal to 0.

pps_cb_beta_offset_div2 and pps_cb_tc_offset_div2 specify the default deblocking parameter offsets for β and tC (divided by 2) that are applied to the Cb component for slices referring to the PPS, unless the default deblocking parameter offsets are overridden by the deblocking parameter offsets present in the picture headers or the slice headers of the slices referring to the PPS. The values of pps_cb_beta_offset_div2 and pps_cb_tc_offset_div2 shall both be in the range of −12 to 12, inclusive. When not present, the values of pps_cb_beta_offset_div2 and pps_cb_tc_offset_div2 are both inferred to be equal to 0.

pps_cr_beta_offset_div2 and pps_cr_tc_offset_div2 specify the default deblocking parameter offsets for β and tC (divided by 2) that are applied to the Cr component for slices referring to the PPS, unless the default deblocking parameter offsets are overridden by the deblocking parameter offsets present in the picture headers or the slice headers of the slices referring to the PPS. The values of pps_cr_beta_offset_div2 and pps_cr_tc_offset_div2 shall both be in the range of −12 to 12, inclusive. When not present, the values of pps_cr_beta_offset_div2 and pps_cr_tc_offset_div2 are both inferred to be equal to 0.

rpl_info_in_ph_flag equal to 1 specifies that reference picture list information is present in the PH syntax structure and not present in slice headers referring to the PPS that do not contain a PH syntax structure. rpl_info_in_ph_flag equal to 0 specifies that reference picture list information is not present in the PH syntax structure and may be present in slice headers referring to the PPS that do not contain a PH syntax structure.

dbf_info_in_ph_flag equal to 1 specifies that deblocking filter information is present in the PH syntax structure and not present in slice headers referring to the PPS that do not contain a PH syntax structure. dbf_info_in_ph flag equal to 0 specifies that deblocking filter information is not present in the PH syntax structure and may be present in slice headers referring to the PPS that do not contain a PH syntax structure. When not present, the value of dbf_info_in_ph flag is inferred to be equal to 0.

sao_info_in_ph_flag equal to 1 specifies that SAO filter information is present in the PH syntax structure and not present in slice headers referring to the PPS that do not contain a PH syntax structure. sao_info_in_ph flag equal to 0 specifies that SAO filter information is not present in the PH syntax structure and may be present in slice headers referring to the PPS that do not contain a PH syntax structure.

alf_info_in_ph_flag equal to 1 specifies that ALF information is present in the PH syntax structure and not present in slice headers referring to the PPS that do not contain a PH syntax structure. alf_info_in_ph_flag equal to 0 specifies that ALF information is not present in the PH syntax structure and may be present in slice headers referring to the PPS that do not contain a PH syntax structure.

wp_info_in_ph_flag equal to 1 specifies that weighted prediction information may be present in the PH syntax structure and not present in slice headers referring to the PPS that do not contain a PH syntax structure. wp_info_in_ph_flag equal to 0 specifies that weighted prediction information is not present in the PH syntax structure and may be present in slice headers referring to the PPS that do not contain a PH syntax structure. When not present, the value of wp_info_in_ph_flag is inferred to be equal to 0.

qp_delta_info_in_ph_flag equal to 1 specifies that QP delta information is present in the PH syntax structure and not present in slice headers referring to the PPS that do not contain a PH syntax structure. qp_delta_info_in_ph_flag equal to 0 specifies that QP delta information is not present in the PH syntax structure and may be present in slice headers referring to the PPS that do not contain a PH syntax structure.

pps_ref_wraparound_enabled_flag equal to 1 specifies that horizontal wrap-around motion compensation is applied in inter prediction. pps_ref_wraparound_enabled_flag equal to 0 specifies that horizontal wrap-around motion compensation is not applied. When the value of CtbSizeY/MinCbSizeY+1 is greater than pic_width_in_luma_samples/MinCbSizeY−1, the value of pps_ref_wraparound_enabled_flag shall be equal to 0. When sps_ref_wraparound_enabled_flag is equal to 0, the value of pps_ref_wraparound_enabled_flag shall be equal to 0.

pps_ref_wraparound_offset plus (CtbSizeY/MinCbSizeY)+2 specifies the offset used for computing the horizontal wrap-around position in units of MinCbSizeY luma samples. The value of pps_ref_wraparound_offset shall be in the range of 0 to (pic_width_in_luma_samples/MinCbSizeY)−(CtbSizeY/MinCbSizeY)−2, inclusive.

The variable PpsRefWraparoundOffset is set equal to pps_ref_wraparound_offset+(CtbSizeY/MinCbSizeY)+2.

picture_header_extension_present_flag equal to 0 specifies that no PH extension syntax elements are present in PHs referring to the PPS. picture_header_extension_present_flag equal to 1 specifies that PH extension syntax elements are present in PHs referring to the PPS. picture_header_extension_present_flag shall be equal to 0 in bitstreams conforming to this version of this Specification.

slice_header_extension_present_flag equal to 0 specifies that no slice header extension syntax elements are present in the slice headers for coded pictures referring to the PPS. slice_header_extension_present_flag equal to 1 specifies that slice header extension syntax elements are present in the slice headers for coded pictures referring to the PPS. slice_header_extension_present_flag shall be equal to 0 in bitstreams conforming to this version of this Specification.

pps_extension_flag equal to 0 specifies that no pps_extension_data_flag syntax elements are present in the PPS RBSP syntax structure. pps_extension_flag equal to 1 specifies that there are pps_extension_data_flag syntax elements present in the PPS RBSP syntax structure.

pps_extension_data_flag may have any value. Its presence and value do not affect decoder conformance to profiles specified in this version of this Specification. Decoders conforming to this version of this Specification shall ignore all pps_extension_data_flag syntax elements.

3.7. APS Syntax and Semantics

In the latest VVC draft text, the APS syntax and semantics are as follows:

| | Descriptor |
|---|---|
| adaptation_parameter_set_rbsp( ) { | |
|   adaptation_parameter_set_id | u(5) |
|   aps_params_type | u(3) |
|   if( aps_params_type = = ALF_APS ) | |
|     alf_data( ) | |
|   else if( aps_params_type = = LMCS_APS ) | |
|     lmcs_data( ) | |
|   else if( aps_params_type = = SCALING_APS ) | |
|     scaling_list_data( ) | |
|   aps_extension_flag | u(1) |
|   if( aps_extension_flag ) | |
|     while( more_rbsp_data( ) ) | |
|       aps_extension_data_flag | u(1) |
|   rbsp_trailing_bits( ) | |
| } | |

The APS RBSP contains a ALF syntax structure, i.e., alf_data( ).

| | Descriptor |
|---|---|
| alf_data( ) { | |
|   alf_luma_filter_signal_flag | u(1) |
|   alf_chroma_filter_signal_flag | u(1) |
|   alf_cc_cb_filter_signal_flag | u(1) |
|   alf_cc_cr_filter_signal_flag | u(1) |
|   if( alf_luma_filter_signal_flag ) { | |
|     alf_luma_clip_flag | u(1) |
|     alf_luma_num_filters_signalled_minus1 | ue(v) |
|     if( alf_luma_num_filters_signalled_minus1 > 0 ) | |
|       for( filtIdx = 0; filtIdx < NumAlfFilters; filtIdx++ ) | |
|         alf_luma_coeff_delta_idx[ filtIdx ] | u(v) |
|     for( sfIdx = 0; sfIdx <= alf_luma_num_filters_signalled_minus1; sfIdx++ ) | |
|       for( j = 0; j < 12; j++ ) { | |
|         alf_luma_coeff_abs[ sfIdx ][ j ] | ue(v) |
|         if( alf_luma_coeff_abs[ sfIdx ][ j ] ) | |
|           alf_luma_coeff_sign[ sfIdx ][ j ] | u(1) |
|       } | |
|     if( alf_luma_clip_flag ) | |
|       for( sfIdx = 0; sfIdx <= alf_luma_num_filters_signalled_minus1; sfIdx++ ) | |
|         for( j = 0; j < 12; j++ ) | |
|           alf_luma_clip_idx[ sfIdx ][ j ] | u(2) |
|   } | |
|   if( alf_chroma_filter_signal_flag ) { | |
|     alf_chroma_clip_flag | u(1) |
|     alf_chroma_num_alt_filters_minus1 | ue(v) |
|     for( altIdx = 0; altIdx <= alf_chroma_num_alt_filters_minus1; altIdx++ ) { | |
|       for( j = 0; j < 6; j++ ) { | |
|         alf_chroma_coeff_abs[ altIdx ][ j ] | ue(v) |
|         if( alf_chroma_coeff_abs[ altIdx ][ j ] > 0 ) | |
|           alf_chroma_coeff_sign[ altIdx ][ j ] | u(1) |
|       } | |
|       if( alf_chroma_clip_flag ) | |
|         for( j = 0; j < 6; j++ ) | |
|           alf_chroma_clip_idx[ altIdx ][ j ] | u(2) |
|     } | |
|   } | |
|   if( alf_cc_cb_filter_signal_flag ) { | |
|     alf_cc_cb_filters_signalled_minus1 | ue(v) |
|     for( k = 0; k < alf_cc_cb_filters_signalled_minus1 + 1; k++ ) { | |
|       for( j = 0; j < 7; j++ ) { | |
|         alf_cc_cb_mapped_coeff_abs[ k ][ j ] | u(3) |
|         if( alf_cc_cb_mapped_coeff_abs[ k ][ j ] ) | |
|           alf_cc_cb_coeff_sign[ k ][ j ] | u(1) |
|       } | |

-continued

| | Descriptor |
|---|---|
| `    }` | |
| `  }` | |
| `  if( alf_cc_cr_filter_signal_flag ) {` | |
| `    alf_cc_cr_filters_signalled_minus1` | ue(v) |
| `    for( k = 0; k < alf_cc_cr_filters_signalled_minus1 +` | |
| `1; k++ ) {` | |
| `      for( j = 0; j < 7; j++ ) {` | |
| `        alf_cc_cr_mapped_coeff_abs[ k ][ j ]` | u(3) |
| `        if( alf_cc_cr_mapped_coeff_abs[ k ][ j ] )` | |
| `          alf_cc_cr_coeff_sign[ k ][ j ]` | u(1) |
| `      }` | |
| `    }` | |
| `  }` | |
| `}` | |

The APS RBSP contains a LMCS syntax structure, i.e., lmcs_data( ).

| | Descriptor |
|---|---|
| `lmcs_data( ) {` | |
| `  lmcs_min_bin_idx` | ue(v) |
| `  lmcs_delta_max_bin_idx` | ue(v) |
| `  lmcs_delta_cw_prec_minus1` | ue(v) |
| `  for( i = lmcs_min_bin_idx; i <= LmcsMaxBinIdx; i++ ) {` | |
| `    lmcs_delta_abs_cw[ i ]` | u(v) |
| `    if( lmcs_delta_abs_cw[ i ] > 0 )` | |
| `      lmcs_delta_sign_cw_flag[ i ]` | u(1) |
| `  }` | |
| `  lmcs_delta_abs_crs` | u(3) |
| `  if( lmcs_delta_abs_crs > 0 )` | |
| `    lmcs_delta_sign_crs_flag` | u(1) |
| `}` | |

The APS RBSP contains a scaling list data syntax structure, i.e., scaling_list_data( ).

| | Descriptor |
|---|---|
| `scaling_list_data( ) {` | |
| `  scaling_matrix_for_lfnst_disabled_flag` | u(1) |
| `  scaling_list_chroma_present_flag` | u(1) |
| `  for( id = 0; id < 28; id ++ )` | |
| `    matrixSize = (id < 2 ) ? 2 : ( ( id < 8 ) ? 4 : 8 )` | |
| `    if( scaling_list_chroma_present_flag || ( id` | |
| `% 3 = = 2 ) || ( id = = 27 ) ) {` | |
| `      scaling_list_copy_mode_flag[ id ]` | u(1) |
| `      if( !scaling_list_copy_mode_flag[ id ] )` | |
| `        scaling_list_pred_mode_flag[ id ]` | u(1) |
| `      if( ( scaling_list_copy_mode_flag[ id ] ||` | |
| `scaling_list_pred_mode_flag[ id ] ) &&` | |
| `        id != 0 && id != 2 && id != 8 )` | |
| `        scaling_list_pred_id_delta[ id ]` | ue(v) |
| `      if( !scaling_list_copy_mode_flag[ id ] ) {` | |
| `        nextCoef = 0` | |
| `        if( id > 13 ) {` | |
| `          scaling_list_dc_coef[ id - 14 ]` | se(v) |
| `          nextCoef += scaling_list_dc_coef[ id - 14 ]` | |
| `        }` | |
| `        for( i = 0; i < matrixSize * matrixSize; i++ ) {` | |
| `          x = DiagScanOrder[ 3 ][ 3 ][ i ][ 0 ]` | |
| `          y = DiagScanOrder[ 3 ][ 3 ][ i ][ 1 ]` | |
| `          if( !( id > 25 && x >= 4 && y >= 4 ) ) {` | |
| `            scaling_list_delta_coef[ id ][ i ]` | se(v) |
| `            nextCoef += scaling_list_delta_coef[ id ][ i ]` | |
| `          }` | |

-continued

| | Descriptor |
|---|---|
| `          ScalingList[ id ][ i ] = nextCoef` | |
| `        }` | |
| `      }` | |
| `    }` | |
| `  }` | |
| `}` | |

Each APS RBSP shall be available to the decoding process prior to it being referenced, included in at least one AU with TemporalId less than or equal to the TemporalId of the coded slice NAL unit that refers it or provided through external means.

All APS NAL units with a particular value of adaptation_parameter_set_id and a particular value of aps_params_type within a PU, regardless of whether they are prefix or suffix APS NAL units, shall have the same content.

adaptation_parameter_set_id provides an identifier for the APS for reference by other syntax elements.

When aps_params_type is equal to ALF APS or SCALING APS, the value of adaptation_parameter_set_id shall be in the range of 0 to 7, inclusive.

When aps_params_type is equal to LMCS APS, the value of adaptation_parameter_set_id shall be in the range of 0 to 3, inclusive.

Let apsLayerId be the value of the nuh_layer_id of a particular APS NAL unit, and vclLayerId be the value of the nuh_layer_id of a particular VCL NAL unit. The particular VCL NAL unit shall not refer to the particular APS NAL unit unless apsLayerId is less than or equal to vclLayerId and the layer with nuh_layer_id equal to apsLayerId is included in at least one OLS that includes the layer with nuh_layer_id equal to vclLayerId.

aps_params_type specifies the type of APS parameters carried in the APS as specified in Table 6.

TABLE 6

APS parameters type codes and types of APS parameters

| aps_params_type | Name of aps_params_type | Type of APS parameters |
|---|---|---|
| 0 | ALF_APS | ALF parameters |
| 1 | LMCS_APS | LMCS parameters |
| 2 | SCALING_APS | Scaling list parameters |
| 3 . . . 7 | Reserved | Reserved |

All APS NAL units with a particular value of aps_params_type, regardless of the nuh_layer_id values, share the same value space for adaptation_parameter_set_id. APS NAL units with different values of aps_params_type use separate values spaces for adaptation_parameter_set_id.

NOTE 1—An APS NAL unit (with a particular value of adaptation_parameter_set_id and a particular value of aps_params_type) can be shared across pictures, and different slices within a picture can refer to different ALF APSs.

NOTE 2—A suffix APS NAL unit associated with a particular VCL NAL unit (this VCL NAL unit precedes the suffix APS NAL unit in decoding order) is not for use by the particular VCL NAL unit, but for use by VCL NAL units following the suffix APS NAL unit in decoding order.

aps_extension_flag equal to 0 specifies that no aps_extension_data_flag syntax elements are present in the APS RBSP syntax structure. aps_extension_flag equal to 1 specifies that there are aps_extension_data_flag syntax elements present in the APS RBSP syntax structure.

aps_extension_data_flag may have any value. Its presence and value do not affect decoder conformance to profiles specified in this version of this Specification. Decoders conforming to this version of this Specification shall ignore all aps_extension_data_flag syntax elements.

alf_luma_filter_signal_flag equal to 1 specifies that a luma filter set is signalled. alf_luma_filter_signal_flag equal to 0 specifies that a luma filter set is not signalled.

alf_chroma_filter_signal_flag equal to 1 specifies that a chroma filter is signalled. alf_chroma_filter_signal_flag equal to 0 specifies that a chroma filter is not signalled. When ChromaArrayType is equal to 0, alf_chroma_filter_signal_flag shall be equal to 0.

At least one of the values of alf_luma_filter_signal_flag, alf_chroma_filter_signal_flag, alf_cc_cb_filter_signal_flag and alf_cc_cr_filter_signal_flag shall be equal to 1.

The variable NumAlfFilters specifying the number of different adaptive loop filters is set equal to 25.

alf_luma_clip_flag equal to 0 specifies that linear adaptive loop filtering is applied on luma component. alf_luma_clip_flag equal to 1 specifies that non-linear adaptive loop filtering may be applied on luma component.

alf_luma_num_filters_signalled_minus1 plus 1 specifies the number of adaptive loop filter classes for which luma coefficients can be signalled. The value of alf_luma_num_filters_signalled_minus1 shall be in the range of 0 to NumAlfFilters−1, inclusive.

alf_luma_coeff_delta_idx[filtIdx] specifies the indices of the signalled adaptive loop filter luma coefficient deltas for the filter class indicated by filtIdx ranging from 0 to NumAlf-Filters−1. When alf_luma_coeff_delta_idx[filtIdx] is not present, it is inferred to be equal to 0. The length of alf_luma_coeff_delta_idx[filtIdx] is Ceil(Log 2(alf_luma_num_filters_signalled_minus1+1)) bits. The value of alf_luma_coeff_delta_idx[filtIdx] shall be in the range of 0 to alf_luma_num_filters_signalled_minus1, inclusive.

alf_luma_coeff_abs[sfIdx][j] specifies the absolute value of the j-th coefficient of the signalled luma filter indicated by sfIdx. When alf_luma_coeff_abs[sfIdx][j] is not present, it is inferred to be equal 0. The value of alf_luma_coeff_abs[sfIdx][j] shall be in the range of 0 to 128, inclusive.

alf_luma_coeff_sign[sfIdx][j] specifies the sign of the j-th luma coefficient of the filter indicated by sfIdx as follows:
- If alf_luma_coeff_sign[sfIdx][j] is equal to 0, the corresponding luma filter coefficient has a positive value.
- Otherwise (alf_luma_coeff_sign[sfIdx][j] is equal to 1), the corresponding luma filter coefficient has a negative value.

When alf_luma_coeff_sign[sfIdx][j] is not present, it is inferred to be equal to 0. The variable filtCoeff[sfIdx][j] with sfIdx=0 . . . alf_luma_num_filters_signalled_minus1, j=0 . . . 11 is initialized as follows:

$$\text{filtCoeff}[sfIdx][j]=\text{alf\_luma\_coeff\_abs}[sfIdx][j]*(1-2*\text{alf\_luma\_coeff\_sign}[sfIdx][j]) \quad (93)$$

The luma filter coefficients $AlfCoeff_L$[adaptation_parameter_set_id] with elements $AlfCoeff_L$[adaptation_parameter_set_id][filtIdx][j], with filtIdx=0 . . . NumAlfFilters−1 and j=0 . . . 11 are derived as follows:

$$AlfCoeff_L[\text{adaptation\_parameter\_set\_id}][\text{filtIdx}][j]=\text{filtCoeff}[\text{alf\_luma\_coeff\_delta\_idx}[\text{filtIdx}]][j] \quad (94)$$

The fixed filter coefficients AlfFixFiltCoeff[i][j] with i=0 . . . 64, j=0 . . . 11 and the class to filter mapping AlfClassToFiltMap[m][n] with m=0 . . . 15 and n=0 . . . 24 are derived as follows:

```
AlfFixFiltCoeff =   (95)
  {
    { 0, 0, 2, -3, 1, -4, 1, 7, -1, 1, -1, 5}
    { 0, 0, 0, 0, 0, -1, 0, 1, 0, 0, -1, 2}
    { 0, 0, 0, 0, 0, 0, 0, 1, 0, 0, 0, 0}
    { 0, 0, 0, 0, 0, 0, 0, 0, 0, 0, -1, 1}
    { 2, 2, -7, -3, 0, -5, 13, 22, 12, -3, -3, 17}
    {-1, 0, 6, -8, 1, -5, 1, 23, 0, 2, -5, 10}
    { 0, 0, -1, -1, 0, -1, 2, 1, 0, 0, -1, 4}
    { 0, 0, 3, -11, 1, 0, -1, 35, 5, 2, -9, 9}
    { 0, 0, 8, -8, -2, -7, 4, 4, 2, 1, -1, 25}
    { 0, 0, 1, -1, 0, -3, 1, 3, -1, 1, -1, 3}
    { 0, 0, 3, -3, 0, -6, 5, -1, 2, 1, -4, 21}
    {-7, 1, 5, 4, -3, 5, 11, 13, 12, -8, 11, 12}
    {-5, -3, 6, -2, -3, 8, 14, 15, 2, -7, 11, 16}
    { 2, -1, -6, -5, -2, -2, 20, 14, -4, 0, -3, 25}
    { 3, 1, -8, -4, 0, -8, 22, 5, -3, 2, -10, 29}
    { 2, 1, -7, -1, 2, -11, 23, -5, 0, 2, -10, 29}
    {-6, -3, 8, 9, -4, 8, 9, 7, 14, -2, 8, 9}
    { 2, 1, -4, -7, 0, -8, 17, 22, 1, -1, -4, 23}
    { 3, 0, -5, -7, 0, -7, 15, 18, -5, 0, -5, 27}
    { 2, 0, 0, -7, 1, -10, 13, 13, -4, 2, -7, 24}
    { 3, 3, -13, 4, -2, -5, 9, 21, 25, -2, -3, 12}
    {-5, -2, 7, -3, -7, 9, 8, 9, 16, -2, 15, 12}
    { 0, -1, 0, -7, -5, 4, 11, 11, 8, -6, 12, 21}
    { 3, -2, -3, -8, -4, -1, 16, 15, -2, -3, 3, 26}
    { 2, 1, -5, -4, -1, -8, 16, 4, -2, 1, -7, 33}
    { 2, 1, -4, -2, 1, -10, 17, -2, 0, 2, -11, 33}
    { 1, -2, 7, -15, -16, 10, 8, 8, 20, 11, 14, 11}
    { 2, 2, 3, -13, -13, 4, 8, 12, 2, -3, 16, 24}
    { 1, 4, 0, -7, -8, -4, 9, 9, -2, -2, 8, 29}
    { 1, 1, 2, -4, -1, -6, 6, 3, -1, -1, -3, 30}
    {-7, 3, 2, 10, -2, 3, 7, 11, 19, -7, 8, 10}
    { 0, -2, -5, -3, -2, 4, 20, 15, -1, -3, -1, 22}
    { 3, -1, -8, -4, -1, -4, 22, 8, -4, 2, -8, 28}
    { 0, 3, -14, 3, 0, 1, 19, 17, 8, -3, -7, 20}
    { 0, 2, -1, -8, 3, -6, 5, 21, 1, 1, -9, 13}
    {-4, -2, 8, 20, -2, 2, 3, 5, 21, 4, 6, 1}
    { 2, -2, -3, -9, -4, 2, 14, 16, 3, -6, 8, 24}
    { 2, 1, 5, -16, -7, 2, 3, 11, 15, -3, 11, 22}
    { 1, 2, 3, -11, -2, -5, 4, 8, 9, -3, -2, 26}
    { 0, -1, 10, -9, -1, -8, 2, 3, 4, 0, 0, 29}
    { 1, 2, 0, -5, 1, -9, 9, 3, 0, 1, -7, 20}
    {-2, 8, -6, -4, 3, -9, -8, 45, 14, 2, -13, 7}
    { 1, -1, 16, -19, -8, -4, -3, 2, 19, 0, 4, 30}
    { 1, 1, -3, 0, 2, -11, 15, -5, 1, 2, -9, 24}
    { 0, 1, -2, 0, 1, -4, 4, 0, 0, 1, -4, 7}
    { 0, 1, 2, -5, 1, -6, 4, 10, -2, 1, -4, 10}
    { 3, 0, -3, -6, -2, -6, 14, 8, -1, -1, -3, 31}
    { 0, 1, 0, -2, 1, -6, 5, 1, 0, 1, -5, 13}
    { 3, 1, 9, -19, -21, 9, 7, 6, 13, 5, 15, 21}
    { 2, 4, 3, -12, -13, 1, 7, 8, 3, 0, 12, 26}
    { 3, 1, -8, -2, 0, -6, 18, 2, -2, 3, -10, 23}
    { 1, 1, -4, -1, 1, -5, 8, 1, -1, 2, -5, 10}
    { 0, 1, -1, 0, 0, -2, 2, 0, 0, 1, -2, 3}
    { 1, 1, -2, -7, 1, -7, 14, 18, 0, 0, -7, 21}
    { 0, 1, 0, -2, 0, -7, 8, 1, -2, 0, -3, 24}
    { 0, 1, 1, -2, 2, -10, 10, 0, -2, 1, -7, 23}
    { 0, 2, 2, -11, 2, -4, -3, 39, 7, 1, -10, 9}
    { 1, 0, 13, -16, -5, -6, -1, 8, 6, 0, 6, 29}
    { 1, 3, 1, -6, -4, -7, 9, 6, -3, -2, 3, 33}
    { 4, 0, -17, -1, -1, 5, 26, 8, -2, 3, -15, 30}
    { 0, 1, -2, 0, 2, -8, 12, -6, 1, 1, -6, 16}
    { 0, 0, 0, -1, 1, -4, 4, 0, 0, 0, -3, 11}
    { 0, 1, 2, -8, 2, -6, 5, 15, 0, 2, -7, 9}
    { 1, -1, 12, -15, -7, -2, 3, 6, 6, -1, 7, 30}
  },
AlfClassToFiltMap =   (96)
  {
    { 8, 2, 2, 2, 3, 4, 53, 9, 9, 52, 4, 4, 5, 9, 2,
      8, 10, 9, 1, 3, 39, 39, 10, 9, 52 }
    { 11, 12, 13, 14, 15, 30, 11, 17, 18, 19, 16, 20, 20, 4, 53,
      21, 22, 23, 14, 25, 26, 26, 27, 28, 10 }
    { 16, 12, 31, 32, 14, 16, 30, 33, 53, 34, 35, 16, 20, 4, 7,
      16, 21, 36, 18, 19, 21, 26, 37, 38, 39 }
```

-continued

```
  { 35, 11, 13, 14, 43, 35, 16, 4, 34, 62, 35, 35, 30, 56, 7,
35, 21, 38, 24, 40, 16, 21, 48, 57, 39 }
  { 11, 31, 32, 43, 44, 16, 4, 17, 34, 45, 30, 20, 20, 7, 5,
21, 22, 46, 40, 47, 26, 48, 63, 58, 10 }
  { 12, 13, 50, 51, 52, 11, 17, 53, 45, 9, 30, 4, 53, 19, 0,
22, 23, 25, 43, 44, 37, 27, 28, 10, 55 }
  { 30, 33, 62, 51, 44, 20, 41, 56, 34, 45, 20, 41, 41, 56, 5,
30, 56, 38, 40, 47, 11, 37, 42, 57, 8 }
  { 35, 11, 23, 32, 14, 35, 20, 4, 17, 18, 21, 20, 20, 4,
16, 21, 36, 46, 25, 41, 26, 48, 49, 58 }
  { 12, 31, 59, 59, 3, 33, 33, 59, 59, 52, 4, 33, 17, 59, 55,
22, 36, 59, 59, 60, 22, 36, 59, 25, 55 }
  { 31, 25, 15, 60, 60, 22, 17, 19, 55, 55, 20, 20, 53, 19, 55,
22, 46, 25, 43, 60, 37, 28, 10, 55, 52 }
  { 12, 31, 32, 50, 51, 11, 33, 53, 19, 45, 16, 4, 4, 53, 5,
22, 36, 18, 25, 43, 26, 27, 27, 28, 10 }
  { 5, 2, 44, 52, 3, 4, 53, 45, 9, 3, 4, 56, 5, 0, 2,
5, 10, 47, 52, 3, 63, 39, 10, 9, 52 }
  { 12, 34, 44, 44, 3, 56, 56, 62, 45, 9, 56, 56, 7, 5, 0,
22, 38, 40, 47, 52, 48, 57, 39, 10, 9 }
  { 35, 11, 23, 14, 51, 35, 20, 41, 56, 62, 16, 20, 41, 56, 7,
16, 21, 38, 24, 40, 26, 26, 42, 57, 39 }
  { 33, 34, 51, 51, 52, 41, 41, 34, 62, 0, 41, 41, 56, 7, 5,
56, 38, 38, 40, 44, 37, 42, 57, 39, 10 }
  { 16, 31, 32, 15, 60, 30, 4, 17, 19, 25, 22, 20, 4, 53, 19,
21, 22, 46, 25, 55, 26, 48, 63, 58, 55 }
},
```

It is a requirement of bitstream conformance that the values of $AlfCoeff_L$[adaptation_parameter_set_id][filtIdx][j] with filtIdx=0 . . . NumAlfFilters−1, j=0 . . . 11 shall be in the range of $-2^7$ to $2^7-1$, inclusive.

alf_luma_clip_idx[sfIdx][j] specifies the clipping index of the clipping value to use before multiplying by the j-th coefficient of the signalled luma filter indicated by sfIdx. It is a requirement of bitstream conformance that the values of alf_luma_clip_idx[sfIdx][j] with sfIdx=0 . . . alf_luma_num_filters_signalled_minus1 and j=0 . . . 11 shall be in the range of 0 to 3, inclusive.

The luma filter clipping values $AlfClip_L$[adaptation_parameter_set_id] with elements $AlfClip_L$[adaptation_parameter_set_id][filtIdx][j], with filtIdx=0 . . . NumAlfFilters−1 and j=0 . . . 11 are derived as specified in Table 8 depending on BitDepth and clipIdx set equal to alf_luma_clip_idx[alf_luma_coeff_delta_idx[filtIdx]][j].

alf_chroma_clip_flag equal to 0 specifies that linear adaptive loop filtering is applied on chroma components; alf_chroma_clip_flag equal to 1 specifies that non-linear adaptive loop filtering is applied on chroma components. When not present, alf_chroma_clip_flag is inferred to be equal to 0.

alf_chroma_num_alt_filters_minus1 plus 1 specifies the number of alternative filters for chroma components. The value of alf_chroma_num_alt_filters_minus1 shall be in the range of 0 to 7, inclusive.

alf_chroma_coeff_abs[altIdx][j] specifies the absolute value of the j-th chroma filter coefficient for the alternative chroma filter with index altIdx. When alf_chroma_coeff_abs[altIdx][j] is not present, it is inferred to be equal 0. The value of alf_chroma_coeff_abs[sfIdx][j] shall be in the range of 0 to 128, inclusive.

alf_chroma_coeff_sign[altIdx][j] specifies the sign of the j-th chroma filter coefficient for the alternative chroma filter with index altIdx as follows:
  If alf_chroma_coeff_sign[altIdx][j] is equal to 0, the corresponding chroma filter coefficient has a positive value.
  Otherwise (alf_chroma_coeff_sign[altIdx][j] is equal to 1), the corresponding chroma filter coefficient has a negative value.

When alf_chroma_coeff_sign[altIdx][j] is not present, it is inferred to be equal to 0.

The chroma filter coefficients $AlfCoeff_C$[adaptation_parameter_set_id][altIdx] with elements $AlfCoeff_C$[adaptation_parameter_set_id][altIdx][j], with altIdx=0 . . . alf_chroma_num_alt_filters_minus1, j=0 . . . 5 are derived as follows:

$$AlfCoeff_C[\text{adaptation\_parameter\_set\_id}][\text{altIdx}][j] = \text{alf\_chroma\_coeff\_abs}[\text{altIdx}][j] * (1 - 2 * \text{alf\_chroma\_coeff\_sign}[\text{altIdx}][j]) \quad (97)$$

It is a requirement of bitstream conformance that the values of $AlfCoeff_C$[adaptation_parameter_set_id][altIdx][j] with altIdx=0 . . . alf_chroma_num_alt_filters_minus1, j=0 . . . 5 shall be in the range of $-2^7$ to $2^7-1$, inclusive.

alf_cc_cb_filter_signal_flag equal to 1 specifies that cross-component filters for the Cb colour component are signalled. alf_cc_cb_filter_signal_flag equal to 0 specifies that cross-component filters for Cb colour component are not signalled. When ChromaArrayType is equal to 0, alf_cc_cb_filter_signal_flag shall be equal to 0.

alf_cc_cb_filters_signalled_minus1 plus 1 specifies the number of cross-component filters for the Cb colour component signalled in the current ALF APS. The value of alf_cc_cb_filters_signalled_minus1 shall be in the range of 0 to 3, inclusive.

alf_cc_cb_mapped_coeff_abs[k][j] specifies the absolute value of the j-th mapped coefficient of the signalled k-th cross-component filter for the Cb colour component. When alf_cc_cb_mapped_coeff_abs[k][j] is not present, it is inferred to be equal to 0.

alf_cc_cb_coeff_sign[k][j] specifies the sign of the j-th coefficient of the signalled k-th cross-component filter for the Cb colour component as follows:
  If alf_cc_cb_coeff_sign[k][j] is equal to 0, the corresponding cross-component filter coefficient has a positive value.
  Otherwise (alf_cc_cb_sign[k][j] is equal to 1), the corresponding cross-component filter coefficient has a negative value.

When alf_cc_cb_coeff_sign[k][j] is not present, it is inferred to be equal to 0. The signalled k-th cross-component filter coefficients for the Cb colour component $CcAlfApsCoeff_{Cb}$[adaptation_parameter_set_id][k][j], with j=0 . . . 6 are derived as follows:
  If alf_cc_cb_mapped_coeff_abs[k][j] is equal to 0, $CcAlfApsCoeff_{Cb}$[adaptation_parameter_set_id][k][j] is set equal to 0.
  Otherwise, $CcAlfApsCoeff_{Cb}$[adaptation_parameter_set_id][k][j] is set equal to $(1-2*\text{alf\_cc\_cb\_coeff\_sign}[k][j])*2^{\text{alf\_cc\_cb\_mapped\_coeff\_abs}[k][j]-1}$.

alf_cc_cr_filter_signal_flag equal to 1 specifies that cross-component filters for the Cr colour component are signalled. alf_cc_cr_filter_signal_flag equal to 0 specifies that cross-component filters for the Cr colour component are not signalled. When ChromaArrayType is equal to 0, alf_cc_cr_filter_signal_flag shall be equal to 0.

alf_cc_cr_filters_signalled_minus1 plus 1 specifies the number of cross-component filters for the Cr colour component signalled in the current ALF APS. The value of alf_cc_cr_filters_signalled_minus1 shall be in the range of 0 to 3, inclusive.

alf_cc_cr_mapped_coeff_abs[k][j] specifies the absolute value of the j-th mapped coefficient of the signalled k-th cross-component filter for the Cr colour component. When alf_cc_cr_mapped_coeff_abs[k][j] is not present, it is inferred to be equal to 0.

alf_cc_cr_coeff_sign[k][j] specifies the sign of the j-th coefficient of the signalled k-th cross-component filter for the Cr colour component as follows:
- If alf_cc_cr_coeff_sign[k][j] is equal to 0, the corresponding cross-component filter coefficient has a positive value.
- Otherwise (alf_cc_cr_sign[k][j] is equal to 1), the corresponding cross-component filter coefficient has a negative value.

When alf_cc_cr_coeff_sign[k][j] is not present, it is inferred to be equal to 0.

The signalled k-th cross-component filter coefficients for the Cr colour component CcAlfApsCoeff$_{Cr}$[adaptation_parameter_set_id][k][j], with j=0 ... 6 are derived as follows:
- If alf_cc_cr_mapped_coeff_abs[k][j] is equal to 0, CcAlfApsCoeff$_{Cr}$[adaptation_parameter_set_id][k][j] is set equal to 0.
- Otherwise, CcAlfApsCoeff$_{Cr}$[adaptation_parameter_set_id][k][j] is set equal to $(1-2*\text{alf\_cc\_cr\_coeff\_sign}[k][j])*2^{\text{alf\_cc\_cr\_mapped\_coeff\_abs}[k][j]-1}$.

alf_chroma_clip_idx[altIdx][j] specifies the clipping index of the clipping value to use before multiplying by the j-th coefficient of the alternative chroma filter with index altIdx. It is a requirement of bitstream conformance that the values of alf_chroma_clip_idx[altIdx][j] with altIdx=0 ... alf_chroma_num_alt_filters_minus1, j=0 ... 5 shall be in the range of 0 to 3, inclusive. The chroma filter clipping values AlfClip$_C$[adaptation_parameter_set_id][altIdx] with elements AlfClip$_C$[adaptation_parameter_set_id][altIdx][j], with altIdx=0 ... alf_chroma_num_alt_filters_minus1, j=0 ... 5 are derived as specified in Table 8 depending on BitDepth and clipIdx set equal to alf_chroma_clip_idx[altIdx][j].

TABLE 8

Specification AlfClip depending on BitDepth and clipIdx

| BitDepth | clipIdx | | | |
|---|---|---|---|---|
| | 0 | 1 | 2 | 3 |
| 8 | $2^8$ | $2^5$ | $2^3$ | $2^1$ |
| 9 | $2^9$ | $2^6$ | $2^4$ | $2^2$ |
| 10 | $2^{10}$ | $2^7$ | $2^5$ | $2^3$ |
| 11 | $2^{11}$ | $2^8$ | $2^6$ | $2^4$ |
| 12 | $2^{12}$ | $2^9$ | $2^7$ | $2^5$ |
| 13 | $2^{13}$ | $2^{10}$ | $2^8$ | $2^6$ |
| 14 | $2^{14}$ | $2^{11}$ | $2^9$ | $2^7$ |
| 15 | $2^{15}$ | $2^{12}$ | $2^{10}$ | $2^8$ |
| 16 | $2^{16}$ | $2^{13}$ | $2^{11}$ | $2^9$ | lmcs_min_bin_idx specifies the minimum bin index used in the luma mapping with chroma scaling construction process. The value of lmcs_min_bin_idx shall be in the range of 0 to 15, inclusive.

lmcs_delta_max_bin_idx specifies the delta value between 15 and the maximum bin index LmcsMaxBinIdx used in the luma mapping with chroma scaling construction process. The value of lmcs_delta_max_bin_idx shall be in the range of 0 to 15, inclusive. The value of LmcsMaxBinIdx is set equal to 15−lmcs_delta_max_bin_idx. The value of LmcsMaxBinIdx shall be greater than or equal to lmcs_min_bin_idx.

lmcs_delta_cw_prec_minus1 plus 1 specifies the number of bits used for the representation of the syntax lmcs_delta_abs_cw[i]. The value of lmcs_delta_cw_prec_minus1 shall be in the range of 0 to BitDepth−2, inclusive.

lmcs_delta_abs_cw[i] specifies the absolute delta codeword value for the ith bin.

lmcs_delta_sign_cw_flag[i] specifies the sign of the variable lmcsDeltaCW[i] as follows:
- If lmcs_delta_sign_cw_flag[i] is equal to 0, lmcsDeltaCW[i] is a positive value.
- Otherwise (lmcs_delta_sign_cw_flag[i] is not equal to 0), lmcsDeltaCW[i] is a negative value.

When lmcs_delta_sign_cw_flag[i] is not present, it is inferred to be equal to 0.

The variable OrgCW is derived as follows:

$$\text{OrgCW} = (1 << \text{BitDepth})/16 \qquad (98)$$

The variable lmcsDeltaCW[i], with i=lmcs_min_bin_idx ... LmcsMaxBinIdx, is derived as follows:

$$\text{lmcsDeltaCW}[i] = (1-2*\text{lmcs\_delta\_sign\_cw\_flag}[i])*\text{lmcs\_delta\_abs\_cw}[i] \qquad (99)$$

The variable lmcsCW[i] is derived as follows:
- For i=0 ... lmcs_min_bin_idx−1, lmcsCW[i] is set equal 0.
- For i=lmcs_min_bin_idx ... LmcsMaxBinIdx, the following applies:

$$\text{lmcsCW}[i] = \text{OrgCW} + \text{lmcsDeltaCW}[i] \qquad (100)$$

The value of lmcsCW[i] shall be in the range of (OrgCW>>3) to (OrgCW<<3−1), inclusive.
- For i=LmcsMaxBinIdx+1 ... 15, lmcsCW[i] is set equal 0.

It is a requirement of bitstream conformance that the following condition is true:

$$\sum_{i=0}^{15} lmcsCW[i] <= (1 << \text{BitDepth}) - 1 \qquad (101)$$

The variable InputPivot[i], with i=0 ... 16, is derived as follows:

$$\text{InputPivot}[i] = i*\text{OrgCW} \qquad (102)$$

The variable LmcsPivot[i] with i=0 ... 16, the variables ScaleCoeff[i] and InvScaleCoeff[i] with i=0 ... 15, are derived as follows:

```
LmcsPivot[ 0 ] = 0;
for( i = 0; i <= 15; i++ ) {
   LmcsPivot[ i + 1 ] = LmcsPivot[ i ] + lmcsCW[ i ]
   ScaleCoeff[ i ] = ( lmcsCW[ i ] * (1 << 11 ) + ( 1 <<
( Log2( OrgCW ) − 1 ) ) ) >> ( Log2( OrgCW ) )
   if( lmcsCW[ i ] = = 0 )                              (103)
      InvScaleCoeff[ i ] = 0
   else
      InvScaleCoeff[ i ] = OrgCW * ( 1 << 11 )/lmcsCW[ i ]
}
```

It is a requirement of bitstream conformance that, for i=lmcs_min_bin_idx ... LmcsMaxBinIdx, when the value of LmcsPivot[i] is not a multiple of 1<<(BitDepth−5), the value of (LmcsPivot[i]>>(BitDepth−5)) shall not be equal to the value of (LmcsPivot[i+1]>>(BitDepth−5)).

lmcs_delta_abs_crs specifies the absolute codeword value of the variable lmcsDeltaCrs. The value of lmcs_delta_abs_crs shall be in the range of 0 and 7, inclusive. When not present, lmcs_delta_abs_crs is inferred to be equal to 0.

lmcs_delta_sign_crs_flag specifies the sign of the variable lmcsDeltaCrs. When not present, lmcs_delta_sign_crs_flag is inferred to be equal to 0.

The variable lmcsDeltaCrs is derived as follows:

$$lmcsDeltaCrs=(1-2*lmcs\_delta\_sign\_crs\_flag)* \\ lmcs\_delta\_abs\_crs \quad (104)$$

It is a requirement of bitstream conformance that, when lmcsCW[i] is not equal to 0, (lmcsCW[i]+lmcsDeltaCrs) shall be in the range of (OrgCW>>3) to ((OrgCW<<3)−1), inclusive.

The variable ChromaScaleCoefft[i], with i=0 . . . 15, is derived as follows:

```
if( lmcsCW[ i ] = = 0 )
  ChromaScaleCoeff[i ]=( 1 <<11 )
else
  ChromaScaleCoeff[i ]=OrgCW *
  ( 1 <<11 )/( lmcsCW[i ]+
  lmcsDeltaCrs )
``` scaling_matrix_for_lfnst_disabled_flag equal to 1 specifies that scaling matrices are not applied to blocks coded with LFNST. scaling_matrix_for_lfnst_disabled_flag equal to 0 specifies that the scaling matrices may apply to the blocks coded with LFNST.

scaling_list_chroma_present_flag equal to 1 specifies that chroma scaling lists are present in scaling_list_data( ). scaling_list_chroma_present_flag equal to 0 specifies that chroma scaling lists are not present in scaling_list_data( ). It is a requirement of bitstream conformance that scaling_list_chroma_present_flag shall be equal to 0 when ChromaArrayType is equal to 0, and shall be equal to 1 when ChromaArrayType is not equal to 0.

scaling_list_copy_mode_flag[id] equal to 1 specifies that the values of the scaling list are the same as the values of a reference scaling list. The reference scaling list is specified by scaling_list_pred_id_delta[id]. scaling_list_copy_mode_flag[id] equal to 0 specifies that scaling_list_pred_mode flag is present.

scaling_list_pred_mode_flag[id] equal to 1 specifies that the values of the scaling list can be predicted from a reference scaling list. The reference scaling list is specified by scaling_list_pred_id_delta[id]. scaling_list_pred_mode flag[id] equal to 0 specifies that the values of the scaling list are explicitly signalled. When not present, the value of scaling_list_pred_mode flag[id] is inferred to be equal to 0.

scaling_list_pred_id_delta[id] specifies the reference scaling list used to derive the predicted scaling matrix ScalingMatrixPred[id]. When not present, the value of scaling_list_pred_id_delta[id] is inferred to be equal to 0. The value of scaling_list_pred_id_delta[id] shall be in the range of 0 to maxIdDelta with maxIdDelta derived depending on id as follows:

$$maxIdDelta=(id<2)?id:((id<8)?(id-2):(id-8)) \quad (106)$$

The variables refId and matrixSize are derived as follows:

$$refId=id-scaling\_list\_pred\_id\_delta[id] \quad (107)$$

$$matrixSize=(id<2)?2:((id<8)?4:8) \quad (108)$$

The (matrixSize)×(matrixSize) array ScalingMatrixPred[x][y] with x=0 . . . matrixSize−1, y=0 . . . matrixSize−1 and the variable ScalingMatrixDCPred are derived as follows:
When both scaling_list_copy_mode_flag[id] and scaling_list_pred_mode flag[id] are equal to 0, all elements of ScalingMatrixPred are set equal to 8, and the value of ScalingMatrixDCPred is set equal to 8.

Otherwise, when scaling_list_pred_id_delta[id] is equal to 0, all elements of ScalingMatrixPred are set equal to 16, and ScalingMatrixDCPred is set equal to 16.

Otherwise (either scaling_list_copy_mode_flag[id] or scaling_list_pred_mode flag[id] is equal to 1 and scaling_list_pred_id_delta[id] is greater than 0), ScalingMatrixPred is set equal to ScalingMatrixRec[refId], and the following applies for ScalingMatrixDCPred:
If refId is greater than 13, ScalingMatrixDCPred is set equal to ScalingMatrixDCRec[refId−14].
Otherwise (refId is less than or equal to 13), ScalingMatrixDCPred is set equal to ScalingMatrixPred[0][0].

scaling_list_dc_coef[id−14] is used to derive the value of the variable ScalingMatrixDC[id−14] when id is greater than 13 as follows:

$$ScalingMatrixDCRec[id-14]=(ScalingMatrixDCPred+scaling\_list\_dc\_coef[id-14])\&255 \quad (109)$$

When not present, the value of scaling_list_dc_coef[id−14] is inferred to be equal to 0. The value of scaling_list_dc_coef[id−14] shall be in the range of −128 to 127, inclusive. The value of ScalingMatrixDCRec[id−14] shall be greater than 0.

scaling_list_delta_coef[id][i] specifies the difference between the current matrix coefficient ScalingList[id][i] and the previous matrix coefficient ScalingList[id][i−1], when scaling_list_copy_mode_flag[id] is equal to 0. The value of scaling_list_delta_coef[id][i] shall be in the range of −128 to 127, inclusive. When scaling_list_copy_mode_flag[id] is equal to 1, all elements of ScalingList[id] are set equal to 0. The (matrixSize)×(matrixSize) array ScalingMatrixRec[id] is derived as follows:

$$ScalingMatrixRec[id][x][y]=(ScalingMatrixPred[x][y]+ScalingList[id][k])\& 255 \quad (110)$$

with k=0 . . . (matrixSize*matrixSize−1),
x=DiagScanOrder[Log 2(matrixSize)][Log 2(matrixSize)][k][0], and
y=DiagScanOrder[Log 2(matrixSize)][Log 2(matrixSize)][k][1] The value of ScalingMatrixRec[id][x][y] shall be greater than 0.

3.8. PH Syntax and Semantics

In the latest VVC draft text, the PH syntax and semantics are as follows:

| picture_header_rbsp( ) { | Descriptor |
|---|---|
| picture_header_structure( ) | |
| rbsp_trailing_bits( ) | |
| } | |

The PH RB SP contains a PH syntax structure, i.e., picture_header_structure( ).

| picture_header_structure( ) { | Descriptor |
|---|---|
| gdr_or_irap_pic_flag | u(1) |
| if( gdr_or_irap_pic_flag ) | |
|   gdr_pic_flag | u(1) |
| ph_inter_slice_allowed_flag | u(1) |
| if( ph_inter_slice_allowed_flag ) | |
|   ph_intra_slice_allowed_flag | u(1) |

-continued

| picture_header_structure( ) { | Descriptor |
|---|---|
| non_reference_picture_flag | u(1) |
| ph_pic_parameter_set_id | ue(v) |
| ph_pic_order_cnt_lsb | u(v) |
| if( gdr_or_irap_pic_flag ) | |
|   no_output_of_prior_pics_flag | u(1) |
| if( gdr_pic_flag ) | |
|   recovery_poc_cnt | ue(v) |
| for( i = 0; i < NumExtraPhBits; i++ ) | |
|   ph_extra_bit[ i ] | u(1) |
| if( sps_poc_msb_flag ) { | |
|   ph_poc_msb_present_flag | u(1) |
|   if( ph_poc_msb_present_flag ) | |
|     poc_msb_val | u(v) |
| } | |
| if( sps_alf_enabled_flag && alf_info_in_ph_flag ) { | |
|   ph_alf_enabled_flag | u(1) |
|   if( ph_alf_enabled_flag ) { | |
|     ph_num_alf_aps_ids_luma | u(3) |
|     for( i = 0; i < ph_num_alf_aps_ids_luma; i++ ) | |
|       ph_alf_aps_id_luma[ i ] | u(3) |
|     if( ChromaArrayType != 0 ) | |
|       ph_alf_chroma_idc | u(2) |
|     if( ph_alf_chroma_idc > 0 ) | |
|       ph_alf_aps_id_chroma | u(3) |
|     if( sps_ccalf_enabled_flag ) { | |
|       ph_cc_alf_cb_enabled_flag | u(1) |
|       if( ph_cc_alf_cb_enabled_flag ) | |
|         ph_cc_alf_cb_aps_id | u(3) |
|       ph_cc_alf_cr_enabled_flag | u(1) |
|       if( ph_cc_alf_cr_enabled_flag ) | |
|         ph_cc_alf_cr_aps_id | u(3) |
|     } | |
|   } | |
| } | |
| if( sps_lmcs_enabled_flag ) { | |
|   ph_lmcs_enabled_flag | u(1) |
|   if( ph_lmcs_enabled_flag ) { | |
|     ph_lmcs_aps_id | u(2) |
|     if( ChromaArrayType != 0 ) | |
|       ph_chroma_residual_scale_flag | u(1) |
|   } | |
| } | |
| if( sps_scaling_list_enabled_flag ) { | |
|   ph_scaling_list_present_flag | u(1) |
|   if( ph_scaling_list_present_flag ) | |
|     ph_scaling_list_aps_id | u(3) |
| } | |
| if( sps_virtual_boundaries_enabled_flag && !sps_virtual_boundaries_present_flag ) { | |
|   ph_virtual_boundaries_present_flag | u(1) |
|   if( ph_virtual_boundaries_present_flag ) { | |
|     ph_num_ver_virtual_boundaries | u(2) |
|     for( i = 0; i < ph_num_ver_virtual_boundaries; i++ ) | |
|       ph_virtual_boundaries_pos_x[ i ] | u(13) |
|     ph_num_hor_virtual_boundaries | u(2) |
|     for( i = 0; i < ph_num_hor_virtual_boundaries; i++ ) | |
|       ph_virtual_boundaries_pos_y[ i ] | u(13) |
|   } | |
| } | |
| if( output_flag_present_flag ) | |
|   pic_output_flag | u(1) |
| if( rpl_info_in_ph_flag ) | |
|   ref_pic_lists( ) | |
| if( partition_constraints_override_enabled_flag ) | |

-continued

| picture_header_structure( ) { | Descriptor |
|---|---|
|   partition_constraints_override_flag | u(1) |
| if( ph_intra_slice_allowed_flag ) { | |
|   if( partition_constraints_override_flag ) { | |
|     ph_log2_diff_min_qt_min_cb_intra_slice_luma | ue(v) |
|     ph_max_mtt_hierarchy_depth_intra_slice_luma | ue(v) |
|     if( ph_max_mtt_hierarchy_depth_intra_slice_luma != 0 ){ | |
|       ph_log2_diff_max_bt_min_qt_intra_slice_luma | ue(v) |
|       ph_log2_diff_max_tt_min_qt_intra_slice_luma | ue(v) |
|     } | |
|     if( qtbtt_dual_tree_intra_flag ) { | |
|       ph_log2_diff_min_qt_min_cb_intra_slice_chroma | ue(v) |
|       ph_max_mtt_hierarchy_depth_intra_slice_chroma | ue(v) |
|       if( ph_max_mtt_hierarchy_depth_intra_slice_chroma != 0 ) { | |
|         ph_log2_diff_max_bt_min_qt_intra_slice_chroma | ue(v) |
|         ph_log2_diff_max_tt_min_qt_intra_slice_chroma | ue(v) |
|       } | |
|     } | |
|   } | |
|   if( cu_qp_delta_enabled_flag ) | |
|     ph_cu_qp_delta_subdiv_intra_slice | ue(v) |
|   if( pps_cu_chroma_qp_offset_list_enabled_flag ) | |
|     ph_cu_chroma_qp_offset_subdiv_intra_slice | ue(v) |
| } | |
| if( ph_inter_slice_allowed_flag ) { | |
|   if( partition_constraints_override_flag ) { | |
|     ph_log2_diff_min_qt_min_cb_inter_slice | ue(v) |
|     ph_max_mtt_hierarchy_depth_inter_slice | ue(v) |
|     if( ph_max_mtt_hierarchy_depth_inter_slice != 0 ) { | |
|       ph_log2_diff_max_bt_min_qt_inter_slice | ue(v) |
|       ph_log2_diff_max_tt_min_qt_inter_slice | ue(v) |
|     } | |
|   } | |
|   if( cu_qp_delta_enabled_flag ) | |
|     ph_cu_qp_delta_subdiv_inter_slice | ue(v) |
|   if( pps_cu_chroma_qp_offset_list_enabled_flag ) | |
|     ph_cu_chroma_qp_offset_subdiv_inter_slice | ue(v) |
|   if( sps_temporal_mvp_enabled_flag ) { | |
|     ph_temporal_mvp_enabled_flag | u(1) |
|     if( ph_temporal_mvp_enabled_flag && rpl_info_in_ph_flag ) { | |
|       ph_collocated_from_l0_flag | u(1) |
|       if( ( ph_collocated_from_l0_flag && num_ref_entries[ 0 ][ RplsIdx[ 0 ] ] > 1 ) \|\| ( !ph_collocated_from_l0_flag && num_ref_entries[ 1 ][ RplsIdx[ 1 ] ] > 1 ) ) | |
|         ph_collocated_ref_idx | ue(v) |
|     } | |
|   } | |
|   mvd_l1_zero_flag | u(1) |
|   if( sps_fpel_mmvd_enabled_flag ) | |
|     ph_fpel_mmvd_enabled_flag | u(1) |
|   if( sps_bdof_pic_present_flag ) | |
|     ph_disable_bdof_flag | u(1) |

-continued

```
picture_header_structure( ) {                                     Descriptor
    if( sps_dmvr_pic_present_flag )
        ph_disable_dmvr_flag                                      u(1)
    if( sps_prof_pic_present_flag )
        ph_disable_prof_flag                                      u(1)
    if( ( pps_weighted_pred_flag | |
pps_weighted_bipred_flag ) &&
wp_info_in_ph_flag )
        pred_weight_table( )
    }
    if( qp_delta_info_in_ph_flag )
        ph_qp_delta                                               se(v)
    if( sps_joint_cbcr_enabled_flag )
        ph_joint_cbcr_sign_flag                                   u(1)
    if( sps_sao_enabled_flag &&
sao_info_in_ph_flag ) {
        ph_sao_luma_enabled_flag                                  u(1)
        if( ChromaArrayType != 0 )
            ph_sao_chroma_enabled_flag                            u(1)
    }
    if( sps_dep_quant_enabled_flag )
        ph_dep_quant_enabled_flag                                 u(1)
    if( sps_sign_data_hiding_enabled_flag
&& !ph_dep_quant_enabled_flag )
        pic_sign_data_hiding_enabled_flag                         u(1)
    if( deblocking_filter_
override_enabled_flag
&& dbf_info_in_ph_flag ) {
        ph_deblocking_filter_override_flag                        u(1)
        if( ph_deblocking_filter_
override_flag ) {
            ph_deblocking_filter_disabled_flag                    u(1)
            if( !ph_deblocking_filter_
disabled_flag ) {
                ph_beta_offset_div2                               se(v)
                ph_tc_offset_div2                                 se(v)
                ph_cb_beta_offset_div2                            se(v)
                ph_cb_tc_offset_div2                              se(v)
                ph_cr_beta_offset_div2                            se(v)
                ph_cr_tc_offset_div2                              se(v)
            }
        }
    }
    if( picture_header_
extension_present_flag ) {
        ph_extension_length                                       ue(v)
        for( i = 0; i < ph_
extension_length; i++)
            ph_extension_data_byte[ i ]                           u(8)
    }
}
```

The PH syntax structure contains information that is common for all slices of the coded picture associated with the PH syntax structure.

gdr_or_irap_pic_flag equal to 1 specifies that the current picture is a GDR or IRAP picture. gdr_or_irap_pic_flag equal to 0 specifies that the current picture may or may not be a GDR or IRAP picture.

gdr_pic_flag equal to 1 specifies the picture associated with the PH is a GDR picture. gdr_pic_flag equal to 0 specifies that the picture associated with the PH is not a GDR picture. When not present, the value of gdr_pic_flag is inferred to be equal to 0. When gdr_enabled_flag is equal to 0, the value of gdr_pic_flag shall be equal to 0.

ph_inter_slice_allowed_flag equal to 0 specifies that all coded slices of the picture have slice_type equal to 2. ph_inter_slice_allowed_flag equal to 1 specifies that there may or may not be one or more coded slices in the picture that have slice_type equal to 0 or 1.

ph_intra_slice_allowed_flag equal to 0 specifies that all coded slices of the picture have slice_type equal to 0 or 1. ph_intra_slice_allowed_flag equal to 1 specifies that there may or may not be one or more coded slices in the picture that have slice_type equal to 2. When not present, the value of ph_intra_slice_allowed_flag is inferred to be equal to 1.

NOTE 1—For bitstreams that are supposed to work subpicture based bitstream merging without the need of changing PH NAL units, the encoder is expected to set the values of both ph_inter_slice_allowed_flag and ph_intra_slice_allowed_flag equal to 1.

non_reference_picture_flag equal to 1 specifies the picture associated with the PH is never used as a reference picture. non_reference_picture_flag equal to 0 specifies the picture associated with the PH may or may not be used as a reference picture.

ph_pic_parameter_set_id specifies the value of pps_pic_parameter_set_id for the PPS in use. The value of ph_pic_parameter_set_id shall be in the range of 0 to 63, inclusive.

It is a requirement of bitstream conformance that the value of TemporalId of the PH shall be greater than or equal to the value of TemporalId of the PPS that has pps_pic_parameter_set_id equal to ph_pic_parameter_set_id.

ph_pic_ordercnt_lsb specifies the picture order count modulo MaxPicOrderCntLsb for the current picture. The length of the ph_pic_order_cnt_lsb syntax element is log 2_max_pic_order_cnt_lsb_minus4+4 bits. The value of ph_pic_order_cnt_lsb shall be in the range of 0 to MaxPicOrderCntLsb−1, inclusive.

no_output_of_prior_pics_flag affects the output of previously-decoded pictures in the DPB after the decoding of a CLVSS picture that is not the first picture in the bitstream as specified in Annex C.

recovery_poc_cnt specifies the recovery point of decoded pictures in output order. If the current picture is a GDR picture that is associated with the PH, and there is a picture picA that follows the current GDR picture in decoding order in the CLVS that has PicOrderCntVal equal to the PicOrderCntVal of the current GDR picture plus the value of recovery_poc_cnt, the picture picA is referred to as the recovery point picture. Otherwise, the first picture in output order that has PicOrderCntVal greater than the PicOrderCntVal of the current picture plus the value of recovery_poc_cnt is referred to as the recovery point picture. The recovery point picture shall not precede the current GDR picture in decoding order. The value of recovery_poc_cnt shall be in the range of 0 to MaxPicOrderCntLsb−1, inclusive.

When the current picture is a GDR picture, the variable RpPicOrderCntVal is derived as follows:

$$RpPicOrderCntVal = PicOrderCntVal + recovery\_poc\_cnt \quad (82)$$

NOTE 2—When gdr_enabled_flag is equal to 1 and PicOrderCntVal of the current picture is greater than or equal to RpPicOrderCntVal of the associated GDR picture, the current and subsequent decoded pictures in output order are exact match to the corresponding pictures produced by starting the decoding process from the previous IRAP picture, when present, preceding the associated GDR picture in decoding order.

ph_extra_bit[i] may be equal to 1 or 0. Decoders conforming to this version of this Specification shall ignore the value of ph_extra_bit[i]. Its value does not affect decoder conformance to profiles specified in this version of specification.

ph_poc_msb_present_flag equal to 1 specifies that the syntax element poc_msb_val is present in the PH. ph_poc_msb_present_flag equal to 0 specifies that the syntax element poc_msb_val is not present in the PH. When vps_independent_layer_flag[GeneralLayerIdx[nuh_layer_id]]

is equal to 0 and there is a picture in the current AU in a reference layer of the current layer, the value of ph_poc_msb_present_flag shall be equal to 0.

poc_msb_val specifies the POC MSB value of the current picture. The length of the syntax element poc_msb_val is poc_msb_len_minus1+1 bits.

ph_alf_enabled_flag equal to 1 specifies that adaptive loop filter is enabled for all slices associated with the PH and may be applied to Y, Cb, or Cr colour component in the slices. ph_alf_enabled_flag equal to 0 specifies that adaptive loop filter may be disabled for one, or more, or all slices associated with the PH. When not present, ph_alf_enabled_flag is inferred to be equal to 0.

ph_num_alf_aps_ids_luma specifies the number of ALF APSs that the slices associated with the PH refers to.

ph_alf_aps_id_luma[i] specifies the adaptation_parameter_set_id of the i-th ALF APS that the luma component of the slices associated with the PH refers to.

The value of alf_luma_filter_signal_flag of the APS NAL unit having aps_params_type equal to ALF_APS and adaptation_parameter_set_id equal to ph_alf_aps_id_luma[i] shall be equal to 1. The TemporalId of the APS NAL unit having aps_params_type equal to ALF_APS and adaptation_parameter_set_id equal to ph_alf_aps_id_luma[i] shall be less than or equal to the TemporalId of the picture associated with the PH.

ph_alf_chroma_idc equal to 0 specifies that the adaptive loop filter is not applied to Cb and Cr colour components. ph_alf_chroma_idc equal to 1 indicates that the adaptive loop filter is applied to the Cb colour component. ph_alf_chroma_idc equal to 2 indicates that the adaptive loop filter is applied to the Cr colour component. ph_alf_chroma_idc equal to 3 indicates that the adaptive loop filter is applied to Cb and Cr colour components. When ph_alf_chroma_idc is not present, it is inferred to be equal to 0.

ph_alf_aps_id_chroma specifies the adaptation_parameter_set_id of the ALF APS that the chroma component of the slices associated with the PH refers to.

The value of alf_chroma_filter_signal_flag of the APS NAL unit having aps_params_type equal to ALF APS and adaptation_parameter_set_id equal to ph_alf_aps_id_chroma shall be equal to 1.

The TemporalId of the APS NAL unit having aps_params_type equal to ALF_APS and adaptation_parameter_set_id equal to ph_alf_aps_id_chroma shall be less than or equal to the TemporalId of the picture associated with the PH.

ph_cc_alf_cb_enabled_flag equal to 1 specifies that cross-component filter for Cb colour component is enabled for all slices associated with the PH and may be applied to Cb colour component in the slices. ph_cc_alf_cb_enabled_flag equal to 0 specifies that cross-component filter for Cb colour component may be disabled for one, or more, or all slices associated with the PH. When not present, ph_cc_alf_cb_enabled_flag is inferred to be equal to 0.

ph_cc_alf_cb_aps_id specifies the adaptation_parameter_set_id of the ALF APS that the Cb colour component of the slices associated with the PH refers to.

The value of alf_cc_cb_filter_signal_flag of the APS NAL unit having aps_params_type equal to ALF_APS and adaptation_parameter_set_id equal to ph_cc_alf_cb_aps_id shall be equal to 1.

The TemporalId of the APS NAL unit having aps_params_type equal to ALF_APS and adaptation_parameter_set_id equal to ph_cc_alf_cb_aps_id shall be less than or equal to the TemporalId of the picture associated with the PH.

ph_cc_alf_cr_enabled_flag equal to 1 specifies that cross-component filter for Cr colour component is enabled for all slices associated with the PH and may be applied to Cr colour component in the slices. ph_cc_alf_cr_enabled_flag equal to 0 specifies that cross-component filter for Cr colour component may be disabled for one, or more, or all slices associated with the PH. When not present, ph_cc_alf_cr_enabled_flag is inferred to be equal to 0.

ph_cc_alf_cr_aps_id specifies the adaptation_parameter_set_id of the ALF APS that the Cr colour component of the slices associated with the PH refers to.

The value of alf_cc_cr_filter_signal_flag of the APS NAL unit having aps_params_type equal to ALF_APS and adaptation_parameter_set_id equal to ph_cc_alf_cr_aps_id shall be equal to 1.

The TemporalId of the APS NAL unit having aps_params_type equal to ALF_APS and adaptation_parameter_set_id equal to ph_cc_alf_cr_aps_id shall be less than or equal to the TemporalId of the picture associated with the PH.

ph_lmcs_enabled_flag equal to 1 specifies that luma mapping with chroma scaling is enabled for all slices associated with the PH. ph_lmcs_enabled_flag equal to 0 specifies that luma mapping with chroma scaling may be disabled for one, or more, or all slices associated with the PH. When not present, the value of ph_lmcs_enabled_flag is inferred to be equal to 0.

ph_lmcs_aps_id specifies the adaptation_parameter_set_id of the LMCS APS that the slices associated with the PH refers to. The TemporalId of the APS NAL unit having aps_params_type equal to LMCS APS and adaptation_parameter_set_id equal to ph_lmcs_aps_id shall be less than or equal to the TemporalId of the picture associated with PH.

ph_chroma_residual_scale_flag equal to 1 specifies that chroma residual scaling is enabled for the all slices associated with the PH. ph_chroma_residual_scale_flag equal to 0 specifies that chroma residual scaling may be disabled for one, or more, or all slices associated with the PH. When ph_chroma_residual_scale_flag is not present, it is inferred to be equal to 0.

ph_scaling_list_present_flag equal to 1 specifies that the scaling list data used for the slices associated with the PH is derived based on the scaling list data contained in the referenced scaling list APS. ph_scaling_list_present_flag equal to 0 specifies that the scaling list data used for the slices associated with the PH is set to be equal to 16. When not present, the value of ph_scaling_list_present_flag is inferred to be equal to 0.

ph_scaling_list_aps_id specifies the adaptation_parameter_set_id of the scaling list APS. The TemporalId of the APS NAL unit having aps_params_type equal to SCALING_APS and adaptation_parameter_set_id equal to ph_scaling_list_aps_id shall be less than or equal to the TemporalId of the picture associated with PH.

ph_virtual_boundaries_present_flag equal to 1 specifies that information of virtual boundaries is signalled in the PH. ph_virtual_boundaries_present_flag equal to 0 specifies that information of virtual boundaries is not signalled in the PH. When there is one or more than one virtual boundaries signalled in the PH, the in-loop filtering operations are disabled across the virtual boundaries in the picture. The in-loop filtering operations include the deblocking filter, sample adaptive offset filter, and adaptive loop filter operations. When not present, the value of ph_virtual_boundaries_present_flag is inferred to be equal to 0.

It is a requirement of bitstream conformance that, when subpic_info_present_flag is equal to 1, the value of ph_virtual_boundaries_present_flag shall be equal to 0.

The variable VirtualBoundariesPresentFlag is derived as follows:

VirtualBoundariesPresentFlag=0
if(sps_virtual_boundaries_enabled_flag)

VirtualBoundariesPresentFlag=sps_virtual_
    boundaries_present_flag||ph_virtual_boundar-
    ies_present_flag     (83)

ph_num_ver_virtual_boundaries specifies the number of ph_virtual_boundaries_pos_x[i] syntax elements that are present in the PH. When ph_num_ver_virtual_boundaries is not present, it is inferred to be equal to 0.

The variable NumVerVirtualBoundaries is derived as follows:

NumVerVirtualBoundaries=0
if(sps_virtual_boundaries_enabled_flag)

NumVerVirtualBoundaries=sps_virtual_
    boundaries_present_flag?sps_num_ver_
    virtual_boundaries:ph_num_ver_virtual_bound-
    aries     (84)

ph_virtual_boundaries_pos_x[i] specifies the location of the i-th vertical virtual boundary in units of luma samples divided by 8. The value of ph_virtual_boundaries_pos_x[i] shall be in the range of 1 to Ceil(pic_width_in_luma_samples÷8)−1, inclusive.

The list VirtualBoundariesPosX[i] for i ranging from 0 to NumVerVirtualBoundaries−1, inclusive, in units of luma samples, specifying the locations of the vertical virtual boundaries, is derived as follows:

for(i=0; i<NumVerVirtualBoundaries; i++)Virtual-
    BoundariesPosX[i]=(sps_virtual_boundar-
    ies_present_flag?sps_virtual_boundaries_pos_x
    [i]:ph_virtual_boundaries_pos_x[i])*8     (85)

The distance between any two vertical virtual boundaries shall be greater than or equal to CtbSizeY luma samples.

ph_num_hor_virtual_boundaries specifies the number of ph_virtual_boundaries_pos_y[i] syntax elements that are present in the PH. When ph_num_hor_virtual_boundaries is not present, it is inferred to be equal to 0.

The parameter NumHorVirtualBoundaries is derived as follows:

NumHorVirtualBoundaries=0
if(sps_virtual_boundaries_enabled_flag)

NumHorVirtualBoundaries=sps_virtual_
    boundaries_present_flag?sps_num_hor_
    virtual_boundaries:ph_num_hor_virtual_bound-
    aries     (86)

When sps_virtual_boundaries_enabled_flag is equal to 1 and ph_virtual_boundaries_present_flag is equal to 1, the sum of ph_num_ver_virtual_boundaries and ph_num_hor_virtual_boundaries shall be greater than 0.

ph_virtual_boundaries_pos_y[i] specifies the location of the i-th horizontal virtual boundary in units of luma samples divided by 8. The value of ph_virtual_boundaries_pos_y[i] shall be in the range of 1 to Ceil(pic_height_in_luma_samples÷8)−1, inclusive.

The list VirtualBoundariesPosY[i] for i ranging from 0 to NumHorVirtualBoundaries−1, inclusive, in units of luma samples, specifying the locations of the horizontal virtual boundaries, is derived as follows:

for(i=0; i<NumHorVirtualBoundaries; i++)Virtual-
    BoundariesPosY[i]=(sps_virtual_boundar-
    ies_present_flag?sps_virtual_boundaries_pos_y
    [i]:ph_virtual_boundaries_pos_y[i])*8     (87)

The distance between any two horizontal virtual boundaries shall be greater than or equal to CtbSizeY luma samples.

pic_output_flag affects the decoded picture output and removal processes as specified in Annex C. When pic_output_flag is not present, it is inferred to be equal to 1.

partition_constraints_override_flag equal to 1 specifies that partition constraint parameters are present in the PH. partition_constraints_override_flag equal to 0 specifies that partition constraint parameters are not present in the PH. When not present, the value of partition_constraints_override_flag is inferred to be equal to 0.

ph_log 2_diff_min_qt_min_cb_intra_slice_luma specifies the difference between the base 2 logarithm of the minimum size in luma samples of a luma leaf block resulting from quadtree splitting of a CTU and the base 2 logarithm of the minimum coding block size in luma samples for luma CUs in the slices with slice_type equal to 2 (I) associated with the PH. The value of ph_log 2_diff_min_qt_min_cb_intra_slice_luma shall be in the range of 0 to Ctb Log 2SizeY−MinCb Log 2SizeY, inclusive. When not present, the value of ph_log 2_diff_min_qt_min_cb_luma is inferred to be equal to sps_log 2_diff_min_qt_min_cb_intra_slice_luma.

ph_max_mtt_hierarchy_depth_intra_slice_luma specifies the maximum hierarchy depth for coding units resulting from multi-type tree splitting of a quadtree leaf in slices with slice_type equal to 2 (I) associated with the PH. The value of ph_max_mtt_hierarchy_depth_intra_slice_luma shall be in the range of 0 to 2*(Ctb Log 2SizeY−MinCb Log 2SizeY), inclusive. When not present, the value of ph_max_mtt_hierarchy_depth_intra_slice_luma is inferred to be equal to sps_max_mtt_hierarchy_depth_intra_slice_luma.

ph_log 2_diff_max_bt_min_qt_intra_slice_luma specifies the difference between the base 2 logarithm of the maximum size (width or height) in luma samples of a luma coding block that can be split using a binary split and the minimum size (width or height) in luma samples of a luma leaf block resulting from quadtree splitting of a CTU in slices with slice type equal to 2 (I) associated with the PH. The value of ph_log 2_diff_max_bt_min_qt_intra_slice_luma shall be in the range of 0 to Ctb Log 2SizeY−MinQt Log 2SizeIntraY, inclusive. When not present, the value of ph_log 2_diff_max_bt_min_qt_intra_slice_luma is inferred to be equal to sps_log 2_diff_max_bt_min_qt_intra_slice_luma.

ph_log 2_diff_max_tt_min_qt_intra_slice_luma specifies the difference between the base 2 logarithm of the maximum size (width or height) in luma samples of a luma coding block that can be split using a ternary split and the minimum size (width or height) in luma samples of a luma leaf block resulting from quadtree splitting of a CTU in slices with slice_type equal to 2 (I) associated with the PH. The value of ph_log 2_diff_max_tt_min_qt_intra_slice_luma shall be in the range of 0 to Ctb Log 2SizeY−MinQt Log 2SizeIntraY, inclusive. When not present, the value of ph_log 2_diff_max_tt_min_qt_intra_slice_luma is inferred to be equal to sps_log 2_diff_max_tt_min_qt_intra_slice_luma.

ph_log 2_diff_min_qt_min_cb_intra_slice_chroma specifies the difference between the base 2 logarithm of the minimum size in luma samples of a chroma leaf block resulting from quadtree splitting of a chroma CTU with treeType equal to DUAL TREE CHROMA and the base 2 logarithm of the minimum coding block size in luma samples for chroma CUs with treeType equal to DUAL TREE CHROMA in slices with slice_type equal to 2 (I) associated with the PH. The value of ph_log 2_diff_min_qt_min_cb_intra_slice_chroma shall be in the range of 0 to Ctb Log 2SizeY−MinCb Log 2SizeY, inclusive. When not present, the value of ph_log 2_diff_min_qt_min_cb_intra_slice_chroma is inferred to be equal to sps_log 2_diff_min_qt_min_cb_intra_slice_chroma.

ph_max_mtt_hierarchy_depth_intra_slice_chroma specifies the maximum hierarchy depth for chroma coding units resulting from multi-type tree splitting of a chroma quadtree leaf with treeType equal to DUAL TREE CHROMA in slices with slice type equal to 2 (I) associated with the PH. The value of ph_max_mtt_hierarchy_depth_intra_slice_chroma shall be in the range of 0 to 2*(Ctb Log 2SizeY−MinCb Log 2SizeY), inclusive. When not present, the value of ph_max_mtt_hierarchy_depth_intra_slice_chroma is inferred to be equal to sps_max_mtt_hierarchy_depth_intra_slice_chroma.

ph_log 2_diff_max_bt_min_qt_intra_slice_chroma specifies the difference between the base 2 logarithm of the maximum size (width or height) in luma samples of a chroma coding block that can be split using a binary split and the minimum size (width or height) in luma samples of a chroma leaf block resulting from quadtree splitting of a chroma CTU with treeType equal to DUAL TREE CHROMA in slices with slice type equal to 2 (I) associated with the PH. The value of ph_log 2_diff_max_bt_min_qt_intra_slice_chroma shall be in the range of 0 to Ctb Log 2SizeY−MinQt Log 2SizeIntraC, inclusive. When not present, the value of ph_log 2_diff_max_bt_min_qt_intra_slice_chroma is inferred to be equal to sps_log 2_diff_max_bt_min_qt_intra_slice_chroma.

ph_log 2_diff_max_tt_min_qt_intra_slice_chroma specifies the difference between the base 2 logarithm of the maximum size (width or height) in luma samples of a chroma coding block that can be split using a ternary split and the minimum size (width or height) in luma samples of a chroma leaf block resulting from quadtree splitting of a chroma CTU with treeType equal to DUAL TREE CHROMA in slices with slice_type equal to 2 (I) associated with the PH. The value of ph_log 2_diff_max_tt_min_qt_intra_slice_chroma shall be in the range of 0 to Ctb Log 2SizeY−MinQt Log 2SizeIntraC, inclusive. When not present, the value of ph_log 2_diff_max_tt_min_qt_intra_slice_chroma is inferred to be equal to sps_log 2_diff_max_tt_min_qt_intra_slice_chroma ph_cu_qp_delta_subdiv_intra_slice specifies the maximum cbSubdiv value of coding units in intra slice that convey cu_qp_delta_abs and cu_qp_delta_sign_flag. The value of ph_cu_qp_delta_subdiv_intra_slice shall be in the range of 0 to 2*(Ctb Log 2SizeY−MinQt Log 2SizeIntraY+ ph_max_mtt_hierarchy_depth_intra_slice_luma), inclusive. When not present, the value of ph_cu_qp_delta_subdiv_intra_slice is inferred to be equal to 0.

ph_cu_chroma_qp_offset_subdiv_intra_slice specifies the maximum cbSubdiv value of coding units in intra slice that convey cu_chroma_qp_offset_flag. The value of ph_cu_chroma_qp_offset_subdiv_intra_slice shall be in the range of 0 to 2*(Ctb Log 2SizeY−MinQt Log 2SizeIntraY+ ph_max_mtt_hierarchy_depth_intra_slice_luma), inclusive. When not present, the value of ph_cu_chroma_qp_offset_subdiv_intra_slice is inferred to be equal to 0.

ph_log 2_diff_min_qt_min_cb_inter_slice specifies the difference between the base 2 logarithm of the minimum size in luma samples of a luma leaf block resulting from quadtree splitting of a CTU and the base 2 logarithm of the minimum luma coding block size in luma samples for luma CUs in the slices with slice_type equal to 0 (B) or 1 (P) associated with the PH. The value of ph_log 2_diff_min_qt_min_cb_inter_slice shall be in the range of 0 to Ctb Log 2SizeY−MinCb Log 2SizeY, inclusive. When not present, the value of ph_log 2_diff_min_qt_min_cb_luma is inferred to be equal to sps_log 2_diff_min_qt_min_cb_inter_slice.

ph_max_mtt_hierarchy_depth_inter_slice specifies the maximum hierarchy depth for coding units resulting from multi-type tree splitting of a quadtree leaf in slices with slice_type equal to 0 (B) or 1 (P) associated with the PH. The value of ph_max_mtt_hierarchy_depth_inter_slice shall be in the range of 0 to 2*(Ctb Log 2SizeY−MinCb Log 2SizeY), inclusive. When not present, the value of ph_max_mtt_hierarchy_depth_inter_slice is inferred to be equal to sps_max_mtt_hierarchy_depth_inter_slice.

ph_log 2_diff_max_bt_min_qt_inter_slice specifies the difference between the base 2 logarithm of the maximum size (width or height) in luma samples of a luma coding block that can be split using a binary split and the minimum size (width or height) in luma samples of a luma leaf block resulting from quadtree splitting of a CTU in the slices with slice type equal to 0 (B) or 1 (P) associated with the PH. The value of ph_log 2_diff_max_bt_min_qt_inter_slice shall be in the range of 0 to Ctb Log 2SizeY−MinQt Log 2SizeInterY, inclusive. When not present, the value of ph_log 2_diff_max_bt_min_qt_inter_slice is inferred to be equal to sps_log 2_diff_max_bt_min_qt_inter_slice.

ph_log 2_diff_max_tt_min_qt_inter_slice specifies the difference between the base 2 logarithm of the maximum size (width or height) in luma samples of a luma coding block that can be split using a ternary split and the minimum size (width or height) in luma samples of a luma leaf block resulting from quadtree splitting of a CTU in slices with slice type equal to 0 (B) or 1 (P) associated with the PH. The value of ph_log 2_diff_max_tt_min_qt_inter_slice shall be in the range of 0 to Ctb Log 2SizeY−MinQt Log 2SizeInterY, inclusive. When not present, the value of ph_log 2_diff_max_tt_min_qt_inter_slice is inferred to be equal to sps_log 2_diff_max_tt_min_qt_inter_slice.

ph_cu_qp_delta_subdiv_inter_slice specifies the maximum cbSubdiv value of coding units that in inter slice convey cu_qp_delta_abs and cu_qp_delta_sign_flag. The value of ph_cu_qp_delta_subdiv_inter_slice shall be in the range of 0 to 2*(Ctb Log 2SizeY−MinQt Log 2SizeInterY+ ph_max_mtt_hierarchy_depth_inter_slice), inclusive. When not present, the value of ph_cu_qp_delta_subdiv_inter_slice is inferred to be equal to 0.

ph_cu_chroma_qp_offset_subdiv_inter_slice specifies the maximum cbSubdiv value of coding units in inter slice that convey cu_chroma_qp_offset_flag. The value of ph_cu_chroma_qp_offset_subdiv_inter_slice shall be in the range of 0 to 2*(Ctb Log 2SizeY−MinQt Log 2SizeInterY+ ph_max_mtt_hierarchy_depth_inter_slice), inclusive. When not present, the value of ph_cu_chroma_qp_offset_subdiv_inter_slice is inferred to be equal to 0.

ph_temporal_mvp_enabled_flag specifies whether temporal motion vector predictors can be used for inter prediction for slices associated with the PH. If ph_temporal_mvp_enabled_flag is equal to 0, the syntax elements of the slices associated with the PH shall be constrained such that no temporal motion vector predictor is used in decoding of the slices. Otherwise (ph_temporal_mvp_enabled_flag is equal to 1), temporal motion vector predictors may be used in decoding of the slices associated with the PH. When not present, the value of ph_temporal_mvp_enabled_flag is inferred to be equal to 0. When no reference picture in the DPB has the same spatial resolution as the current picture, the value of ph_temporal_mvp_enabled_flag shall be equal to 0.

The maximum number of subblock-based merging MVP candidates, MaxNumSubblockMergeCand, is derived as follows:

```
if( sps_affine_enabled_flag )
   MaxNumSubblockMergeCand = 5 −
   five_minus_max_num_
   subblock_merge_cand
                                                    (88)
else
   MaxNumSubblockMergeCand =
   sps_sbtmvp_enabled_flag &&
   ph_temporal_mvp_enable_flag
```

The value of MaxNumSubblockMergeCand shall be in the range of 0 to 5, inclusive. ph_collocated_from_l0_flag equal to 1 specifies that the collocated picture used for temporal motion vector prediction is derived from reference picture list 0. ph_collocated_from_l0_flag equal to 0 specifies that the collocated picture used for temporal motion vector prediction is derived from reference picture list 1.
ph_collocated_ref_idx specifies the reference index of the collocated picture used for temporal motion vector prediction.
When ph_collocated_from_l0_flag is equal to 1, ph_collocated_ref_idx refers to an entry in reference picture list 0, and the value of ph_collocated_ref_idx shall be in the range of 0 to num_ref_entries[0][RplsIdx[0]]−1, inclusive.
When ph_collocated_from_l0_flag is equal to 0, ph_collocated_ref_idx refers to an entry in reference picture list 1, and the value of ph_collocated_ref_idx shall be in the range of 0 to num_ref_entries[1][RplsIdx[1]]−1, inclusive.
When not present, the value of ph_collocated_ref_idx is inferred to be equal to 0.
mvd_l1_zero_flag equal to 1 indicates that the mvd_coding (x0, y0, 1) syntax structure is not parsed and MvdL1[x0][y0][compIdx] and MvdCpL1[x0][y0][cpIdx][compIdx] are set equal to 0 for compIdx=0 . . . 1 and cpIdx=0 . . . 2. mvd_l1_zero_flag equal to 0 indicates that the mvd_coding (x0, y0, 1) syntax structure is parsed.
ph_fpel_mmvd_enabled_flag equal to 1 specifies that merge mode with motion vector difference uses integer sample precision in the slices associated with the PH. ph_fpel_mmvd_enabled_flag equal to 0 specifies that merge mode with motion vector difference can use fractional sample precision in the slices associated with the PH. When not present, the value of ph_fpel_mmvd_enabled_flag is inferred to be 0.
ph_disable_bdof_flag equal to 1 specifies that bi-directional optical flow inter prediction based inter bi-prediction is disabled in the slices associated with the PH. ph_disable_bdof_flag equal to 0 specifies that bi-directional optical flow inter prediction based inter bi-prediction may or may not be enabled in the slices associated with the PH.
When ph_disable_bdof_flag is not present, the following applies:
 If sps_bdof_enabled_flag is equal to 1, the value of ph_disable_bdof_flag is inferred to be equal to 0.
 Otherwise (sps_bdof_enabled_flag is equal to 0), the value of ph_disable_bdof_flag is inferred to be equal to 1.
ph_disable_dmvr_flag equal to 1 specifies that decoder motion vector refinement based inter bi-prediction is disabled in the slices associated with the PH. ph_disable_dmvr_flag equal to 0 specifies that decoder motion vector refinement based inter bi-prediction may or may not be enabled in the slices associated with the PH.

When ph_disable_dmvr_flag is not present, the following applies:
 If sps_dmvr_enabled_flag is equal to 1, the value of ph_disable_dmvr_flag is inferred to be equal to 0.
 Otherwise (sps_dmvr_enabled_flag is equal to 0), the value of ph_disable_dmvr_flag is inferred to be equal to 1.
ph_disable_prof_flag equal to 1 specifies that prediction refinement with optical flow is disabled in the slices associated with the PH. ph_disable_prof_flag equal to 0 specifies that prediction refinement with optical flow may or may not be enabled in the slices associated with the PH.
When ph_disable_prof_flag is not present, the following applies:
 If sps_affine_prof_enabled_flag is equal to 1, the value of ph_disable_prof_flag is inferred to be equal to 0.
 Otherwise (sps_affine_prof_enabled_flag is equal to 0), the value of ph_disable_prof_flag is inferred to be equal to 1.
ph_qp_delta specifies the initial value of $Qp_Y$ to be used for the coding blocks in the picture until modified by the value of CuQpDeltaVal in the coding unit layer.
When qp_delta_info_in_ph_flag is equal to 1, the initial value of the $Qp_Y$ quantization parameter for all slices of the picture, $SliceQp_Y$, is derived as follows:

$$SliceQp_Y=26+init\_qp\_minus26+ph\_qp\_delta \qquad (89)$$

The value of $SliceQp_Y$ shall be in the range of −QpBdOffset to +63, inclusive.
ph_joint_cbcr_sign_flag specifies whether, in transform units with tu_joint_cbcr_residual_flag[x0][y0] equal to 1, the collocated residual samples of both chroma components have inverted signs. When tu_joint_cbcr_residual_flag[x0][y0] equal to 1 for a transform unit, ph_joint_cbcr_sign_flag equal to 0 specifies that the sign of each residual sample of the Cr (or Cb) component is identical to the sign of the collocated Cb (or Cr) residual sample and ph_joint_cbcr_sign_flag equal to 1 specifies that the sign of each residual sample of the Cr (or Cb) component is given by the inverted sign of the collocated Cb (or Cr) residual sample.
ph_sao_luma_enabled_flag equal to 1 specifies that SAO is enabled for the luma component in all slices associated with the PH; ph_sao_luma_enabled_flag equal to 0 specifies that SAO for the luma component may be disabled for one, or more, or all slices associated with the PH. When ph_sao_luma_enabled_flag is not present, it is inferred to be equal to 0.
ph_sao_chroma_enabled_flag equal to 1 specifies that SAO is enabled for the chroma component in all slices associated with the PH; ph_sao_chroma_enabled_flag equal to 0 specifies that SAO for chroma component may be disabled for one, or more, or all slices associated with the PH. When ph_sao_chroma_enabled_flag is not present, it is inferred to be equal to 0.
ph_dep_quant_enabled_flag equal to 0 specifies that dependent quantization is disabled for the current picture. ph_dep_quant_enabled_flag equal to 1 specifies that dependent quantization is enabled for the current picture. When ph_dep_quant_enabled_flag is not present, it is inferred to be equal to 0.
pic_sign_data_hiding_enabled_flag equal to 0 specifies that sign bit hiding is disabled for the current picture. pic_sign_data_hiding_enabled_flag equal to 1 specifies that sign bit hiding is enabled for the current picture. When pic_sign_data_hiding_enabled_flag is not present, it is inferred to be equal to 0.

ph_deblocking_filter_override_flag equal to 1 specifies that deblocking parameters are present in the PH. ph_deblocking_filter_override_flag equal to 0 specifies that deblocking parameters are not present in the PH. When not present, the value of ph_deblocking_filter_override_flag is inferred to be equal to 0.

ph_deblocking_filter_disabled_flag equal to 1 specifies that the operation of the deblocking filter is not applied for the slices associated with the PH. ph_deblocking_filter_disabled_flag equal to 0 specifies that the operation of the deblocking filter is applied for the slices associated with the PH. When ph_deblocking_filter_disabled_flag is not present, it is inferred to be equal to pps_deblocking_filter_disabled_flag.

ph_beta_offset_div2 and ph_tc_offset_div2 specify the deblocking parameter offsets for β and tC (divided by 2) that are applied to the luma component for the slices associated with the PH. The values of ph_beta_offset_div2 and ph_tc_offset_div2 shall both be in the range of −12 to 12, inclusive. When not present, the values of ph_beta_offset_div2 and ph_tc_offset_div2 are inferred to be equal to pps_beta_offset_div2 and pps_tc_offset_div2, respectively.

ph_cb_beta_offset_div2 and ph_cb_tcoffset_div2 specify the deblocking parameter offsets for β and tC (divided by 2) that are applied to the Cb component for the slices associated with the PH. The values of ph_cb_beta_offset_div2 and ph_cb_tc_offset_div2 shall both be in the range of −12 to 12, inclusive. When not present, the values of ph_cb_beta_offset_div2 and ph_cb_tc_offset_div2 are inferred to be equal to pps_cb_beta_offset_div2 and pps_cb_tc_offset_div2, respectively.

ph_cr_beta_offset_div2 and ph_cr_tc_offset_div2 specify the deblocking parameter offsets for β and tC (divided by 2) that are applied to the Cr component for the slices associated with the PH. The values of ph_cr_beta_offset_div2 and ph_cr_tc_offset_div2 shall both be in the range of −12 to 12, inclusive. When not present, the values of ph_cr_beta_offset_div2 and ph_cr_tc_offset_div2 are inferred to be equal to pps_cr_beta_offset_div2 and pps_cr_tc_offset_div2, respectively.

ph_extension_length specifies the length of the PH extension data in bytes, not including the bits used for signalling ph_extension_length itself. The value of ph_extension_length shall be in the range of 0 to 256, inclusive. When not present, the value of ph_extension_length is inferred to be equal to 0.

ph_extension_data_byte may have any value. Decoders conforming to this version of this Specification shall ignore the value of ph_extension_data_byte. Its value does not affect decoder conformance to profiles specified in this version of specification.

3.9. SH Syntax and Semantics

In the latest VVC draft text, the SH syntax and semantics are as follows:

| slice_header( ) { | Descriptor |
|---|---|
|   picture_header_in_slice_header_flag | u(1) |
|   if( picture_header_in_slice_header_flag ) | |
|     picture_header_structure( ) | |
|   if( subpic_info_present_flag ) | |
|     slice_subpic_id | u(v) |
|   if( ( rect_slice_flag && | |
| NumSlicesInSubpic | |
| [ CurrSubpicIdx ] > 1 ) \|\| | |
|     ( !rect_slice_flag && | |
| NumTilesInPic > 1 ) ) | |
|     slice_address | u(v) |
|   for( i = 0; i < NumExtraShBits; i++ ) | |
|     sh_extra_bit[ i ] | u(1) |
|   if( !rect_slice_flag && | |
| NumTilesInPic > 1 ) | |
|     num_tiles_in_slice_minus1 | ue(v) |
|   if( ph_inter_slice_allowed_flag ) | |
|     slice_type | ue(v) |
|   if( sps_alf_enabled_flag && | |
| !alf_info_in_ph_flag ) { | |
|     slice_alf_enabled_flag | u(1) |
|     if( slice_alf_enabled_flag ) { | |
|       slice_num_alf_aps_ids_luma | u(3) |
|       for( i = 0; i < slice_num_alf_aps_ids_luma; i++ ) | |
|         slice_alf_aps_id_luma[i] | u(3) |
|       if( ChromaArrayType != 0 ) | |
|         slice_alf_chroma_idc | u(2) |
|       if( slice_alf_chroma_idc ) | |
|         slice_alf_aps_id_chroma | u(3) |
|       if( sps_ccalf_enabled_flag ) { | |
|         slice_cc_alf_cb_enabled_flag | u(1) |
|         if( slice_cc_alf_cb_enabled_flag ) | |
|           slice_cc_alf_cb_aps_id | u(3) |
|         slice_cc_alf_cr_enabled_flag | u(1) |
|         if( slice_cc_alf_cr_enabled_flag ) | |
|           slice_cc_alf_cr_aps_id | u(3) |
|       } | |
|     } | |
|   } | |
|   if( separate_colour_plane_flag = = 1 ) | |
|     colour_plane_id | u(2) |
|   if( !rpl_info_in_ph_flag && | |
| ( ( nal_unit_type != IDR_W_RADL && | |
| nal_unit_type != | |
|     IDR_N_LP ) \|\| | |
|     sps_idr_rpl_present_flag ) ) | |
|     ref_pic_lists( ) | |
|   if( ( rpl_info_in_ph_flag \|\| | |
| ( ( nal_unit_type != IDR_W_RADL && | |
| nal_unit_type != | |
|     IDR_N_LP ) \|\| sps_idr_rpl_present_flag ) ) && | |
|     ( slice_type != I && num_ref_entries[ 0 ][ RplsIdx | |
|     [ 0 ] ] > 1 ) \|\| | |
|     ( slice_type = = B && num_ref_entries[ 1 ][ RplsIdx | |
|     [ 1 ] ] > 1 ) ) { | |
|     num_ref_idx_active_override_flag | u(1) |
|     if( num_ref_idx_active_override_flag ) | |
|       for( i = 0; i < ( slice_type = = B ? 2: 1 ); i++ ) | |
|         if( num_ref_entries[ i ] | |
|         [ RplsIdx[ i ] ] > 1 ) | |
|           num_ref_idx_active_minus1[ i ] | ue(v) |
|   } | |
|   if( slice_type != I ) { | |
|     if( cabac_init_present_flag ) | |
|       cabac_init_flag | u(1) |
|     if( ph_temporal_mvp_enabled_flag | |
|     && !rpl_info_in_ph_flag ) { | |
|       if( slice_type = = B ) | |
|         slice_collocated_from_l0_flag | u(1) |
|       if( ( slice_collocated_from_l0_flag | |
|       && NumRefIdxActive[ 0 ] > 1 ) \|\| | |
|         ( ! slice_collocated_from_l0_flag | |
|         && NumRefIdxActive[ 1 ] > 1 ) | |
| ) | |
|         slice_collocated_ref_idx | ue(v) |
|     } | |
|     if( !wp_info_in_ph_flag && | |
| ( ( pps_weighted_pred_flag && slice_type = = | |
| P ) \|\| | |

-continued

| slice_header( ) { | Descriptor |
|---|---|
|    ( pps_weighted_bipred_flag | |
|    && slice_type = = B ) ) ) | |
|     pred_weight_table( ) | |
|  } | |
|  if( !qp_delta_info_in_ph_flag ) | |
|   slice_qp_delta | se(v) |
|  if( pps_slice_chroma_qp_ | |
| offsets_present_flag ) { | |
|   slice_cb_qp_offset | se(v) |
|   slice_cr_qp_offset | se(v) |
|   if( sps_joint_cbcr_enabled_flag ) | |
|    slice_joint_cbcr_qp_offset | se(v) |
|  } | |
|  if( pps_cu_chroma_qp_offset_ | |
| list_enabled_flag ) | |
|   cu_chroma_qp_offset_enabled_flag | u(1) |
|  if( sps_sao_enabled_flag && | |
| !sao_info_in_ph_flag ) { | |
|   slice_sao_luma_flag | u(1) |
|   if( ChromaArrayType != 0 ) | |
|    slice_sao_chroma_flag | u(1) |
|  } | |
|  if( deblocking_filter_override_enabled_ | |
| flag && !dbf_info_in_ph_flag ) | |
|   slice_deblocking_filter_override_flag | u(1) |
|  if( slice_deblocking_ | |
| filter_override_flag ) { | |
|   slice_deblocking_filter_disabled_flag | u(1) |
|   if( !slice_deblocking_filter_ | |
| disabled_flag ) { | |
|    slice_beta_offset_div2 | se(v) |
|    slice_tc_offset_div2 | se(v) |
|    slice_cb_beta_offset_div2 | se(v) |
|    slice_cb_tc_offset_div2 | se(v) |
|    slice_cr_beta_offset_div2 | se(v) |
|    slice_cr_tc_offset_div2 | se(v) |
|   } | |
|  } | |
|  slice_ts_residual_coding_disabled_flag | u(1) |
|  if( ph_lmcs_enabled_flag ) | |
|   slice_lmcs_enabled_flag | u(1) |
|  if( ph_scaling_list_enabled_flag ) | |
|   slice_scaling_list_present_flag | u(1) |
|  if( NumEntryPoints > 0 ) { | |
|   offset_len_minus1 | ue(v) |
|   for( i = 0; i < NumEntryPoints; i++ ) | |
|    entry_point_offset_minus1[ i ] | u(v) |
|  } | |
|  if( slice_header_extension_ | |
| present_flag ) { | |
|   slice_header_extension_length | ue(v) |
|   for( i = 0; i < slice_header_ | |
| extension_length; i++) | |
|    slice_header_extension_ | u(8) |
|    data_byte[ i ] | |
|  } | |
|  byte_alignment( ) | |
| } | |

The variable CuQpDeltaVal, specifying the difference between a luma quantization parameter for the coding unit containing cu_qp_delta_abs and its prediction, is set equal to 0. The variables CuQpOffset$_{Cb}$, CuQpOffset$_{Cr}$, and CuQpOffset$_{CbCr}$, specifying values to be used when determining the respective values of the Qp'$_{Cb}$, Qp'$_{Cr}$, and Qp'$_{CbCr}$ quantization parameters for the coding unit containing cu_chroma_qp_offset_flag, are all set equal to 0.

picture_header_in_slice_header_flag equal to 1 specifies that the PH syntax structure is present in the slice header. picture_header_in_slice_header_flag equal to 0 specifies that the PH syntax structure is not present in the slice header. It is a requirement of bitstream conformance that the value of picture_header_in_slice_header_flag shall be the same in all coded slices in a CLVS.

When picture_header_in_slice_header_flag is equal to 1 for a coded slice, it is a requirement of bitstream conformance that no VCL NAL unit with nal_unit_type equal to PH NUT shall be present in the CLVS.

When picture_header_in_slice_header_flag is equal to 0, all coded slices in the current picture shall have picture_header_in_slice_header_flag is equal to 0, and the current PU shall have a PH NAL unit.

slice_subpic_id specifies the subpicture ID of the subpicture that contains the slice. If slice_subpic_id is present, the value of the variable CurrSubpicIdx is derived to be such that SubpicIdVal[CurrSubpicIdx] is equal to slice_subpic_id. Otherwise (slice_subpic_id is not present), CurrSubpicIdx is derived to be equal to 0. The length of slice_subpic_id is sps_subpic_id_len_minus1+1 bits.

slice_address specifies the slice address of the slice. When not present, the value of slice_address is inferred to be equal to 0. When rect_slice_flag is equal to 1 and NumSlicesInSubpic[CurrSubpicIdx] is equal to 1, the value of slice_address is inferred to be equal to 0.

If rect_slice_flag is equal to 0, the following applies:

The slice_address is the raster scan tile index.

The length of slice_address is Ceil(Log 2(NumTilesInPic)) bits.

The value of slice_address shall be in the range of 0 to NumTilesInPic−1, inclusive.

Otherwise (rect_slice_flag is equal to 1), the following applies:

The slice_address is the subpicture-level slice index of the slice.

The length of slice_address is Ceil(Log 2(NumSlicesInSubpic[CurrSubpicIdx])) bits.

The value of slice_address shall be in the range of 0 to NumSlicesInSubpic[CurrSubpicIdx]−1, inclusive.

It is a requirement of bitstream conformance that the following constraints apply:

If rect_slice_flag is equal to 0 or subpic_info_present_flag is equal to 0, the value of slice_address shall not be equal to the value of slice_address of any other coded slice NAL unit of the same coded picture.

Otherwise, the pair of slice_subpic_id and slice_address values shall not be equal to the pair of slice_subpic_id and slice_address values of any other coded slice NAL unit of the same coded picture.

The shapes of the slices of a picture shall be such that each CTU, when decoded, shall have its entire left boundary and entire top boundary consisting of a picture boundary or consisting of boundaries of previously decoded CTU(s).

sh_extra_bit[i] may be equal to 1 or 0. Decoders conforming to this version of this Specification shall ignore the value of sh_extra_bit[i]. Its value does not affect decoder conformance to profiles specified in this version of specification.

num_tiles_in_slice_minus1 plus 1, when present, specifies the number of tiles in the slice. The value of num_tiles_in_slice_minus1 shall be in the range of 0 to NumTilesInPic−1, inclusive.

The variable NumCtusInCurrSlice, which specifies the number of CTUs in the current slice, and the list CtbAddrInCurrSlice[i], for i ranging from 0 to NumCtusInCurrSlice−1, inclusive, specifying the picture raster scan address of the i-th CTB within the slice, are derived as follows:

```
if( rect_slice_flag ) {
  picLevelSliceIdx = slice_address
  for( j = 0; j < CurrSubpicIdx; j++ )
    picLevelSliceIdx +=
      NumSlicesInSubpic[ j ]
  NumCtusInCurrSlice = NumCtusInSlice
    [ picLevelSliceIdx ]
  for( i = 0; i < NumCtusInCurrSlice; i++ )
    CtbAddrInCurrSlice[ i ] =                          (117)
    CtbAddrInSlice
      [ picLevelSliceIdx ][ i ]
} else {
  NumCtusInCurrSlice = 0
  for( tileIdx = slice_address; tileIdx <=
    slice_address + num_tiles_in_slice_minus1;
    tileIdx++ ) {
    tileX = tileIdx % NumTileColumns
    tileY = tileIdx / NumTileColumns
    for( ctbY = tileRowBd[ tileY ]; ctbY <
      tileRowBd[ tileY + 1 ]; ctbY++ ) {
      for( ctbX = tileColBd[ tileX ]; ctbX <
        tileColBd[ tileX + 1 ]; ctbX++ ) {
        CtbAddrInCurrSlice
          [ NumCtusInCurrSlice ] =
          ctbY * PicWidthInCtb + ctbX
        NumCtusInCurrSlice++
      }
    }
  }
}
```

The variables SubpicLeftBoundaryPos, SubpicTopBoundaryPos, SubpicRightBoundaryPos, and SubpicBotBoundaryPos are derived as follows:

```
if( subpic_treated_as_pic_flag
  [ CurrSubpicIdx ] ) {
  SubpicLeftBoundaryPos =
    subpic_ctu_top_
    left_x[ CurrSubpicIdx ] *
    CtbSizeY
  SubpicRightBoundaryPos =
    Min( pic_width_max_in_
    luma_samples − 1,
      ( subpic_ctu_top_left_x
      [ CurrSubpicIdx ] +
      subpic_width_minus1
      [ CurrSubpicIdx ] +
      1 ) * CtbSizeY − 1 )
  SubpicTopBoundaryPos =                               (118)
    subpic_ctu_top_
    left_y[ CurrSubpicIdx ]
    *CtbSizeY
  SubpicBotBoundaryPos =
    Min( pic_height_max_in_
    luma_samples − 1,
      ( subpic_ctu_top_left_y
      [ CurrSubpicIdx ] +
      subpic_height_minus1
      [ CurrSubpicIdx ] +
      1 ) * CtbSizeY − 1 )
}
``` slice_type specifies the coding type of the slice according to Table 9.

TABLE 9

Name association to slice_type

| slice_type | Name of slice_type |
|---|---|
| 0 | B (B slice) |
| 1 | P (P slice) |
| 2 | I (I slice) |

When not present, the value of slice_type is inferred to be equal to 2.

When ph_intra_slice_allowed_flag is equal to 0, the value of slice_type shall be equal to 0 or 1.

When nal_unit_type is in the range of IDR_W_RADL to CRA_NUT, inclusive, and vps_independent_layer_flag[GeneralLayerIdx[nuh_layer_id]] is equal to 1, slice_type shall be equal to 2.

The variables MinQt Log 2SizeY, MinQt Log 2SizeC, MinQtSizeY, MinQtSizeC, MaxBtSizeY, MaxBtSizeC, MinBtSizeY, MaxTtSizeY, MaxTtSizeC, MinTtSizeY, MaxMttDepthY and MaxMttDepthC are derived as follows:

If slice_type equal to 2 (I), the following applies:

$$\text{MinQt Log 2SizeY} = \text{MinCb Log 2SizeY} + \text{ph\_log 2\_diff\_min\_qt\_min\_cb\_intra\_slice\_luma} \quad (119)$$

$$\text{MinQt Log 2SizeC} = \text{MinCb Log 2SizeY} + \text{ph\_log 2\_diff\_min\_qt\_min\_cb\_intra\_slice\_chroma} \quad (120)$$

$$\text{MaxBtSizeY} = 1 << (\text{MinQt Log 2SizeY} + \text{ph\_log 2\_diff\_max\_bt\_min\_qt\_intra\_slice\_luma}) \quad (121)$$

$$\text{MaxBtSizeC} = 1 << (\text{MinQt Log 2SizeC} + \text{ph\_log 2\_diff\_max\_bt\_min\_qt\_intra\_slice\_chroma}) \quad (122)$$

$$\text{MaxTtSizeY} = 1 << (\text{MinQt Log 2SizeY} + \text{ph\_log 2\_diff\_max\_tt\_min\_qt\_intra\_slice\_luma}) \quad (123)$$

$$\text{MaxTtSizeC} = 1 << (\text{MinQt Log 2SizeC} + \text{ph\_log 2\_diff\_max\_tt\_min\_qt\_intra\_slice\_chroma}) \quad (124)$$

$$\text{MaxMttDepthY} = \text{ph\_max\_mtt\_hierarchy\_depth\_intra\_slice\_luma} \quad (125)$$

$$\text{MaxMttDepthC} = \text{ph\_max\_mtt\_hierarchy\_depth\_intra\_slice\_chroma} \quad (126)$$

$$\text{CuQpDeltaSubdiv} = \text{ph\_cu\_qp\_delta\_subdiv\_intra\_slice} \quad (127)$$

$$\text{CuChromaQpOffsetSubdiv} = \text{ph\_cu\_chroma\_qp\_offset\_subdiv\_intra\_slice} \quad (128)$$

Otherwise (slice_type equal to 0 (B) or 1 (P)), the following applies:

$$\text{MinQt Log 2SizeY} = \text{MinCb Log 2SizeY} + \text{ph\_log 2\_diff\_min\_qt\_min\_cb\_inter\_slice} \quad (129)$$

$$\text{MinQt Log 2SizeC} = \text{MinCb Log 2SizeY} + \text{ph\_log 2\_diff\_min\_qt\_min\_cb\_inter\_slice} \quad (130)$$

$$\text{MaxBtSizeY} = 1 << (\text{MinQt Log 2SizeY} + \text{ph\_log 2\_diff\_max\_bt\_min\_qt\_inter\_slice}) \quad (131)$$

$$\text{MaxBtSizeC} = 1 << (\text{MinQt Log 2SizeC} + \text{ph\_log 2\_diff\_max\_bt\_min\_qt\_inter\_slice}) \quad (132)$$

$$\text{MaxTtSizeY} = 1 << (\text{MinQt Log 2SizeY} + \text{ph\_log 2\_diff\_max\_tt\_min\_qt\_inter\_slice}) \quad (133)$$

$$\text{MaxTtSizeC} = 1 << (\text{MinQt Log 2SizeC} + \text{ph\_log 2\_diff\_max\_tt\_min\_qt\_inter\_slice}) \quad (134)$$

$$\text{MaxMttDepthY} = \text{ph\_max\_mtt\_hierarchy\_depth\_inter\_slice} \quad (135)$$

$$\text{MaxMttDepthC} = \text{ph\_max\_mtt\_hierarchy\_depth\_inter\_slice} \quad (136)$$

$$\text{CuQpDeltaSubdiv} = \text{ph\_cu\_qp\_delta\_subdiv\_inter\_slice} \quad (137)$$

$$\text{CuChromaQpOffsetSubdiv} = \text{ph\_cu\_chroma\_qp\_offset\_subdiv\_inter\_slice} \quad (138)$$

The following applies:

$$MinQtSizeY = 1 << MinQt\,Log\,2SizeY \quad (139)$$

$$MinQtSizeC = 1 << MinQt\,Log\,2SizeC \quad (140)$$

$$MinBtSizeY = 1 << MinCb\,Log\,2SizeY \quad (141)$$

$$MinTtSizeY = 1 << MinCb\,Log\,2SizeY \quad (142)$$

slice_alf_enabled_flag equal to 1 specifies that adaptive loop filter is enabled and may be applied to Y, Cb, or Cr colour component in a slice. slice_alf_enabled_flag equal to 0 specifies that adaptive loop filter is disabled for all colour components in a slice. When not present, the value of slice_alf_enabled_flag is inferred to be equal to ph_alf_enabled_flag.

slice_num_alf_aps_ids_luma specifies the number of ALF APSs that the slice refers to. When slice_alf_enabled_flag is equal to 1 and slice_num_alf_aps_ids_luma is not present, the value of slice_num_alf_aps_ids_luma is inferred to be equal to the value of ph_num_alf_aps_ids_luma.

aps_id_luma[i] specifies the adaptation_parameter_set_id of the i-th ALF APS that the luma component of the slice refers to. The TemporalId of the APS NAL unit having aps_params_type equal to ALF_APS and adaptation_parameter_set_id equal to slice_alf_aps_id_luma[i] shall be less than or equal to the TemporalId of the coded slice NAL unit. When slice_alf_enabled_flag is equal to 1 and slice_alf_aps_id_luma[i] is not present, the value of slice_alf_aps_id_luma[i] is inferred to be equal to the value of ph_alf_aps_id_luma[i]. The value of alf_luma_filter_signal_flag of the APS NAL unit having aps_params_type equal to ALF_APS and adaptation_parameter_set_id equal to slice_alf_aps_id_luma[i] shall be equal to 1.

slice_alf_chroma_idc equal to 0 specifies that the adaptive loop filter is not applied to Cb and Cr colour components. slice_alf_chroma_idc equal to 1 indicates that the adaptive loop filter is applied to the Cb colour component. slice_alf_chroma_idc equal to 2 indicates that the adaptive loop filter is applied to the Cr colour component. slice_alf_chroma_idc equal to 3 indicates that the adaptive loop filter is applied to Cb and Cr colour components. When slice_alf_chroma_idc is not present, it is inferred to be equal to ph_alf_chroma_idc.

slice_aps_id_chroma specifies the adaptation_parameter_set_id of the ALF_APS that the chroma component of the slice refers to. The TemporalId of the APS NAL unit having aps_params_type equal to ALF_APS and adaptation_parameter_set_id equal to slice_alf_aps_id_chroma shall be less than or equal to the TemporalId of the coded slice NAL unit. When slice_alf_enabled_flag is equal to 1 and slice_alf_aps_id_chroma is not present, the value of slice_alf_aps_id_chroma is inferred to be equal to the value of ph_alf_aps_id_chroma.

The value of alf_chroma_filter_signal_flag of the APS NAL unit having aps_params_type equal to ALF_APS and adaptation_parameter_set_id equal to slice_alf_aps_id_chroma shall be equal to 1.

slice_cc_alf_cb_enabled_flag equal to 0 specifies that the cross-component filter is not applied to the Cb colour component. slice_cc_alf_cb_enabled_flag equal to 1 indicates that the cross-component filter is enabled and may be applied to the Cb colour component. When slice_cc_alf_cb_enabled_flag is not present, it is inferred to be equal to ph_cc_alf_cb_enabled_flag.

slice_cc_alf_cb_aps_id specifies the adaptation_parameter_set_id that the Cb colour component of the slice refers to.

The TemporalId of the APS NAL unit having aps_params_type equal to ALF_APS and adaptation_parameter_set_id equal to slice_cc_alf_cb_aps_id shall be less than or equal to the TemporalId of the coded slice NAL unit. When slice_cc_alf_cb_enabled_flag is equal to 1 and slice_cc_alf_cb_aps_id is not present, the value of slice_cc_alf_cb_aps_id is inferred to be equal to the value of ph_cc_alf_cb_aps_id.

The value of alf_cc_cb_filter_signal_flag of the APS NAL unit having aps_params_type equal to ALF_APS and adaptation_parameter_set_id equal to slice_cc_alf_cb_aps_id shall be equal to 1.

slice_cc_alf_cr_enabled_flag equal to 0 specifies that the cross-component filter is not applied to the Cr colour component. slice_cc_alf_cb_enabled_flag equal to 1 indicates that the cross-component adaptive loop filter is enabled and may be applied to the Cr colour component. When slice_cc_alf_cr_enabled_flag is not present, it is inferred to be equal to ph_cc_alf_cr_enabled_flag.

slice_cc_alf_cr_aps_id specifies the adaptation_parameter_set_id that the Cr colour component of the slice refers to. The TemporalId of the APS NAL unit having aps_params_type equal to ALF_APS and adaptation_parameter_set_id equal to slice_cc_alf_cr_aps_id shall be less than or equal to the TemporalId of the coded slice NAL unit. When slice_cc_alf_cr_enabled_flag is equal to 1 and slice_cc_alf_cr_aps_id is not present, the value of slice_cc_alf_cr_aps_id is inferred to be equal to the value of ph_cc_alf_cr_aps_id.

The value of alf_cc_cr_filter_signal_flag of the APS NAL unit having aps_params_type equal to ALF_APS and adaptation_parameter_set_id equal to slice_cc_alf_cr_aps_id shall be equal to 1. colour_plane_id identifies the colour plane associated with the current slice when separate_colour_plane_flag is equal to 1. The value of colour_plane_id shall be in the range of 0 to 2, inclusive. colour_plane_id values 0, 1 and 2 correspond to the Y, Cb and Cr planes, respectively. The value 3 of colour_plane_id is reserved for future use by ITU-T|ISO/IEC.

NOTE 1—There is no dependency between the decoding processes of different colour planes of one picture.

num_ref_idx_active_override_flag equal to 1 specifies that the syntax element num_ref_idx_active_minus1[0] is present for P and B slices and the syntax element num_ref_idx_active_minus1[1] is present for B slices. num_ref_idx_active_override_flag equal to 0 specifies that the syntax elements num_ref_idx_active_minus1[0] and num_ref_idx_active_minus1[1] are not present. When not present, the value of num_ref_idx_active_override_flag is inferred to be equal to 1.

num_ref_idx_active_minus1[i] is used for the derivation of the variable NumRefIdxActive[i] as specified by Equation 143. The value of num_ref_idx_active_minus1[i] shall be in the range of 0 to 14, inclusive.

For i equal to 0 or 1, when the current slice is a B slice, num_ref_idx_active_override_flag is equal to 1, and num_ref_idx_active_minus1[i] is not present, num_ref_idx_active_minus1[i] is inferred to be equal to 0.

When the current slice is a P slice, num_ref_idx_active_override_flag is equal to 1, and num_ref_idx_active_minus1[0] is not present, num_ref_idx_active_minus1[0] is inferred to be equal to 0.

The variable NumRefIdxActive[i] is derived as follows:

```
for( i = 0; i < 2; i++ ) {
    if( slice_type = = B | |
      ( slice_type = = P && i = = 0 ) ) {
        if( num_ref_idx_active_
            override_flag )
            NumRefIdxActive                    (143)
                [ i ] = num_
                ref_idx_active_
                minus1[ i ] + 1
        else {
            if( num_ref_entries
                [ i ][ RplsIdx[ i ] ] >=
                num_ref_idx_default_
                active_minus1[ i ] + 1 )
                NumRefIdxActive
                    [ i ] = num_ref_
                    idx_default_active_
                    minus1[ i ] + 1
            else
                NumRefIdxActive
                    [ i ] = num_ref_
                    entries[ i ]
                    [ RplsIdx[ i ] ]
        }
    } else /* slice_type = = I | |
      ( slice_type = = P && i = = 1 ) */
        NumRefIdxActive[ i ] = 0
}
```

The value of NumRefIdxActive[i]−1 specifies the maximum reference index for reference picture list i that may be used to decode the slice. When the value of NumRefIdxActive[i] is equal to 0, no reference index for reference picture list i may be used to decode the slice.

When the current slice is a P slice, the value of NumRefIdxActive[0] shall be greater than 0. When the current slice is a B slice, both NumRefIdxActive[0] and NumRefIdxActive[1] shall be greater than 0.

cabac_init_flag specifies the method for determining the initialization table used in the initialization process for context variables. When cabac_init_flag is not present, it is inferred to be equal to 0.

slice_collocated_from_l0_flag equal to 1 specifies that the collocated picture used for temporal motion vector prediction is derived from reference picture list 0. slice_collocated_from_l0_flag equal to 0 specifies that the collocated picture used for temporal motion vector prediction is derived from reference picture list 1.

When slice_type is equal to B or P, ph_temporal_mvp_enabled_flag is equal to 1, and slice_collocated_from_l0_flag is not present, the following applies:

If rpl_info_in_ph_flag is equal to 1, slice collocated from l0 flag is inferred to be equal to ph_collocated_from_l0_flag.

Otherwise (rpl_info_in_ph_flag is equal to 0 and slice_type is equal to P), the value of slice collocated from l0 flag is inferred to be equal to 1.

slice_collocated_ref_idx specifies the reference index of the collocated picture used for temporal motion vector prediction.

When slice_type is equal to P or when slice_type is equal to B and slice collocated from l0 flag is equal to 1, slice_collocated_ref_idx refers to an entry in reference picture list 0, and the value of slice_collocated_ref_idx shall be in the range of 0 to NumRefIdxActive[0]−1, inclusive. When slice_type is equal to B and slice collocated from l0 flag is equal to 0, slice_collocated_ref_idx refers to an entry in reference picture list 1, and the value of slice_collocated_ref_idx shall be in the range of 0 to NumRefIdxActive[1]−1, inclusive. When slice_collocated_ref_idx is not present, the following applies:

If rpl_info_in_ph_flag is equal to 1, the value of slice_collocated_ref_idx is inferred to be equal to ph_collocated_ref_idx.

Otherwise (rpl_info_in_ph_flag is equal to 0), the value of slice_collocated_ref_idx is inferred to be equal to 0.

It is a requirement of bitstream conformance that the picture referred to by slice_collocated_ref_idx shall be the same for all slices of a coded picture.

It is a requirement of bitstream conformance that the values of pic_width_in_luma_samples and pic_height_in_luma_samples of the reference picture referred to by slice_collocated_ref_idx shall be equal to the values of pic_width_in_luma_samples and pic_height_in_luma_samples, respectively, of the current picture, and RprConstraintsActive[slice_collocated_from_l0_flag?0:1][slice_collocated_ref_idx] shall be equal to 0.

slice_qp_delta specifies the initial value of $Qp_Y$ to be used for the coding blocks in the slice until modified by the value of CuQpDeltaVal in the coding unit layer.

When qp_delta_info_in_ph_flag is equal to 0, the initial value of the $Qp_Y$ quantization parameter for the slice, $SliceQp_Y$, is derived as follows:

$$SliceQp_Y = 26 + init\_qp\_minus26 + slice\_qp\_delta \qquad (144)$$

The value of $SliceQp_Y$ shall be in the range of −QpBdOffset to +63, inclusive.

When either of the following conditions is true:

The value of wp_info_in_ph_flag is equal to 1, pps_weighted_pred_flag is equal to 1, and slice_type is equal to P.

The value of wp_info_in_ph_flag is equal to 1, pps_weighted_bipred_flag is equal to 1, and slice_type is equal to B.

the following applies:

The value of NumRefIdxActive[0] shall be less than or equal to the value of NumWeightsL0.

For each reference picture index RefPicList[0][i] for i in the range of 0 to NumRefIdxActive[0]−1, inclusive, the luma weight, Cb weight, and Cr weight that apply to the reference picture index are LumaWeightL0[i], ChromaWeightL0[0][i], and ChromaWeightL0[1][i], respectively.

When wp_info_in_ph_flag is equal to 1, pps_weighted_bipred_flag is equal to 1, and slice_type is equal to B, the following applies:

The value of NumRefIdxActive[1] shall be less than or equal to the value of NumWeightsL1.

For each reference picture index RefPicList[1][i] for i in the range of 0 to NumRefIdxActive[1]−1, inclusive, the luma weight, Cb weight, and Cr weight that apply to the reference picture index are LumaWeightL1[i], ChromaWeightL1[0][i], and ChromaWeightL1[1][i], respectively.

slice_cb_qp_offset specifies a difference to be added to the value of pps_cb_qp_offset when determining the value of the $Qp'_{Cb}$ quantization parameter. The value of slice_cb_qp_offset shall be in the range of −12 to +12, inclusive. When slice_cb_qp_offset is not present, it is inferred to be equal to 0. The value of pps_cb_qp_offset+slice_cb_qp_offset shall be in the range of −12 to +12, inclusive.

slice_cr_qp_offset specifies a difference to be added to the value of pps_cr_qp_offset when determining the value of the $Qp'_{Cr}$ quantization parameter. The value of slice_cr_qp_offset shall be in the range of −12 to +12, inclusive. When slice_cr_qp_offset is not present, it is inferred to be equal to 0. The value of pps_cr_qp_offset+slice_cr_qp_offset shall be in the range of −12 to +12, inclusive.

slice_joint_cbcr_qp_offset specifies a difference to be added to the value of pps_joint_cbcr_qp_offset_value when determining the value of the Qp'$_{CbCr}$. The value of slice_joint_cbcr_qp_offset shall be in the range of −12 to +12, inclusive. When slice_joint_cbcr_qp_offset is not present, it is inferred to be equal to 0. The value of pps_joint_cbcr_qp_offset_value+slice_joint_cbcr_qp_offset shall be in the range of −12 to +12, inclusive.

cu_chroma_qp_offset_enabled_flag equal to 1 specifies that the cu_chroma_qp_offset_flag may be present in the transform unit and palette coding syntax. cu_chroma_qp_offset_enabled_flag equal to 0 specifies that the cu_chroma_qp_offset_flag is not present in the transform unit or palette coding syntax. When not present, the value of cu_chroma_qp_offset_enabled_flag is inferred to be equal to 0.

slice_sao_luma_flag equal to 1 specifies that SAO is enabled for the luma component in the current slice; slice_sao_luma_flag equal to 0 specifies that SAO is disabled for the luma component in the current slice. When slice_sao_luma_flag is not present, it is inferred to be equal to ph_sao_luma_enabled_flag.

slice_sao_chroma_flag equal to 1 specifies that SAO is enabled for the chroma component in the current slice; slice_sao_chroma_flag equal to 0 specifies that SAO is disabled for the chroma component in the current slice. When slice_sao_chroma_flag is not present, it is inferred to be equal to ph_sao_chroma_enabled_flag.

slice_deblocking_filter_override_flag equal to 1 specifies that deblocking parameters are present in the slice header. slice_deblocking_filter_override_flag equal to 0 specifies that deblocking parameters are not present in the slice header. When not present, the value of slice_deblocking_filter_override_flag is inferred to be equal to ph_deblocking_filter_override_flag.

slice_deblocking_filter_disabled_flag equal to 1 specifies that the operation of the deblocking filter is not applied for the current slice. slice_deblocking_filter_disabled_flag equal to 0 specifies that the operation of the deblocking filter is applied for the current slice. When slice_deblocking_filter_disabled_flag is not present, it is inferred to be equal to ph_deblocking_filter_disabled_flag.

slice_beta_offset_div2 and slice_tc_offset_div2 specify the deblocking parameter offsets for β and tC (divided by 2) that are applied to the luma component for the current slice. The values of slice_beta_offset_div2 and slice_tc_offset_div2 shall both be in the range of −12 to 12, inclusive. When not present, the values of slice_beta_offset_div2 and slice_tc_offset_div2 are inferred to be equal to ph_beta_offset_div2 and ph_tc_offset_div2, respectively.

slice_cb_beta_offset_div2 and slice_cb_tc_offset_div2 specify the deblocking parameter offsets for β and tC (divided by 2) that are applied to the Cb component for the current slice. The values of slice_cb_beta_offset_div2 and slice_cb_tc_offset_div2 shall both be in the range of −12 to 12, inclusive. When not present, the values of slice_cb_beta_offset_div2 and slice_cb_tc_offset_div2 are inferred to be equal to ph_cb_beta_offset_div2 and ph_cb_tc_offset_div2, respectively.

slice_cb_beta_offset_div2 and slice_cb_tc_offset_div2 specify the deblocking parameter offsets for β and tC (divided by 2) that are applied to the Cr component for the current slice. The values of slice_cr_beta_offset_div2 and slice_cr_tc_offset_div2 shall both be in the range of −12 to 12, inclusive. When not present, the values of slice_cr_beta_offset_div2 and slice_cr_tc_offset_div2 are inferred to be equal to ph_cr_beta_offset_div2 and ph_cr_tc_offset_div2, respectively.

slice_ts_residual_coding_disabled_flag equal to 1 specifies that the residual_coding( ) syntax structure is used to parse the residual samples of a transform skip block for the current slice. slice_ts_residual_coding_disabled_flag equal to 0 specifies that the residual_ts_coding( ) syntax structure is used to parse the residual samples of a transform skip block for the current slice. When slice_ts_residual_coding_disabled_flag is not present, it is inferred to be equal to 0.

slice_lmcs_enabled_flag equal to 1 specifies that luma mapping with chroma scaling is enabled for the current slice. slice_lmcs_enabled_flag equal to 0 specifies that luma mapping with chroma scaling is not enabled for the current slice. When slice_lmcs_enabled_flag is not present, it is inferred to be equal to 0.

slice_scaling_list_present_flag equal to 1 specifies that the scaling list data used for the current slice is derived based on the scaling list data contained in the referenced scaling list APS with aps_params_type equal to SCALING_APS and adaptation_parameter_set_id equal to ph_scaling_list_aps_id. slice_scaling_list_present_flag equal to 0 specifies that the scaling list data used for the current picture is the default scaling_list_data derived specified in clause 7.4.3.21. When not present, the value of slice_scaling_list_present_flag is inferred to be equal to 0.

The variable NumEntryPoints, which specifies the number of entry points in the current slice, is derived as follows:

```
NumEntryPoints = 0
for( i = 1; i < NumCtus-
InCurrSlice; i++ ) {
   ctbAddrX = CtbAddrInCurrSlice
   [ i ] % PicWidthInCtbsY
   ctbAddrY = CtbAddrInCurrSlice
   [ i ] / PicWidthInCtbsY
   (145) prevCtbAddrX =
   CtbAddrInCurrSlice
   [ i − 1 ] % PicWidthInCtbsY
   prevCtbAddrY = CtbAddrInCurrSlice
   [ i − 1 ] / PicWidthInCtbsY
   if( CtbToTileRowBd[ ctbAddrY ] !=
   CtbToTileRowBd[ prevCtbAddrY ] | |
      CtbToTileColBd[ ctbAddrX ] !=
      CtbToTileColBd
      [ prevCtbAddrX ] | |
      ( ctbAddrY != prevCtbAddrY )
   && sps_wpp_entry_point_
   offsets_present_flag ) )
      NumEntryPoints++
}
``` offset_len_minus1 plus 1 specifies the length, in bits, of the entry_point_offset_minus1[i] syntax elements. The value of offset_len_minus1 shall be in the range of 0 to 31, inclusive.

entry_point_offset_minus1[i] plus 1 specifies the i-th entry point offset in bytes, and is represented by offset_len_minus1 plus 1 bits. The slice data that follow the slice header consists of NumEntryPoints+1 subsets, with subset index values ranging from 0 to NumEntryPoints, inclusive. The first byte of the slice data is considered byte 0. When present, emulation prevention bytes that appear in the slice data portion of the coded slice NAL unit are counted as part of the slice data for purposes of subset identification. Subset 0 consists of bytes 0 to entry_point_offset_minus1[0], inclusive, of the coded slice data, subset k, with k in the range of 1 to NumEntryPoints−1, inclusive, consists of bytes firstByte[k] to lastByte[k], inclusive, of the coded slice data with firstByte[k] and lastByte[k] defined as:

$$\text{firstByte}[k] = \sum_{n=1}^{k}(\text{entry\_point\_offset\_minus1}[n-1]+1) \quad (146)$$

$$\text{lastByte}[k] = \text{firstByte}[k] + \text{entry\_point\_offset\_minus1}[k] \quad (147)$$

lastByte[k]=firstByte[k]+entry_point_offset_minus1 [k]   (147)

The last subset (with subset index equal to NumEntryPoints) consists of the remaining bytes of the coded slice data. When sps_entropy_coding_sync_enabled_flag is equal to 0 and the slice contains one or more complete tiles, each subset shall consist of all coded bits of all CTUs in the slice that are within the same tile, and the number of subsets (i.e., the value of NumEntryPoints+1) shall be equal to the number of tiles in the slice.

When sps_entropy_coding_sync_enabled_flag is equal to 0 and the slice contains a subset of CTU rows from a single tile, the NumEntryPoints shall be 0, and the number of subsets shall be 1. The subset shall consist of all coded bits of all CTUs in the slice.

When sps_entropy_coding_sync_enabled_flag is equal to 1, each subset k with k in the range of 0 to NumEntryPoints, inclusive, shall consist of all coded bits of all CTUs in a CTU row within a tile, and the number of subsets (i.e., the value of NumEntryPoints+1) shall be equal to the total number of tile-specific CTU rows in the slice.

slice_header_extension_length specifies the length of the slice header extension data in bytes, not including the bits used for signalling slice_header_extension_length itself. The value of slice_header_extension_length shall be in the range of 0 to 256, inclusive. When not present, the value of slice_header_extension_length is inferred to be equal to 0.

slice_header_extension_data_byte[i] may have any value. Decoders conforming to this version of this Specification shall ignore the values of all the slice_header_extension_data_byte[i] syntax elements. Its value does not affect decoder conformance to profiles specified in this version of specification.

3.10. Reference Picture Lists Syntax

In the latest VVC draft text, the syntax structure ref_pic_lists( ) and semantics are as follows:

| ref_pic_lists( ) { | Descriptor |
|---|---|
| for( i = 0; i < 2; i++ ) { | |
|   if( num_ref_pic_lists_ | |
|   in_sps[ i ] > 0 && | |
|     ( i = = 0 \|\| | |
|     ( i = = 1 && | |
|     rpl1_idx_ | |
|     present_flag ) ) ) | |
|     rpl_sps_flag[ i ] | u(1) |
|   if( rpl_sps_flag[ i ] ) { | |
|     if( num_ref_pic_lists_ | |
|     in_sps[ i ] > 1 && | |
|       ( i = = 0 \|\| | |
|       ( i = = 1 && | |
|       rpl1_idx_ | |
|       present_flag ) ) ) | |
|     rpl_idx[ i ] | u(v) |
|   } else | |
|     ref_pic_list_ | |
|     struct( i, num_ref_ | |
|     pic_lists_in_sps[ i ] ) | |
|   for( j = 0; j < | |
|   NumLtrpEntries | |
|   [ i ][ RplsIdx[ i ] ; j++ ) { | |
|     if( ltrp_in_header_flag | |
|     [ i ][ RplsIdx[ i ] ] ) | |
|     poc_lsb_lt[ i ][ j ] | u(v) |
|     delta_poc_msb_ | u(1) |
|     present_flag[ i ][ j ] | |
|     if( delta_poc_msb_ | |
|     present_flag[ i ][ j ] ) | |
|     delta_poc_msb_ | ue(v) |
|     cycle_lt[ i ][ j ] | |
|   } | |
| } | |
| } | |

The ref_pic_lists( ) syntax structure may be present in the PH syntax structure or the slice header.

rpl_sps_flag[i] equal to 1 specifies that reference picture list i in ref_pic_lists( ) is derived based on one of the ref_pic_list_struct(listIdx, rplsIdx) syntax structures with listIdx equal to i in the SPS. rpl_sps_flag[i] equal to 0 specifies that reference picture list i of the picture is derived based on the ref_pic_list_struct(listIdx, rplsIdx) syntax structure with listIdx equal to i that is directly included in ref_pic_lists( ).

When rpl_sps_flag[i] is not present, the following applies:
  If num_ref_pic_lists_in_sps[i] is equal to 0, the value of rpl_sps_flag[i] is inferred to be equal to 0.
  Otherwise (num_ref_pic_lists_in_sps[i] is greater than 0), when rpl1_idx_present_flag is equal to 0 and i is equal to 1, the value of rpl_sps_flag[1] is inferred to be equal to rpl_sps_flag[0].

rpl_idx[i] specifies the index, into the list of the ref_pic_list_struct(listIdx, rplsIdx) syntax structures with listIdx equal to i included in the SPS, of the ref_pic_list_struct (listIdx, rplsIdx) syntax structure with listIdx equal to i that is used for derivation of reference picture list i of the current picture. The syntax element rpl_idx[i] is represented by Ceil(Log 2(num_ref_pic_lists_in_sps[i])) bits. When not present, the value of rpl_idx[i] is inferred to be equal to 0. The value of rpl_idx[i] shall be in the range of 0 to num_ref_pic_lists_in_sps[i]−1, inclusive. When rpl_sps_flag[i] is equal to 1 and num_ref_pic_lists_in_sps[i] is equal to 1, the value of rpl_idx[i] is inferred to be equal to 0. When rpl_sps_flag[i] is equal to 1 and rpl1_idx_present_flag is equal to 0, the value of rpl_idx[1] is inferred to be equal to rpl_idx[0].

The variable RplsIdx[i] is derived as follows:

$$\text{RplsIdx}[i] = \text{rpl\_sps\_flag}[i]?\text{rpl\_idx}[i]:\text{num\_ref\_pic\_lists\_in\_sps}[i] \quad (149)$$

poc_lsb_lt[i][j] specifies the value of the picture order count modulo MaxPicOrderCntLsb of the j-th LTRP entry in the i-th reference picture list in the ref_pic_lists( ) syntax structure. The length of the poc_lsb_lt[i][j] syntax element is log 2_max_pic_order_cnt_lsb_minus4+4 bits. The variable PocLsbLt[i][j] is derived as follows:

$$\text{PocLsbLt}[i][j] = \text{ltrp\_in\_header\_flag}[i][\text{RplsIdx}[i]]?\text{poc\_lsb\_lt}[i][j]:\text{rpls\_poc\_lsb\_lt}[\text{listIdx}][\text{RplsIdx}[i]][j] \quad (150)$$

delta_poc_msb_present_flag[i][j] equal to 1 specifies that delta_poc_msb_cycle_lt[i][j] is present. delta_poc_msb_present_flag[i][j] equal to 0 specifies that delta_poc_msb_cycle_lt[i][j] is not present.

Let prevTid0Pic be the previous picture in decoding order that has nuh_layer_id the same as the slice or picture header referring to the ref_pic_lists( ) syntax structure, has TemporalId equal to 0, and is not a RASL or RADL picture. Let setOfPrevPocVals be a set consisting of the following:
- the PicOrderCntVal of prevTid0Pic,
- the PicOrderCntVal of each picture that is referred to by entries in RefPicList[0] or RefPicList[1] of prevTid0Pic and has nuh_layer_id the same as the current picture,
- the PicOrderCntVal of each picture that follows prevTid0Pic in decoding order, has nuh_layer_id the same as the current picture, and precedes the current picture in decoding order.

When there is more than one value in setOfPrevPocVals for which the value modulo MaxPicOrderCntLsb is equal to PocLsbLt[i][j], the value of delta_poc_msb_present_flag[i][j] shall be equal to 1.

delta_poc_msb_cycle_lt[i][j] specifies the value of the variable FullPocLt[i][j] as follows:

```
if( j == 0 )
  deltaPocMsbCycleLt[ i ][ j ] =
  delta_poc_msb_cycle_lt[ i ][ j ]
else
                                                    (151)
  deltaPocMsbCycleLt[ i ][ j ] =
  delta_poc_msb_cycle_lt[ i ][ j ] +
  deltaPocMsbCycleLt[ i ][ j − 1 ]
FullPocLt[ i ][ j ] = PicOrderCntVal −
  deltaPocMsbCycleLt[ i ][ j ] *
  MaxPicOrderCntLsb −
    ( PicOrderCntVal & ( MaxPicOrderCntLsb −
    1 ) ) + PocLsbLt[ i ][ j ]
```

The value of delta_poc_msb_cycle_lt[i][j] shall be in the range of 0 to $2^{(32-log\ 2\_max\_pic\_order\_cnt\_lsb\_minus4-4)}$, inclusive. When not present, the value of delta_poc_msb_cycle_lt[i][j] is inferred to be equal to 0.

3.11. Reference Picture List Structure Syntax

In the latest VVC draft text, the syntax structure ref_pic_lists( ) and semantics are as follows:

| ref_pic_list_struct( listIdx, rplsIdx ) { | Descriptor |
|---|---|
|   num_ref_entries [ listIdx ][ rplsIdx ] | ue(v) |
|   if( long_term_ref_pics_flag ) | |
|     ltrp_in_header_flag [ listIdx ][ rplsIdx ] | u(1) |
|   for( i = 0, j = 0; i < num_ref_entries [ listIdx ][ rplsIdx ]; i++) { | |
|     if( inter_layer_ref_pics_present_flag ) | |
|       inter_layer_ref_pic_flag [ listIdx ][ rplsIdx ][ i ] | u(1) |
|     if( !inter_layer_ref_pic_flag [ listIdx ][ rplsIdx ][ i ] ) { | |
|       if( long_term_ref_pics_flag ) | |
|         st_ref_pic_flag [ listIdx ][ rplsIdx ][ i ] | u(1) |
|       if( st_ref_pic_flag [ listIdx ][ rplsIdx ][ i ] ) { | |
|         abs_delta_poc_st [ listIdx ][ rplsIdx ][ i ] | ue(v) |
|         if( AbsDeltaPocSt [ listIdx ][ rplsIdx ] | |
|         [ i ] > 0 ) | |
|           strp_entry_sign_flag [ listIdx ][ rplsIdx ][ i ] | u(1) |
|       } else if( !ltrp_in_header_flag [ listIdx ][ rplsIdx ] ) | |
|         rpls_poc_lsb_lt [ listIdx ][ rplsIdx ] [ j++ ] | u(v) |
|     } else | |
|       ilrp_idx[ listIdx ] [ rplsIdx ][ i ] | ue(v) |
|   } | |
| } | |

The ref_pic_list_struct(listIdx, rplsIdx) syntax structure may be present in an SPS, in a PH syntax structure, or in a slice header. Depending on whether the syntax structure is included in an SPS, a PH syntax structure, or a slice header, the following applies:
- If present in a PH syntax structure or a slice header, the ref_pic_list_struct(listIdx, rplsIdx) syntax structure specifies reference picture list listIdx of the current picture (the picture containing the slice).
- Otherwise (present in an SPS), the ref_pic_list_struct (listIdx, rplsIdx) syntax structure specifies a candidate for reference picture list listIdx, and the term "the current picture" in the semantics specified in the remainder of this clause refers to each picture that 1) has a PH syntax structure containing ph_rpl_idx[listIdx] equal to an index into the list of the ref_pic_list_struct(listIdx, rplsIdx) syntax structures included in the SPS or one or more slices containing slice rpl_idx [listIdx] equal to an index into the list of the ref_pic_list_struct(listIdx, rplsIdx) syntax structures included in the SPS, and 2) is in a CVS that refers to the SPS.

num_ref_entries[listIdx][rplsIdx] specifies the number of entries in the ref_pic_list_struct(listIdx, rplsIdx) syntax structure. The value of num_ref_entries[listIdx][rplsIdx] shall be in the range of 0 to MaxDpbSize+13, inclusive, where MaxDpbSize is as specified in clause A.4.2.

ltrp_in_header_flag[listIdx][rplsIdx] equal to 0 specifies that the POC LSBs of the LTRP entries in the ref_pic_list_struct (listIdx, rplsIdx) syntax structure are present in the ref_pic_list_struct(listIdx, rplsIdx) syntax structure. ltrp_in_header_flag[listIdx][rplsIdx] equal to 1 specifies that the POC LSBs of the LTRP entries in the ref_pic_list_struct(listIdx, rplsIdx) syntax structure are not present in the ref_pic_list_struct(listIdx, rplsIdx) syntax structure.

inter_layer_ref_pic_flag[listIdx][rplsIdx][i] equal to 1 specifies that the i-th entry in the ref_pic_list_struct(listIdx, rplsIdx) syntax structure is an ILRP entry. inter_layer_ref_pic_flag[listIdx][rplsIdx][i] equal to 0 specifies that the i-th entry in the ref_pic_list_struct(listIdx, rplsIdx) syntax structure is not an ILRP entry. When not present, the value of inter_layer_ref_pic_flag[listIdx][rplsIdx][i] is inferred to be equal to 0.

st_ref_pic_flag[listIdx][rplsIdx][i] equal to 1 specifies that the i-th entry in the refpic_list_struct(listIdx, rplsIdx) syntax structure is an STRP entry. st_ref_pic_flag[listIdx][rplsIdx] [i] equal to 0 specifies that the i-th entry in the refpic_list_struct(listIdx, rplsIdx) syntax structure is an LTRP entry. When inter_layer_ref_pic_flag[listIdx][rplsIdx][i] is equal to 0 and st_ref_pic_flag[listIdx][rplsIdx][i] is not present, the value of st_ref_pic_flag[listIdx][rplsIdx][i] is inferred to be equal to 1.

The variable NumLtrpEntries[listIdx][rplsIdx] is derived as follows:

```
for( i = 0, NumLtrpEntries
[ listIdx ][ rplsIdx ] = 0; i <
num_ref_entries[ listIdx ]
[ rplsIdx ]; i++ )
    if(
    !inter_layer_ref_pic_flag
    [ listIdx ][ rplsIdx ][ i ] &&
    !st_ref_pic_flag[ listIdx ]                         (152)
    [ rplsIdx ][ i ] )
        NumLtrpEntries
[ listIdx ][ rplsIdx ]++
abs_delta_poc_st[ listIdx ]
[ rplsIdx ][ i ]
specifies the value of the variable
AbsDeltaPocSt[ listIdx ]
[ rplsIdx ][ i ] as follows:
    if( ( sps_weighted_pred_flag ||
    sps_weighted_bipred_
    flag ) && i != 0 )
        AbsDeltaPocSt[ listIdx ]
        [ rplsIdx ][ i ] =
    abs_delta_poc_st[ listIdx ]
    [ rplsIdx ][ i ]
        (153)
        else
        AbsDeltaPocSt[ listIdx ]
        [ rplsIdx ][ i ] =
    abs_delta_poc_st[ listIdx ]
    [ rplsIdx ][ i ] + 1
```

The value of abs_delta_poc_st[listIdx][rplsIdx][i] shall be in the range of 0 to $2^{15}-1$, inclusive.

strp_entry_sign_flag[listIdx][rplsIdx][i] equal to 1 specifies that i-th entry in the syntax structure refpic_list_struct (listIdx, rplsIdx) has a value greater than or equal to 0.

strp_entry_sign_flag[listIdx][rplsIdx][i] equal to 0 specifies that the i-th entry in the syntax structure refpic_list_struct (listIdx, rplsIdx) has a value less than 0. When not present, the value of strp_entry_sign_flag[listIdx][rplsIdx][i] is inferred to be equal to 1.

The list DeltaPocValSt[listIdx][rplsIdx] is derived as follows:

```
for( i = 0; i < num_ref_entries
[ listIdx ][ rplsIdx ]; i++ )
    if(
    !inter_layer_ref_pic_flag
    [ listIdx ][ rplsIdx ][ i ] &&
    st_ref_pic_flag[ listIdx ]                          (153)
    [ rplsIdx ][ i ] )
        DeltaPocValSt[ listIdx]
        [ rplsIdx][ i ] =
    ( strp_entry_sign_flag
    [ listIdx ][ rplsIdx ][ i ] ) ?
        AbsDeltaPocSt[ listIdx ]
        [ rplsIdx ][ i ] : 0 -
    AbsDeltaPocSt[ listIdx ]
    [ rplsIdx ][ i ]
``` rpls_poc_lsb_lt[listIdx][rplsIdx][i] specifies the value of the picture order count modulo MaxPicOrderCntLsb of the picture referred to by the i-th entry in the refpic_list_struct (listIdx, rplsIdx) syntax structure. The length of the rpls_poc_lsb_lt[listIdx][rplsIdx][i] syntax element is log 2_max_pic_order_cnt_lsb_minus4+4 bits.

ilrp_idx[listIdx][rplsIdx][i] specifies the index, to the list of the direct reference layers, of the ILRP of the i-th entry in the refpic_list_struct(listIdx, rplsIdx) syntax structure. The value of ilrp_idx[listIdx][rplsIdx][i] shall be in the range of 0 to NumDirectRefLayers[GeneralLayerIdx[nuh_layer_id]]−1, inclusive.

4. Examples of Technical Problems Solved by Disclosed Techniques

The existing designs for constraint flags have the following problems:

1) Currently, whenever there is a PTL syntax structure with profileTierPresentFlag equal to 1, all the general constraint flags/fields are signalled in that PTL syntax structure (SS). Considering that PTL syntax structures may be included in DCI (one or more times, each time with profileTierPresentFlag equal to 1), in VPS (one or more times, the first time with profileTierPresentFlag equal to 1, other times with profileTierPresentFlag equal to either 0 or 1), and in SPS (zero or one time, with profileTierPresentFlag equal to 1), potentially there can be lots of redundant signalling of the general constraint flags/fields. Furthermore, it is possible that none of the general constraints may apply while in this case at least one set of general constraint flags/fields is still signalled for the bitstream of each OLS.
2) In the latest VVC draft text, the general constraint flags are used to constrain the values of some SPS/PH/SH syntax elements (SEs) or their combinations via bitstream constraint in the semantics. However, they can also be used to condition the presence of such related SPS/PH/SH SEs, which would allow skipping the signalling of bits for which their values are known thus avoiding waste of bits.
    a. In the general_constraint_info( ) synatx in the latest VVC draft text, the syntax elements such as no_aps_constraint_flag affect a group of techniques such as ALF, CCALF, LMCS, scaling list, and etc. However, the current design does not cover all cases (e.g., in terms of specifying constraints on values of related syntax elements or conditioning the presence of related syntax elements).
3) In the latest VVC draft text, some PPS SEs that relate to general constraint flags can only have certain values depending on values of certain general constraint flags. However, some semantics constraints are missing to disallow illegal values of such PPS SEs.
4) In the general_constraint_info( ) synatx in the latest VVC draft text, a bunch of general constraint flags have interactions with each other, i.e., certain values of general constraint flags depend the values of other general constraint flags. However, there lacks constraints to disallow illegal values of such general constraint flags, by either bitstream constraints or syntax conditioning.
5) Some syntax elements may be added to SPS and/or PPS to condition the presences of some SPS/PPS/PH/SH syntax elements for saving bits.
6) In the general_constraint_info( ) synatx in the latest VVC draft text, constraint flags for a subset of coding tools and functionalities are included. However, there are other coding tools (e.g., WPP, entropy coding sync, weighted prediction, weighted bi-prediction, SMVD, MMVD, ISP, MRL, MIP, LFNST, Palette, ACT, scaling list, and etc.) and functionalities (e.g., single layer only, one sub-picture only, no inter-layer prediction, no virtual boundaries, no long term reference, no 32×32 max luma transform size, no MER, and etc.) that don't have corresponding constraint flags.

7) In the latest VVC draft text, APSs do not refer to an PPS, an SPS, or an VPS. However, the semantics of some APS SEs depends on values of SEs of VPS, SPS, or PPS. Either all such dependencies should be removed or an PPS or SPS or VPS ID is added to the APS syntax to allow the referencing of PPS or SPS or VPS thus allowing such semantics dependencies.

5. Example Embodiments and Techniques

To solve the above problems and some other problems not mentioned, methods as summarized below are disclosed. The embodiments should be considered as examples to explain the general concepts and should not be interpreted in a narrow way. Furthermore, these embodiments can be applied individually or combined in any manner.

1. Regarding the signalling of general constraint flags/fields in general for solving the first problem, one or more of the following approaches are disclosed:
    1) A presence flag may be added to the PTL syntax structure to specify whether the general_constraint_info( ) syntax structure is present in the PTL syntax structure.
        a. In one example, when no general_constraint_info( ) syntax structure is present for an OLS, a default value is inferred for each of the general constraint flags/fields.
            i. In one example, when no general_constraint_info( ) syntax structure is present for an OLS, each of the general constraint flags/fields is inferred to be a value that specifies that no particular constraint is imposed for the bitstream of the OLS. For example, the values of intra_only_constraint_flag, no_res_change_in_clvs_constraint_flag, and one_tile_per_pic_constraint_flag are all inferred to be equal to 0.
        b. In one example, in the DCI, when there is more than one PTL syntax structure in it, it may be required that at most one of those PTL syntax structures contains a general_constraint_info( ) syntax structure, and when present, that general_constraint_info( ) syntax structure applies to the entire bitstream.
            i. Furthermore, it may be required that only the first PTL syntax structure in the DCI may contain a general_constraint_info( ) syntax structure, and the general constraints information associated with the first DCI PTL syntax structure in the DCI (explicitly signalled or inferred) is considered as the general constraints information associated with the DCI, which applies to the entire bitstream.
        c. In one example, when a DCI is present in the bitstream, it may be required that no PTL syntax structure present in a VPS or SPS shall contain a general_constraint_info( ) syntax structure, and the general constraints information associated with the DCI (explicitly signalled or inferred) applies to each OLS in each CVS in the bitstream.
            i. Alternatively, when a DCI is present in the bitstream, it may be required that no PTL syntax structure present in a VPS shall contain a general_constraint_info( ) syntax structure, and the general constraints information associated with the DCI (explicitly signalled or inferred) applies to each OLS containing more than one layer in each CVS in the bitstream.
        d. In one example, in a VPS, when there is more than one PTL syntax structure in it, it may be required that only one of those PTL syntax structures may contain a general_constraint_info( ) syntax structure, and that general_constraint_info( ) syntax structure applies to each OLS of each CVS in the bitstream.
            i. Alternatively, in a VPS, when there is more than one PTL syntax structure in it, it may be required that only the first PTL syntax structure in the VPS may contain a general_constraint_info( ) syntax structure, and the general constraints information associated with the first PTL syntax structure (explicitly signalled or inferred) applies to each OLS of each CVS in the bitstream.
        e. In one example, when there is more than one PTL (and/or general_constraint_info( )) syntax structure signaled in DCI and/or SPS and/or VPS, those PTL (and/or general_constraint_info( )) syntax structures must have the same content in a conformance bitstream.
            i. In one example, when there is more than one PTL (and/or general_constraint_info( )) syntax structure signaled for an OLS, those PTL (and/or general_constraint_info( )) syntax structures must have the same content in a conformance bitstream.
            ii. In one example, when there is more than one PTL (and/or general_constraint_info( )) syntax structure signaled for a CVS, those PTL (and/or general_constraint_info( )) syntax structures must have the same content in a conformance bitstream.
        f. In one example, at most one PTL (and/or general_constraint_info( )) syntax structure is allowed to be signaled in DCI and/or SPS and/or VPS in a conformance bitstream.
            i. In one example, at most one PTL (and/or general_constraint_info( )) syntax structure is allowed to be signaled for an OLS in a conformance bitstream.
            ii. In one example, at most one PTL (and/or general_constraint_info( )) syntax structure is allowed to be signaled for a CVS in a conformance bitstream.
        g. In one example, when there are multiple PTL syntax structures signaled in DCI targeting for multiple OLSs, a syntax element may be added to the DCI syntax structure to specify the index, to the list of PLT syntax structures in the DCI, of the PTL syntax structure that applies to the i-th OLS.
            i. Additionally, if there is only one OLS in a bitstream, the signaling of the above-mentioned syntax element may be skipped and/or the value of the syntax element is inferred to a certain value (such as 0).
        h. In one example, when there are multiple general_constraint_info( )) syntax structures in DCI and/or SPS and/or VPS, and the values for a particular general constraint flag/field are different for an OLS, then as long as anyone of the general constraint flags imposes a particular constraint, the particular constraint would be applied to this OLS.
            i. In one example, when any of the general constraint flags in VPS/SPS specify that a particular constraint is imposed for an OLS, whereas the corresponding general constraint flag in DCI specifies that a particular constraint is not imposed for an OLS, then that OLS may conform to the tighter constraint (e.g., impose such particular constraint to that OLS as indicated in VPS/SPS).
1. Alternatively, when any of the general constraint flags in VPS/SPS specify that a particular constraint is not imposed for an OLS, whereas the corresponding general constraint flag in DCI specifies that a particular constraint is imposed for an OLS, then that OLS may conform to the tighter constraint (e.g., impose such particular constraint to that OLS as indicated in DCI).
ii. In one example, for any particular aspect associated with a general constraint syntax element that impose a constraint to an OLS, the corresponding general constraint syntax element carried in DCI has to have a value that indicates a more relaxed than but cannot be tighter than the value of the same constraint regarding that aspect indicated in VPS/SPS.
1. In one example, if any of the general constraint flags/fields in VPS/SPS specify that a particular constraint is not imposed for an OLS, then a bitstream conformance may be added to require that the value of the corresponding general constraint flag in DCI is equal to 0 for that OLS (in this case, the value of the corresponding general constraint flag in DCI cannot be equal to 1).
2. In one example, if any of the general constraint flags/fields in VPS/SPS specify that a particular constraint is imposed for an OLS, then the value of the corresponding general constraint flag in DCI may be equal to 0 or 1 for that OLS.
iii. Alternatively, oppositely, for any particular aspect associated with a general constraint syntax element that impose a constraint to an OLS, the corresponding general constraint syntax element carried in DCI has to have a value that indicates a tighter than but cannot be more relaxed than the value of the same constraint regarding that aspect indicated in VPS/SPS.
1. In one example, if any of the general constraint flags/fields in VPS/SPS specify that a particular constraint is imposed for an OLS, then a bitstream conformance may be added to require that the value of the corresponding general constraint flag in DCI is equal to 1 for that OLS (in this case, the value of the corresponding general constraint flag in DCI cannot be equal to 0).
2. In one example, if any of the general constraint flags/fields in VPS/SPS specify that a particular constraint is not imposed for an OLS, then the value of the corresponding general constraint flag in DCI may be equal to 0 or 1 for that OLS.
i. In one example, multiple sets of different default values for the general constraint flags/fields may be pre-defined.
i. Alternatively, furthermore, an indication of one set among the multiple sets may be signalled in a DCI/VPS/SPS.
ii. Alternatively, only one set is pre-defined.
1. Alternatively, furthermore, one flag may be present in DCI/VPS/SPS to specify whether the one set is used.
iii. In one example, for one of the multiple sets, each of the general constraint flags/fields is inferred to be a value that specifies that a particular constraint is not imposed for the bitstream of the OLS. For example, the values of intra_only_constraint_flag, no_res_change_in_clvs_constraint_flag, and one_tile_per_pic_constraint_flag are all inferred to be equal to 0.
iv. In one example, for one or some of the multiple sets, the value of max_bitdepth_constraint_idc may be inferred to be equal to a particular value, e.g., 2.
2. Regarding the signalling of SPS/PH/SH syntax elements based on the general constraint flags for solving the second problem:
1) Depending on the values of general constraint flags, the signaling of the corresponding syntax elements in SPS/PH/SH may be skipped, e.g., as in the first embodiment.
a. In one example, signalling of some SPS syntax elements may be skipped according to some general constraint flags.
i. For example, in case of the value of the general constraint field max_chroma_format_constraint_idc is equal to 0, the signalling of the corresponding SPS syntax element chroma_format_idc may be skipped.
a) Additionally, furthermore, when max_chroma_format_constraint_idc is equal to 0, the value of chroma_format_idc is inferred to be equal to 0.
ii. For example, in case of the value of the general constraint field max_bitdepth_constraint_idc is equal to 0, the signalling of the corresponding SPS syntax element bit_depth_minus8 may be skipped.
a) Additionally, furthermore, when max_bitdepth_constraint_idc is equal to 0, the value of bit_depth_minus8 is inferred to be equal to 0.
iii. For example, in case of the value of the general constraint flag no_aps_constraint_flag is equal to 1, the signalling of the APS-related SPS syntax elements (such as sps_lmcs_enabled_flag, sps_scaling_list_enabled_flag, sps_alf_enabled_flag, sps_ccalf_enabled_flag, and etc) may be skipped.
a) Additionally, when no_aps_constraint_flag is equal to 1, the value of the above-mentioned each of the APS-related SPS syntax elements is inferred to be equal to 0.
b) Alternatively, furthermore, in case of the value of the general constraint flag no_aps_constraint_flag is equal to 1, the NAL unit type is disallowed to be equal to PREFIX_APS_NUT or SUFFIX_APS_NUT.
iv. For example, in case of the value of the general constraint flag intra_only_constraint_flag is equal to 1, the signalling of the one or more of inter-related SPS syntax elements (such as sps_weighted_pred_flag, sps_weighted_bipred_flag, long_term_ref_pics_flag, sps_idr_rpl_present_flag, rpl1_same_as_rpl0_flag, gdr_enabled_flag, res_change_in_clvs_allowed_flag, sps_ref_wraparound_enabled_flag, sps_temporal_mvp_enabled_flag, sps_sbtmvp_enabled_flag, sps_amvr_enabled_flag, sps_bdof_enabled_flag, sps_dmvr_enabled_flag, sps_sbt_enabled_flag, sps_affine_enabled_flag, sps_bcw_enabled_flag, sps_ciip_enabled_flag, sps_fpel_mmvd_enabled_flag, sps_gpm_enabled_flag, and etc) may be skipped.

a) Additionally, when intra_only_constraint_flag is equal to 1, the value of each of the abovementioned the inter-related SPS syntax elements is inferred to be equal to 0.
v. For example, the signalling of the corresponding SPS syntax element Y1 may be skipped in case of the value of the general constraint flag Y2 is equal to 1.
  a) Additionally, when not present (in the case of the general constraint flag Y2 is equal to 1), the value of the corresponding SPS syntax element Y1 is inferred to be equal to 0.
  b) For example, Y1 is sps_ladf_enabled_flag, and Y2 is no_ladf_constraint_flag.
  c) For example, Y1 is gdr_enabled_flag, and Y2 is no_gdr_constraint_flag.
  d) For example, Y1 is res_change_in_clvs_allowed_flag, and Y2 is no_res_change_in_clvs_constraint_flag.
  e) For example, Y1 is qtbtt_dual_tree_intra_flag, and Y2 is no_qtbtt_dual_tree_intra_constraint_flag.
  f) For example, Y1 is partition_constraints_override_enabled_flag, and Y2 is no_partition_constraints_override_constraint_flag.
  g) For example, Y1 is sps_joint_cbcr_enabled_flag, and Y2 is no_joint_cbcr_constraint_flag.
  h) For example, Y1 is sps_sao_enabled_flag, and Y2 is no_sao_constraint_flag.
  i) For example, Y1 is sps_alf_enabled_flag, and Y2 is no_alf_constraint_flag.
  j) For example, Y1=sps_ccalf_enabled_flag, Y2=no_ccalf_constraint_flag.
  k) For example, Y1 is sps_transform_skip_enabled_flag, and Y2 is no_transform_skip_constraint_flag.
  l) For example, Y1 is sps_bdpcm_enabled_flag, and Y2 is no_bdpcm_constraint_flag.
  m) For example, Y1 is sps_ref_wraparound_enabled_flag, and Y2 is no_ref_wraparound_constraint_flag.
  n) For example, Y1=sps_temporal_mvp_enabled_flag, Y2=no_temporal_mvp_constraint_flag
  o) For example, Y1 is sps_sbtmvp_enabled_flag, and Y2 is no_sbtmvp_constraint_flag.
  p) For example, Y1 is sps_amvr_enabled_flag, and Y2 is no_amvr_constraint_flag.
  q) For example, Y1 is sps_bdof_enabled_flag, and Y2 is no_bdof_constraint_flag.
  r) For example, Y1 is sps_dmvr_enabled_flag, and Y2 is no_dmvr_constraint_flag.
  s) For example, Y1 is sps_cclm_enabled_flag, and Y2 is no_cclm_constraint_flag.
  t) For example, Y1 is sps_mts_enabled_flag, and Y2 is no mts_constraint_flag.
  u) For example, Y1 is sps_sbt_enabled_flag, and Y2 is no_sbt_constraint_flag.
  v) For example, Y1 is sps_affine_enabled_flag, and Y2 is no_affine_motion_constraint_flag.
  w) For example, Y1 is sps_bcw_enabled_flag, and Y2 is no_bcw_constraint_flag.
  x) For example, Y1 is sps_ibc_enabled_flag, and Y2 is no_ibc_constraint_flag.
  y) For example, Y1 is sps_ciip_enabled_flag, and Y2 is no_ciip_constraint_flag.
  z) For example, Y1 is sps_fpel_mmvd_enabled_flag, and Y2 is no_fpel_mmvd_constraint_flag.
  aa) For example, Y1 is sps_dep_quant_enabled_flag, and Y2 is no_dep_quant_constraint_flag.
  bb) For example, Y1 is sps_sign_data_hiding_enabled_flag, and Y2 is no_sign_data_hiding_constraint_flag.
  cc) For example, Y1 is sps_gpm_enabled_flag, and Y2 is no_gpm_constraint_flag.
vi. Alternatively, a bitstream constraint may be added to require that the value of the related syntax element in SPS be equal to a certain value based on the value of the corresponding general constraint flag.
  a) In one example (in this case the above mentioned SPS syntax element Y1 is signalled or inferred), a bitstream constraint may be added that when the general constraint flag Y2 is equal to 1, the value of the corresponding SPS syntax element Y1 is required to be equal to 0.
  b) In one example (in this case the APS-related SPS syntax element is signalled or inferred), a bitstream constraint may be added that when no_aps_constraint_flag is equal to 1, the value of each of the APS-related SPS syntax elements (such as sps_lmcs_enabled_flag, sps_scaling_list_enabled_flag, sps_alf_enabled_flag, sps_ccalf_enabled_flag, and etc) is required to be equal to 0.
  c) In one example (in this case the inter-related SPS syntax element is signalled or inferred), a bitstream constraint may be added that when intra_only_constraint_flag is equal to 1, the value of each of the above inter-related SPS syntax elements (such as sps_weighted_pred_flag, sps_weighted_bipred_flag, long_term_ref_pics_flag, sps_idr_rpl_present_flag, rpl1_same_as_rpl0_flag, gdr_enabled_flag, res_change_in_clvs_allowed_flag, sps_ref_wraparound_enabled_flag, sps_temporal_mvp_enabled_flag, sps_sbtmvp_enabled_flag, sps_amvr_enabled_flag, sps_bdof_enabled_flag, sps_dmvr_enabled_flag, sps_sbt_enabled_flag, sps_affine_enabled_flag, sps_bcw_enabled_flag, sps_ciip_enabled_flag, sps_fpel_mmvd_enabled_flag, sps_gpm_enabled_flag, and etc) is required to be equal to 0.
b. In one example, signalling of one or multiple PH syntax elements may be skipped according to the values of some general constraint flags.
  i. For example, when intra_only_constraint_flag is equal to 1, the signalling of the inter-related PH syntax elements such as ph_inter_slice_allowed_flag may be skipped.
    a) Additionally, when intra_only_constraint_flag is equal to 1, the value of each of the inter-related PH syntax elements such as ph_inter_slice_allowed_flag is inferred to be equal to 0.
  ii. For example, when intra_only_constraint_flag is equal to 1, the signalling of the PH syntax elements in the syntax structure ref_pic_lists( ) and the syntax structure ref_pic_list_struct(listIdx, rplsIdx) included in the PH may be skipped.

a) For example, when intra_only_constraint_flag is equal to 1, the syntax elements such as rpl_sps_flag[ ], rpl_idx[ ], poc_lsb_lt[ ][ ], delta_poc_msb_present_flag[ ][ ], delta_poc_msb_cycle_lt[ ][ ] in the syntax structure ref_pic_lists( ) that included in the PH may be skipped.

b) For example, when intra_only_constraint_flag is equal to 1, the syntax elements such as num_ref_entries[ ][ ], ltrp_in_header_flag[ ][ ], inter_layer_ref_pic_flag[ ][ ][ ], st_ref_pic_flag [ ][ ][ ], abs_delta_poc_st[ ][ ][ ], strp_entry_sign_flag[ ][ ][ ], rpls_poc_lsb_lt[ ][ ][ ], ilrp_idx[ ][ ][ ] in the syntax structure ref_pic_list_struct(listIdx, rplsIdx) that included in the PH may be skipped.

iii. Alternatively (in this case the corresponding syntax elements in PH are not conditionally signalled or skipped depending on the values of related general constraint flags/fields), in one example, a bitstream constraint may be added to require that the value of the related syntax element in PH be equal to a certain value based on the value of the corresponding general constraint flag.

a) In one example (in this case the PH syntax element ph_inter_slice_allowed_flag is signalled or inferred), when intra_only_constraint_flag is equal to 1, a bitstream constraint may be added such that the value of each of the inter-related PH syntax elements such as ph_inter_slice_allowed_flag is required to be equal to 0.

b) In one example (in this case the syntax elements in ref_pic_lists( ) and ref_pic_list_struct(listIdx, rplsIdx) included in the PH are signalled or inferred), a bitstream constraint may be added that the syntax elements in reference picture lists included in PH are required to be never used.

c. In one example, signalling of one or multiple SH syntax elements may be skipped according to the values of some general constraint flags.

i. For example, the signalling of the RPL-related SH syntax element num_ref_idx_active_override_flag may be skipped, in case of the value of intra_only_constraint_flag is equal to 1.

a) Additionally, when intra_only_constraint_flag is equal to 1, the value of num_ref_idx_active_override_flag is inferred to be equal to 0.

ii. For example, in case of intra_only_constraint_flag is equal to 1, the signalling of the RPL-related syntax elements in the syntax structure ref_pic_lists( ) and the syntax structure refpic_list_struct (listIdx, rplsIdx) included in the SH may be skipped.

a) For example, when intra_only_constraint_flag is equal to 1, the syntax elements such as rpl_sps_flag[ ], rpl_idx[ ], poc_lsb_lt[ ][ ], delta_poc_msb_present_flag[ ][ ], delta_poc_msb_cycle_lt[ ][ ] in the syntax structure ref_pic_lists( ) that included in the SH may be skipped.

b) For example, when intra_only_constraint_flag is equal to 1, the syntax elements such as num_ref_entries[ ][ ], ltrp_in_header_flag[ ][ ], inter_layer_ref_pic_flag[ ][ ][ ], st_ref_pic_flag [ ][ ][ ], abs_delta_poc_st[ ][ ][ ], strp_entry_sign_flag[ ][ ][ ], rpls_poc_lsb_lt[ ][ ][ ], ilrp_idx[ ][ ][ ] in the syntax structure refpic_list_struct(listIdx, rplsIdx) that included in the SH may be skipped.

iii. Alternatively (in this case the corresponding syntax elements in SH are not conditionally signalled or skipped depending on the values of related general constraint flags/fields), in one example, a bitstream constraint may be added to require that the value of each of the related syntax elements in SH is be equal to a certain value according to the value of the corresponding general constraint flag.

a) In one example (in this case the SH syntax element num_ref_idx_active_override_flag is signalled or inferred), when intra_only_constraint_flag is equal to 1, a bitstream constraint may be added such that the syntax element num_ref_idx_active_override_flag in SH is required to be equal to 0.

b) In one example (in this case the SH syntax elements in ref_pic_lists( ) and refpic_list_struct(listIdx, rplsIdx) included in the SH are signalled or inferred), when intra_only_constraint_flag is equal to 1, a bitstream constraint may be added such that the syntax elements in reference picture lists included in SH are required to be never used.

d. In above examples, the general constraint flags/fields used to determine whether signalling of one or multiple SH syntax elements is skipped may be replaced by a new syntax element in SPS/PPS/PH/SH.

e. In above examples, the general constraint flags/fields used to determine whether signalling of one or multiple PH syntax elements is skipped may be replaced by a new syntax element in SPS/PPS/PH.

f. In above examples, the general constraint flags/fields used to determine whether signalling of one or multiple SPS syntax elements is skipped may be replaced by a new syntax element in SPS.

3. Regarding the constraints of PPS syntax elements based on the general constraint flags for solving the third problem:

1) Depending on the values of general constraint flags, the values of the corresponding syntax elements in PPS may be constrained, e.g., as in the second embodiment.

a. In one example, depending on the values of general constraint flags, bitstream constraints may be added such that the value of a syntax element in PPS is required to be equal to a certain value.

i. For example, when one_tile_per_pic_constraint_flag is equal to 1, the values of num_exp_tile_columns_minus1, and/or num_exp_tile_rows_minus1, and/or rect_slice_flag are required to be equal to 0.

ii. For example, when one_slice_per_pic_constraint_flag is equal to 1, the value of rect_slice_flag is required to be equal to 1.

iii. For example, when both one_tile_per_pic_constraint_flag and one_slice_per_pic_constraint_flag are equal to 1, the value of no_pic_partition_flag is required to be equal to 1.

iv. For example, when intra_only_constraint_flag is equal to 1, the values of rpl1_idx_present_flag and num_ref_idx_default_active_minus1[ ] are required to be equal to 0.

4. Regarding the constraints on general constraint flags to disallow illegal values of such general constraint flags for solving the fourth problem:
   1) In the syntax general_constraint_info( ) the value of one general constraint flag may be dependent on the value of another general constraint flag, e.g., as in the third embodiment.
      a. In one example, depending on the values of earlier signalled general constraint flags, the signaling of some general constraint flags in the syntax general_constraint_info( )) may be skipped.
         i. In one example, in case of the value of one_slice_per_pic_constraint_flag is equal to 1, the signalling of the syntax element one_subpic_per_pic_constraint_flag in the syntax general_constraint_info( )) may be skipped.
            1. Additionally, when one_slice_per_pic_constraint_flag is equal to 1, the value of one_subpic_per_pic_constraint_flag is inferred to be equal to 1.
         ii. In one example, in case of the value of no_transform_skip_constraint_flag is equal to 1, the signalling of the syntax element no_bdpcm_constraint_flag in the syntax general_constraint_info( ) may be skipped.
            1. Additionally, when no_transform_skip_constraint_flag is equal to 1, the value of no_bdpcm_constraint_flag is inferred to be equal to 1.
         iii. For example, in case of the value of intra_only_constraint_flag is equal to 1, the signalling of the inter-related syntax elements (such as no_res_change_in_clvs_constraint_flag, no_ref_wraparound_constraint_flag, no_temporal_mvp_constraint_flag, no_sbtmvp_constraint_flag, no_amvr_constraint_flag, no_bdof_constraint_flag, no_dmvr_constraint_flag, no_sbt_constraint_flag, no_affine_motion_constraint_flag, no_bcw_constraint_flag, no_ciip_constraint_flag, no_fpel_mmvd_constraint_flag, no_gpm_constraint_flag) in the general_constraint_info( )) syntax structure may be skipped.
            2. Additionally, when intra_only_constraint_flag is equal to 1, the value of each of the above-mentioned inter-related syntax elements in the general_constraint_info( )) syntax structure is inferred to be equal to 1.
      b. In one example, alternatively (in this case the general constraint flags are not conditionally signalled or skipped depending on values of earlier general constraint flags), bitstream constraints may be added such that the value of one general constraint flag is required to be equal to a certain value according to the value of the related earlier general constraint flag(s).
         i. In one example, when intra_only_constraint_flag is equal to 1, the value of each of the inter-related general constraint flags as mentioned in the above bullet is required to be equal to 1.
         ii. In one example, when intra_only_constraint_flag is equal to 1, at least one of the values of no_idr_constraint_flag and no_cra_constraint_flag is required to be equal to 0.
         iii. In one example, when no_transform_skip_constraint_flag equal to 1, the value of no_bdpcm_constraint_flag is required to be equal to 1.
         iv. In one example, when no_aps_constraint_flag is equal to 1, the value of no_alf_constraint_flag is required to be equal to 1.
      c. In one example, additionally, bitstream constraints may be added to require the values of some general constraint flags be equal to certain values, and, if necessary, under certain conditions.
         i. In one example, a bitstream constraint may be added to constrain the values of the combination of multiple general constraint flags, e.g., at least one of the values of no_gdr_constraint_flag, no_idr_constraint_flag, and no_cra_constraint_flag is required to be equal to 0.
         ii. In one example, a bitstream constraint may be added to constrain the range of general constraint fields.
            1. For example, max_bitdepth_constraint_idc is required to be in the range of 0 to X (such as X=8), inclusive.
            2. For example, when general_profile_idc is equal to A (such as A=1), max_bitdepth_constraint_idc is required to be in the range of 0 to B (such as B=2), inclusive.
5. Regarding adding new SPS/PPS syntax elements for solving the fifth problem:
   1) New SPS and/or PPS syntax elements may be added to condition the related syntax elements in SPS/PPS/PH/SH, e.g., as in the fourth embodiment.
      a. In one example, a new SPS syntax element (e.g., sps_intra_only_flag) and/or a new PPS syntax element (e.g., pps_intra_only_flag) may be added to condition the inter prediction related syntax elements in SPS/PPS/PH/SH.
         i. In one example, when the general constraint flag intra_only_constraint_flag is equal to 1, the signaling of the new SPS syntax element sps_intra_only_flag and/or the new PPS syntax element pps_intra_only_flag may be skipped.
            1. Additionally, when intra_only_constraint_flag is equal to 1, the value of the new SPS syntax element sps_intra_only_flag is inferred to be equal to 1, and/or, the value of the new PPS syntax element pps_intra_only_flag is inferred to be equal to 1.
         ii. In one example, in case of the value of the new SPS syntax element (e.g., sps_intra_only_flag) is equal to 1, the signalling of the inter-related SPS syntax elements (such as sps_weighted_pred_flag, sps_weighted_bipred_flag, long_term_ref_pics_flag, sps_idr_rpl_present_flag, rpl1_same_as_rpl0_flag, gdr_enabled_flag, res_change_in_clvs_allowed_flag, sps_ref_wraparound_enabled_flag, sps_temporal_mvp_enabled_flag, sps_sbtmvp_enabled_flag, sps_amvr_enabled_flag, sps_bdof_enabled_flag, sps_dmvr_enabled_flag, sps_sbt_enabled_flag, sps_affine_enabled_flag, sps_bcw_enabled_flag, sps_ciip_enabled_flag, sps_fpel_mmvd_enabled_flag, sps_gpm_enabled_flag, and etc) may be skipped.
            2. Additionally, when the new SPS syntax element sps_intra_only_flag is equal to 1, the value of each of the inter-related SPS syntax elements is inferred to be equal to a certain value (such as 0 or 1).
         iii. In one example, in case of the value of the new SPS/PPS syntax element (e.g., sps_intra_only- _flag, and/or pps_intra_only_flag) is equal to 1, the signalling of the corresponding inter-related and RPL-related syntax elements included in PH and/or SH may be skipped.
1. In one example, the above-mentioned inter-related PH syntax element may be ph_inter_slice_allowed_flag.
2. In one example, the above-mentioned RPL-related SH syntax element may be num_ref_idx_active_override_flag.
3. In one example, the above-mentioned corresponding RPL-related syntax element may be the syntax elements in the syntax structure ref_pic_lists( ) and the syntax structure ref_pic_list_struct(listIdx, rplsIdx) included in the PH and/or SH.
4. Additionally, when the new syntax element sps_intra_only_flag, and/or pps_intra_only_flag is equal to 1, the value of each of the corresponding inter-related and RPL-related syntax elements in PH and/or SH is inferred to be equal a certain value (such as 0 or 1).
iv. In one example, in case of the value of the new PPS syntax element (e.g., pps_intra_only_flag) is equal to 1, the signalling of the corresponding PPS syntax elements may be skipped.
1. For example, the above-mentioned corresponding PPS syntax element may be rpl1_idx_present_flag.
2. For example, the above-mentioned corresponding PPS syntax element may be num_ref_idx_default_active_minus1[ ].
3. Additionally, when the new PPS syntax element pps_intra_only_flag is equal to 1, the value of the corresponding PPS syntax elements is inferred to be equal to a certain value (such as 0 or 1).
v. Alternatively (in this case the new SPS and/or PPS syntax elements sps_intra_only_flag and/or pps_intra_only_flag is conditionally signalled or skipped depending on the values of intra_only_constraint_flag), in one example, when intra_only_constraint_flag is equal to 1, bitstream constraints may be added to require the value of the new SPS and/or PPS syntax elements sps_intra_only_flag and/or pps_intra_only_flag to be equal to 1.
vi. Alternatively (in this case the SPS/PPS/PH/SH syntax elements related to the new SPS/PPS syntax elements are not conditionally signalled or skipped depending on the values of the new SPS/PPS syntax elements), in one example, according to the values of the new SPS/PPS syntax elements, bitstream constraints may be added that the value of each of the related syntax elements in SPS/PPS/PH/SH is required to be equal to a certain value (such as 0 or 1).
1. In one example (in this case the new PPS syntax element pps_intra_only_flag is signalled or inferred), additionally, when the new SPS syntax element sps_intra_only_flag is equal to 1, a bitstream constraint may be added such that the value of the new PPS syntax element pps_intra_only_flag is required to be equal to 1.
2. In one example (in this case the SPS syntax elements related to the new SPS syntax elements are signalled or inferred), a bitstream constraint may be added such that when the new SPS syntax element sps_intra_only_flag is equal to 1, the value of the inter-related SPS syntax element is required to be equal to 0.
3. In one example (in this case the PPS syntax elements related to the new SPS/PPS syntax elements are signalled or inferred), in one example, a bitstream constraint may be added such that when the new SPS syntax element sps_intra_only_flag is equal to 1, or, the new PPS syntax element pps_intra_only_flag is equal to 1, the value of inter-related PPS syntax elements is required to be equal to 0.
4. In one example (in this case the PH/SH syntax elements related to the new SPS/PPS syntax elements are signalled or inferred), a bitstream constraint may be added such that when the new SPS syntax element sps_intra_only_flag is equal to 1 and/or the new PPS syntax element pps_intra_only_flag is equal to 1, the value of the corresponding inter-related and/or RPL-related syntax element included in PH/SH is required to be equal to a certain value (such as 0 or 1).
6. Regarding adding new general constraint flags/fields for solving the sixth problem:
1) In the syntax general_constraint_info( ) new general constraint flags may be added, and furthermore, these new general constraint flags may be used to condition the related syntax elements in SPS/PPS/PH/SH, or to constrain the values of related syntax elements in SPS/PPS/PH/SH through bitstream constraints, e.g., as in the fifth embodiment.
a. For example, a new general constraint flag may be added to achieve one or more functionalities as described below.
i. For example, add a new general constraint flag to disable the inter-layer prediction and/or allowing only one layer, e.g., a new syntax element no_inter_layer_prediction_constraint_flag is added. Furthermore, this new syntax element may be used to condition the signalling of the SPS syntax element inter_layer_ref_pics_present_flag or to constrain its value.
ii. For example, add a new general constraint flag to disable long-term reference, e.g., a new syntax element no_long_term_ref_pics_constraint_flag. Furthermore, this new syntax element may be used to condition the signalling of the SPS syntax element long_term_ref_pics_flag or to constrain its value.
iii. For example, add a new general constraint flag to disable max transform size equal to 32×32, e.g., a new syntax element no max luma transform size 64_constraint_flag. Furthermore, this new syntax element may be used to condition the signalling of the SPS syntax element sps_max_luma_transform_size_64_flag or to constrain its value.
iv. For example, add a new general constraint flag to disable MER, e.g., a new syntax element no_parallel_merge_level_constraint_flag. Furthermore, this new syntax element may be used to condition the signalling of the SPS syntax element log 2_parallel_merge_level_minus2 or to constrain its value.

v. For example, add a new general constraint flag to disable the presence of the wavefront parallel processing entry offsets, e.g., a new syntax element no_wpp_entry_point_offset_present_constraint_flag. Furthermore, this new syntax element may be used to condition the signalling of the SPS syntax element sps_wpp_entry_point_offsets_present_flag or to constrain its value.

vi. For example, add a new general constraint flag to disable the entropy coding sync point (i.e., wavefront parallel processing), e.g., a new syntax element no_entropy_coding_sync_constraint_flag. Furthermore, this new syntax element may be used to condition the signalling of the SPS syntax element sps_entropy_coding_sync_enabled_flag or to constrain its value.

b. For example, a new general constraint flag may be added to control one or more of the coding tools as described below.

i. For example, add a new general constraint flag to disable weighted prediction for P slices, e.g., a new syntax element no_weighted_pred_constraint_flag. Furthermore, this new syntax element may be used to condition the signalling of the SPS syntax element sps_weighted_pred_flag or to constrain its value.

ii. For example, add a new general constraint flag to disable the weighted bi-prediction for B slices, e.g., a new syntax element no_weighted_bipred_constraint_flag. Furthermore, this new syntax element may be used to condition the signalling of the SPS syntax element sps_weighted_bipred_flag or to constrain its value.

iii. For example, add a new general constraint flag to disable the SMVD, e.g., a new syntax element no_smvd_constraint_flag. Furthermore, this new syntax element may be used to condition the signalling of the SPS syntax element sps_smvd_enabled_flag or to constrain its value.

iv. For example, add a new general constraint flag to disable the MMVD, e.g., a new syntax element no_mmvd_constraint_flag. Furthermore, this new syntax element may be used to condition the signalling of the SPS syntax element sps_mmvd_enabled_flag or to constrain its value.

v. For example, add a new general constraint flag to disable the ISP, e.g., a new syntax element no_isp_constraint_flag. Furthermore, this new syntax element may be used to condition the signalling of the SPS syntax element sps_isp_enabled_flag or to constrain its value.

vi. For example, add a new general constraint flag to disable the MRL, e.g., a new syntax element no_mrl_constraint_flag. Furthermore, this new syntax element may be used to condition the signalling of the SPS syntax element sps_mrl_enabled_flag or to constrain its value.

vii. For example, add a new general constraint flag to disable the MIP, e.g., a new syntax element no_mip_constraint_flag. Furthermore, this new syntax element may be used to condition the signalling of the SPS syntax element sps_mip_enabled_flag or to constrain its value.

viii. For example, add a new general constraint flag to disable the PLT, e.g., a new syntax element no_palette_constraint_flag. Furthermore, this new syntax element may be used to condition the signalling of the SPS syntax element sps_palette_enabled_flag or to constrain its value.

ix. For example, add a new general constraint flag to disable the ACT, e.g., a new syntax element no_act_constraint_flag. Furthermore, this new syntax element may be used to condition the signalling of the SPS syntax element sps_act_enabled_flag or to constrain its value.

x. For example, add a new general constraint flag to disable the LMCS, e.g., a new syntax element no_lmcs_constraint_flag. Furthermore, this new syntax element may be used to condition the signalling of the SPS syntax element sps_lmcs_enabled_flag or to constrain its value.

xi. For example, add a new general constraint flag to disable the LFNST, e.g., a new syntax element no_lfnst_constraint_flag. Furthermore, this new syntax element may be used to condition the signalling of the SPS syntax element sps_lfnst_enabled_flag or to constrain its value.

xii. For example, add a new general constraint flag to disable the scaling list, e.g., a new syntax element no_scaling_list_constraint_flag. Furthermore, this new syntax element may be used to condition the signalling of the SPS syntax element sps_scaling_list_enabled_flag or to constrain its value.

xiii. For example, add a new general constraint flag to disable the virtual boundaries, e.g., a new syntax element no_virtual_boundaries_constraint_flag. Furthermore, this new syntax element may be used to condition the signalling of the SPS syntax element sps_virtual_boundaries_enabled_flag or to constrain its value.

c. For example, a new general constraint flag may be added to control (i.e., to condition the signalling of or to constrain the values of) a group of syntax elements as described below.

i. For example, add a new general constraint flag to disable the weighted prediction and weighted bi-prediction. Furthermore, this new syntax element may be used to control the SPS syntax elements sps_weighted_pred_flag and sps_weighted_bipred_flag.

d. For example, when the new general constraint syntax is equal to 1, the signalling of the corresponding SPS/PH/SH syntax element may be skipped.

ii. Additionally, when the corresponding SPS/PH/SH syntax element is not present (in the case of the corresponding new general constraint syntax element is equal to 1), the value of the corresponding SPS/PH/SH syntax element is inferred to be equal to a certain value (such as 0 or 1).

iii. Alternatively (in this case of the corresponding SPS/PH/SH syntax element is signalled or inferred), in one example, a bitstream constraint may be added such that when the new general constraint syntax element is equal to 1, the value of the corresponding SPS/PH/SH syntax element is required to be equal to a certain value (such as 0 or 1).

i. Alternatively, in one example, when no_aps_constraint_flag is equal to 1, the values of the APS-related newly added constraint flags (e.g., no_scaling_list_constraint_flag and no_lmcs_constraint_flag) are required to be equal to 1.

ii. Alternatively, in one example, when intra_only_constraint_flag is equal to 1, the values of the APS-related newly added constraint flags (e.g., no_weighted_pred_constraint_flag, no_weighted_bipred_constraint_flag, no_long_term_ref_pics_constraint_flag, no_inter_layer_prediction_constraint_flag, no_smvd_constraint_flag, and no_mmvd_constraint_flag) are required to be equal to 1.
iii. Alternatively, in one example, when vps_independent_layer_flag[GeneralLayerIdx[nuh_layer_id]] is equal to 1, the value of no_inter_layer_prediction_constraint_flag is required to be equal to 1.

7. Regarding the connection of APS syntax elements to the syntax elements in the other parameter sets for solving the seventh problem:
   1) In one example, VPS ID and/or SPS ID and/or PPS ID may be added to APS syntax structure, i.e., adaptation_parameter_set_rbsp( ), e.g., as in the sixth embodiment.
   2) In one example, the APS syntax elements (e.g., alf_luma_filter_signal_flag, alf_chroma_filter_signal_flag, alf_cc_cb_filter_signal_flag and alf_cc_cr_filter_signal_flag) may be dependent on the value of general constraint flag, e.g., as in the sixth embodiment.
      a. For example, when no_aps_constraint_flag is equal to 0, at least one of the values of alf_luma_filter_signal_flag, alf_chroma_filter_signal_flag, alf_cc_cb_filter_signal_flag and alf_cc_cr_filter_signal_flag shall be equal to 1.
      b. For example, when sps_alf_enabled_flag is equal to 1, at least one of the values of alf_luma_filter_signal_flag, alf_chroma_filter_signal_flag, alf_cc_cb_filter_signal_flag and alf_cc_cr_filter_signal_flag shall be equal to 1.
      c. When no_aps_constraint_flag is equal to 0 and sps_alf_enabled_flag is equal to 1, at least one of the values of alf_luma_filter_signal_flag, alf_chroma_filter_signal_flag, alf_cc_cb_filter_signal_flag and alf_cc_cr_filter_signal_flag shall be equal to 1.
      d. Alternatively, the values of alf_luma_filter_signal_flag, alf_chroma_filter_signal_flag, alf_cc_cb_filter_signal_flag and alf_cc_cr_filter_signal_flag may dependent on whether there is a APS NAL unit having aps_params_type equal to ALF_APS.
   3) In one example, the APS syntax elements may be dependent on the value of a syntax element associated with the corresponding SPS/PPS according to the SPS/PPS ID.
      a. For example, the value of chroma-related APS syntax elements (such as alf_chroma_filter_signal_flag, alf_cc_cb_filter_signal_flag, alf_cc_cr_filter_signal_flag, scaling_list_chroma_present_flag, and etc) may be not constrained according to variables (such as ChromaArrayType) derived by the SPS syntax elements.
   4) In one example, bitstream constraints may be added that when no_aps_constraint_flag is equal to 1, the syntax elements associated with the syntax structures alf_data( ), lmcs_data( ) and scaling_list_data( )) cannot be sent.

8. Regarding redundant signalling of the general constraint flags:
   1) In one example, indicators may be included in the syntax structures of profile_tier_level( ) and/or general_constraint_info( ), to indicate which profile and/or which tier and/or which level that the current general constraint information applies to.
   2) In one example, the syntax structure general_constraint_info( ) may be and may only be included in the SPS syntax structure seq_parameter_set_rbsp( ).
   3) Bitstream constraint may be added that if there is VPS, the general_constraint_info( ) syntax elements included in VPS are used for the CVS.
   4) Bitstream constraint may be added that if there is NO VPS, the general_constraint_info( ) syntax elements included in SPS are use for the current CLVS.

9. In one example, whether and/or how to signal the general constraint structure may depend on the values of the profile and/or the sub-profiles and/or level and/or tier.
   a. In one example, each general_constraint_info( ) syntax structure is specified to be associated with one set of general_profile_idc and subprofile_sub_profile_idc[i] for all i values signalled in the same profile_tier_level( ) syntax structure as the general_constraint_info( ) syntax structure.
      Or equivalently, each general_constraint_info( ) syntax structure is specified to be associated with the profile_tier_level( ) syntax structure containing the general_constraint_info( ) syntax structure.
   b. In one example, the information carried in a general_constraint_info( ) syntax structure may impose more constraints regarding which coding tools can be applied than the profile and sub-profiles indicated in the profile_tier_level( ) syntax structure containing the general_constraint_info( ) syntax structure. That means, in addition to all the constraints imposed by the profile and sub-profiles, more aspects may be constrained by the general constraint information.
   c. In one example, for any particular aspect associated with a general constraint syntax element, the corresponding general constraint syntax element has to have a value that indicates either a tighter constraint regarding that aspect than indicated by the profile and sub-profiles or the same constraint regarding that aspect as indicated by the profile and sub-profiles.
      i. In one example, if any of the profile and sub-profiles indicates that all slices are intra slices, then the intra_only_constraint_flag shall be equal to 1, whereas if none of the profile and sub-profiles indicates that all slices are intra slices, the intra_only_constraint_flag may be equal to either 1 or 0.
   d. In one example, for any particular aspect associated with a general constraint syntax element, the tightest constraint indicated by the profile, the sub-profiles, and the corresponding general constraint syntax element applies.
      i. In one example, when any of the profile and sub-profiles indicates that all slices are intra slices, the value of intra_only_constraint_flag may be equal to either 1 or 0, but still all slices are required to be intra slices, and when none of the profile and sub-profiles indicates that all slices are intra slices and the value of intra_only_constraint_flag is equal to 1, again all slices are required to be intra slices.
   e. In one example, no general constraint information is signaled for a specific profile and/or sub-profile and/or level and/or tier. The general constraint flags/fields are inferred to be predefined values based on the specific profile and/or level and/or tier.
   f. In one example, the general constraint information may be signaled but ignored for a specific profile and/or sub-profile and/or level and/or tier. The general constraint flags are inferred to be predefined values based on the specific profile and/or level and/or tier.
  g. In one example, the general constraint information may be signaled for a specific profile and/or sub-profile and/or level and/or tier. The general constraint flags must be equal to predefined values based on the specific profile and/or level and/or tier in a conformance bitstream.
  h. In one example, the general constraint information may be signaled for a specific profile and/or sub-profile and/or level and/or tier. Whether and/or how to apply a coding tool may be determined by the corresponding general constraint flag(s), ignoring the specification in the profile and/or level and/or tier.
  i. In one example, the general constraint flag associated with a coding tool must be set equal to 1 (meaning turned off) if the coding tool is specified to be turned off in the profile and/or sub-profile and/or level and/or tier.
  j. In one example, the general constraint flag associated with a coding tool may be ignored and inferred to be 1 (meaning turned off) if the coding tool is specified to be turned off in the profile and/or sub-profile and/or level and/or tier.
  k. In one example, the general constraint flag associated with a coding tool may be skipped and inferred to be 1 (meaning turned off) if the coding tool is specified to be turned off in the profile and/or sub-profile and/or level and/or tier.
  l. In one example, for a profile and/or sub-profile a sub-profile indicating all intra coding, intra_only_constraint_flag must be equal to 1.
    i. Alternatively, for a profile and/or sub-profile a sub-profile indicating all intra coding, intra_only_constraint_flag is skipped or ignored and inferred to be 1.

6. EMBODIMENTS

Below are some example embodiments for some of the disclosed aspects summarized above in Section 5, which can be applied to the VVC specification. The changed texts are based on the latest VVC text in JVET-Q2001-vC. Most relevant parts that have been added or modified are highlighted in bold and italic, and some of the deleted parts are marked with double brackets (e.g., denotes the deletion of the character "a").

6.1. First Embodiment

This is an embodiment of items 1, 1.1, 1.1.a, 1.1.b, and 1.1.c summarized above in Section 5.

6.1.1. Embodiment of Items 2.1 and 2.1a

In one example, the syntax structure seq_parameter_set_rbsp( ) is changed as follows:

| seq_parameter_set_rbsp( ) { | Descriptor |
|---|---|
| sps_seq_parameter_set_id | u(4) |
| sps_video_parameter_set_id | u(4) |
| sps_max_sublayers_minus1 | u(3) |
| sps_reserved_zero_4bits | u(4) |
| sps_ptl_dpb_hrd_params_present_flag | u(1) |
| if( sps_ptl_dpb_hrd_params_present_flag ) | |
|   profile_tier_level( 1, sps_max_sublayers_minus1 ) | |
| *if(!no_gdr_constraint_flag)* | |
|   gdr_enabled_flag | u(1) |
| *if( max_chroma_format_constraint_idc > 0 )* | |
|   chroma_format_idc | u(2) |
| if( chroma_format_idc = = 3 ) | |
|   separate_colour_plane_flag | u(1) |
| *if(!no_res_change_in_clvs_constraint_flag)* | |
|   res_change_in_clvs_allowed_flag | u(1) |
| pic_width_max_in_luma_samples | ue(v) |
| pic_height_max_in_luma_samples | ue(v) |
| sps_conformance_window_flag | u(1) |
| if( sps_conformance_window_flag ) { | |
|   sps_conf_win_left_offset | ue(v) |
|   sps_conf_win_right_offset | ue(v) |
|   sps_conf_win_top_offset | ue(v) |
|   sps_conf_win_bottom_offset | ue(v) |
| } | |
| sps_log2_ctu_size_minus5 | u(2) |
| subpic_info_present_flag | u(1) |
| if( subpic_info_present_flag ) { | |
|   sps_num_subpics_minus1 | ue(v) |
|   *if(sps_num_subpics_minus1 > 0)* | |
|     sps_independent_subpics_flag | u(1) |
|   for( i = 0; sps_num_subpics_minus1 > 0 && i <= sps_num_subpics_minus1; i++ ) { | |
|     if( i > 0 && pic_width_max_in_luma_samples > CtbSizeY ) | |
|       subpic_ctu_top_left_x[ i ] | u(v) |
|     if( i > 0 && pic_height_max_in_luma_samples > CtbSizeY ) { | |
|       subpic_ctu_top_left_y[ i ] | u(v) |
|     if( i < sps_num_subpics_minus1 && pic_width_max_in_luma_samples > CtbSizeY ) | |
|       subpic_width_minus1[ i ] | u(v) |
|     if( i < sps_num_subpics_minus1 && pic_height_max_in_luma_samples > CtbSizeY ) | |
|       subpic_height_minus1[ i ] | u(v) |
|     if( !sps_independent_subpics_flag ) { | |
|       subpic_treated_as_pic_flag[i ] | u(1) |
|       loop_filter_across_subpic_enabled_flag[i ] | u(1) |
|     } | |
|   } | |
|   sps_subpic_id_len_minus1 | ue(v) |
|   subpic_id_mapping_explicitly_signalled_flag | u(1) |
|   if( subpic_id_mapping_explicitly_signalled_flag ) { | |
|     subpic_id_mapping_in_sps_flag | u(1) |
|     if( subpic_id_mapping_in_sps_flag ) | |
|       for( i = 0; i <= sps_num_subpics_minus1; i++ ) | |
|         sps_subpic_id[ i ] | u(v) |
|   } | |
| } | |
| *if(max_bitdepth_constraint_idc > 0)* | |
|   bit_depth_minus8 | ue(v) |
| sps_entropy_coding_sync_enabled_flag | u(1) |
| if( sps_entropy_coding_sync_enabled_flag ) | |
|   sps_wpp_entry_point_offsets_present_flag | u(1) |
| *if(!intra_only_constraint_flag){* | |
|   sps_weighted_pred_flag | u(1) |
|   sps_weighted_bipred_flag | u(1) |
| *}* | |
| log2_max_pic_order_cnt_lsb_minus4 | u(4) |
| sps_poc_msb_flag | u(1) |
| if( sps_poc_msb_flag ) | |
|   poc_msb_len_minus1 | ue(v) |
| num_extra_ph_bits_bytes | u(2) |
| extra_ph_bits_struct( num_extra_ph_bits_bytes ) | |

-continued

| seq_parameter_set_rbsp( ) { | Descriptor |
|---|---|
| num_extra_sh_bits_bytes | u(2) |
| extra_sh_bits_struct( num_ extra_sh_bits_bytes ) | |
| if( sps_max_sublayers_minus1 > 0 ) | |
| sps_sublayer_dpb_params_flag | u(1) |
| if( sps_ptl_dpb_hrd_ params_present_flag ) | |
| dpb_parameters( sps_max_ sublayers_minus1, sps_sublayer_dpb_params_flag ) | |
| *if(!intra_only_constraint_flag)* | |
| long_term_ref_pics_flag | u(1) |
| inter_layer_ref_pics_present_flag | u(1) |
| *if(!intra_only_constraint_flag){* | |
| sps_idr_rpl_present_flag | u(1) |
| rpl1_same_as_rpl0_flag | u(1) |
| } | |
| for( i = 0; i < !rpl1_same_as_ rpl0_flag ? 2 : 1; i++ ) { | |
| num_ref_pic_lists_in_sps[ i ] | ue(v) |
| for( j = 0; j < num_ref_pic_ lists_in_sps[ i ]; j++) | |
| ref_pic_list_struct( i, j ) | |
| } | |
| if( ChromaArrayType != 0 && !no_qtbtt_dual_tree_intra_constraint_flag ) | |
| qtbtt_dual_tree_intra_flag | u(1) |
| log2_min_luma_coding_block_size_minus2 | ue(v) |
| *if(!no_partition_constraints_ override_constraint_flag )* | |
| partition_constraints_ override_enabled_flag | u(1) |
| sps_log2_diff_min_qt_ min_cb_intra_slice_luma | ue(v) |
| sps_max_mtt_hierarchy_ depth_intra_slice_luma | ue(v) |
| if( sps_max_mtt_hierarchy_depth_ intra_slice_luma != 0 ) { | |
| sps_log2_diff_max_bt_ min_qt_intra_slice_luma | ue(v) |
| sps_log2_diff_max_tt_ min_qt_intra_slice_luma | ue(v) |
| } | |
| sps_log2_diff_min_qt_ min_cb_inter_slice | ue(v) |
| sps_max_mtt_hierarchy_ depth_inter_slice | ue(v) |
| if( sps_max_mtt_hierarchy_ depth_inter_slice != 0 ) { | |
| sps_log2_diff_max_bt_ min_qt_inter_slice | ue(v) |
| sps_log2_diff_max_tt_ min_qt_inter_slice | ue(v) |
| } | |
| if( qtbtt_dual_tree_intra_flag ) { | |
| sps_log2_diff_min_qt_ min_cb_intra_slice_chroma | ue(v) |
| sps_max_mtt_hierarchy_ depth_intra_slice_chroma | ue(v) |
| if( sps_max_mtt_hierarchy_depth_ intra_slice_chroma != 0 ) { | |
| sps_log2_diff_max_bt_min_ qt_intra_slice_chroma | ue(v) |
| sps_log2_diff_max_tt_min_ qt_intra_slice_chroma | ue(v) |
| } | |
| } | |
| sps_max_luma_transform_size_64_flag | u(1) |
| if( ChromaArrayType != 0 ) { | |
| *if( !no_joint_cbcr_constraint_flag )* | |
| sps_joint_cbcr_enabled_flag | u(1) |
| same_qp_table_for_chroma | u(1) |
| numQpTables = same_qp_table_for_chroma ? 1 : ( sps_joint_cbcr_enabled_flag ? 3 : 2 ) | |
| for( i = 0; i < numQpTables; i++) { | |
| qp_table_start_minus26[ i ] | se(v) |

-continued

| seq_parameter_set_rbsp( ) { | Descriptor |
|---|---|
| num_points_in_qp_table_minus1[ i ] | ue(v) |
| for( j = 0; j <= num_points_in_ qp_table_minus1[ i ]; j++ ) { | |
| delta_qp_in_val_minus1[ i ][ j ] | ue(v) |
| delta_qp_diff_val[ i ][ j ] | ue(v) |
| } | |
| } | |
| } | |
| *if( !no_sao_constraint_flag )* | |
| sps_sao_enabled_flag | u(1) |
| *if( !no_alf_constraint_flag )* | |
| sps_alf_enabled_flag | u(1) |
| if( sps_alf_enabled_flag && ChromaArrayType != 0 && !no_ccalf_constraint_flag ) | |
| sps_ccalf_enabled_flag | u(1) |
| *if( !no_transform_skip_constraint_flag )* | |
| sps_transform_skip_enabled_flag | u(1) |
| if( sps_transform_skip_enabled_flag ) { | |
| log2_transform_skip_max_size_minus2 | ue(v) |
| *if( !no_bdpcm_constraint_flag )* | |
| sps_bdpcm_enabled_flag | u(1) |
| *if( !no_ref_wraparound_constraint_flag )* | |
| sps_ref_wraparound_enabled_flag | u(1) |
| *if( !no_temporal_mvp_constraint_flag )* | |
| sps_temporal_mvp_enabled_flag | u(1) |
| if( sps_temporal_mvp_enabled_flag && !no_sbtmvp_constraint_flag ) | |
| sps_sbtmvp_enabled_flag | u(1) |
| *if( !no_amvr_constraint_flag )* | |
| sps_amvr_enabled_flag | u(1) |
| *if( !no_bdof_constraint_flag )* | |
| sps_bdof_enabled_flag | u(1) |
| if( sps_bdof_enabled_flag ) | |
| sps_bdof_pic_present_flag | u(1) |
| sps_smvd_enabled_flag | u(1) |
| *if( !no_dmvr_constraint_flag )* | |
| sps_dmvr_enabled_flag | u(1) |
| if( sps_dmvr_enabled_flag ) | |
| sps_dmvr_pic_present_flag | u(1) |
| sps_mmvd_enabled_flag | u(1) |
| sps_isp_enabled_flag | u(1) |
| sps_mrl_enabled_flag | u(1) |
| sps_mip_enabled_flag | u(1) |
| *if( ChromaArrayType !=0 && ! no_cclm_constraint_flag )* | |
| sps_cclm_enabled_flag | u(1) |
| if( chroma_format_idc == 1 ) { | |
| sps_chroma_horizontal_collocated_flag | u(1) |
| sps_chroma_vertical_collocated_flag | u(1) |
| } | |
| *if( !no_mts_constraint_flag )* | |
| sps_mts_enabled_flag | u(1) |
| if( sps_mts_enabled_flag ) { | |
| sps_explicit_mts_intra_enabled_flag | u(1) |
| sps_explicit_mts_inter_enabled_flag | u(1) |
| } | |
| six_minus_max_num_merge_cand | ue(v) |
| *if( !no_sbt_constraint_flag )* | |
| sps_sbt_enabled_flag | u(1) |
| *if( !no_affine_motion_constraint_flag )* | |
| sps_affine_enabled_flag | u(1) |
| if( sps_affine_enabled_flag ) { | |
| five_minus_max_num_subblock_merge_cand | ue(v) |
| sps_affine_type_flag | u(1) |
| if( sps_amvr_enabled_flag ) | |
| sps_affine_amvr_enabled_flag | u(1) |
| sps_affine_prof_enabled_flag | u(1) |
| if( sps_affine_prof_enabled_flag ) | |
| sps_prof_pic_present_flag | u(1) |
| } | |
| sps_palette_enabled_flag | u(1) |
| if( ChromaArrayType == 3 && !sps_ max_luma_transform_size_64_flag ) | |
| sps_act_enabled_flag | u(1) |
| if( sps_transform_skip_enabled_flag || sps_palette_enabled_flag ) | |

-continued

| seq_parameter_set_rbsp( ) { | Descriptor |
|---|---|
|     min_qp_prime_ts_minus4 | ue(v) |
|     if( !no_bcw_constraint_flag ) | |
|         sps_bcw_enabled_flag | u(1) |
|     if( !no_ibc_constraint_flag ) | |
|         sps_ibc_enabled_flag | u(1) |
|     if( sps_ibc_enabled_flag ) | |
|         six_minus_max_num_ibc_merge_cand | ue(v) |
|     if( !no_ciip_constraint_flag ) | |
|         sps_ciip_enabled_flag | u(1) |
|     if( sps_mmvd_enabled_flag | |
|     && !no_fpel_mmvd_constraint_flag ) | |
|         sps_fpel_mmvd_enabled_flag | u(1) |
|     if( MaxNumMergeCand >= | |
|     2 && !no_gpm_constraint_flag ) { | |
|         sps_gpm_enabled_flag | u(1) |
|         if( sps_gpm_enabled_flag && | |
|         MaxNumMergeCand >= 3 ) | |
|             max_num_merge_cand_<br>            minus_max_num_gpm_cand | ue(v) |
|     } | |
|     if( !no_aps_constraint_flag ) | |
|         sps_lmcs_enabled_flag | u(1) |
|     sps_lfnst_enabled_flag | u(1) |
|     if( !no_ladf_constraint_flag ) | |
|         sps_ladf_enabled_flag | u(1) |
|     if( sps_ladf_enabled_flag ) { | |
|         sps_num_ladf_intervals_minus2 | u(2) |
|         sps_ladf_lowest_interval_qp_offset | se(v) |
|         for( i = 0; i < sps_num_ladf_<br>        intervals_minus2 + 1; i++ ) { | |
|             sps_ladf_qp_offset[ i ] | se(v) |
|             sps_ladf_delta_threshold_minus1[ i ] | ue(v) |
|         } | |
|     } | |
|     log2_parallel_merge_level_minus2 | ue(v) |
|     if( !no_aps_constraint_flag ) | |
|         sps_scaling_list_enabled_flag | u(1) |
|     if( !no_dep_quant_constraint_flag ) | |
|         sps_dep_quant_enabled_flag | u(1) |
|     if( !sps_dep_quant_enabled_flag && | |
|     !no_sign_data_hiding_constraint_flag ) | |
|         sps_sign_data_hiding_enabled_flag | u(1) |
|     sps_virtual_boundaries_enabled_flag | u(1) |
|     if( sps_virtual_boundaries_<br>    enabled_flag ) { | |
|         sps_virtual_boundaries_present_flag | u(1) |
|         if( sps_virtual_boundaries_<br>present_flag ) { | |
|             sps_num_ver_virtual_boundaries | u(2) |
|             for( i = 0; i < sps_num_ver_<br>            virtual_boundaries; i++ ) | |
|                 sps_virtual_boundaries_pos_x[ i ] | u(13) |
|             sps_num_hor_virtual_boundaries | u(2) |
|             for( i = 0; i < sps_num_hor_<br>            virtual_boundaries; i++ ) | |
|                 sps_virtual_boundaries_pos_y[ i ] | u(13) |
|         } | |
|     } | |
|     if( sps_ptl_dpb_hrd_params_<br>present_flag ) { | |
|         sps_general_hrd_params_present_flag | u(1) |
|         if( sps_general_hrd_params_<br>present_flag ) { | |
|             general_hrd_parameters( ) | |
|             if( sps_max_sublayers_minus1 > 0 ) | |
|                 sps_sublayer_cpb_params_present_flag | u(1) |
|             firstSubLayer = sps_sublayer_<br>            cpb_params_present_flag ? 0 :<br>                sps_max_sublayers_minus1 | |
|             ols_hrd_parameters( firstSubLayer,<br>            sps_max_sublayers_minus1 ) | |
|         } | |
|     } | |
|     field_seq_flag | u(1) |
|     vui_parameters_present_flag | u(1) |
|     if( vui_parameters_present_flag ) | |
|         vui_parameters( ) /* Specified in<br>        ITU-T H.SEI | ISO/IEC 23002-7 */ | |
|     sps_extension_flag | u(1) |
|     if( sps_extension_flag ) | |
|         while( more_rbsp_data( ) ) | |
|             sps_extension_data_flag | u(1) |
|     rbsp_trailing_bits( ) | |
| } | | gdr_enabled_flag equal to 1 specifies that GDR pictures may be present in CLVSs referring to the SPS. gdr_enabled_flag equal to 0 specifies that GDR pictures are not present in CLVSs referring to the SPS. *When not present, the value of gdr_enabled_flag is inferred to be equal to 0.*.

chroma_format_idc specifies the chroma sampling relative to the luma sampling as specified in clause 6.2. *chroma_format_idc shall be in the range of 0 to max_chroma_format_constraint idc, inclusive. When not present, the value of chroma_format_idc is inferred to be equal to 0.* res_change_in_clvs_allowed_flag equal to 1 specifies that the picture spatial resolution may change within a CLVS referring to the SPS. res_change_in_clvs_allowed_flag equal to 0 specifies that the picture spatial resolution does not change within any CLVS referring to the SPS. *When not present, the value of res_change_in_clvs_allowed_ flag is inferred to be equal to 0.*.

bit_depth_minus8 specifies the bit depth of the samples of the luma and chroma arrays, BitDepth, and the value of the luma and chroma quantization parameter range offset, QpBdOffset, as follows:

$$BitDepth = 8 + bit\_depth\_minus8 \qquad (45)$$

$$QpBdOffset = 6 * bit\_depth\_minus8 \qquad (46)$$

bit_depth_minus8 shall be in the range of 0 to *max_bitdepth_constraint_idc*, inclusive. *When not present, the value of bit_depth_minus8 is inferred to be equal to 0.* sps_weighted_pred_flag equal to 1 specifies that weighted prediction may be applied to P slices referring to the SPS. sps_weighted_pred_flag equal to 0 specifies that weighted prediction is not applied to P slices referring to the SPS. *When not present, the value of sps_weighted_pred_flag is inferred to be equal to 0.*.

sps_weighted_bipred_flag equal to 1 specifies that explicit weighted prediction may be applied to B slices referring to the SPS. sps_weighted_bipred_flag equal to 0 specifies that explicit weighted prediction is not applied to B slices referring to the SPS. *When not present, the value of sps_weighted_bipred_flag is inferred to be equal to 0.*.

long_term_ref_pics_flag equal to 0 specifies that no LTRP is used for inter prediction of any coded picture in the CLVS. long_term_ref_pics_flag equal to 1 specifies that LTRPs may be used for inter prediction of one or more coded pictures in the CLVS. *When not present, the value of long_term_ref_pics_ flag is inferred to be equal to 0.* inter_layer_ref_pics_present_flag equal to 0 specifies that no ILRP is used for inter prediction of any coded picture in the CLVS. inter_layer_ref_pic_flag equal to 1 specifies that ILRPs may be used for inter prediction of one or more coded pictures in the CLVS. When sps_video_parameter_set_id is equal to 0, the value of inter_layer_ref_pics_present_flag is inferred to be equal to 0. When vps_independent_layer_flag [GeneralLayerIdx[nuh_layer_id]] is equal to 1, the value of inter_layer_ref_pics_present_flag shall be equal to 0. *When not present, the value of inter_layer_ref_pics_present_flag is inferred to be equal to 0.* sps_idr_rpl_present_flag equal to 1 specifies that reference picture list syntax elements are present in slice headers of IDR pictures. sps_idr_rpl_present_flag equal to 0 specifies that reference picture list syntax elements are not present in slice headers of IDR pictures. *When not present, the value of sps_idr_rpl_present_flag is inferred to be equal to 0.* rpl1_same_as_rpl0_flag equal to 1 specifies that the syntax element num_ref_pic_lists_in_sps[1] and the syntax structure ref_pic_list_struct(1, rplsIdx) are not present and the following applies:

The value of num_ref_pic_lists_in_sps[1] is inferred to be equal to the value of num_ref_pic_lists_in_sps[0].
   The value of each of syntax elements in ref_pic_list_struct(1, rplsIdx) is inferred to be equal to the value of corresponding syntax element in ref_pic_list_struct(0, rplsIdx) for rplsIdx ranging from 0 to num_ref_pic_lists_in_sps[0]−1.

*When not present, the value of rpl1_same_as_rpl0_flag is inferred to be equal to 0.* partition_constraints_override_enabled_flag equal to 1 specifies the presence of partition_constraints_override_flag in PHs referring to the SPS. partition_constraints_override_enabled_flag equal to 0 specifies the absence of partition_constraints_override_flag in PHs referring to the SPS. *When not present, the value of partition_constraints_override_enabled_flag is inferred to be equal to 0.* sps_sao_enabled_flag equal to 1 specifies that the sample adaptive offset process is applied to the reconstructed picture after the deblocking filter process. sps_sao_enabled_flag equal to 0 specifies that the sample adaptive offset process is not applied to the reconstructed picture after the deblocking filter process. *When not present, the value of sps_sao_enabled_flag is inferred to be equal to 0.* sps_alf_enabled_flag equal to 0 specifies that the adaptive loop filter is disabled. sps_alf_enabled_flag equal to 1 specifies that the adaptive loop filter is enabled. *When not present, the value of sps_alf_enabled_flag is inferred to be equal to 0.* sps_ccalf_enabled_flag equal to 0 specifies that the cross-component adaptive loop filter is disabled. sps_ccalf_enabled_flag equal to 1 specifies that the cross-component adaptive loop filter may be enabled. *When not present, the value of sps_ccalf_enabled_flag is inferred to be equal to 0.* sps_transform_skip_enabled_flag equal to 1 specifies that transform_skip_flag may be present in the transform unit syntax. sps_transform_skip_enabled_flag equal to 0 specifies that transform_skip_flag is not present in the transform unit syntax. *When not present, the value of sps_transform_skip_enabled_flag is inferred to be equal to 0.* sps_ref_wraparound_enabled_flag equal to 1 specifies that horizontal wrap-around motion compensation is applied in inter prediction. sps_ref_wraparound_enabled_flag equal to 0 specifies that horizontal wrap-around motion compensation is not applied. *When not present, the value of sps_ref_wraparound_enabled_flag is inferred to be equal to 0.*. When the value of (CtbSizeY/MinCbSizeY+1) is greater than (pic_width_in_luma_samples/MinCbSizeY−1), where pic_width_in_luma_samples is the value of pic_width_in_luma_samples in any PPS that refers to the SPS, the value of sps_ref_wraparound_enabled_flag shall be equal to 0.

sps_temporal_mvp_enabled_flag equal to 1 specifies that temporal motion vector predictors may be used in the CLVS. sps_temporal_mvp_enabled_flag equal to 0 specifies that temporal motion vector predictors are not used in the CLVS. *When not present, the value of sps_temporal_mvp_enabled_flag is inferred to be equal to 0.* sps_amvr_enabled_flag equal to 1 specifies that adaptive motion vector difference resolution is used in motion vector coding. amvr_enabled_flag equal to 0 specifies that adaptive motion vector difference resolution is not used in motion vector coding. *When not present, the value of sps_amvr_enabled_flag is inferred to be equal to 0.*.

sps_bdof_enabled_flag equal to 0 specifies that the bi-directional optical flow inter prediction is disabled. sps_bdof_enabled_flag equal to 1 specifies that the bi-directional optical flow inter prediction is enabled. *When not present, the value of sps_bdof_enabled_flag is inferred to be equal to 0.* sps_dmvr_enabled_flag equal to 1 specifies that decoder motion vector refinement based inter bi-prediction is enabled. sps_dmvr_enabled_flag equal to 0 specifies that decoder motion vector refinement based inter bi-prediction is disabled. *When not present, the value of sps_dmvr_enabled_flag is inferred to be equal to 0.* sps_mts_enabled_flag equal to 1 specifies that sps_explicit_mts_intra_enabled_flag is present in the sequence parameter set RBSP syntax and sps_explicit_mts_inter_enabled_flag is present in the sequence parameter set RBSP syntax. sps_mts_enabled_flag equal to 0 specifies that sps_explicit_mts_intra_enabled_flag is not present in the sequence parameter set RBSP syntax and sps_explicit_mts_inter_enabled_flag is not present in the sequence parameter set RBSP syntax. *When not present, the value of sps_mts_enabled_flag is inferred to be equal to 0.* sps_sbt_enabled_flag equal to 0 specifies that subblock transform for inter-predicted CUs is disabled. sps_sbt_enabled_flag equal to 1 specifies that subblock transform for inter-predicted CU is enabled. *When not present, the value of sps_sbt_enabled_flag is inferred to be equal to 0.* sps_affine_enabled_flag specifies whether affine model based motion compensation can be used for inter prediction. If sps_affine_enabled_flag is equal to 0, the syntax shall be constrained such that no affine model based motion compensation is used in the CLVS, and inter affine flag and cu_affine_type_flag are not present in coding unit syntax of the CLVS. Otherwise (sps_affine_enabled_flag is equal to 1), affine model based motion compensation can be used in the CLVS. *When not present, the value of sps_affine_enabled_flag is inferred to be equal to 0.* sps_bcw_enabled_flag specifies whether bi-prediction with CU weights can be used for inter prediction. If sps_bcw_enabled_flag is equal to 0, the syntax shall be constrained such that no bi-prediction with CU weights is used in the CLVS, and bcw_idx is not present in coding unit syntax of the CLVS. Otherwise (sps_bcw_enabled_flag is equal to 1), bi-prediction with CU weights can be used in the CLVS. *When not present, the value of sps_bcw_enabled_flag is inferred to be equal to 0.* sps_ciip_enabled_flag specifies that ciip_flag may be present in the coding unit syntax for inter coding units. sps_ciip_enabled_flag equal to 0 specifies that ciip_flag is not present in the coding unit syntax for inter coding units. *When not present, the value of sps_ciip_enabled_flag is inferred to be equal to 0.*
sps_fpel_mmvd_enabled_flag equal to 1 specifies that merge mode with motion vector difference is using integer sample precision. sps_fpel_mmvd_enabled_flag equal to 0 specifies that merge mode with motion vector difference can use fractional sample precision. *When not present, the value of sps _fpel_mmvd_enabled_flag is inferred to be equal to 0*
sps_lmcs_enabled_flag equal to 1 specifies that luma mapping with chroma scaling is used in the CLVS. sps_lmcs_enabled_flag equal to 0 specifies that luma mapping with chroma scaling is not used in the CLVS. *When not present, the value of sps_lmcs_enabled_flag is inferred to be equal to 0.*
sps_lfnst_enabled_flag equal to 1 specifies that lfnst_idx may be present in intra coding unit syntax. sps_lfnst_enabled_flag equal to 0 specifies that lfnst_idx is not present in intra coding unit syntax.
sps_ladf_enabled_flag equal to 1, specifies that sps_num_ladf_intervals_minus2, sps_ladf_lowest_interval_qp_offset, sps_ladf_qp_offset[i], and sps_ladf_delta_threshold_minus1[i] are present in the SPS. *When not present, the value of sps_ladf_enabled_flag is inferred to be equal to 0.*
sps_scaling_list_enabled_flag equal to 1 specifies that a scaling list is used for the scaling process for transform coefficients. sps_scaling_list_enabled_flag equal to 0 specifies that scaling list is not used for the scaling process for transform coefficients. *When not present, the value of sps_scaling_list_enabled _flag is inferred to be equal to 0.*
sps_dep_quant_enabled_flag equal to 0 specifies that dependent quantization is disabled for pictures referring to the SPS. sps_dep_quant_enabled_flag equal to 1 specifies that dependent quantization may be enabled for pictures referring to the SPS. *When not present, the value of sps_dep_quant_enabled_ flag is inferred to be equal to 0.* .

6.1.2. Embodiment of Items 2.1 and 2.1b

In one example, the syntax structure picture_header_structure ( ) is changed as follows:

| picture_header_structure( ) { | Descriptor |
|---|---|
| gdr_or_irap_pic_flag | u(1) |
| if( gdr_or_irap_pic_flag ) | |
|   gdr_pic_flag | u(1) |
| *if(!intra_only_constraint_flag)* | |
|   ph_inter_slice_allowed_flag | u(1) |
| if( ph_inter_slice_allowed_flag ) | |
|   ph_intra_slice_allowed_flag | u(1) |
| non_reference_picture_flag | u(1) |
| ph_pic_parameter_set_id | ue(v) |
| ph_pic_order_cnt_lsb | u(v) |
| if( gdr_or_irap_pic_flag ) | |
|   no_output_of_prior_pics_flag | u(1) |
| ... | |
| if( rpl_info_in_ph_flag ) | |
|   ref_pic_lists( ) | |
| ... | |

6.1.3. Embodiment of Items 2.1 and 2.1c

In one example, the syntax structure slice_header ( ) is changed as follows:

| slice_header( ) { | Descriptor |
|---|---|
| picture_header_in_slice_header_flag | u(1) |
| if( picture_header_in_slice_header_flag ) | |
|   picture_header_structure( ) | |
| if( subpic_info_present_flag ) | |
|   slice_subpic_id | u(v) |
| ... | |
| if( separate_colour_plane_flag = = 1 ) | |
|   colour_plane_id | u(2) |
| if( *!intra_only_constraint_flag &&* !rpl_info_in_ph_flag && | |
| ( ( nal_unit_type != IDR_W_RADL && nal_unit_type != | |
|   IDR_N_LP ) \|\| sps_idr_rpl_present_flag ) ) | |
|   ref_pic_lists( ) | |
| if( *!intra_only_constraint_flag &&* ( rpl_info_in_ph_flag \|\| | |
| ( ( nal_unit_type != IDR_W_RADL && nal_unit_type != | |
|   IDR_N_LP ) \|\| sps_idr_rpl_present_flag ) ) && | |
|   ( slice_type != I && num_ref_entries | |
|   [ 0 ][ RplsIdx[ 0 ] ] > 1 ) \|\| | |
|   ( slice_type = = B && num_ref_entries[ 1 ] | |
|   [ RplsIdx[ 1 ] ] > 1 ) ) { | |
|   num_ref_idx_active_override_flag | u(1) |
| if( num_ref_idx_active_override_flag ) | |
|   for( i = 0; i < ( slice_type = = B ? 2: 1 ); i++ ) | |

```
slice_header( ) {                                                      Descriptor
    if( num_ref_entries[ i ][ RplsIdx[ i ] ] > 1 )
        num_ref_idx_active_minus1[ i ]                                  ue(v)
}
```

6.2. Second Embodiment

This is an embodiment of items 3, and 3.1 summarized above in Section 5.

In one example, the general constraint information semantics are changed as follows:

intra_only_constraint_flag equal to 1 specifies that slice_type shall be equal to I. intra_only_constraint_flag equal to 0 does not impose such a constraint.

*When intra_only_constraint_ flag is equal to 1, the value of rpl1_idx_ present_flag and num_ref_idx_default_active_ minus1[ ] shall be equal to 0.* one_slice_per_pic_constraint_flag equal to 1 specifies that each picture shall contain only one slice. one_slice_per_pic_constraint_flag equal to 0 does not impose such a constraint.

*When one_slice_per_pic_ constraint_flag is equal to 1, the value of rect_slice_ _flag shall be equal to 1.* one_tile_per_pic_constraint_flag equal to 1 specifies that each picture shall contain only one tile. one_tile_per_pic_constraint_flag equal to 0 does not impose such a constraint.

*When one_tile_per_pic_constriant flag is equal to 1, the value of num_exp_tile_columns_minus 1, num_exp_tile_rows_ minus1, rect_slice_flag shall to be equal to 0.*
*When both one_tile_per_pic_ constraint flag and one_slice_per_pic_constraint flag are equal to 1, the value of no_pic_partition_ flag shall be equal to 1.*

6.3. Third Embodiment

This is an embodiment of items 4, 4.1, 4.1.a, 4.1.b, and 4.1.c summarized above in Section 5.

6.3.1. Embodiment of Items 4.1 and 4.1a

In one example, the syntax structure general_constraint_info ( ) is changed as follows:

```
general_constraint_info( ) {                                           Descriptor
    general_progressive_source_flag                                     u(1)
    general_interlaced_source_flag                                      u(1)
    general_non_packed_constraint_flag                                  u(1)
    general_frame_only_constraint_flag                                  u(1)
    general_non_projected_constraint_flag                               u(1)
    intra_only_constraint_flag                                          u(1)
    max_bitdepth_constraint_idc                                         u(4)
    max_chroma_format_constraint_idc                                    u(2)
    if( !intra_only_constraint_flag )
        no_res_change_in_clvs_constraint_flag                           u(1)
    one_tile_per_pic_constraint_flag                                    u(1)
    one_slice_per_pic_constraint_flag                                   u(1)
    if( !one_slice_per_pic_constraint_flag )
        one_subpic_per_pic_constraint_flag                              u(1)
    no_qtbtt_dual_tree_intra_constraint_flag                            u(1)
    no_partition_constraints_override_constraint_flag                   u(1)
    no_sao_constraint_flag                                              u(1)
    no_alf_constraint_flag                                              u(1)
    no_ccalf_constraint_flag                                            u(1)
    no_joint_cbcr_constraint_flag                                       u(1)
    if( !intra_only_constraint_flag ) {
        no_ref_wraparound_constraint_flag                               u(1)
        no_temporal_mvp_constraint_flag                                 u(1)
        no_sbtmvp_constraint_flag                                       u(1)
        no_amvr_constraint_flag                                         u(1)
        no_bdof_constraint_flag                                         u(1)
        no_dmvr_constraint_flag                                         u(1)
    }
    no_cclm_constraint_flag                                             u(1)
    no_mts_constraint_flag                                              u(1)
    if( !intra_only_constraint_flag ) {
        no_sbt_constraint_flag                                          u(1)
        no_affine_motion_constraint_flag                                u(1)
        no_bcw_constraint_flag                                          u(1)
    }
    no_ibc_constraint_flag                                              u(1)
    if( !intra_only_constraint_flag ) {
        no_ciip_constraint_flag                                         u(1)
        no_fpel_mmvd_constraint_flag                                    u(1)
        no_gpm_constraint_flag                                          u(1)
    }
    no_ladf_constraint_flag                                             u(1)
```

-continued

```
general_constraint_info( ) {                                        Descriptor
    no_transform_skip_constraint_flag                                 u(1)
    if( !no_transform_skip_constraint_flag )
        no_bdpcm_constraint_flag                                      u(1)
    no_qp_delta_constraint_flag                                       u(1)
    no_dep_quant_constraint_flag                                      u(1)
    no_sign_data_hiding_constraint_flag                               u(1)
    if( !intra_only_constraint_flag ) {
        no_mixed_nalu_types_in_pic_constraint_flag                    u(1)
        no_trail_constraint_flag                                      u(1)
        no_stsa_constraint_flag                                       u(1)
        no_rasl_constraint_flag                                       u(1)
        no_radl_constraint_flag                                       u(1)
    }
    no_idr_constraint_flag                                            u(1)
    no_cra_constraint_flag                                            u(1)
    if( !intra_only_constraint_flag )
        no_gdr_constraint_flag                                        u(1)
    no_aps_constraint_flag                                            u(1)
    while( !byte_aligned( ) )
        gci_alignment_zero_bit                                        f(1)
    num_reserved_constraint_bytes                                     u(8)
    for( i = 0; i < num_reserved_constraint_bytes; i++ )
        gci_reserved_constraint_byte[ i ]                             u(8)
}
```

6.3.2. Embodiment of Items 4.1 and 4.1b

In one example, the general constraint information semantics are changed as follows:

intra_only_constraint_flag equal to 1 specifies that slice_type shall be equal to I.

intra_only_constraint_flag equal to 0 does not impose such a constraint.

*If intra_only_constraint_flag is equal to 1, the value of no_res_change_in_clvs_constraint_flag, no_ref_wraparound_ constraint_flag, no_temporal_mvp_constraint_flag, no_sbtmvp_constraint_flag, no_amvr_constraint_flag, no_bdof_constraint_flag, no _dmvr_constraint_flag, no_sbt_constraint_flag, no_affine_motion_constraint_flag, no_bcw_constraint_ flag, no_ciip_constraint_flag, no_fpel_mmvd_constraint_flag, no_gpm_constraint_flag, no_mixed_nalu_types_in_pic_constraint_flag, no_trail_ constraint_flag, of no_stsa_constraint_flag, no _rasl_constraint_flag, radl_constraint_flag, no_gdr_constraint_flag shall be equal to 1.*

*When intra_only_constraint _flag is equal to 1, at least one of the values of no_idr_constraint_flag and no_cra_constraint_flag shall be equal to 0.* no_transform_skip_constraint_flag equal to 1 specifies that sps_transform_skip_enabled_flag shall be equal to 0. no_transform_skip_constraint_flag equal to 0 does not impose such a constraint. *When no_transform_skip_ constraint_flag is equal to 1, the value of no_bdpcm_constraint_flag shall be equal to 1.* no_aps_constraint_flag equal to 1 specifies that there shall be no NAL unit with nuh_unit_type equal to PREFIX_APS_NUT or SUFFIX_APS_NUT present in OlsInScope. no_aps_constraint_flag equal to 0 does not impose such a constraint. *When no_aps_constraint_flag is equal to 1, the value of no_alf_constraint_flag shall be equal to 1.*

6.3.3. Embodiment of Items 4.1 and 4.1c

In one example, the general constraint information semantics are changed as follows:

max_bitdepth_constraint_idc specifies that bit_depth_minus8 shall be in the range of 0 to max_bitdepth_constraint_idc, inclusive *max_bitdepth_constraint _idc shall be in the range of 0 to 8, inclusive.* no_gdr_constraint_flag equal to 1 specifies that there shall be no NAL unit with nuh_unit_type equal to GDR_NUT present in OlsInScope. no_gdr_constraint_flag equal to 0 does not impose such a constraint.

*At least one of the values of no_gdr_constraint_flag, no_idr_constraint_flag, and no_cra_constraint_flag shall be equal to 0.*

6.4. Fourth Embodiment

This is an embodiment of items 5, and 5.a summarized above in Section 5.

In one example, the syntax structure seqparameter_set_rbsp( ) is changed as follows:

```
seq_parameter_set_rbsp( ) {                                         Descriptor
    sps_seq_parameter_set_id                                          u(4)
    ...
    if( !intra_only_constraint_flag )
        sps_intra_only_flag                                           u(1)
    ...
    if( !sps_intra_only_flag ) {
        sps_weighted_pred_flag                                        u(1)
```

-continued

| seq_parameter_set_rbsp( ) { | Descriptor |
|---|---|
|   sps_weighted_bipred_flag | u(1) |
| } | |
| ... | |
| *if( !sps_intra_only_flag )* | |
|   long_term_ref_pics_flag | u(1) |

*sps_intra_only_flag equal to 1 specifies that inter prediction is not allowed within a CLVSs referring to the SPS. sps_ intra_only_flag equal to 0 specifies that inter predition is allowed within a CLVSs referring to the SPS. When not present (in this case the intra_only_constraint_flag is equal to 1), the value of sps_ _intra_only_flag is inferred to be equal to1.*
And the syntax structure pic_parameter_set_rbsp( ) is changed as follows:

| pic_parameter_set_rbsp( ) { | Descriptor |
|---|---|
|   pps_pic_parameter_set_id | ue(v) |
|   pps_seq_parameter_set_id | u(4) |
|   pps_intra_only_flag | u(1) |
|   mixed_nalu_types_in_pic_flag | u(1) |
|   pic_width_in_luma_samples | ue(v) |
|   pic_height_in_luma_samples | ue(v) |
| ... | |
|   cabac_init_present_flag | u(1) |
|   *if( !pps_intra_only_flag ) {* | |
|     for( i = 0; i < 2; i++ ) | |
|       num_ref_idx_default_active_minus1[ i ] | ue(v) |
|     rpl1_idx_present_flag | u(1) |
|   } | |
|   init_qp_minus26 | se(v) |
|   cu_qp_delta_enabled_flag | u(1) |
| ... | |

And the picture parameter set RBSP semantics are changed as follows:
*pps_intra_only_flag equal to 1 specifies that each picture referring to the PPS is not allowed to use inter. sps_intra_only _flag equal to 0 specifies that each picture referring to the PPS is allowed to use inter prediction. When sps_intra_ only_flag is equal to 1 , the value of pps_intra_only_flag shall be equal to 1.*
num_ref_idx_default_active_minus1[i] plus 1, when i is equal to 0, specifies the inferred value of the variable NumRefIdxActive[0] for P or B slices with num_ref_idx_active_override_flag equal to 0, and, when i is equal to 1, specifies the inferred value of NumRefIdxActive[1] for B slices with num_ref_idx_active_override_flag equal to 0.

The value of num_ref_idx_default_active_minus1[i] shall be in the range of 0 to 14, inclusive.
*When not present, the value of num_ref_idx_default_ active_minus1[ i ] shall be equal to 0.*
rpl1_idx_present_flag equal to 0 specifies that ref_pic_list_sps_flag[1] and ref_pic_list_idx[1] are not present in the PH syntax structures or the slice headers for pictures referring to the PPS. rpl1_idx_present_flag equal to 1 specifies that ref_pic_list_sps_flag[1] and ref_pic_list_idx[1] may be present in the PH syntax structures or the slice headers for pictures referring to the PPS. *When not present, the value of rpl1_idx_present_flag shall be equal to 0.*
And the syntax structure picture_header_structure ( ) is changed as follows:

| picture_header_structure( ) { | Descriptor |
|---|---|
|   gdr_or_irap_pic_flag | u(1) |
|   if( gdr_or_irap_pic_flag ) | |
|     gdr_pic_flag | u(1) |
|   *if( !pps_intra_only_flag )* | |
|     ph_inter_slice_allowed_flag | u(1) |
|     if( ph_inter_slice_allowed_flag ) | |
|       ph_intra_slice_allowed_flag | u(1) |
|   non_reference_picture_flag | u(1) |
|   ph_pic_parameter_set_id | ue(v) |
|   ph_pic_order_cnt_lsb | u(v) |
|   if( gdr_or_irap_pic_flag ) | |
|     no_output_of_prior_pics_flag | u(1) | ph_inter_slice_allowed_flag equal to 0 specifies that all coded slices of the picture have slice_type equal to 2. ph_inter_slice_allowed_flag equal to 1 specifies that there may or may not be one or more coded slices in the picture that have slice_type equal to 0 or 1. *When not present, the value of ph_inter_ slice_allowed_flag is inferred to be equal to 0.*
And the syntax structure slice_header ( ) is changed as follows:

| slice_header( ) { | Descriptor |
|---|---|
| picture_header_in_slice_header_flag | u(1) |
| if( picture_header_in_slice_header_flag ) | |
| picture_header_structure( ) | |
| if( subpic_info_present_flag ) | |
| slice_subpic_id | u(v) |
| ... | |
| if( separate_colour_plane_flag = = 1 ) | |
| colour_plane_id | u(2) |
| if( *!pps_intra_only_flag &&* !rpl_info_in_ph_flag && ( ( nal_unit_type != IDR_W_RADL && nal_unit_type != IDR_N_LP ) \|\| sps_idr_rpl_present_flag ) ) | |
| ref_pic_lists( ) | |
| if( *!pps_intra_only_flag &&* ( rpl_info_in_ph_flag \|\| ( ( nal_unit_type != IDR_W_RADL && nal_unit_type != IDR_N_LP ) \|\| sps_idr_rpl_present_flag ) ) && ( slice_type != I && num_ref_entries[ 0 ][ RplsIdx[ 0 ] ] > 1 ) \|\| ( slice_type = = B && num_ref_entries[ 1 ][ RplsIdx[ 1 ] ] > 1 ) ) { | |
| num_ref_idx_active_override_flag | u(1) |
| if( num_ref_idx_active_override_flag ) | |
| for( i = 0; i < ( slice_type = = B ? 2: 1 ); i++ ) | |
| if( num_ref_entries[ i ][ RplsIdx[ i ] ] > 1 ) | |
| num_ref_idx_active_minus1[ i ] | ue(v) |
| } | |

6.5. Fifth Embodiment

This is an embodiment of items 6, and 6.1 summarized above in Section 5.
In one example, the syntax structure seq_parameter_set_rbsp( ) is changed as follows:

| seq_parameter_set_rbsp( ) { | Descriptor |
|---|---|
| sps_seq_parameter_set_id | u(4) |
| sps_video_parameter_set_id | u(4) |
| ... | |
| if( *!no_entropy_coding_sync_constraint_flag* ) | |
| sps_entropy_coding_sync_enabled_flag | u(1) |
| if( *! no_wpp_entry_point_offsets_present_constraint_flag &&* sps_entropy_coding_sync_enabled_flag ) | |
| sps_wpp_entry_point_offsets_present_flag | u(1) |
| if( *!no_weighted_pred_constraint_flag* ) | |
| sps_weighted_pred_flag | u(1) |
| if( *!no_weighted_bipred_constraint_flag* ) | |
| sps_weighted_bipred_flag | u(1) |
| log2_max_pic_order_cnt_lsb_minus4 | u(4) |
| ... | |
| if( *!no_long_term_ref_pics_constraint_flag* ) | |
| long_term_ref_pics_flag | u(1) |
| if( *!no_inter_layer_prediction_constraint_flag* ) | |
| inter_layer_ref_pics_present_flag | u(1) |
| ... | |
| if( *!no_max_luma_transform_size_64_constraint_flag)* | |
| sps_max_luma_transform_size_64_flag | u(1) |
| ... | |
| if( *!no_smvd_constraint_flag* ) | |
| sps_smvd_enabled_flag | u(1) |
| ... | |
| if( *!no_mmvd_constraint_flag* ) | |
| sps_mmvd_enabled_flag | u(1) |
| if( *!no_isp_constraint_flag* ) | |
| sps_isp_enabled_flag | u(1) |
| if( *!no_mrl_constraint_flag* ) | |

-continued

```
seq_parameter_set_rbsp( ) {                                             Descriptor
    sps_mrl_enabled_flag                                                u(1)
    if( !no_mip_constraint_flag )
        sps_mip_enabled_flag                                            u(1)
    ...
    if( !no_palette_constraint_flag )
        sps_palette_enabled_flag                                        u(1)
    if( !no_act_constraint_flag && ChromaArrayType = = 3 &&
!sps_max_luma_transform_size_64_flag )
        sps_act_enabled_flag                                            u(1)
    ...
    if( !no_lmcs_constraint_flag )
        sps_lmcs_enabled_flag                                           u(1)
    if( !no_lfnst_constraint_flag )
        sps_lfnst_enabled_flag                                          u(1)
    ...
    if( !no_parallel_merge_level_constraint_flag )
        log2_parallel_merge_level_minus2                                ue(v)
    if( !no_scaling_list_constraint_flag )
        sps_scaling_list_enabled_flag                                   u(1)
    ...
    if( !no_virtual_boundaries_constraint_flag )
        sps_virtual_boundaries_enabled_flag                             u(1)
``` sps_entropy_coding_sync_enabled_flag equal to 1 specifies that a specific synchronization process for context variables is invoked before decoding the CTU that includes the first CTB of a row of CTBs in each tile in each picture referring to the SPS, and a specific storage process for context variables is invoked after decoding the CTU that includes the first CTB of a row of CTBs in each tile in each picture referring to the SPS. sps_entropy_coding_sync_enabled_flag equal to 0 specifies that no specific synchronization process for context variables is required to be invoked before decoding the CTU that includes the first CTB of a row of CTBs in each tile in each picture referring to the SPS, and no specific storage process for context variables is required to be invoked after decoding the CTU that includes the first CTB of a row of CTBs in each tile in each picture referring to the SPS. *When not present, the value of sps_entropy_coding_sync_ enabled_flag is inferred to be equal to 0.* sps_wpp_entry_point_offsets_present_flag equal to 1 specifies that signalling for entry point offsets for CTU rows be present in the slice headers of pictures referring to the SPS when sps_entropy_coding_sync_enabled_flag is equal to 1. sps_wpp_entry_point_offsets_present_flag equal to 0 specifies that signalling for entry point offsets for CTU rows are not present in the slice headers of pictures referring to the SPS. When not present, the value of sps_wpp_entry_point_offsets_present_flag is inferred to be equal to 0. *When not present, the value sps_wpp_entry_point_ offsets_present_flag is inferred to be equal to 0.* sps_weighted_pred_flag equal to 1 specifies that weighted prediction may be applied to P slices referring to the SPS. sps_weighted_pred_flag equal to 0 specifies that weighted prediction is not applied to P slices referring to the SPS. *When not present, the value of sps weighted _pred_flag is inferred to be equal to 0.* sps_weighted_bipred_flag equal to 1 specifies that explicit weighted prediction may be applied to B slices referring to the SPS. sps_weighted_bipred_flag equal to 0 specifies that explicit weighted prediction is not applied to B slices referring to the SPS. *When not present, the value of sps_weighted_bipred_ flag is inferred to be equal to 0.* long_term_ref_pics_flag equal to 0 specifies that no LTRP is used for inter prediction of any coded picture in the CLVS. long_term_ref_pics_flag equal to 1 specifies that LTRPs may be used for inter prediction of one or more coded pictures in the CLVS. *When not present, the value of long_term_ref_ pics_flag is inferred to be equal to 0.* inter_layer_ref_pics_present_flag equal to 0 specifies that no ILRP is used for inter prediction of any coded picture in the CLVS. inter_layer_ref_pic_flag equal to 1 specifies that ILRPs may be used for inter prediction of one or more coded pictures in the CLVS. When sps_video_parameter_set_id is equal to 0, the value of inter_layer_ref_pics_present_flag is inferred to be equal to 0. When vps_independent_layer_flag [GeneralLayerIdx[nuh_layer_id]] is equal to 1, the value of inter_layer_ref_pics_present_flag shall be equal to 0. *When not present, the value of inter_laer_ ref_pics_present_flag is inferred to be equal to 0.* sps_max_luma_transform_size_64_flag equal to 1 specifies that the maximum transform size in luma samples is equal to 64. sps_max_luma_transform_size_64_flag equal to 0 specifies that the maximum transform size in luma samples is equal to 32. *When not present, the value of sps_max_luma_transform _size_64_flag is inferred to be equal to 0.* sps_smvd_enabled_flag equal to 1 specifies that symmetric motion vector difference may be used in motion vector decoding. sps_smvd_enabled_flag equal to 0 specifies that symmetric motion vector difference is not used in motion vector coding. *When not present, the value of sps_smvd_enabled_flag is inferred to be equal to 0.* sps_mmvd_enabled_flag equal to 1 specifies that merge mode with motion vector difference is enabled. sps_mmvd_enabled_flag equal to 0 specifies that merge mode with motion vector difference is disabled. *When not present, the value of sps_dmvr_enabled_flag is inferred to be equal to 0.* sps_isp_enabled_flag equal to 1 specifies that intra prediction with subpartitions is enabled. sps_isp_enabled_flag equal to 0 specifies that intra prediction with subpartitions is disabled. *When not present, the value of sps_isp_enabled_ flag is inferred to be equal to 0.* sps_mrl_enabled_flag equal to 1 specifies that intra prediction with multiple reference lines is enabled. sps_mrl_enabled_flag equal to 0 specifies that intra prediction with multiple reference lines is disabled. *When not present, the value of sps_mrl enabled_flag is inferred to be equal to 0.* sps_mip_enabled_flag equal to 1 specifies that matrix-based intra prediction is enabled. sps_mip_enabled_flag equal to 0 specifies that matrix-based intra prediction is disabled. *When not present, the value of sps_mip_enabled_flag is inferred to be equal to 0.* sps_palette_enabled_flag equal to 1 specifies that pred_mode_plt_flag may be present in the coding unit syntax. sps_palette_enabled_flag equal to 0 specifies that pred_mode_plt_flag is not present in the coding unit syntax. When sps_palette_enabled_flag is not present, it is inferred to be equal to 0. *When not present, the value of sps_palette_ enabled_flag is inferred to be equal to 0.* sps_act_enabled_flag equal to 1 specifies that adaptive colour transform may be used and the cu_act_enabled_flag may be present in the coding unit syntax. sps_act_enabled_flag equal to 0 specifies that adaptive colour transform is not used and cu_act_enabled_flag is not present in the coding unit syntax. When sps_act_enabled_flag is not present, it is inferred to be equal to 0. *When not present, the value of sps_act_ enabled_flag is inferred to be equal to* sps_lmcs_enabled_flag equal to 1 specifies that luma mapping with chroma scaling is used in the CLVS. sps_lmcs_enabled_flag equal to 0 specifies that luma mapping with chroma scaling is not used in the CLVS. *When not present, the value of sps_lmcs_ enabled_flag is inferred equal to 0.* sps_lfnst_enabled_flag equal to 1 specifies that lfnst_idx may be present in intra coding unit syntax. sps_lfnst_enabled_flag equal to 0 specifies that lfnst_idx is not present in intra coding unit syntax. *When not present, the value of sps_lfnst enabled_flag is inferred to be equal to 0.* log 2_parallel_merge_level_minus2 plus 2 specifies the value of the variable Log 2ParMrgLevel, which is used in the derivation process for spatial merging candidates as specified in clause 8.5.2.3, the derivation process for motion vectors and reference indices in subblock merge mode as specified in clause 8.5.5.2, and to control the invocation of the updating process for the history-based motion vector predictor list in clause 8.5.2.1. The value of log 2_parallel_merge_level_minus2 shall be in the range of 0 to Ctb Log 2SizeY−2, inclusive.

The variable Log 2ParMrgLevel is derived as follows:

$$\text{Log 2ParMrgLevel} = \log 2\_parallel\_merge\_level\_minus2 + 2 \quad (68)$$

*When not present, the value of log2_parallel_merge_level_minus2 is inferred to be equal to 0.* sps_scaling_list_enabled_flag equal to 1 specifies that a scaling list is used for the scaling process for transform coefficients. sps_scaling_list_enabled_flag equal to 0 specifies that scaling list is not used for the scaling process for transform coefficients. *When not present, the value of sps_scaling_list_ enabled_flag is inferred to be equal to 0.* sps_virtual_boundaries_present_flag equal to 1 specifies that information of virtual boundaries is signalled in the SPS. sps_virtual_boundaries_present_flag equal to 0 specifies that information of virtual boundaries is not signalled in the SPS. When there is one or more than one virtual boundaries signalled in the SPS, the in-loop filtering operations are disabled across the virtual boundaries in pictures referring to the SPS. In-loop filtering operations include the deblocking filter, sample adaptive offset filter, and adaptive loop filter operations. *When not present, the value of sps_virtual_boundaries_present_ flag is inferred to be equal to 0.*

And the syntax structure general_constraint_info ( ) is changed as follows:

| general_constraint_info( ) { | Descriptor |
|---|---|
| general_progressive_source_flag | u(1) |
| general_interlaced_source_flag | u(1) |
| general_non_packed_constraint_flag | u(1) |
| general_frame_only_constraint_flag | u(1) |
| general_non_projected_constraint_flag | u(1) |
| intra_only_constraint_flag | u(1) |
| max_bitdepth_constraint_idc | u(4) |
| max_chroma_format_constraint_idc | u(2) |
| *no_entropy_coding_sync_constraint_flag* | *u(1)* |
| *no_wpp_entry_point_offsets_present_constraint_flag* | *u(1)* |
| if( !intra_only_constraint_flag ) { | |
|   *no_weighted_pred_constraint_flag* | *u(1)* |
|   *no_weighted_bipred_constraint_flag* | *u(1)* |
|   *no_long_term_ref_pics_constraint_flag* | *u(1)* |
|   *no_inter_layer_prediction_constraint_flag* | *u(1)* |
|   *no_res_change_in_clvs_constraint_flag* | *u(1)* |
| } | |
| ... | |
| *no_max_luma_transform_size_64_constraint_flag* | *u(1)* |
| ... | |
| if( !intra_only_constraint_flag ) | |
|   no_ref_wraparound_constraint_flag | u(1) |
|   no_temporal_mvp_constraint_flag | u(1) |
|   no_sbtmvp_constraint_flag | u(1) |
|   no_amvr_constraint_flag | u(1) |
|   no_bdof_constraint_flag | u(1) |
|   *no_smvd_constraint_flag* | *u(1)* |
|   no_dmvr_constraint_flag | u(1) |
|   *no_mmvd_constraint_flag* | *u(1)* |
| } | |
| *no_isp_constraint_flag* | *u(1)* |

-continued

```
general_constraint_info( ) {                                    Descriptor
    no_mrl_constraint_flag                                         u(1)
    no_mip_constaint_flag                                          u(1)
    no_cclm_constraint_flag                                        u(1)
    ...
    no_palette_constraint_flag                                     u(1)
    no_act-constraint_flag                                         u(1)
    no_ibc_constraint_flag                                         u(1)
    ...
    no_lmcs_constraint_flag                                        u(1)
    no_lfnst_constraint_flag                                       u(1)
    no_ladf_constraint_flag                                        u(1)
    no_transform_skip_constraint_flag                              u(1)
    ...
    no_qp_delta_constraint_flag                                    u(1)
    no_parallel_merge_level_constraint_flag                        u(1)
    no_scaling_list_constraint_flag                                u(1)
    no_dep_quant_constraint_flag                                   u(1)
    no_sign_data_hiding_constraint_flag                            u(1)
    no_virtual_boundaries_constraint_flag                          u(1)
``` intra_only_constraint_flag equal to 1 specifies that slice_type shall be equal to I.
intra_only_constraint_flag equal to 0 does not impose such a constraint.
If intra_only_constraint_flag is equal to 1, the value of no_weighted_pred_ constraint_flag, no_weighted_bipred_constraint_flag, no_long_term_ref_ pics_constraint_flag, no_inter_layer_prediction constraint_flag, no_res_change_in_clvs_ constraint_flag, no_ref_wraparound_constraint flag, no_temporal_mvp_constraint_flag, no_sbtmvp_constraint_flag, no_amvr_constraint_flag, no_bdof_constraint_flag, no_smvd_constraint_flag, no _dmvr_constraint_flag, no mmvd_constraint_flag, no_sbt_constraint_flag, no_affine_motion_constraint_flag, no_bcw_constraint_flag, no_ciip_constraint_flag, no_fpel_mmvd_constraint_flag, no_gpm_constraint_flag, no_mixed_nalu_types_in_pic _constraint_flag, no_trail_constraint_flag, of no_stsa_constraint_flag, no_rasl_constraint_flag, radl_ constraint_flag, no_gdr_constraint_flag shall be equal to 1.
no_entropy_coding_sync_ constraint_flag equal to 1 specifies that sps_entropy_coding_sync_enabled_flag is not present.
no_entropy_coding_sync_ constraint_flag equal to 0 specifies that sps_entropy_coding_sync_enabled_flag is present.
no_wpp_entry_point_offsets _present_constraint_flag equal to 1 specifies that sps_wpp_entry_point_offsets_present_flag is not present.
no_wpp_entry_point_offsets_present_constraint_flag equal to 0 specifies that sps_wpp_entry_point_offsets_present_flag is present.
no_weighted_pred_constraint _flag equal to 1 specifies that sps_weighted_pred _flag is not present. no_weighted_pred_constraint_flag equal to 0 specifies that sps_weighted_pred_flag is present.
no_weighted_bipred_ constraint_flag equal to 1 specifies that sps_ weighted_bipred_flag is not present. no_weighted_bipred_constraint_flag equal to 0 specifies that sps_weighted_bipred_flag is present.
no_long_term_ref_pics_ constraint_flag equal to 1 specifies that long _term_ref_pics_flag is not present. . no_long_term_ref_pics_constraint_flag equal to 0 specifies that long_term_ref_pics_flag is present.
no_inter_layer_prediction _constraint_flag equal to 1 specifies that inter_layer_ref_pics_present_flag is not present. no_ inter_layer_prediction_constraint_flag equal to 0 specifies that inter_layer_ref_pics_ present_flag is present. When vps_independent_layer_flag[ GeneralLayerIdx[ nuh_layer_id] ] is equal to 1 , the value of no_inter_layer_prediction_ constraint_flag shall be equal to 1.
no_max_luma_tranform_ size 64_constraint_flag equal to 1 specifies that sps_max_luma_transform_size_64_flag is not present.
no_partition_constraints_ override_constraint_flag equal to 0 specifies that sps_max_luma_transform_size_64_flag is present.
no_smvd_constraint_flag equal to 1 specifies that sps_smvd_enabled _flag is not present.
no_partition_constraints_ override_constraint_flag equal to 0 specifies that sps_smvd_enabled_flag is present.
no_mmvd_constraint_flag equal to 1 specifies that sps_mmvd_enabled_ flag is not present.
no_partition_constraints_ override_constraint_flag equal to 0 specifies that sps_mmvd_enabled_flag is present.
no_isp_constraint_flag equal to 1 specifies that sps_isp_enabled_ flag is not present.
no_partition_constraints_ override_constraint_flag equal to 0 specifies that sps_isp_enabled_flag is present.
no_mrl_constraint_flag equal t0 1 specifies that sps_mrl_enabled_ flag is not present.
no_partition_constraints_ ovverride_constraint_flag equal to 0 specifies that sps_mrl_enabled_flag is present. .
no_mip_constraint_flag equal to 1 specifies that sps_mip_enabled_flag is not present.
no_partition_constraints_ override_constraint_flag equal to 0 specifies that sps_mip_enabled_flag is present.

*no_palette_constraint_flag equal to 1 specifies that sps_palette_enabled_flag is not present.*
*no_partition_constraints_ _override_constraint_flag equal to 0 specifies that sps_palette_enabled_ flag is present.*
*no_act_constraint_flag equal to 1 specifies that sps_act_enabled_ flag is not present*
*no_partition_constraints_ _override_constraint_flag equal to 0 specifies that sps_act_enabled_ flag is present.*
*no_lmcs_constraint_flag equal to 1 specifies that sps_lmcs_enabled _flag is not present.*
*no_partition_constraints_ override_constraint_flag equal to 0 specifies that sps_lmcs_enabled_ flag is present.*
*no_lfnst_constraint_flag equal to 1 specifies that sps_lfnst_enabled_ flag is not present.*
*no_partition_constraints _override_constraint_flag equal to 0 specifies that sps_lfnst_enabled_ flag is present.*
*no_parallel_merge_level _constraint_flagequal to 1 specifies that log2_parallel_merge_ level_minus2 is not present*
*no_partition_constraints_ override_constraint_flag equal to 0 specifies that log2_parallel_merge_level_ minus2 is present.*
*no_scaling_list_constraint_ flag equal to 1 specifies that sps_scaling_list_ enabled_flag is not present. no_partition_ constraints_override_ constraint_flag equal to 0 specifies that sps_scaling_list_ enabled_flag is present.*
*no_virtual_boundaries_ constraint_flag equal to 1 specifies that sps_virtual_boundaries_ enabled_flag is not present.*
*no_partition_constraints_ override_constraint_flag equal to 0 specifies that sps_virtual_boundaries_ enabled_flag is present.*

6.6. Sixth Embodiment

This is an embodiment of items 7, 7.1, 7.2.c and 7.2.d summarized above in Section 5.

6.6.1. Embodiment of Items 7.1 and 7.2.c

In one example, the syntax structure adaptation_parameter_set_rbsp ( ) is changed as follows:

And the semantics of adaptive loop filter data are changed as follows:

alf_chroma_filter_signal_flag equal to 1 specifies that a chroma filter is signalled. alf_chroma_filter_signal_flag equal to 0 specifies that a chroma filter is not signalled. When ChromaArrayType is equal to 0, alf_chroma_filter_signal_flag shall be equal to 0.

*When no_aps_constraint_ flag is equal to 0 and sps_alf_enabled_flag is equal to 1,* at least one of the values of alf_luma_filter_signal_flag, alf_chroma_filter_signal_flag, alf_cc_cb_filter_signal_flag and alf_cc_cr_filter_signal_flag shall be equal to 1.

6.6.2. Embodiment of Item 7.2.d

In one example, the semantics of adaptive loop filter data are changed as follows:

alf_chroma_filter_signal_flag equal to 1 specifies that a chroma filter is signalled. alf_chroma_filter_signal_flag equal to 0 specifies that a chroma filter is not signalled. When ChromaArrayType is equal to 0, alf_chroma_filter_signal_flag shall be equal to 0.

*If the APS NAL unit having aps_params_type equal to ALF_APS,* at least one of the values of alf_luma_filter_signal_flag, alf_chroma_filter_signal_flag, alf_cc_cb_filter_signal_flag and alf_cc_cr_filter_signal_flag shall be equal to 1.

FIG. 1 is a block diagram showing an example video processing system 1900 in which various techniques disclosed herein may be implemented. Various implementations may include some or all of the components of the system 1900. The system 1900 may include input 1902 for receiving video content. The video content may be received in a raw or uncompressed format, e.g., 8 or 10 bit multi-component pixel values, or may be in a compressed or encoded format. The input 1902 may represent a network interface, a peripheral bus interface, or a storage interface. Examples of network interface include wired interfaces such as Ethernet, passive optical network (PON), etc. and wireless interfaces such as wireless fidelity (WI-FI) or cellular interfaces.

The system 1900 may include a coding component 1904 that may implement the various coding or encoding methods described in the present document. The coding component 1904 may reduce the average bitrate of video from the input 1902 to the output of the coding component 1904 to produce

| adaptation_parameter_set_rbsp( ) { | Descriptor |
|---|---|
| adaptation_parameter_set_id | u(5) |
| *aps_seq_parameter_set_id* | *u(4)* |
| aps_params_type | u(3) |
| if( aps_params_type = = ALF_APS ) | |
|   alf_data( ) | |
| else if( aps_params_type = = LMCS_APS ) | |
|   lmcs_data( ) | |
| else if( aps_params_type = = SCALING_APS ) | |
|   scaling_list_data( ) | |
| aps_extension_flag | u(1) |
| if( aps_extension_flag ) | |
|   while( more_rbsp_data( ) ) | |
|     aps_extension_data_flag | u(1) |
| rbsp_trailing_bits( ) | |
| } | | aps_seq_parameter_set_id specifies the value of sps_seq_parameter_set_id for the APS. The value of aps_seq_parameter_set_id shall be in the range of 0 to 15, inclusive. The value of aps_seq_parameter_set_id shall be the same in all APSs that are referred to by coded pictures in a CLVS.

a coded representation of the video. The coding techniques are therefore sometimes called video compression or video transcoding techniques. The output of the coding component 1904 may be either stored, or transmitted via a communication connected, as represented by the component 1906. The stored or communicated bitstream (or coded) representation of the video received at the input 1902 may be used by the component 1908 for generating pixel values or displayable video that is sent to a display interface 1910. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or Displayport, and so on. Examples of storage interfaces include serial advanced technology attachment (SATA), peripheral component interconnect (PCI), integrated drive electronics (IDE) interface, and the like. The techniques described in the present document may be embodied in various electronic devices such as mobile phones, laptops, smartphones or other devices that are capable of performing digital data processing and/or video display.

Figure 2:
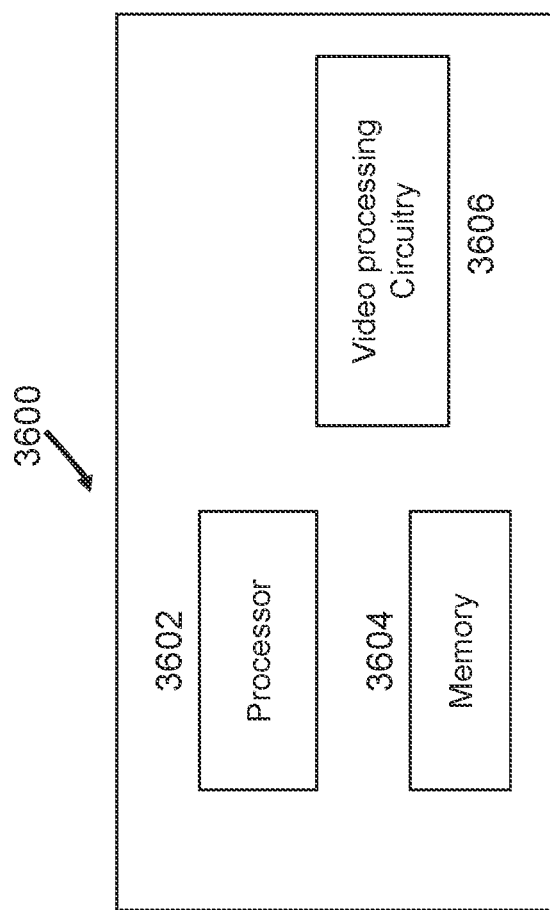
FIG. 2 is a block diagram of a video processing apparatus.

FIG. 2 is a block diagram of a video processing apparatus 3600. The apparatus 3600 may be used to implement one or more of the methods described herein. The apparatus 3600 may be embodied in a smartphone, tablet, computer, Internet of Things (IoT) receiver, and so on. The apparatus 3600 may include one or more processors 3602, one or more memories 3604 and video processing hardware 3606. The processor(s) 3602 may be configured to implement one or more methods described in the present document. The memory (memories) 3604 may be used for storing data and code used for implementing the methods and techniques described herein. The video processing hardware 3606 may be used to implement, in hardware circuitry, some techniques described in the present document.

Figure 4:
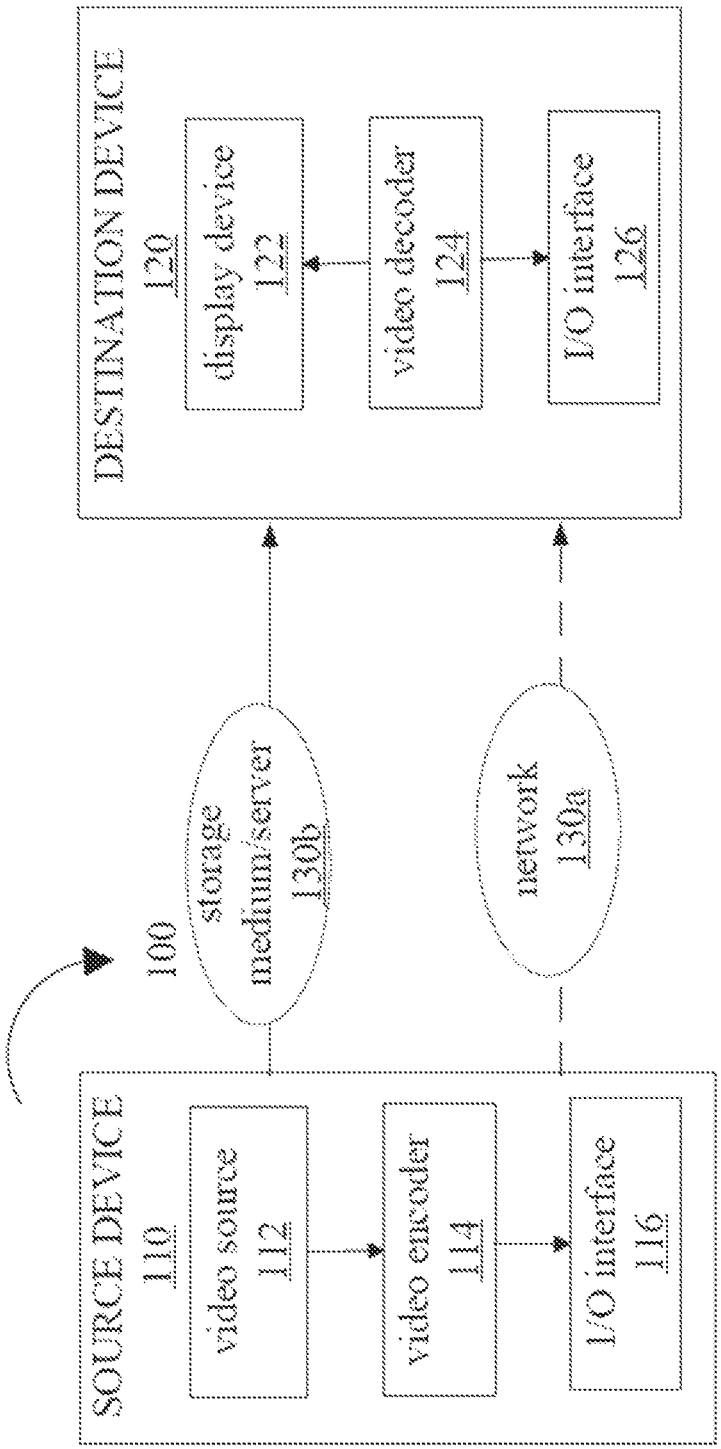
FIG. 4 is a block diagram that illustrates a video coding system in accordance with some embodiments of the present disclosure.

FIG. 4 is a block diagram that illustrates an example video coding system 100 that may utilize the techniques of this disclosure.

As shown in FIG. 4, video coding system 100 may include a source device 110 and a destination device 120. Source device 110 generates encoded video data which may be referred to as a video encoding device. Destination device 120 may decode the encoded video data generated by source device 110 which may be referred to as a video decoding device.

Source device 110 may include a video source 112, a video encoder 114, and an input/output (I/O) interface 116.

Video source 112 may include a source such as a video capture device, an interface to receive video data from a video content provider, and/or a computer graphics system for generating video data, or a combination of such sources. The video data may comprise one or more pictures. Video encoder 114 encodes the video data from video source 112 to generate a bitstream. The bitstream may include a sequence of bits that form a coded representation of the video data. The bitstream may include coded pictures and associated data. The coded picture is a coded representation of a picture. The associated data may include sequence parameter sets, picture parameter sets, and other syntax structures. I/O interface 116 may include a modulator/demodulator (modem) and/or a transmitter. The encoded video data may be transmitted directly to destination device 120 via I/O interface 116 through network 130*a*. The encoded video data may also be stored onto a storage medium/server 130*b* for access by destination device 120.

Destination device 120 may include an I/O interface 126, a video decoder 124, and a display device 122.

I/O interface 126 may include a receiver and/or a modem. I/O interface 126 may acquire encoded video data from the source device 110 or the storage medium/server 130*b*. Video decoder 124 may decode the encoded video data. Display device 122 may display the decoded video data to a user. Display device 122 may be integrated with the destination device 120, or may be external to destination device 120 which be configured to interface with an external display device.

Video encoder 114 and video decoder 124 may operate according to a video compression standard, such as the High Efficiency Video Coding (HEVC) standard, Versatile Video Coding (VVC) standard and other current and/or further standards.

Figure 5:
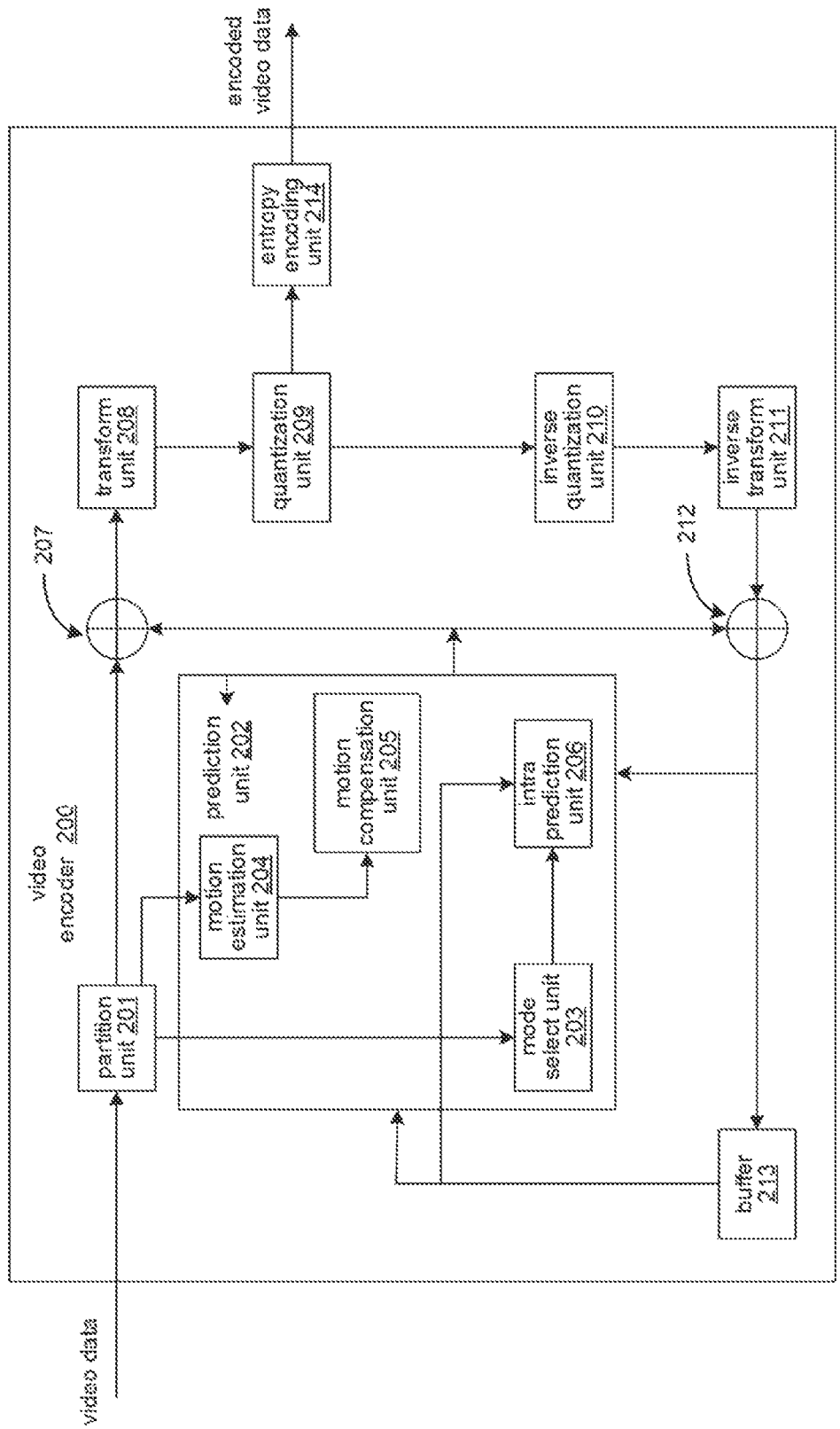
FIG. 5 is a block diagram that illustrates an encoder in accordance with some embodiments of the present disclosure.

FIG. 5 is a block diagram illustrating an example of video encoder 200, which may be video encoder 114 in the system 100 illustrated in FIG. 4.

Video encoder 200 may be configured to perform any or all of the techniques of this disclosure. In the example of FIG. 5, video encoder 200 includes a plurality of functional components. The techniques described in this disclosure may be shared among the various components of video encoder 200. In some examples, a processor may be configured to perform any or all of the techniques described in this disclosure.

The functional components of video encoder 200 may include a partition unit 201, a prediction unit 202 which may include a mode select unit 203, a motion estimation unit 204, a motion compensation unit 205 and an intra prediction unit 206, a residual generation unit 207, a transform unit 208, a quantization unit 209, an inverse quantization unit 210, an inverse transform unit 211, a reconstruction unit 212, a buffer 213, and an entropy encoding unit 214.

In other examples, video encoder 200 may include more, fewer, or different functional components. In an example, prediction unit 202 may include an intra block copy (IBC) unit. The IBC unit may perform prediction in an IBC mode in which at least one reference picture is a picture where the current video block is located.

Furthermore, some components, such as motion estimation unit 204 and motion compensation unit 205 may be highly integrated, but are represented in the example of FIG. 5 separately for purposes of explanation.

Partition unit 201 may partition a picture into one or more video blocks. Video encoder 200 and video decoder 300 may support various video block sizes.

Mode select unit 203 may select one of the coding modes, intra or inter, e.g., based on error results, and provide the resulting intra- or inter-coded block to a residual generation unit 207 to generate residual block data and to a reconstruction unit 212 to reconstruct the encoded block for use as a reference picture. In some example, Mode select unit 203 may select a combination of intra and inter prediction (CIIP) mode in which the prediction is based on an inter prediction signal and an intra prediction signal. Mode select unit 203 may also select a resolution for a motion vector (e.g., a sub-pixel or integer pixel precision) for the block in the case of inter-prediction.

To perform inter prediction on a current video block, motion estimation unit 204 may generate motion information for the current video block by comparing one or more reference frames from buffer 213 to the current video block. Motion compensation unit 205 may determine a predicted video block for the current video block based on the motion information and decoded samples of pictures from buffer 213 other than the picture associated with the current video block.

Motion estimation unit 204 and motion compensation unit 205 may perform different operations for a current video block, for example, depending on whether the current video block is in an I slice, a P slice, or a B slice.

In some examples, motion estimation unit 204 may perform uni-directional prediction for the current video block, and motion estimation unit 204 may search reference pictures of list 0 or list 1 for a reference video block for the current video block. Motion estimation unit 204 may then generate a reference index that indicates the reference picture in list 0 or list 1 that contains the reference video block and a motion vector that indicates a spatial displacement between the current video block and the reference video block. Motion estimation unit 204 may output the reference index, a prediction direction indicator, and the motion vector as the motion information of the current video block. Motion compensation unit 205 may generate the predicted video block of the current block based on the reference video block indicated by the motion information of the current video block.

In other examples, motion estimation unit 204 may perform bi-directional prediction for the current video block, motion estimation unit 204 may search the reference pictures in list 0 for a reference video block for the current video block and may also search the reference pictures in list 1 for another reference video block for the current video block. Motion estimation unit 204 may then generate reference indexes that indicate the reference pictures in list 0 and list 1 containing the reference video blocks and motion vectors that indicate spatial displacements between the reference video blocks and the current video block. Motion estimation unit 204 may output the reference indexes and the motion vectors of the current video block as the motion information of the current video block. Motion compensation unit 205 may generate the predicted video block of the current video block based on the reference video blocks indicated by the motion information of the current video block.

In some examples, motion estimation unit 204 may output a full set of motion information for decoding processing of a decoder.

In some examples, motion estimation unit 204 may not output a full set of motion information for the current video. Rather, motion estimation unit 204 may signal the motion information of the current video block with reference to the motion information of another video block. For example, motion estimation unit 204 may determine that the motion information of the current video block is sufficiently similar to the motion information of a neighboring video block.

In one example, motion estimation unit 204 may indicate, in a syntax structure associated with the current video block, a value that indicates to the video decoder 300 that the current video block has the same motion information as another video block.

In another example, motion estimation unit 204 may identify, in a syntax structure associated with the current video block, another video block and a motion vector difference (MVD). The motion vector difference indicates a difference between the motion vector of the current video block and the motion vector of the indicated video block. The video decoder 300 may use the motion vector of the indicated video block and the motion vector difference to determine the motion vector of the current video block.

As discussed above, video encoder 200 may predictively signal the motion vector. Two examples of predictive signaling techniques that may be implemented by video encoder 200 include advanced motion vector prediction (AMVP) and merge mode signaling.

Intra prediction unit 206 may perform intra prediction on the current video block. When intra prediction unit 206 performs intra prediction on the current video block, intra prediction unit 206 may generate prediction data for the current video block based on decoded samples of other video blocks in the same picture. The prediction data for the current video block may include a predicted video block and various syntax elements.

Residual generation unit 207 may generate residual data for the current video block by subtracting (e.g., indicated by the minus sign) the predicted video block(s) of the current video block from the current video block. The residual data of the current video block may include residual video blocks that correspond to different sample components of the samples in the current video block.

In other examples, there may be no residual data for the current video block for the current video block, for example in a skip mode, and residual generation unit 207 may not perform the subtracting operation.

Transform processing unit 208 may generate one or more transform coefficient video blocks for the current video block by applying one or more transforms to a residual video block associated with the current video block.

After transform processing unit 208 generates a transform coefficient video block associated with the current video block, quantization unit 209 may quantize the transform coefficient video block associated with the current video block based on one or more quantization parameter (QP) values associated with the current video block.

Inverse quantization unit 210 and inverse transform unit 211 may apply inverse quantization and inverse transforms to the transform coefficient video block, respectively, to reconstruct a residual video block from the transform coefficient video block. Reconstruction unit 212 may add the reconstructed residual video block to corresponding samples from one or more predicted video blocks generated by the prediction unit 202 to produce a reconstructed video block associated with the current block for storage in the buffer 213.

After reconstruction unit 212 reconstructs the video block, loop filtering operation may be performed reduce video blocking artifacts in the video block.

Entropy encoding unit 214 may receive data from other functional components of the video encoder 200. When entropy encoding unit 214 receives the data, entropy encoding unit 214 may perform one or more entropy encoding operations to generate entropy encoded data and output a bitstream that includes the entropy encoded data.

Figure 6:
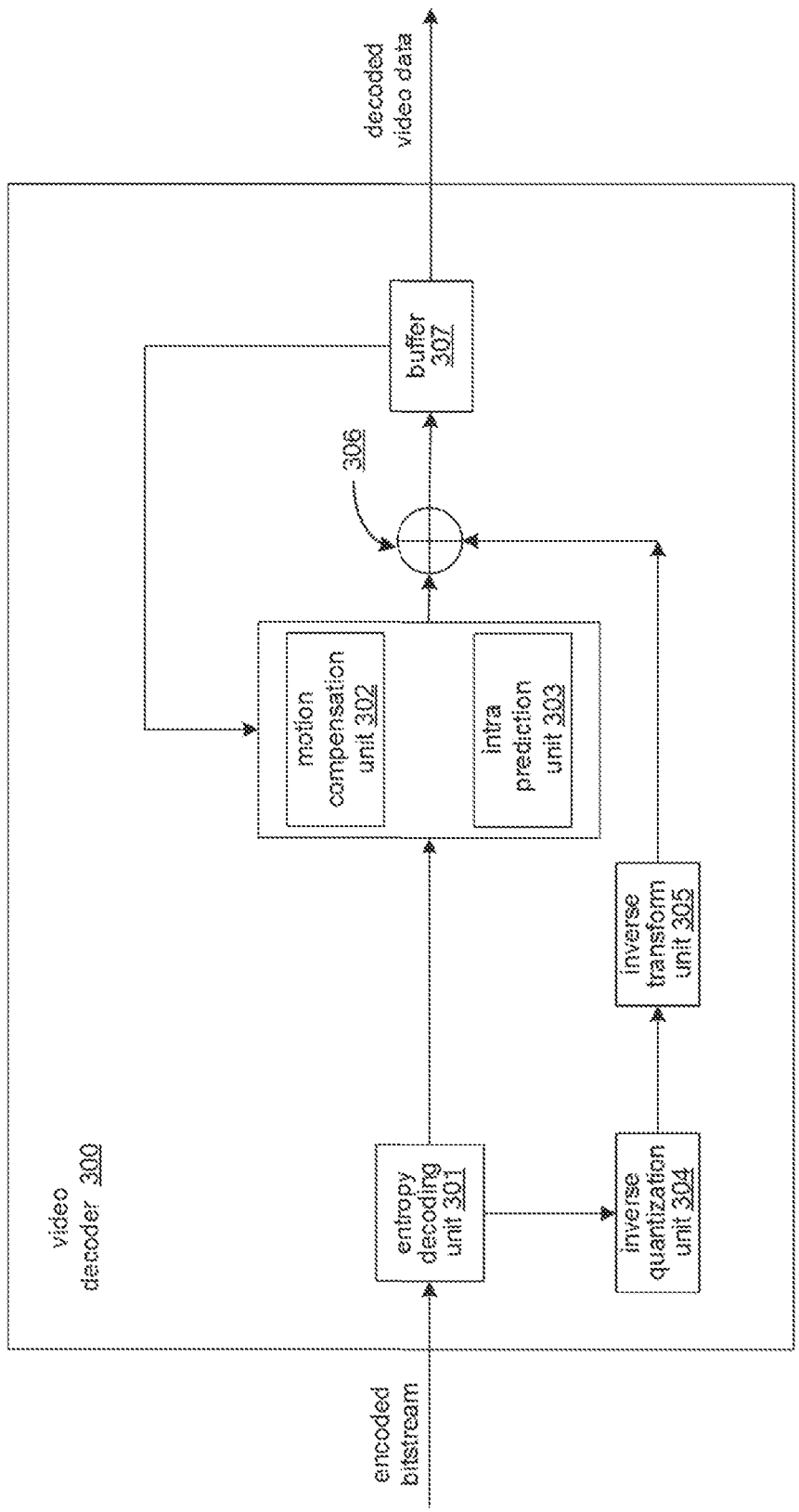
FIG. 6 is a block diagram that illustrates a decoder in accordance with some embodiments of the present disclosure.

FIG. 6 is a block diagram illustrating an example of video decoder 300 which may be video decoder 114 in the system 100 illustrated in FIG. 4.

The video decoder 300 may be configured to perform any or all of the techniques of this disclosure. In the example of FIG. 6, the video decoder 300 includes a plurality of functional components. The techniques described in this disclosure may be shared among the various components of the video decoder 300. In some examples, a processor may be configured to perform any or all of the techniques described in this disclosure.

In the example of FIG. 6, video decoder 300 includes an entropy decoding unit 301, a motion compensation unit 302, an intra prediction unit 303, an inverse quantization unit 304, an inverse transformation unit 305, and a reconstruction unit 306 and a buffer 307. Video decoder 300 may, in some examples, perform a decoding pass generally reciprocal to the encoding pass described with respect to video encoder 200 (FIG. 5).

Entropy decoding unit 301 may retrieve an encoded bitstream. The encoded bitstream may include entropy coded video data (e.g., encoded blocks of video data). Entropy decoding unit 301 may decode the entropy coded video data, and from the entropy decoded video data, motion compensation unit 302 may determine motion information including motion vectors, motion vector precision, reference picture list indexes, and other motion information. Motion compensation unit 302 may, for example, determine such information by performing the AMVP and merge mode.

Motion compensation unit 302 may produce motion compensated blocks, possibly performing interpolation based on interpolation filters. Identifiers for interpolation filters to be used with sub-pixel precision may be included in the syntax elements.

Motion compensation unit 302 may use interpolation filters as used by video encoder 200 during encoding of the video block to calculate interpolated values for sub-integer pixels of a reference block. Motion compensation unit 302 may determine the interpolation filters used by video encoder 200 according to received syntax information and use the interpolation filters to produce predictive blocks.

Motion compensation unit 302 may use some of the syntax information to determine sizes of blocks used to encode frame(s) and/or slice(s) of the encoded video sequence, partition information that describes how each macroblock of a picture of the encoded video sequence is partitioned, modes indicating how each partition is encoded, one or more reference frames (and reference frame lists) for each inter-encoded block, and other information to decode the encoded video sequence.

Intra prediction unit 303 may use intra prediction modes for example received in the bitstream to form a prediction block from spatially adjacent blocks. Inverse quantization unit 303 inverse quantizes, i.e., de-quantizes, the quantized video block coefficients provided in the bitstream and decoded by entropy decoding unit 301. Inverse transform unit 303 applies an inverse transform.

Reconstruction unit 306 may sum the residual blocks with the corresponding prediction blocks generated by motion compensation unit 202 or intra-prediction unit 303 to form decoded blocks. If desired, a deblocking filter may also be applied to filter the decoded blocks in order to remove blockiness artifacts. The decoded video blocks are then stored in buffer 307, which provides reference blocks for subsequent motion compensation/intra prediction and also produces decoded video for presentation on a display device.

A listing of examples preferred by some embodiments is provided next.

The first set of clauses show example embodiments of techniques discussed in the previous section. The following clauses show example embodiments of techniques discussed in the previous section (e.g., item 1).

Figure 3:
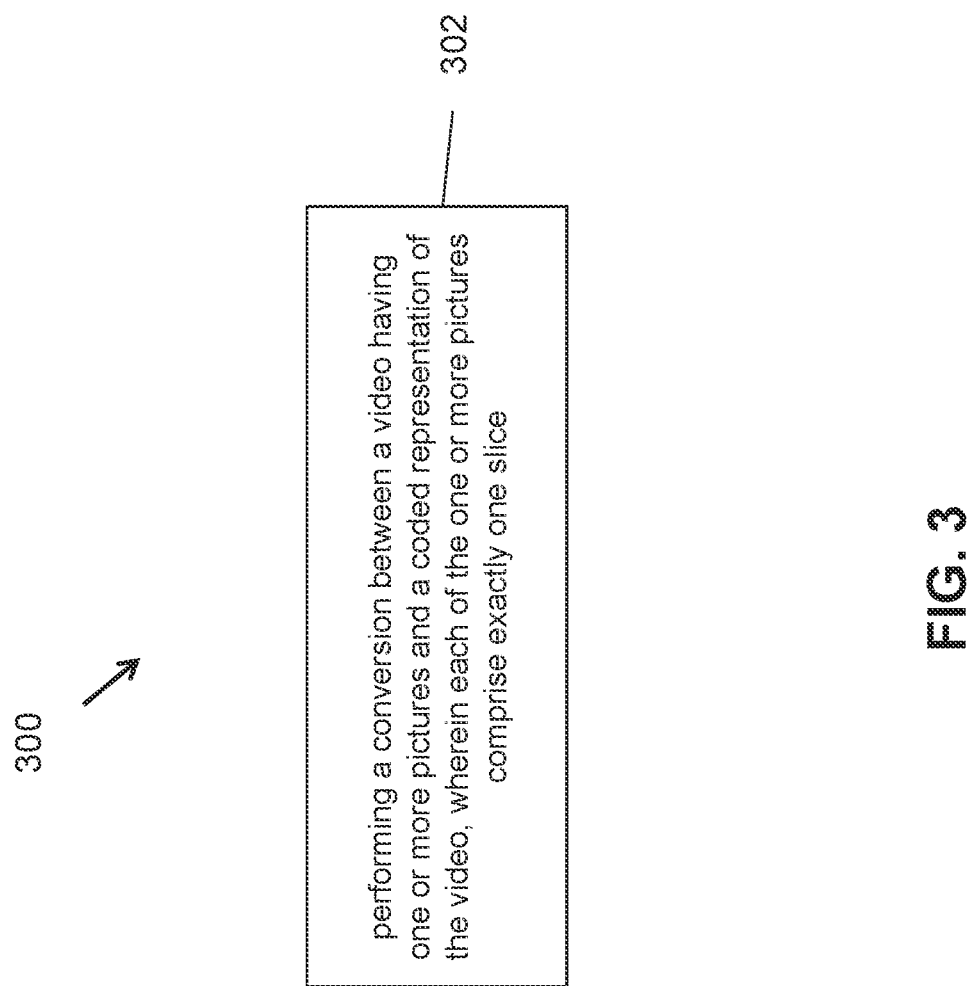
FIG. 3 is a flowchart for an example method of video processing.

1. A video processing method (e.g., method 300 depicted in FIG. 3), comprising: performing (302) a conversion between a video having one or more pictures and a coded representation of the video, wherein each of the one or more pictures comprise exactly one slice; wherein the coded representation conforms to a format rule; wherein the format rule specifies that a first field in the coded representation indicative of a profile, a tier and a level that the coded representation conforms to, includes a second field indicative of whether a syntax structure that signals various constraints observed during the conversion is present in the first field.

2. The method of solution 1, wherein the syntax structure comprises a general_constraint_info( ) syntax structure.

3. The method of any of solutions 1-2, wherein the first field comprises Profile Tier Level (PTL) syntax structure.

4. The method of any of solutions 1-3, wherein the second field is a single bit flag.

The following solutions show example embodiments of techniques discussed in the previous section (e.g., item 2).

5. A method of video processing, comprising: performing a conversion between a video comprising one or more pictures and one or more slices and a coded representation of the video, wherein the coded representation conforms to a format rule, wherein the format rule specifies that values of one or more constraint flags at a first level in the coded representation control occurrence of one or more syntax elements at a sequence parameter set (SPS) level or a picture header (PH) level of a slice header (SH) level.

6. The method of solution 5, wherein the format rule specifies to include a syntax element at the SPS level if and only if max_chroma_format_constraint_idc is not equal to a specific value at the first level.

7. The method of solution 6, wherein the syntax element at SPS level comprises a chroma format IDC syntax element.

8. The method of solution 5, wherein the format rule specifies to include a syntax element at the PH level if and only if a general constraint flag is set for a specific value.

9. The method of solution 5, wherein the format rule specifies to include a syntax element at the SH level if and only if a general constraint flag is set for a specific value.

The following clauses show example embodiments of techniques discussed in the previous section (e.g., item 3).

10. A method of video processing, comprising: performing a conversion between a video comprising one or more pictures and one or more slices and a coded representation of the video, wherein the coded representation conforms to a format rule, wherein the format rule specifies that values of one or more constraint flags at a first level in the coded representation constrain values of one or more syntax elements at picture parameter set (PPS) level.

11. The method of solution 10, wherein the one or more constraint flags at the first level include a flag indicating presence of a single tile per picture, and wherein the format rule specifies that fields indicating number of tile rows and number of tile columns have a zero value at the PPS level.

The following clauses show example embodiments of techniques discussed in the previous section (e.g., item 4).

12. The method of any of previous or subsequent solutions, wherein a first syntax portion in the first field controls values and/or occurrence of a second syntax portion in the first field.

13. The method of solution 12, wherein the second syntax portion occurs in the first field if and only if the first syntax portion indicates prespecified values.

14. The method of solution 13, wherein the first syntax portion comprises one_slice_per_pic_constraint_flag and wherein format rule specifies that one_subpic_per_pic_constraint_flag is omitted from the coded representation when one_subpic_per_pic_constraint_flag is equal to zero.

The following clauses show example embodiments of techniques discussed in the previous section (e.g., item 7).

15. A method of video processing, comprising: performing a conversion between a video comprising one or more pictures and one or more slices and a coded representation of the video, wherein the coded representation conforms to a format rule that specifies that the coded representation includes an adaptation parameter set that includes syntax elements for identifiers of a video parameter set and/or a sequence parameter set and/or a picture parameter set.

16. The method of solution 15, wherein the format rule specifies that one or more constraint flags control values and/or occurrence of one or more syntax elements in the adaptation parameter set.

17. The method of solution 16, the one or more syntax elements in the adaptation parameter set include one or more of alf_luma_filter_signal_flag, alf_chroma_filter_signal_flag, alf_cc_cb_filter_signal_flag or alf_cc_cr_filter_signal_flag.

18. The method of solution 16, wherein the one or more constraint flags are included in a sequence parameter set or a picture parameter set that is identified by a corresponding identifier.

The following clauses show example embodiments of techniques discussed in the previous section (e.g., item 8).

19. A method of video processing, comprising: performing a conversion between a video comprising one or more pictures and one or more slices and a coded representation of the video, wherein the coded representation conforms to a format rule that specifies to include one or more general constraint flags applicable to the conversion; wherein the one or more general constraint flags are indicative of applicability of general constrain info included in the coded representation to the conversion.

20. The method of solution 19, wherein the applicability of general constraint info is indicated for profiles, levels or tiers for which the general constraint info is applicable.

21. The method of solution 19, wherein the format rule specifies that the general constraint info is includes in a sequence parameter set.

22. The method of solution 1 wherein the format rule specifies that the general constraint info is included in a video parameter set.

The following clauses show example embodiments of techniques discussed in the previous section (e.g., item 9).

23. A method of video processing, comprising: performing a conversion between a video and a coded representation of the video, wherein the coded representation conforms to a format rule, wherein the format rule specifies that the coded representation conditionally includes a general constraint structure carrying general constraint information based on a characteristic of the video or the conversion.

24. The method of solution 23, wherein the characteristic of the video or the conversion comprises a profile or a level or a tier or a sub-profile used for the conversion.

25. The method of solutions 23-24, wherein the format rule specifies that the general constraint structure is included in a profile tier level syntax structure to which the general constraint information is applicable.

26. The method of any of solutions 23-25, wherein the general constraint information indicates a relationship between at least some coding tools and corresponding profiles or levels to which the coding tools are applicable.

27. The method of any of solutions 23-26, wherein the format rule specifies to omit the general constraint structure for a specific profile and/or a specific sub-profile and/or a specific level and/or a specific tier.

28. The method of any of solutions 23-27, wherein the format rule specifies to set an intra only constrain flag to 1 due to all-intra coding being used in a profile or a sub-profile.

29. The method of any of solutions 1 to 28, wherein the conversion comprises encoding the video into the coded representation.

30. The method of any of solutions 1 to 28, wherein the conversion comprises decoding the coded representation to generate pixel values of the video.

31. A video decoding apparatus comprising a processor configured to implement a method recited in one or more of solutions 1 to 30.

32. A video encoding apparatus comprising a processor configured to implement a method recited in one or more of solutions 1 to 30.

33. A computer program product having computer code stored thereon, the code, when executed by a processor, causes the processor to implement a method recited in any of solutions 1 to 30.

34. A method, apparatus or system described in the present document.

The second set of clauses show example embodiments of techniques discussed in the previous section (e.g., items 1 and 2).

Figure 7A:
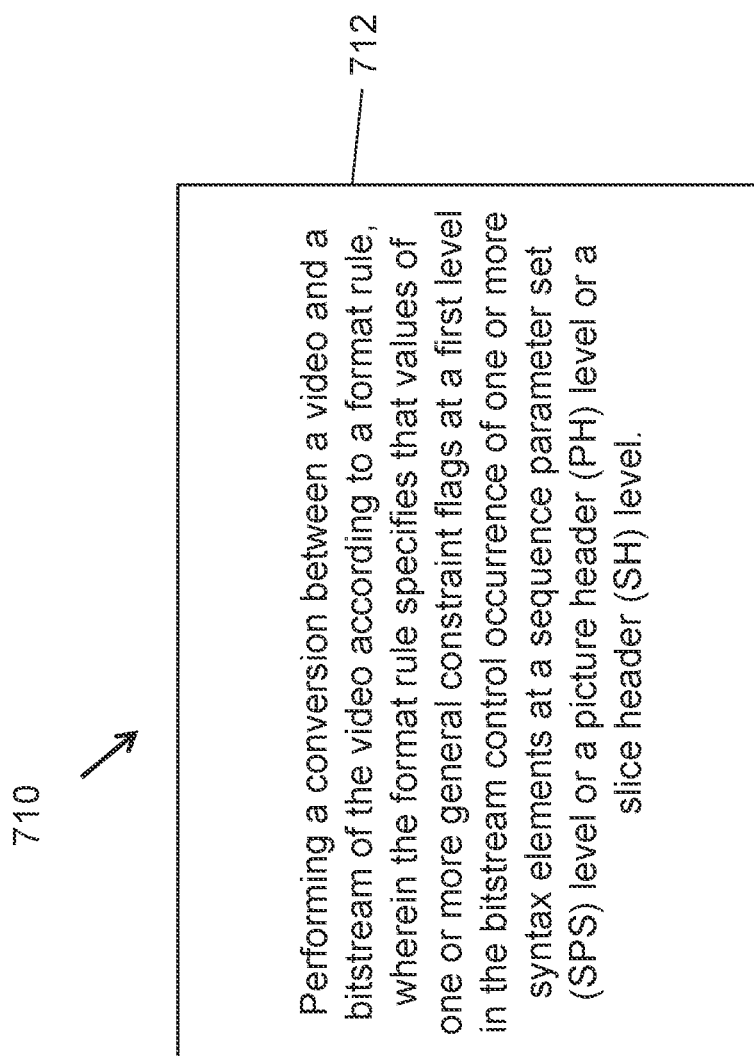
FIGS. 7A and 7B are flowcharts for example methods of video processing.

1. A method of video processing (e.g., method 710 as shown in FIG. 7A), comprising: performing 712 a conversion between a video and a bitstream of the video according to a format rule, wherein the format rule specifies that values of one or more general constraint flags at a first level in the bitstream control occurrence of one or more syntax elements at a sequence parameter set (SPS) level or a picture header (PH) level or a slice header (SH) level.

2. The method of clause 1, wherein the first level is higher than the SPS level or the PH level or the SH level.

3. The method of clause 1, wherein the format rule further specifies to exclude a first syntax element at the SPS level that indicates a chroma format sampling structure from the bitstream in case that a first general constraint flag related to the chroma format sampling structure is equal to a specific value.

4. The method of clause 3, wherein the specific value of the first general constraint flag is equal to 0.

5. The method of clause 3 or 4, wherein the first syntax element is inferred to be equal to 0.

6. The method of clause 1, wherein the format rule further specifies to exclude a second syntax element at the SPS level that indicates a value that subtracts 8 from a bit depth from the bitstream in case that a second general constraint flag related to bit depth is equal to a specific value.

7. The method of clause 6, wherein the specific value of the second general constraint flag is equal to 0.

8. The method of clause 6 or 7, wherein the second syntax element is inferred to be equal to 0.

9. The method of clause 1, wherein the format rule further specifies to exclude at least one third syntax element at the SPS level from the bitstream in case that a third general constraint flag indicating whether to impose a constraint on a network abstraction layer (NAL) unit regarding a particular NAL unit type is equal to a first specific value.

10. The method of clause 1, wherein the format rule further specifies to include at least one third syntax element at the SPS level in case that a third general constraint flag indicating whether to impose a constraint on a network abstraction layer (NAL) unit regarding a particular NAL unit type is not equal to a first specific value.

11. The method of clause 9 or 10, wherein the third general constraint flag is no_aps_constraint_flag.

12. The method of any of clauses 9 to 11, wherein the at least one third syntax element at the SPS level is related to adaptation parameter set (APS).

13. The method of 12, wherein the at least one third syntax element comprises a luma mapping chroma scaling (LMCS) enabled flag.

14. The method of 12, wherein the at least one third syntax element comprises an explicit scaling list enabled flag.

15. The method of 12, wherein the at least one third syntax element comprises a cross-component adaptive loop filter enabled flag.

16. The method of any of clauses 9 to 12, wherein in case that the third general constraint flag is equal to the first specific value, a value of the at least one third syntax element is inferred to be equal to 0.

17. The method of any of clauses 9 to 12, wherein in case that the third general constraint flag is equal to the first specific value, a network abstraction layer (NAL) unit type is disallowed to be equal to PREFIX_APS_NUT or SUFFIX_APS_NUT.

18. The method of any of clauses 9 to 16, wherein the format rule further specifies that in case that the third general constraint flag is equal to the first specific value, a bitstream constraint is added such that the at least one third syntax element in the SPS level is equal to 0.

19. The method of any of clauses 9 to 18, wherein the first specific value is equal to 1.

Figure 7B:
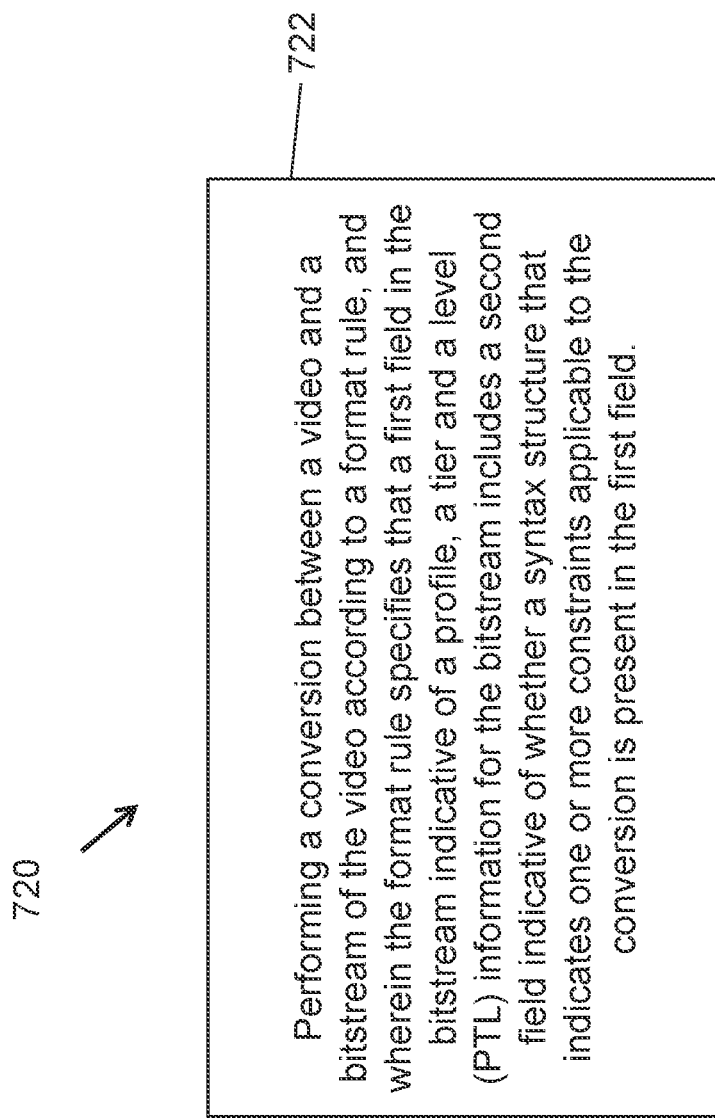

20. A method for video processing (e.g., method 720 as shown in FIG. 7B), comprising: performing 722 a conversion between a video and a bitstream of the video according to a format rule, and wherein the format rule specifies that a first field in the bitstream indicative of a profile, a tier and a level (PTL) information for the bitstream includes a second field indicative of whether a syntax structure that indicates one or more constraints applicable to the conversion is present in the first field.

21. The method of clause 20, wherein the syntax structure comprises a set of general constraint syntax elements.

22. The method of clause 20 or 21, wherein the first field comprises a general constraint syntax structure.

23. The method of any of clauses 20-22, wherein the second field is a single bit flag.

24. The method of clause 20, wherein the format rule further specifies that a default value is inferred for a constraint parameter in case that the syntax structure is not present for a video unit.

25. The method of clause 24, wherein the default value specifies that no constraint is imposed for a video unit.

26. The method of clause 24 or 25, wherein the video unit is a bitstream of an output layer set (OLS).

27. The method of clause 20, wherein the format rule further specifies that in case that decoding capability information (DCI) includes multiple first fields, at most one of the multiple first fields contains the syntax structure applied to an entire bitstream.

28. The method of clause 20, wherein the format rule further specifies that in case that decoding capability information (DCI) is present in the bitstream, 1) no first field present in a video parameter set (VPS) or a sequence parameter set (SPS) contains the syntax structure and 2) constraint information associated with the DCI applies to each output layer set (OLS) in each coded video sequence (CVS) in the bitstream.

29. The method of clause 20, wherein the format rule further specifies that in case that decoding capability information (DCI) is present in the bitstream, 1) no first field present in a video parameter set (VPS) or sequence parameter set (SPS) contains the syntax structure and 2) constraint information associated with the DCI applies to each output layer set (OLS) containing more than one layer in each coded video sequence (CVS) in the bitstream.

30. The method of clause 20, wherein the format rule further specifies that in case that there are multiple first fields in a video parameter set, 1) only one of the multiple first fields contains the syntax structure, and 2) the syntax structure applies to each output layer set (OLS) of each coded video sequence (CVS) in the bitstream.

31. The method of clause 20, wherein the format rule further specifies that in case that there are multiple first fields included in decoding capability information (DCI) and/or a sequence parameter set (SPS) and/or a video parameter set (VPS), the multiple first fields have a same content in a conformance bitstream.

32. The method of clause 31, wherein the multiple first fields are signaled for an output layer set (OLS) or a coded video sequence (CVS).

33. The method of clause 20, wherein the format rule further specifies that at most one first field is allowed to be signaled in decoding capability information (DCI) and/or a sequence parameter set (SPS) and/or a video parameter set (VPS) in a conformance bitstream.

34. The method of clause 33, wherein the at most one first field is allowed to be signaled for an output layer set (OLS) or a coded video sequence (CVS).

35. The method of clause 20, wherein the format rule further specifies that in case that there are multiple first fields signaled in decoding capability information (DCI) for multiple output layer sets (OLSs), another syntax element is added to a DCI syntax structure to specify an index of a corresponding syntax structure that applies to an i-th OLS, whereby i is a natural number.

36. The method of clause 35, wherein the format rule further specifies that in case that there is only one OLS in the bitstream, signaling of another syntax element is skipped and/or a value of another syntax element is inferred to a certain value.

37. The method of clause 20, wherein the format rule further specifies that in case that there are multiple syntax structures that signal the one or more constraints in decoding capability information (DCI) and/or a sequence parameter set (SPS) and/or a video parameter set (VPS), 1) values for constraint parameters in the DCI and/or the SPS and/or the VPS are different for an output layer set (OLS) and 2) a particular constraint imposed by any of the constraint flags or fields is applied to the OLS.

38. The method of clause 37, wherein in case that the any of the constraint parameters in the VPS or the SPS specifies that the particular constraint is imposed for the OLS but a corresponding constraint parameter in the DCI specifies that the particular constraint is not imposed for the OLS, the particular constraint is imposed to the OLS as indicated in the VPS or the SPS.

39. The method of clause 37, wherein in case that the any of the constraint parameters in the VPS or the SPS specifies that the particular constraint is not imposed for the OLS but a corresponding constraint parameter in the DCI specifies that the particular constraint is imposed for the OLS, the particular constraint is imposed to the OLS as indicated in the DCI.

40. The method of clause 37, wherein constraint parameters in the VPS or the SPS indicate whether to impose the particular constraint to the OLS, a corresponding constraint syntax element carried in the DCI has a value that indicates not tighter than the particular constraint indicated in the VPS or the SPS.

41. The method of clause 40, wherein in case that any of the constraint parameters in the VPS or the SPS specifies that the particular constraint is not imposed for the OLS, a bitstream conformance is added to require that the value of a corresponding constraint parameter in the DCI is equal to 0 for the OLS.

42. The method of clause 40, wherein in case that any of the constraint parameters in the VPS or the SPS specifies that the particular constraint is imposed for the OLS, the value of a corresponding constraint parameter in the DCI is equal to 0 or 1 for the OLS.

43. The method of clause 37, wherein constraint parameters in the VPS or the SPS indicate whether to impose the particular constraint to the OLS, a corresponding constraint syntax element carried in the DCI has a value that indicates not more relaxed than the particular constraint indicated in the VPS or the SPS.

44. The method of clause 43, wherein in case that any of the constraint parameters in the VPS or the SPS specifies that the particular constraint is imposed for the OLS, a bitstream conformance is added to require that the value of a corresponding constraint parameter in the DCI is equal to 1 for the OLS.

45. The method of clause 43, wherein in case that any of the constraint parameters in the VPS or the SPS specifies that the particular constraint is not imposed for the OLS, the value of a corresponding constraint parameter in the DCI is equal to 0 or 1 for the OLS.

46. The method of clause 20, wherein the format rule further specifies that only one set or multiple sets of different default values for constraint parameters are predefined.

47. The method of clause 46, wherein, for one of the multiple sets, each constraint parameter is inferred to be a value that specifies that a particular constraint is not imposed for the output layer set (OLS).

48. The method of clause 46, wherein, for one or some of the multiple sets, a value of the general constraint syntax element indicating maximum bit depth IDC is inferred to be equal to a particular value.

49. The method of any of clauses 1 to 48, wherein the conversion includes encoding the video into the bitstream.

50. The method of any of clauses 1 to 48, wherein the conversion includes decoding the video from the bitstream.

51. The method of clauses 1 to 48, wherein the conversion includes generating the bitstream from the video, and the method further comprises: storing the bitstream in a non-transitory computer-readable recording medium.

52. A video processing apparatus comprising a processor configured to implement a method recited in any one or more of clauses 1 to 51.

53. A method of storing a bitstream of a video, comprising, a method recited in any one of clauses 1 to 51, and further including storing the bitstream to a non-transitory computer-readable recording medium.

54. A computer readable medium storing program code that, when executed, causes a processor to implement a method recited in any one or more of clauses 1 to 51.

55. A computer readable medium that stores a bitstream generated according to any of the above described methods.

56. A video processing apparatus for storing a bitstream representation, wherein the video processing apparatus is configured to implement a method recited in any one or more of clauses 1 to 51.

The third set of clauses show example embodiments of techniques discussed in the previous section (e.g., items 2-5).

Figure 8A:
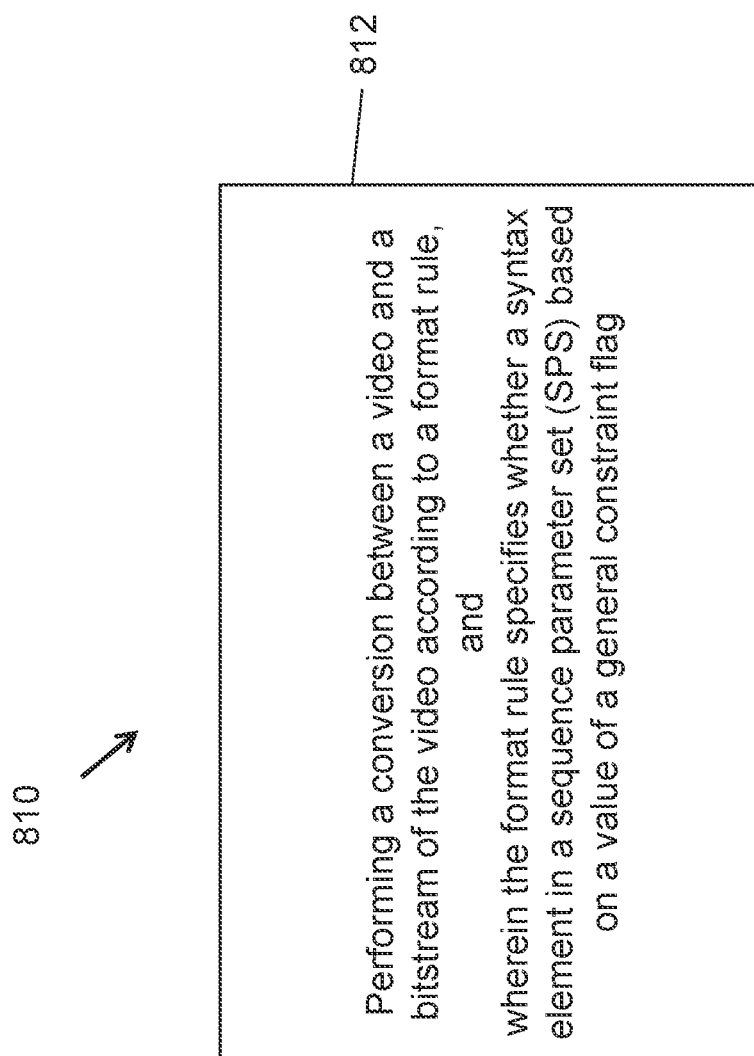

1. A method of video processing (e.g., method 810 as shown in FIG. 8A), comprising: performing a conversion between a video and a bitstream of the video according to a format rule, and wherein the format rule specifies whether a syntax element in a sequence parameter set (SPS) based on a value of a general constraint flag.

2. The method of clause 1, wherein the format rule specifies that the syntax element that is an intra-related SPS syntax element is excluded in case that the value of the general constraint flag that imposes a constraint on a type of a slice is equal to 1.

3. The method of clause 2, wherein the general constraint flag indicates whether to impose a constraint on use of only intra prediction.

4. The method of clause 2, wherein the general constraint flag is intra_only_constraint_flag.

5. The method of clause 1, wherein the format rule specifies that the syntax element in the SPS is omitted in case that the value of the general constraint flag is equal to 1.

6. The method of clause 5, wherein a value of the syntax element is inferred to be equal to 0 in case that the value of the general constraint flag is equal to 1.

7. The method of clause 5, wherein the syntax element indicates whether a GDR (gradual decoding refresh) picture is enabled and present in a coded layer video sequence (CLVS) referring to the SPS, and the general constraint flag indicates whether to impose a constraint on a network abstraction layer (NAL) unit regarding GDR.

8. The method of clause 5, wherein the syntax element gdr_enabled_flag, and the general constraint flag is no_gdr_constraint_flag.

9. The method of clause 5, wherein the syntax element indicates an applicability of an adaptive loop filter (ALF), and the general constraint flag indicates whether to impose a constraint on use of the ALF.

10. The method of clause 5, wherein the syntax element sps_alf_enabled_flag, and the general constraint flag is no_alf_constraint_flag.

11. The method of clause 5, wherein the syntax element includes a flag indicating an enablement of a large-block adaptive deblocking (ladf), a flag indicating no resolution change, a flag indicating an applicability of a dual tree, a flag indicating an enablement of a partition constraint overriding, a flag indicating an enablement of a joint CbCr, a flag indicating an enablement of a sample adaptive offset (SAO), a flag indicating an enablement of a cross component adaptive loop filter (CCALF), a flag indicating an enablement of transform skip, a flag indicating an enablement of a block based differential pulse code modulation (bdpcm), a flag indicating an enablement of a wrap-around motion compensation, a flag indicating an enablement of a temporal motion vector prediction (mvp), a flag indicating a sub-block-based temporal motion vector prediction (sbTMVP), a flag indicating an adaptive motion vector resolution (AMVR), a flag indicating an enablement of a bi-directional optical flow, a flag indicating an enablement of a decoder side motion vector refinement (dmvr), a flag indicating an enablement of a cross-component linear model (CCLM), a flag indicating an enablement of multiple transform selection (MTS), a flag indicating an enablement of a sub-block transform (sbt), a flag indicating an enablement of an affine motion compensation, a flag indicating an enablement of a bi-prediction with CU-level weights (bcw), a flag indicating an enablement of an intra block copy (ibc), a flag indicating an enablement of an enhanced combined inter-intra prediction (CIIP), a flag indicating an enablement of a merge with motion vector difference using integer sample precision, a flag indicating an enablement of a dependent quantization, a flag indicating an enablement of a sign bit hiding, or a flag indicating an enablement of a geometric partition based motion compensation.

12. The method of clause 11, wherein the general constraint flag indicates whether to impose a constraint on coding characteristics indicated in the flag included in the syntax element.

13. The method of clause 5, wherein the syntax element includes sps_ladf_enabled_flag, no_res_change_in_clvs_constraint_flag, qtbtt_dual_tree_intra_flag, partition_constraints_override_enabled_flag, sps_joint_cbcr_enabled_flag, sps_sao_enabled_flag, sps_ccalf_enabled_flag, sps_transform_skip_enabled_flag, sps_bdpcm_enabled_flag, sps_ref_wraparound_enabled_flag, sps_temporal_mvp_enabled_flag, sps_sbtmvp_enabled_flag, sps_amvr_enabled_flag, sps_bdof_enabled_flag, sps_dmvr_enabled_flag, sps_cclm_enabled_flag, sps_mts_enabled_flag, sps_sbt_enabled_flag, sps_affine_enabled_flag, sps_bcw_enabled_flag, sps_ibc_enabled_flag, sps_ciip_enabled_flag, sps_fpel_mmvd_enabled_flag, sps_dep_quant_enabled_flag, or sps_sign_data_hiding_enabled_flag, sps_gpm_enabled_flag, and the general constraint flag includes no_ladf_constraint_flag, no_qtbtt_dual_tree_intra_constraint_flag, no_partition_constraints_override_constraint_flag, no_joint_cbcr_constraint_flag, no_sao_constraint_flag, no_ccalf_constraint_flag, no_transform_skip_constraint_flag, no_bdpcm_constraint_flag, no_ref_wraparound_constraint_flag, no_temporal_mvp_constraint_flag, no_sbtmvp_constraint_flag, no_amvr_constraint_flag, no_bdof_constraint_flag, no_dmvr_constraint_flag, no_cclm_constraint_flag, no_mts_constraint_flag, no_sbt_constraint_flag, no_affine_motion_constraint_flag, no_bcw_constraint_flag, no_ibc_constraint_flag, no_ciip_constraint_flag, no_fpel_mmvd_constraint_flag, no_dep_quant_constraint_flag, no_sign_data_hiding_constraint_flag, or no_gpm_constraint_flag.

Figure 8B:
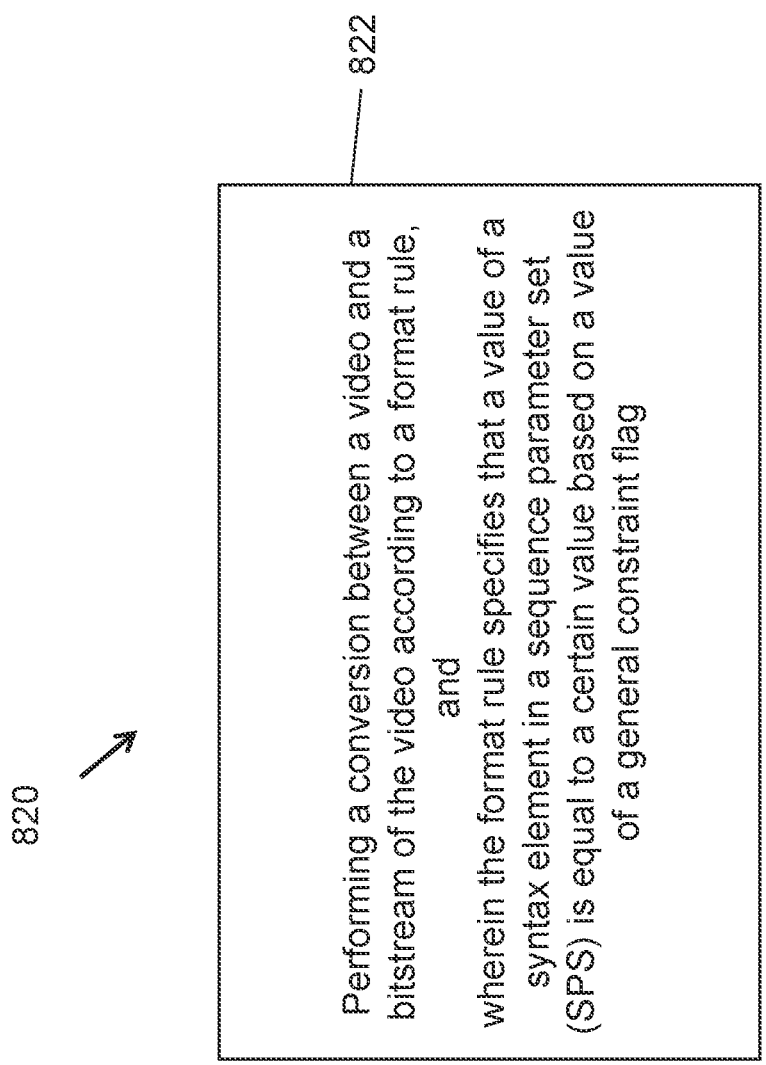

14. A method of video processing (e.g., method 820 as shown in FIG. 8B), comprising: performing 822 a conversion between a video and a bitstream of the video according to a format rule, and wherein the format rule specifies that a value of a syntax element in a sequence parameter set (SPS) is equal to a certain value based on a value of a general constraint flag.

15. The method of clause 14, wherein a bitstream constraint is added such that the value of the syntax element in the SPS is equal to 0 in case that the value of the general constraint flag is equal to 1.

16. The method of clause 15, wherein the syntax element in the SPS is a flag indicating whether a GDR (gradual decoding refresh) picture is enabled and present in a coded layer video sequence (CLVS) referring to the SPS in case that the general constraint flag indicates whether to impose a constraint on a network abstraction layer (NAL) unit regarding GDR.

17. The method of clause 15, wherein the syntax element in the SPS is sps_gdr_enabled_flag in case that the corresponding general constraint flag is no_gdr_constraint_flag.

18. The method of clause 14, wherein a bitstream constraint is added such that the value of the syntax element that is an adaptation parameter set (APS) related SPS syntax element is equal to 0 in case that a flag indicating whether to impose a constraint on a network abstraction layer (NAL) unit regarding a particular NAL unit type is equal to 1.

19. The method of clause 18, wherein the APS related syntax element in the SPS is a flag indicating an applicability of an adaptive loop filter (alf), a flag indicating an enablement of a cross component adaptive loop filter (CCALF), a flag indicating an enablement of a luma mapping with chroma scaling (LMCS), or a flag indicating an enablement of an explicit scaling list.

20. The method of clause 18, wherein the APS related syntax element in the SPS is a sps_alf_enabled_flag, sps_ccalf_enabled_flag, sps_lmcs_enabled_flag, or sps_explicit_scaling_list_enabled_flag.

21. The method of clause 14, wherein the bitstream constraint is added such that the value of the syntax element that is an inter-related SPS syntax element is equal to 0 in case that a flag indicating whether to impose a constraint on use of only intra prediction is equal to 1.

22. The method of clause 14, wherein the flag corresponds to intra_only_constraint_flag.

23. The method of any of clauses 14-21, wherein the bitstream constraint is represented based on a definition of the general constraint flag.

Figure 8C:
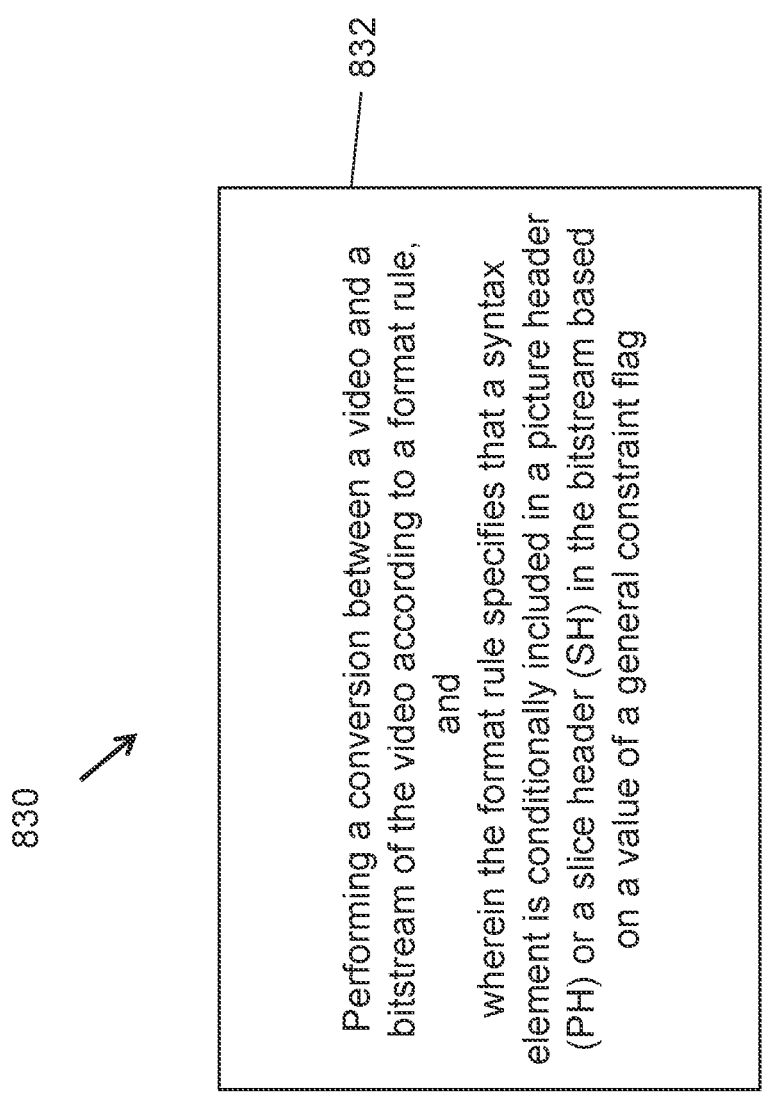

24. A method of video processing (e.g., method 830 as shown in FIG. 8C), comprising: performing 832 a conversion between a video and a bitstream of the video according to a format rule, and wherein the format rule specifies that a syntax element is conditionally included in a picture header (PH) or a slice header (SH) in the bitstream based on a value of a general constraint flag.

25. The method of clause 24, wherein the format rule specifies that the syntax element that is an intra-related PH syntax element is excluded in case that the general constraint flag indicating whether to impose a constraint on use of only intra prediction is equal to 1.

26. The method of clause 25, wherein the syntax element is a ph_inter_slice_allowed_flag indicting whether all coded slices of a picture are I slice.

27. The method of clause 24, wherein the format rule specifies that the syntax element that is a RPL-related SH syntax element is excluded in case that the general constraint flag indicating whether to impose a constraint on use of only intra prediction is equal to 1.

28. The method of clause 25, wherein the syntax element is a num_ref_idx_active_override_flag.

29. The method of clause 25 or 27, wherein in case that the flag is equal to 1, the value of the intra-related PH syntax element or the value of the RPL-related SH syntax element is inferred to be equal to 0.

30. The method of clause 24, wherein the format rule specifies that the syntax element in a syntax structure related to a reference picture list included in the PH level or the SH level is excluded in case that a flag indicating whether to impose a constraint on use of only intra prediction is equal to 1.

31. The method of clause 24, wherein the format rule specifies that the syntax element in a syntax structure related to a reference picture list included in the PH level or the SH level is excluded in case that a flag indicating whether to impose a constraint on use of only intra prediction is equal to 1.

32. The method of any of clauses 25 to 31, wherein the flag indicating whether to impose a constraint on use of only intra prediction corresponds to intra_only_constraint_flag.

33. The method of clause 30 or 31, wherein the syntax structure related to the reference picture list corresponds to refpic_lists( ) or refpic_list_struct(listIdx, rplsIdx).

34. A method of video processing (e.g., method 840 as shown in FIG. 8D), comprising: performing a conversion between a video and a bitstream of the video according to a format rule, and wherein the format rule specifies that a bitstream constraint is added such that a value of a syntax element in a picture header (PH) or a slice header (SH) is equal to a certain value based on a value of a general constraint flag.

35. The method of clause 34, wherein the bitstream constraint is added such that the value of the syntax element that is an inter-related PH syntax element is equal to 0 in case that the general constraint flag that is a flag indicating whether to impose a constraint on use of only intra prediction is equal to 1.

36. The method of clause 34, wherein the bitstream constraint is added such that the value of the syntax element in a reference picture list included in the PH or the SH is never used in case that the general constraint flag that is a flag indicating whether to impose a constraint on use of only intra prediction is equal to 1.

37. The method of clause 35 or 36, wherein the flag indicating whether to impose a constraint on use of only intra prediction corresponds to intra_only_constraint_flag.

38. The method of any of clauses 34 to 37, wherein the format rule further specifies that the general constraint flag used to determine whether to include the syntax element in the SPS or the PH or the SH is replaced by a new syntax element at the SPS level, in a picture parameter set (PPS) level, the PH level, or the SH level.

Figure 8E:
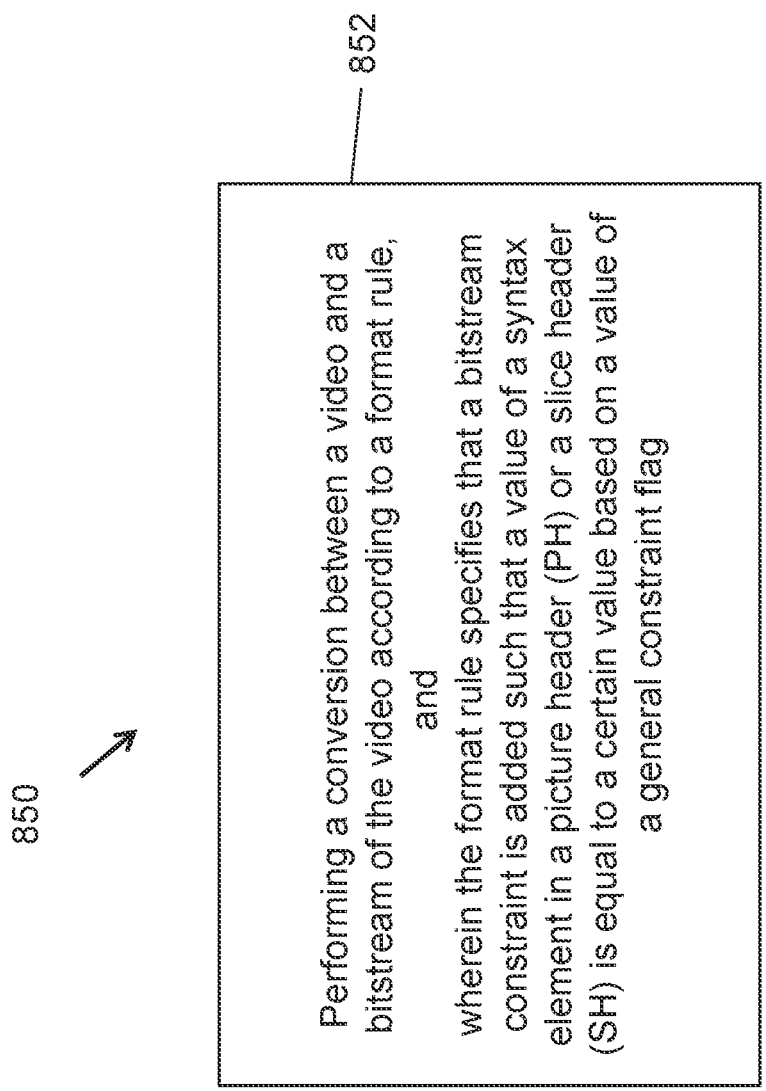

39. A method of video processing (e.g., method 850 as shown in FIG. 8E), comprising: performing 852 a conversion between a video and a bitstream of the video according to a format rule, wherein the format rule specifies that a value or an inclusion of a first general constraint flag in a syntax structure that indicates a constraint imposed during the conversion is based on a value of a second general constraint flag in the syntax structure.

40. The method of clause 39, wherein the format rule specifies that the first general constraint flag is not included in the bitstream based on the value of the second general constraint flag that appears prior to the first general constraint flag.

41. The method of clause 39, wherein a flag indicating whether each picture contains only one subpicture in the syntax structure is excluded in case that the value of the second general constraint flag indicates that each picture contains only one slice.

42. The method of clause 39, wherein one_subpic_per_pic_constraint_flag in the syntax structure is excluded in case that the value of the second general constraint flag that is one_slice_per_pic_constraint_flag is equal to 1.

43. The method of clause 39, wherein a flag indicating whether to impose a constraint on use of a block based differential pulse code modulation (bdpcm) in the syntax structure is excluded in case that the value of the second general constraint flag indicating whether to impose a constraint on use of transform skip is equal to 1.

44. The method of clause 39, wherein no_bdpcm_constraint_flag in the syntax structure is excluded in case that the value of the second general constraint flag that is no_transform_skip_constraint_flag is equal to 1.

45. The method of clause 39, wherein an intra-related syntax element in the syntax structure is excluded in case that the value of the second general constraint flag indicating whether to impose on use of only intra prediction is equal to 1.

46. The method of clause 39, wherein the format rule specifies that a bitstream constraint is added such that the value of the first general constraint flag is required to be equal to a certain value based on the value of the second general constraint flag that appears prior to the one or more first constraint flags.

47. The method of clause 46, wherein the value of the first general constraint flag that is an inter-related general constraint flag is required to be equal to 1 in case that the value of the second general constraint flag indicating whether to impose a constraint on use of only intra prediction is equal to 1.

48. The method of clause 45 or 47, wherein the second general constraint flag corresponds to a intra_only_constraint_flag.

49. The method of clause 46, wherein the value of the first general constraint flags indicating whether to impose constraints related to a instantaneous decoding refresh (IDR) picture and a clean random access (CRA) picture is required to be equal to 0 in case that the value of the second general constraint flag that is a flag indicating whether to impose a constraint on use of only intra prediction is equal to 1.

50. The method of clause 46, wherein the value of the first general constraint flags that is no_idr_constraint_flag or no_cra_constraint_flag is required to be equal to 0 in case that the value of the second general constraint flag that is intra_only_constraint_flag is equal to 1.

51. The method of clause 46, wherein the value of the first general constraint flag indicating whether to impose a constraint on use of a transform skip is required to be equal to 1 in case that the value of the second general constraint flag indicating no transform skip constraint is equal to 1.

52. The method of clause 46, wherein the value of the first general constraint flag that is a no_transform_skip_constraint_flag is required to be equal to 1 in case that the value of the second general constraint flag that is no_transform_skip_constraint_flag is equal to 1.

53. The method of clause 46, wherein the value of the first general constraint flag indicating whether to impose a constraint on use of adaptive loop filter (alf) is required to be equal to 1 in case that the value of the second general constraint flag whether to impose a constraint on a network abstraction layer (NAL) unit regarding a particular NAL unit type is equal to 1.

54. The method of clause 46, wherein the value of the first general constraint flag that is a no_alf_constraint_flag is required to be equal to 1 in case that the value of the second general constraint_flag that is no_aps_constraint_flag is equal to 1.

55. The method of clause 39, wherein the format rule further specifies that a bitstream constraint is added to require values of some general constraint flags to be equal to certain values.

56. The method of clause 39, wherein the format rule further specifies that a bitstream constraint is added to constraint a range of constraint fields.

57. The method of clause 56, wherein a syntax element indicating maximum bit depth IDC is required to be in a range of 0 to X, whereby X is a positive integer.

58. The method of clause 56, wherein max_bitdepth_constraint_idc is required to be in a range of 0 to X, whereby X is a positive integer.

59. The method of clause 57 or 58, wherein X=8.

60. The method of clause 58, wherein max_bitdepth_constraint_idc that is greater than 0 specifies that a syntax element in a SPS indicating a bit depth is in a range expressed based on max_bitdepth_constraint_idc.

61. The method of clause 56, wherein a syntax element indicating general profile IC is equal to A and a syntax element indicating maximum bit depth IDC is required to be in the range of 0 to B, whereby A and B are positive integers.

62. The method of clause 56, wherein general_profile_idc is equal to A and max_bitdepth_constraint_idc is required to be in the range of 0 to B, whereby A and B are positive integers.

Figure 8F:
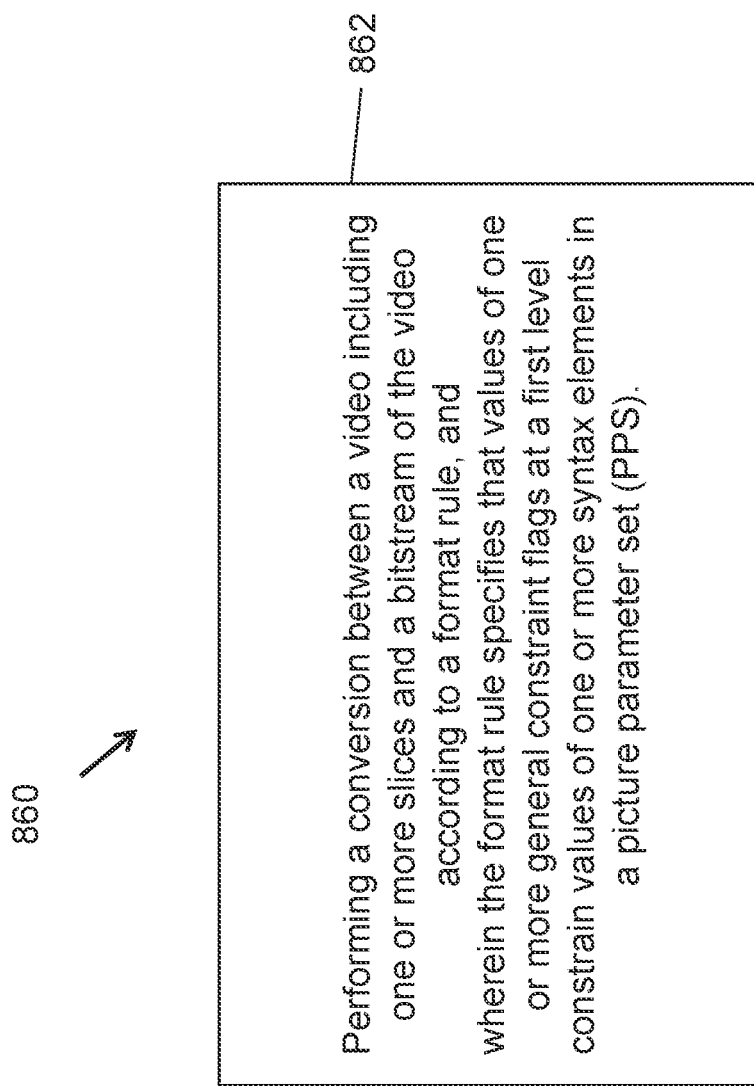

63. A method of video processing (e.g., method 860 as shown in FIG. 8F), comprising: performing 862 a conversion between a video including one or more slices and a bitstream of the video according to a format rule, and wherein the format rule specifies that values of one or more general constraint flags at a first level constrain values of one or more syntax elements in a picture parameter set (PPS).

64. The method of clause 63, wherein the format rule specifies that a bitstream constraint is added such that the values of the one or more syntax elements in the PPS is equal to a certain value based on the values of the one or more general constraint flags.

65. The method of clause 63 or 64, wherein the values of the one or more syntax elements that include a number of explicitly provided title column widths minus one, and/or a number of explicitly provided tile row heights minus one, and/or a flag indicating whether tiles within a slice are in raster scan order are required to be equal to 0 in case that a general constraint flag indicates that each picture includes only one tile.

66. The method of clause 63 or 64, wherein the values of the one or more syntax elements that include num_exp_tile_columns_minus1, and/or num_exp_tile_rows_minus1, and/or rect_slice_flag are required to be equal to 0 in case that a general constraint flag that is one_tile_per_pic_constraint_flag is equal to 1.

67. The method of clause 64, wherein a value of the flag indicating whether tiles within a slice are in raster scan order is required to be equal to 1 in case that the general constraint flag is equal to 1.

68. The method of clause 63 or 64, wherein a value of a syntax element that is rect_slice_flag is required to be equal to 1 in case that one_slice_per_pic_constraint_flag is equal to 1.

69. The method of clause 64, wherein a value of a syntax element indicating that no picture partitioning is applied to each picture referring to the PPS is required to be equal to 1 in case that the general constraint flag is equal to 1.

70. The method of clause 63 or 64, wherein a value of a syntax element that is no_pic_partition_flag is required to be equal to 1 in case that one_tile_per_pic_constraint_flag and one_slice_per_pic_constraint_flag are equal to 1.

71. The method of clause 63, where values of the one or more syntax elements that include 1) a flag indicating a presence of parameters related to a reference picture list in the PH level or slice headers for pictures referring to the PPS and 2) parameters indicating an inferred value of a maximum reference index for each of reference picture list 0 and list 1 used to decode a video unit are required to be equal to 0 in case that a flag indicating that only intra prediction allowed is equal to 1.

72. The method of clause 63 or 64, where values of the one or more syntax elements that include rpl1_idx_present_flag and num_ref_idx_default_active_minus1[ ] are required to be equal to 0 in case that intra_only_constraint_flag is equal to 1.

73. A method of video processing (e.g., method 870 as shown in FIG. 8G), comprising: performing a conversion between a video and a bitstream of the video according to a format rule, and wherein the format rule specifies that a value or an occurrence of a SPS (sequence parameter set) syntax element at a SPS level and/or a PPS (picture parameter set) syntax element at a PPS level controls an inclusion of one or more related syntax element in the SPS level, the PPS level, a PH (picture header) level, or a SH (slice header) level.

74. The method of clause 73, wherein the format rule specifies that the SPS syntax element and/or the PPS syntax element is omitted from the bitstream in case that a flag indicating whether to impose a constraint on use of only intra prediction is equal to 1.

75. The method of clause 74, wherein in case that the flag is equal to 1, a value of the SPS syntax element and/or a value of the PPS syntax element is inferred to be equal to 1.

76. The method of clause 73, wherein the format rule specifies that in case that the value of the SPS syntax element is equal to 1, an inter prediction related syntax element that is one of the one or more related syntax elements and included in the SPS level is omitted from the bitstream.

77. The method of clause 76, wherein in case that the SPS syntax element is equal to 1, the value of the inter prediction related syntax element is inferred to be equal to a certain value.

78. The method of clause 73, wherein the format rule specifies that in case that the value of the SPS syntax element and/or the PPS syntax element is 1, an inter prediction related syntax element included in the PH level and/or a reference picture list (RPL) related syntax element included in the SH level is omitted from the bitstream.

79. The method of clause 78, wherein the inter prediction related syntax element included in the PH level corresponds to a flag indicating whether all coded slices of a picture have a particular slice type and wherein the RPL related syntax element included in the SH level corresponds to a flag indicative whether a parameter describing a maximum reference picture list index for P-type or another parameter describing a maximum reference picture list index for B type are present in a slice header.

80. The method of clause 78, wherein the inter prediction related syntax element included in the PH level corresponds to ph_inter_slice_allowed_flag and wherein the RPL related syntax element included in the SH level corresponds to num_ref_idx_active_override_flag.

81. The method of clause 78, wherein the RPL related syntax element is in syntax structures related to a reference picture list and included in the PH level and/or the SH level.

82. The method of clause 78, wherein the RPL related syntax element is in syntax structures including ref_pic_lists( ) and ref_pic_list_struct(listIdx, rplsIdx) that are included in the PH level and/or the SH level.

83. The method of clause 78, wherein in case that the SPS syntax element and/or the PPS syntax element is 1, a value of the inter prediction related syntax element and/or the RPL related syntax element is inferred to be equal to a certain value.

84. The method of clause 73, wherein the format rule specifies that in case that the value of the PPS syntax element is equal to 1, a corresponding PPS syntax element is omitted from the bitstream.

85. The method of clause 84, wherein the corresponding PPS syntax element is 1) a flag indicating a presence of parameters related to a reference picture list in the PH level or slice headers for pictures referring to the PPS or 2) parameters indicating an inferred value of a maximum reference index for each of reference picture list 0 and list 1 used to decode a video unit.

86. The method of clause 84, wherein the corresponding PPS syntax element is rpl1_idx_present_flag or num_ref_idx_default_active_minus1 [ ].

87. The method of clause 84, wherein the format rule specifies that in case that the PPS syntax element is equal to 1, a value of the corresponding PPS syntax element is inferred to be equal to a certain value.

88. The method of clause 73, wherein the format rule specifies that in case that a flag indicating whether to impose a constraint on use of only intra prediction is equal to 1, a bitstream constraint is added to require that the value of the SPS level and/or the PPS syntax element is equal to 1.

89. The method of clause 74, 75, or 88, wherein the flag indicating whether to impose a constraint on use of only intra prediction corresponds to an intra_only_constraint_flag.

90. The method of clause 73, wherein the format rule specifies that a bitstream constraint is added that a value of each of the one or more related syntax element is equal to a certain value based on values of the SPS syntax element and/or the PPS syntax element.

91. The method of clause 90, wherein the format rule specifies that in case that the SPS syntax element is equal to 1, the bitstream constraint is added such that the value of the PPS syntax element is equal to 1.

92. The method of clause 90, wherein the format rule specifies that in case that the SPS syntax element is equal to 1, the bitstream constraint is added such that a value of an inter prediction related syntax element in the SPS level is equal to 0.

93. The method of clause 90, wherein the format rule specifies that in case that the SPS syntax element or the PPS syntax element is equal to 1, the bitstream constraint is added such that a value of an inter prediction related syntax element in the PPS level is equal to 0.

94. The method of clause 90, wherein the format rule specifies that in case that the SPS syntax element and/or the PPS syntax element is equal to 1, the bitstream constraint is added such that a value of an inter prediction related syntax element and/or a RPL related syntax element that is included in the PH level and/or SH level is equal to a certain value.

95. The method of any of clauses 1 to 94, wherein the conversion includes encoding the video into the bitstream.

96. The method of any of clauses 1 to 94, wherein the conversion includes decoding the video from the bitstream.

97. The method of any of clauses 1 to 94, wherein the conversion includes generating the bitstream from the video, and the method further comprises: storing the bitstream in a non-transitory computer-readable recording medium.

98. A video processing apparatus comprising a processor configured to implement a method recited in any one or more of clauses 1 to 97.

99. A method of storing a bitstream of a video, comprising, a method recited in any one of clauses 1 to 97, and further including storing the bitstream to a non-transitory computer-readable recording medium.

100. A computer readable medium storing program code that, when executed, causes a processor to implement a method recited in any one or more of clauses 1 to 97.

101. A computer readable medium that stores a bitstream generated according to any of the above described methods.

102. A video processing apparatus for storing a bitstream representation, wherein the video processing apparatus is configured to implement a method recited in any one or more of clauses 1 to 97.

The fourth set of clauses show example embodiments of techniques discussed in the previous section (e.g., items 6-9).

1. A method of video processing (e.g., method 910 as shown in FIG. 9A), comprising: performing 912 a conversion between a video and a bitstream of the video according to a format rule, and wherein the format rule specifies to include, in a general constraint syntax structure associated with the video, one or more general constraint flags indicating whether corresponding syntax elements are included in a sequence parameter set (SPS) and/or a picture parameter set (PPS) and/or a picture header (PH) and/or a slice header (SH) or to constrain values of the syntax elements in the SPS and/or the PPS and/or the PH and/or the SH.

2. The method of clause 1, wherein the one or more general constraint flags include a flag to disable an interlayer prediction and/or allow only one layer and/or control a value or an occurrence of a corresponding syntax element in the SPS.

3. The method of clause 1, wherein the one or more general constraint flags include a flag to disable long-term reference and/or control a value or an occurrence of a corresponding syntax element in the SPS.

4. The method of clause 1, wherein the one or more general constraint flags include a flag to disable max transform size that is equal to 32×32 and/or control a value or an occurrence of a corresponding syntax structure in the SPS.

5. The method of clause 1, wherein the one or more general constraint flags include a flag to disable a merge estimation region (MER) and/or control a value or an occurrence of a corresponding syntax structure in the SPS.

6. The method of clause 1, wherein the one or more general constraint flags include a flag to disable a presence of wavefront parallel processing entry offsets and/or control a value or an occurrence of a corresponding syntax structure in the SPS.

7. The method of clause 1, wherein the one or more general constraint flags include a flag to disable an entropy coding sync point and/or control a value or an occurrence of a corresponding syntax structure in the SPS.

8. The method of clause 1, wherein the one or more general constraint flags include a flag to disable weighted prediction for P slices and/or control a value or an occurrence of a corresponding syntax element in the SPS.

9. The method of clause 1, wherein the one or more general constraint flags include a flag to disable weighted bi-prediction for B slices and/or control a value or an occurrence of a corresponding syntax element in the SPS.

10. The method of clause 1, wherein the one or more general constraint flags include a flag to disable a symmetric motion vector difference and/or control a value or an occurrence of a corresponding syntax element in the SPS.

11. The method of clause 1, wherein the one or more general constraint flags include a flag to disable a merge mode with motion vector difference and/or control a value or an occurrence of a corresponding syntax element in the SPS.

12. The method of clause 1, wherein the one or more general constraint flags include a flag to disable an intra prediction with subpartitions and/or control a value or an occurrence of a corresponding syntax element in the SPS.

13. The method of clause 1, wherein the one or more general constraint flags include a flag to disable an intra prediction with multiple reference lines and/or control a value or an occurrence of a corresponding syntax element in the SPS.

14. The method of clause 1, wherein the one or more general constraint flags include a flag to disable a matrix-based intra prediction and/or control a value or an occurrence of a corresponding syntax element in the SPS.

15. The method of clause 1, wherein the one or more general constraint flags include a flag to disable a palette coding mode and/or control a value or an occurrence of a corresponding syntax element in the SPS.

16. The method of clause 1, wherein the one or more general constraint flags include a flag to disable an adaptive color transform and/or control a value or an occurrence of a corresponding syntax element in the SPS.

17. The method of clause 1, wherein the one or more general constraint flags include a flag to disable a luma mapping with chroma scaling and/or control a value or an occurrence of a corresponding syntax element in the SPS.

18. The method of clause 1, wherein the one or more general constraint flags include a flag to disable a low frequency non-separable transform and/or control a value or an occurrence of a corresponding syntax element in the SPS.

19. The method of clause 1, wherein the one or more general constraint flags include a flag to disable a scaling list and/or control a value or an occurrence of a corresponding syntax element in the SPS.

20. The method of clause 1, wherein the one or more general constraint flags include a flag to disable virtual boundaries and/or control a value or an occurrence of a corresponding syntax element in the SPS.

21. The method of clause 1, wherein the one or more general constraint flags include a flag to disable weighted prediction for P slices and weighted bi-prediction for B slices and/or control corresponding syntax elements in the SPS.

22. The method of clause 1, wherein the format rule specifies that a general constraint flag is equal to 1, the corresponding syntax elements in the SPS and/or PH and/or SH are omitted.

23. The method of clause 22, wherein the format rule specifies that in case that the corresponding syntax elements are not present, values of the corresponding syntax elements are inferred to be equal to a certain value.

24. The method of clause 22, wherein the format rule specifies that a bitstream constraint is added such that values of the corresponding syntax elements are equal to a certain value in case that a general constraint flag is equal to 1.

25. The method of clause 22, wherein the format rule specifies that in case that no aps constraint flag is equal to 1, values of the one or more general constraint flags that are related to adaptation parameter set (APS) are required to be 1.

26. The method of clause 22, wherein the format rule specifies that in case that a flag indicating whether to impose a constraint on use of only intra prediction is equal to 1, values of the one or more general constraint flags that are related to adaptation parameter set (APS) are required to be 1.

Figure 9B:
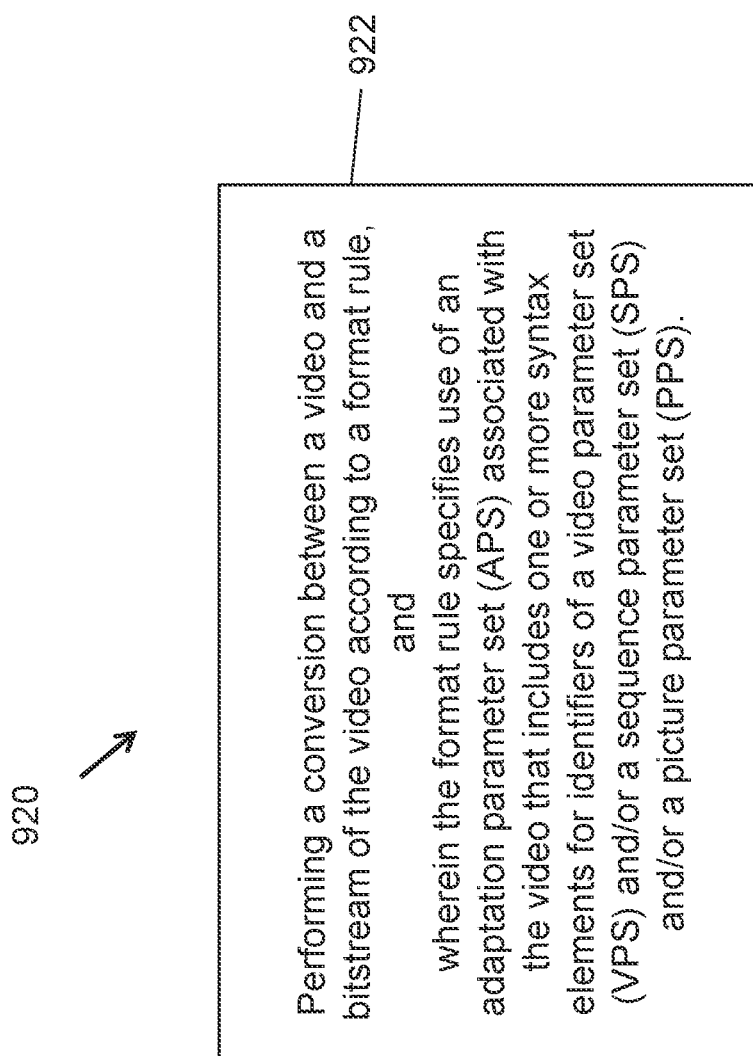

27. A method of video processing (e.g., method 920 as shown in FIG. 9B), comprising: performing 922 a conversion between a video and a bitstream of the video according to a format rule, and wherein the format rule specifies use of an adaptation parameter set (APS) associated with the video that includes one or more syntax elements for identifiers of a video parameter set (VPS) and/or a sequence parameter set (SPS) and/or a picture parameter set (PPS).

28. The method of clause 27, wherein the format rule specifies that one or more constraint flags control values and/or occurrence of the one or more syntax elements in the adaptation parameter set.

29. The method of clause 28, wherein at least one of values of the one or more syntax elements in the adaptation parameter set is equal to 1 in case 1) a first flag indicating whether to impose a constraint on a network abstraction layer (NAL) unit regarding a particular NAL unit type for APS is equal to 0, 2) a second flag indicating an applicability of adaptive loop filter (ALF) is equal to 1, and/or 3) the first flag is equal to 0 and the second flag is equal to 1.

30. The method of clause 27, wherein the format rule specifies that values of the one or more syntax elements in the adaptation parameter set are based on whether there is an APS NAL (network abstraction layer) unit corresponding to the adaptation parameter set and having a parameter type that is equal to ALF parameter.

31. The method of clause 27, wherein the format rule specifies that values of the one or more syntax elements in the adaptation parameter set are dependent on a value of a syntax element associated with a corresponding SPS or PPS based on the identifiers of the SPS or PPS.

32. The method of clause 27, wherein the format rule specifies that in case that no aps constraint flag indicating no constraint for APS is equal to 1, bitstream constraints are added not to send syntax elements associated with syntax structures including adaptive loop filter (ALF) parameters, LMCS (luma mapping with chroma scaling) parameters, scaling list parameters.

Figure 9C:
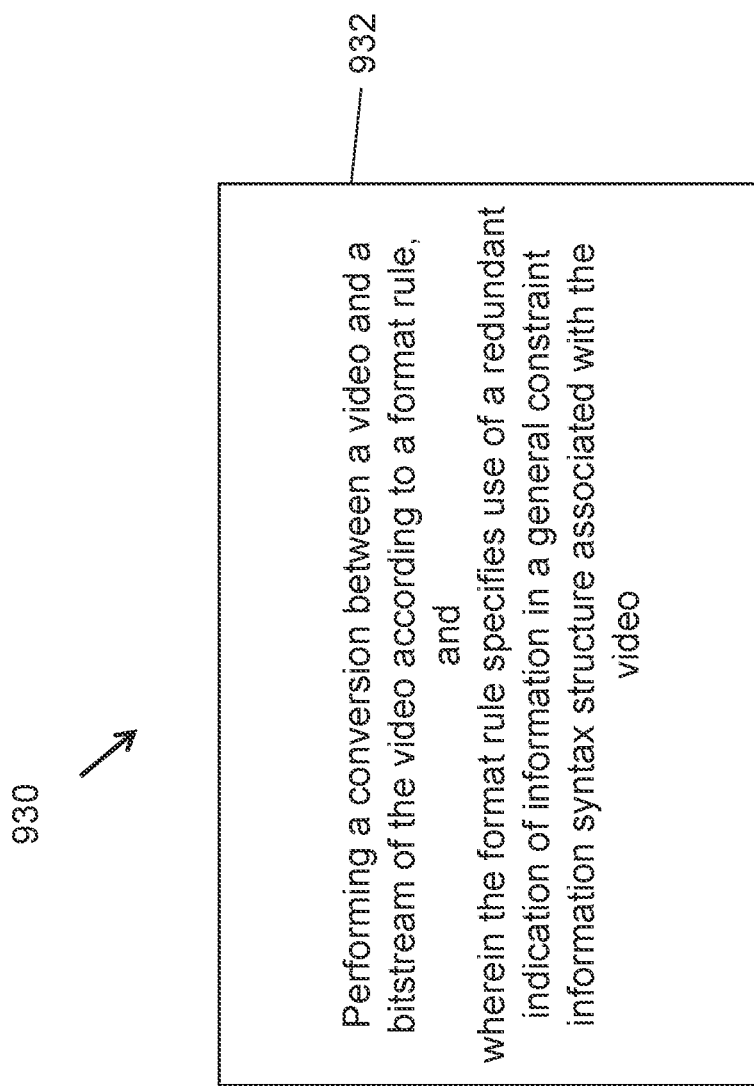
Figure 9D:
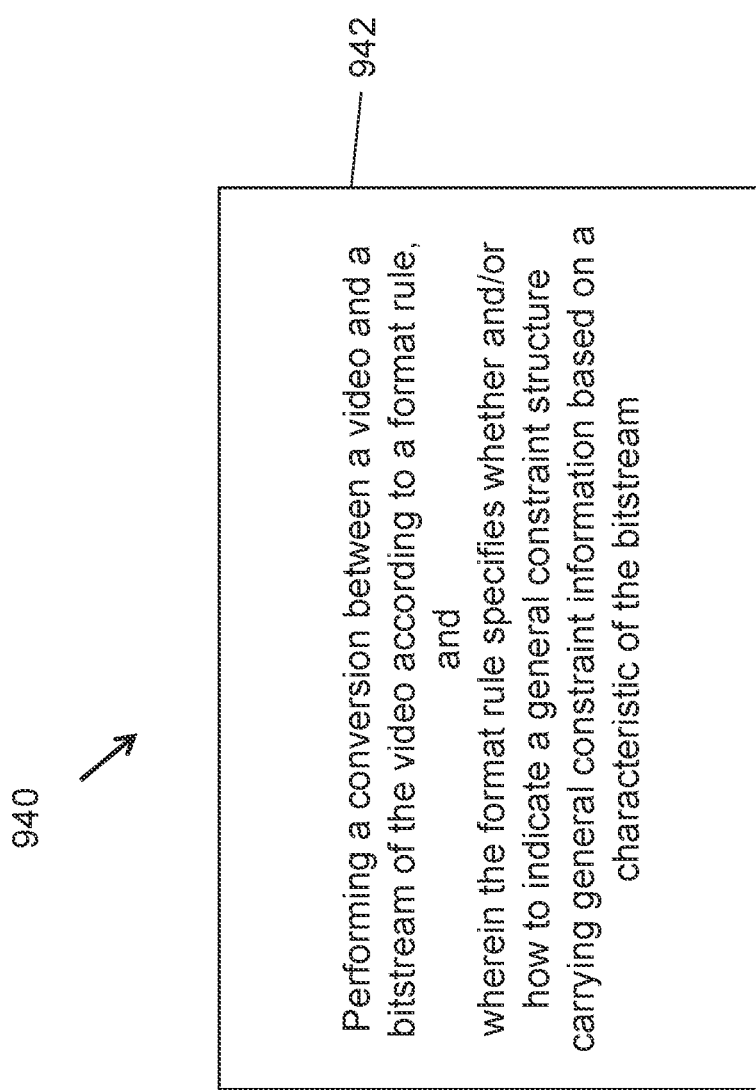

33. A method of video processing (e.g., method 930 as shown in FIG. 9C), comprising: performing 932 a conversion between a video and a bitstream of the video according to a format rule, and wherein the format rule specifies use of a redundant indication of information in a general constraint information syntax structure associated with the video.

34. The method of clause 33, wherein an applicability of the information is indicated for profiles, levels or tiers for which the information is applicable.

35. The method of clause 33, wherein the format rule specifies that the information is included in a sequence parameter set.

36. The method of clause 33, wherein the format rule specifies that the information is included in a video parameter set.

37. The method of clause 33 wherein the format rule specifies that a bitstream constraint is added to use the information included in a sequence parameter set for a coded layer video sequence in case that there is no video parameter set.

38. A method of video processing, comprising: performing a conversion between a video and a bitstream of the video according to a format rule, wherein the format rule specifies whether and/or how to indicate a general constraint structure carrying general constraint information based on a characteristic of the bitstream.

39. The method of clause 38, wherein the characteristic of the bitstream comprises a profile or a level or a tier or a sub-profile used for the conversion.

40. The method of clause 39, wherein the format rule specifies that the general constraint structure is included in a profile tier level syntax structure to which the general constraint information is applicable.

41. The method of clause 39, wherein the general constraint information indicates additional constraints regarding at least some coding tools applied in addition to constraints indicated in a profile tier level syntax structure.

42. The method of clause 39, wherein the format rule specifies that, for a particular aspect associated with a general constraint syntax element included in the general constraint structure, the general constraint syntax element has a value that indicates a constraint regarding the particular aspect that is either a tighter or same as that indicated by the profile and the sub-profile.

43. The method of clause 39, wherein the format rule specifies that, for a particular aspect associated with a general constraint syntax element included in the general constraint structure, a tightest constraint indicated by the profile, the sub-profile, and the general constraint syntax element applies to the conversion.

44. The method of clause 39, wherein the format rule specifies that no general constraint information is signaled for a specific profile and/or a specific sub-profile and/or a specific level and/or a specific tier and that general constraint parameters are inferred to be predefined values based on the specific profile and/or the specific level and/or the specific tier.

45. The method of clause 39, wherein the format rule specifies that general constraint information is signaled but ignored for a specific profile and/or a specific sub-profile and/or a specific level and/or specific tier and that general constraint flags are inferred to be predefined values based on the specific profile and/or the specific level and/or the specific tier.

46. The method of clause 39, wherein the format rule specifies that general constraint information is signaled but ignored for a specific profile and/or a specific sub-profile and/or a specific level and/or specific tier and that general constraint flags are equal to predefined values based on the specific profile and/or the specific level and/or the specific tier.

47. The method of clause 39, wherein the format rule specifies that general constraint information is signaled for a specific profile and/or a specific sub-profile and/or a specific level and/or a specific tier and that whether and/or how to apply a coding tool is determined by a corresponding general constraint flag instead of a specification in the specific profile and/or the specific level and/or the specific tier.

48. The method of clause 39, wherein the format rule specifies that a general constraint parameter associated with a coding tool is set equal to a certain value in case that the coding tool is specified to be turned off in the profile and/or the sub-profile and/or the level and/or the tier.

49. The method of clause 39, wherein the format rule specifies that a general constraint parameter associated with a coding tool is ignored and inferred to be a certain value in case that the coding tool is specified to be turned off in the profile and/or the sub-profile and/or the level and/or the tier.

50. The method of clause 39, wherein the format rule specifies that a general constraint parameter associated with a coding tool is omitted and inferred to be a certain value in case that the coding tool is specified to be turned off in the profile and/or the sub-profile and/or the level and/or the tier.

51. The method of clause 39, wherein the format rule specifies that for the profile and/or the sub-profile indicating all intra coding, a flag indicating whether to impose a constraint on use of only intra prediction is equal to 1.

52. The method of any of clauses 1 to 51, wherein the conversion includes encoding the video into the bitstream.

53. The method of any of clauses 1 to 51, wherein the conversion includes decoding the video from the bitstream.

54. The method of clauses 1 to 51, wherein the conversion includes generating the bitstream from the video, and the method further comprises: storing the bitstream in a non-transitory computer-readable recording medium.

55. A video processing apparatus comprising a processor configured to implement a method recited in any one or more of clauses 1 to 54.

56. A method of storing a bitstream of a video, comprising, a method recited in any one of clauses 1 to 54, and further including storing the bitstream to a non-transitory computer-readable recording medium.

57. A computer readable medium storing program code that, when executed, causes a processor to implement a method recited in any one or more of clauses 1 to 54.

58. A computer readable medium that stores a bitstream generated according to any of the above described methods.

59. A video processing apparatus for storing a bitstream representation, wherein the video processing apparatus is configured to implement a method recited in any one or more of clauses 1 to 54.

In the present document, the term "video processing" may refer to video encoding, video decoding, video compression or video decompression. For example, video compression algorithms may be applied during conversion from pixel representation of a video to a corresponding bitstream representation or vice versa. The bitstream representation of a current video block may, for example, correspond to bits that are either co-located or spread in different places within the bitstream, as is defined by the syntax. For example, a macroblock may be encoded in terms of transformed and coded error residual values and also using bits in headers and other fields in the bitstream. Furthermore, during conversion, a decoder may parse a bitstream with the knowledge that some fields may be present, or absent, based on the determination, as is described in the above solutions. Similarly, an encoder may determine that certain syntax fields are or are not to be included and generate the coded representation accordingly by including or excluding the syntax fields from the coded representation.

The disclosed and other solutions, examples, embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., erasable programmable read-only memory (EPROM), electrically erasable programmable read-only memory (EEPROM), and flash memory devices; magnetic disks, e.g., internal hard disks or removable disks; magneto optical disks; and compact disc, read-only memory (CD ROM) and digital versatile disc read-only memory (CD-ROM) disks. The processor and the memory can be supplemented by, or incorporated in, special purpose logic circuitry.

While this patent document contains many specifics, these should not be construed as limitations on the scope of any subject matter or of what may be claimed, but rather as descriptions of features that may be specific to particular embodiments of particular techniques. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A method of processing video data, comprising:
performing a conversion between a video and a bitstream of the video according to a format rule,
wherein the format rule specifies to include one or more general constraint flags to constrain values of corresponding syntax elements in a sequence parameter set (SPS) and/or a picture parameter set (PPS) and/or a picture header (PH) and/or a slice header (SH) and to control corresponding coding tools; and
wherein the one or more general constraint flags include a first general constraint flag, and when the first general constraint flag is equal to 1, a first syntax element of the corresponding syntax elements in the SPS is equal to 0, and a max transform size in luma samples indicated by the first syntax element equal to 64×64 is disabled and the max transform size in luma samples referring to the SPS is equal to 32×32;
wherein the one or more general constraint flags include a second general constraint flag, and when the second general constraint flag is equal to 1, a second syntax element of the corresponding syntax elements in the SPS is equal to 0, and a symmetric motion vector difference (SMVD) coding tool controlled by the second syntax element is disabled;
wherein the one or more general constraint flags include a third general constraint flag, and when the third general constraint flag is equal to 1, a third syntax element of the corresponding syntax elements in the SPS is equal to 0, and a merge mode with motion vector difference (MMVD) coding tool controlled by the third syntax element is disabled;
wherein the one or more general constraint flags include a fourth general constraint flag, and when the fourth general constraint flag is equal to 1, a fourth syntax element of the corresponding syntax elements in the SPS is equal to 0, and an intra prediction with subpartitions (ISP) coding tool controlled by the fourth syntax element is disabled;
wherein the one or more general constraint flags include a fifth general constraint flag, and when the fifth general constraint flag is equal to 1, a fifth syntax element of the corresponding syntax elements in the SPS is equal to 0, and an intra prediction with multiple reference lines (MRL) coding tool controlled by the fifth syntax element is disabled;
wherein the one or more general constraint flags include a sixth general constraint flag, and when the sixth general constraint flag is equal to 1, a sixth syntax element of the corresponding syntax elements in the SPS is equal to 0, and a matrix-based intra prediction (MIP) coding tool controlled by the sixth syntax element is disabled;
wherein the one or more general constraint flags include a seventh general constraint flag, and when the seventh general constraint flag is equal to 1, a seventh syntax element of the corresponding syntax elements in the SPS is equal to 0, and a palette coding tool controlled by the seventh syntax element is disabled;
wherein the one or more general constraint flags include an eighth general constraint flag, and when the eighth general constraint flag is equal to 1, an eighth syntax element of the corresponding syntax elements in the SPS is equal to 0, and an adaptive color transform (ACT) coding tool controlled by the eighth syntax element is disabled;
wherein the one or more general constraint flags include a ninth general constraint flag, and when the ninth general constraint flag is equal to 1, a ninth syntax element of the corresponding syntax elements in the SPS is equal to 0, and a low frequency non-separable transform (LFNST) coding tool controlled by the ninth syntax element is disabled;
wherein the one or more general constraint flags include a tenth general constraint flag, and when the tenth general constraint flag is equal to 1, a tenth syntax element of the corresponding syntax elements in the SPS is equal to 0, and disabling in-loop filtering across virtual boundaries controlled by the tenth syntax element is disabled; and
wherein the one or more general constraint flags include an eleventh general constraint flag, and when the eleventh general constraint flag is equal to 1, an eleventh syntax element and a twelfth syntax element of the corresponding syntax elements in the SPS are equal to 0, and a weighted prediction coding tool controlled by the eleventh syntax element and a weighted bi-prediction coding tool controlled by the twelfth syntax element are disabled.

2. The method of claim 1, wherein the conversion includes encoding the video into the bitstream.

3. The method of claim 1, wherein the conversion includes decoding the video from the bitstream.

4. An apparatus for processing video data comprising a processor and a non-transitory memory with instructions thereon, wherein the instructions upon execution by the processor, cause the processor to:
perform a conversion between a video and a bitstream of the video according to a format rule,
wherein the format rule specifies to include one or more general constraint flags to constrain values of corresponding syntax elements in a sequence parameter set (SPS) and/or a picture parameter set (PPS) and/or a picture header (PH) and/or a slice header (SH) and to control corresponding coding tools; and
wherein the one or more general constraint flags include a first general constraint flag, and when the first general constraint flag is equal to 1, a first syntax element of the corresponding syntax elements in the SPS is equal to 0, and a max transform size in luma samples indicated by the first syntax element equal to 64×64 is disabled and the max transform size in luma samples referring to the SPS is equal to 32×32;
wherein the one or more general constraint flags include a second general constraint flag, and when the second general constraint flag is equal to 1, a second syntax element of the corresponding syntax elements in the SPS is equal to 0, and a symmetric motion vector difference (SMVD) coding tool controlled by the second syntax element is disabled;
wherein the one or more general constraint flags include a third general constraint flag, and when the third general constraint flag is equal to 1, a third syntax element of the corresponding syntax elements in the SPS is equal to 0, and a merge mode with motion vector difference (MMVD) coding tool controlled by the third syntax element is disabled;
wherein the one or more general constraint flags include a fourth general constraint flag, and when the fourth general constraint flag is equal to 1, a fourth syntax element of the corresponding syntax elements in the SPS is equal to 0, and an intra prediction with subpartitions (ISP) coding tool controlled by the fourth syntax element is disabled;
wherein the one or more general constraint flags include a fifth general constraint flag, and when the fifth general constraint flag is equal to 1, a fifth syntax element of the corresponding syntax elements in the SPS is equal to 0, and an intra prediction with multiple reference lines (MRL) coding tool controlled by the fifth syntax element is disabled;
wherein the one or more general constraint flags include a sixth general constraint flag, and when the sixth general constraint flag is equal to 1, a sixth syntax element of the corresponding syntax elements in the SPS is equal to 0, and a matrix-based intra prediction (MIP) coding tool controlled by the sixth syntax element is disabled;
wherein the one or more general constraint flags include a seventh general constraint flag, and when the seventh general constraint flag is equal to 1, a seventh syntax element of the corresponding syntax elements in the SPS is equal to 0, and a palette coding tool controlled by the seventh syntax element is disabled;
wherein the one or more general constraint flags include an eighth general constraint flag, and when the eighth general constraint flag is equal to 1, an eighth syntax element of the corresponding syntax elements in the SPS is equal to 0, and an adaptive color transform (ACT) coding tool controlled by the eighth syntax element is disabled;
wherein the one or more general constraint flags include a ninth general constraint flag, and when the ninth general constraint flag is equal to 1, a ninth syntax element of the corresponding syntax elements in the SPS is equal to 0, and a low frequency non-separable transform (LFNST) coding tool controlled by the ninth syntax element is disabled;
wherein the one or more general constraint flags include a tenth general constraint flag, and when the tenth general constraint flag is equal to 1, a tenth syntax element of the corresponding syntax elements in the SPS is equal to 0, and disabling in-loop filtering across virtual boundaries controlled by the tenth syntax element is disabled; and
wherein the one or more general constraint flags include an eleventh general constraint flag, and when the eleventh general constraint flag is equal to 1, an eleventh syntax element and a twelfth syntax element of the corresponding syntax elements in the SPS are equal to 0, and a weighted prediction coding tool controlled by the eleventh syntax element and a weighted bi-prediction coding tool controlled by the twelfth syntax element are disabled.

5. A non-transitory computer-readable storage medium storing instructions that cause a processor to:
perform a conversion between a video and a bitstream of the video according to a format rule, wherein the format rule specifies to include one or more general constraint flags to constrain values of corresponding syntax elements in a sequence parameter set (SPS) and/or a picture parameter set (PPS) and/or a picture header (PH) and/or a slice header (SH) and to control corresponding coding tools; and wherein the one or more general constraint flags include a first general constraint flag, and when the first general constraint flag is equal to 1, a first syntax element of the corresponding syntax elements in the SPS is equal to 0, and a max transform size in luma samples indicated by the first syntax element equal to 64×64 is disabled and the max transform size in luma samples referring to the SPS is equal to 32×32;

wherein the one or more general constraint flags include a second general constraint flag, and when the second general constraint flag is equal to 1, a second syntax element of the corresponding syntax elements in the SPS is equal to 0, and a symmetric motion vector difference (SMVD) coding tool controlled by the second syntax element is disabled;

wherein the one or more general constraint flags include a third general constraint flag, and when the third general constraint flag is equal to 1, a third syntax element of the corresponding syntax elements in the SPS is equal to 0, and a merge mode with motion vector difference (MMVD) coding tool controlled by the third syntax element is disabled;

wherein the one or more general constraint flags include a fourth general constraint flag, and when the fourth general constraint flag is equal to 1, a fourth syntax element of the corresponding syntax elements in the SPS is equal to 0, and an intra prediction with subpartitions (ISP) coding tool controlled by the fourth syntax element is disabled;

wherein the one or more general constraint flags include a fifth general constraint flag, and when the fifth general constraint flag is equal to 1, a fifth syntax element of the corresponding syntax elements in the SPS is equal to 0, and an intra prediction with multiple reference lines (MRL) coding tool controlled by the fifth syntax element is disabled;

wherein the one or more general constraint flags include a sixth general constraint flag, and when the sixth general constraint flag is equal to 1, a sixth syntax element of the corresponding syntax elements in the SPS is equal to 0, and a matrix-based intra prediction (MIP) coding tool controlled by the sixth syntax element is disabled;

wherein the one or more general constraint flags include a seventh general constraint flag, and when the seventh general constraint flag is equal to 1, a seventh syntax element of the corresponding syntax elements in the SPS is equal to 0, and a palette coding tool controlled by the seventh syntax element is disabled;

wherein the one or more general constraint flags include an eighth general constraint flag, and when the eighth general constraint flag is equal to 1, an eighth syntax element of the corresponding syntax elements in the SPS is equal to 0, and an adaptive color transform (ACT) coding tool controlled by the eighth syntax element is disabled;

wherein the one or more general constraint flags include a ninth general constraint flag, and when the ninth general constraint flag is equal to 1, a ninth syntax element of the corresponding syntax elements in the SPS is equal to 0, and a low frequency non-separable transform (LFNST) coding tool controlled by the ninth syntax element is disabled;

wherein the one or more general constraint flags include a tenth general constraint flag, and when the tenth general constraint flag is equal to 1, a tenth syntax element of the corresponding syntax elements in the SPS is equal to 0, and disabling in-loop filtering across virtual boundaries controlled by the tenth syntax element is disabled; and wherein the one or more general constraint flags include an eleventh general constraint flag, and when the eleventh general constraint flag is equal to 1, an eleventh syntax element and a twelfth syntax element of the corresponding syntax elements in the SPS are equal to 0, and a weighted prediction coding tool controlled by the eleventh syntax element and a weighted bi-prediction coding tool controlled by the twelfth syntax element are disabled.

6. A non-transitory computer-readable recording medium storing a bitstream of a video which is generated by a method performed by a video processing apparatus, wherein the method comprises:

generating the bitstream for the video according to a format rule, wherein the format rule specifies to include one or more general constraint flags to constrain values of corresponding syntax elements in a sequence parameter set (SPS) and/or a picture parameter set (PPS) and/or a picture header (PH) and/or a slice header (SH) and to control corresponding coding tools; and wherein the one or more general constraint flags include a first general constraint flag, and when the first general constraint flag is equal to 1, a first syntax element of the corresponding syntax elements in the SPS is equal to 0, and a max transform size in luma samples indicated by the first syntax element equal to 64×64 is disabled and the max transform size in luma samples referring to the SPS is equal to 32×32;

wherein the one or more general constraint flags include a second general constraint flag, and when the second general constraint flag is equal to 1, a second syntax element of the corresponding syntax elements in the SPS is equal to 0, and a symmetric motion vector difference (SMVD) coding tool controlled by the second syntax element is disabled;

wherein the one or more general constraint flags include a third general constraint flag, and when the third general constraint flag is equal to 1, a third syntax element of the corresponding syntax elements in the SPS is equal to 0, and a merge mode with motion vector difference (MMVD) coding tool controlled by the third syntax element is disabled;

wherein the one or more general constraint flags include a fourth general constraint flag, and when the fourth general constraint flag is equal to 1, a fourth syntax element of the corresponding syntax elements in the SPS is equal to 0, and an intra prediction with subpartitions (ISP) coding tool controlled by the fourth syntax element is disabled;

wherein the one or more general constraint flags include a fifth general constraint flag, and when the fifth general constraint flag is equal to 1, a fifth syntax element of the corresponding syntax elements in the SPS is equal to 0, and an intra prediction with multiple reference lines (MRL) coding tool controlled by the fifth syntax element is disabled;

wherein the one or more general constraint flags include a sixth general constraint flag, and when the sixth general constraint flag is equal to 1, a sixth syntax element of the corresponding syntax elements in the SPS is equal to 0, and a matrix-based intra prediction (MIP) coding tool controlled by the sixth syntax element is disabled;

wherein the one or more general constraint flags include a seventh general constraint flag, and when the seventh general constraint flag is equal to 1, a seventh syntax element of the corresponding syntax elements in the SPS is equal to 0, and a palette coding tool controlled by the seventh syntax element is disabled;

wherein the one or more general constraint flags include an eighth general constraint flag, and when the eighth general constraint flag is equal to 1, an eighth syntax element of the corresponding syntax elements in the SPS is equal to 0, and an adaptive color transform (ACT) coding tool controlled by the eighth syntax element is disabled;

wherein the one or more general constraint flags include a ninth general constraint flag, and when the ninth general constraint flag is equal to 1, a ninth syntax element of the corresponding syntax elements in the SPS is equal to 0, and a low frequency non-separable transform (LFNST) coding tool controlled by the ninth syntax element is disabled;

wherein the one or more general constraint flags include a tenth general constraint flag, and when the tenth general constraint flag is equal to 1, a tenth syntax element of the corresponding syntax elements in the SPS is equal to 0, and disabling in-loop filtering across virtual boundaries controlled by the tenth syntax element is disabled; and wherein the one or more general constraint flags include an eleventh general constraint flag, and when the eleventh general constraint flag is equal to 1, an eleventh syntax element and a twelfth syntax element of the corresponding syntax elements in the SPS are equal to 0, and a weighted prediction coding tool controlled by the eleventh syntax element and a weighted bi-prediction coding tool controlled by the twelfth syntax element are disabled.

* * * * *